US010413880B2

(12) United States Patent
Biberger et al.

(10) Patent No.: US 10,413,880 B2
(45) Date of Patent: Sep. 17, 2019

(54) COMPOSITIONS FOR PASSIVE NOX ADSORPTION (PNA) SYSTEMS AND METHODS OF MAKING AND USING SAME

(71) Applicant: Umicore AG & Co. KG, Hanau-Wolfgang (DE)

(72) Inventors: Maximilian A. Biberger, Scottsdale, AZ (US); Bryant Kearl, Phoenix, AZ (US); Qinghua Yin, Tempe, AZ (US); Xiwang Qi, Scottsdale, AZ (US)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 16/113,931

(22) Filed: Aug. 27, 2018

(65) Prior Publication Data

US 2019/0009244 A1    Jan. 10, 2019

Related U.S. Application Data

(60) Division of application No. 15/605,750, filed on May 25, 2017, now Pat. No. 10,086,356, which is a
(Continued)

(51) Int. Cl.
*B01J 20/02* (2006.01)
*B01J 20/04* (2006.01)
(Continued)

(52) U.S. Cl.
CPC .......... *B01J 20/02* (2013.01); *B01D 53/9413* (2013.01); *B01D 53/9481* (2013.01);
(Continued)

(58) Field of Classification Search
CPC .... B01J 20/02; B01J 20/0207; B01J 20/0211; B01J 20/04; B01J 20/08; B01J 20/28007;
(Continued)

(56) References Cited

U.S. PATENT DOCUMENTS 1,477,664 A  12/1923  Rankin
2,021,936 A  11/1935  Johnstone
(Continued)

FOREIGN PATENT DOCUMENTS

CN   101301610 A   11/2008
CN   101601999 A   12/2009
(Continued)

OTHER PUBLICATIONS

Ahmad, K. et al. (2008). "Hybrid Nanocomposites: A New Route Towards Tougher Alumina Ceramics," *Composites Science and Technology* 68: 1321-1327.
(Continued)

*Primary Examiner* — Cam N. Nguyen
(74) *Attorney, Agent, or Firm* — Suzannah K. Sundby, Esq.; Canady + Lortz LLP

(57) ABSTRACT

The present disclosure relates to a substrate containing passive $NO_x$ adsorption (PNA) materials for treatment of gases, and washcoats for use in preparing such a substrate. Also provided are methods of preparation of the PNA materials, as well as methods of preparation of the substrate containing the PNA materials. More specifically, the present disclosure relates to a coated substrate containing PNA materials for PNA systems, useful in the treatment of exhaust gases. Also disclosed are exhaust treatment systems, and vehicles, such as diesel or gasoline vehicles, particularly light-duty diesel or gasoline vehicles, using catalytic converters and exhaust treatment systems using the coated substrates.

20 Claims, 8 Drawing Sheets

US 10,413,880 B2
Page 2

Related U.S. Application Data continuation of application No. 14/663,330, filed on Mar. 19, 2015, now Pat. No. 9,687,811.

(60) Provisional application No. 62/121,444, filed on Feb. 26, 2015, provisional application No. 61/985,388, filed on Apr. 28, 2014, provisional application No. 61/969,035, filed on Mar. 21, 2014.

(51) Int. Cl.

| | |
|---|---|
| *B01J 20/08* | (2006.01) |
| *B01J 20/28* | (2006.01) |
| *B01J 20/32* | (2006.01) |
| *B01J 23/42* | (2006.01) |
| *B01J 23/63* | (2006.01) |
| *B01J 35/00* | (2006.01) |
| *B01J 37/02* | (2006.01) |
| *B01D 53/94* | (2006.01) |
| *F01N 3/08* | (2006.01) |

(52) U.S. Cl.
CPC ....... *B01J 20/0207* (2013.01); *B01J 20/0211* (2013.01); *B01J 20/04* (2013.01); *B01J 20/08* (2013.01); *B01J 20/28007* (2013.01); *B01J 20/28045* (2013.01); *B01J 20/3236* (2013.01); *B01J 20/3295* (2013.01); *B01J 23/42* (2013.01); *B01J 23/63* (2013.01); *B01J 35/0006* (2013.01); *B01J 35/0013* (2013.01); *B01J 37/0244* (2013.01); *B01J 37/0246* (2013.01); *F01N 3/0807* (2013.01); *F01N 3/0814* (2013.01); *F01N 3/0842* (2013.01); B01D 2255/1021 (2013.01); B01D 2255/1023 (2013.01); B01D 2255/1026 (2013.01); B01D 2255/2061 (2013.01); B01D 2255/2063 (2013.01); B01D 2255/2065 (2013.01); B01D 2255/20715 (2013.01); B01D 2255/91 (2013.01); B01D 2258/012 (2013.01); Y02A 50/2325 (2018.01)

(58) Field of Classification Search
CPC .............. B01J 20/28045; B01J 20/3236; B01J 20/3295; B01J 23/42; B01J 23/63; B01J 35/0006; B01J 35/0013; B01J 37/0244; B01J 37/0246; B01D 53/9413; B01D 53/9481; F01N 3/0807; F01N 3/0814; F01N 3/0842
See application file for complete search history.

(56) References Cited

U.S. PATENT DOCUMENTS

| | | |
|---|---|---|
| 2,284,554 A | 5/1942 | Beyerstedt |
| 2,419,042 A | 4/1947 | Todd |
| 2,519,531 A | 8/1950 | Worn |
| 2,562,753 A | 7/1951 | Trost |
| 2,689,780 A | 9/1954 | Rice |
| 3,001,402 A | 9/1961 | Koblin |
| 3,042,511 A | 7/1962 | Reding, Jr. |
| 3,067,025 A | 12/1962 | Chisholm |
| 3,108,006 A | 10/1963 | Kenedi et al. |
| 3,145,287 A | 8/1964 | Siebein et al. |
| 3,178,121 A | 4/1965 | Wallace, Jr. |
| 3,179,782 A | 4/1965 | Matvay |
| 3,181,947 A | 5/1965 | Vordahl |
| 3,235,700 A | 2/1966 | Mondain-Monval et al. |
| 3,290,723 A | 12/1966 | Jaques et al. |
| 3,309,873 A | 3/1967 | Cann |
| 3,313,908 A | 4/1967 | Unger et al. |
| 3,387,110 A | 6/1968 | Wendler et al. |
| 3,401,465 A | 9/1968 | Larwill |
| 3,450,926 A | 6/1969 | Kiernan |
| 3,457,788 A | 7/1969 | Miyajima |
| 3,520,656 A | 7/1970 | Yates et al. |
| 3,537,513 A | 11/1970 | Austin |
| 3,552,653 A | 1/1971 | Inoue |
| 3,589,351 A | 6/1971 | Shoupp et al. |
| 3,617,358 A | 11/1971 | Dittrich |
| 3,667,111 A | 6/1972 | Chartet |
| 3,676,638 A | 7/1972 | Stand |
| 3,741,001 A | 6/1973 | Fletcher et al. |
| 3,743,708 A | 7/1973 | Chase et al. |
| 3,752,172 A | 8/1973 | Cohen et al. |
| 3,761,360 A | 9/1973 | Auvil et al. |
| 3,774,442 A | 11/1973 | Gustaysson |
| 3,804,034 A | 4/1974 | Stiglich, Jr. |
| 3,830,756 A | 8/1974 | Sanchez et al. |
| 3,857,744 A | 12/1974 | Moss |
| 3,871,448 A | 3/1975 | Vann et al. |
| 3,892,882 A | 7/1975 | Guest et al. |
| 3,914,573 A | 10/1975 | Muehlberger |
| 3,959,094 A | 5/1976 | Steinberg |
| 3,959,420 A | 5/1976 | Geddes et al. |
| 3,969,482 A | 7/1976 | Teller |
| 4,006,340 A | 2/1977 | Gorinas |
| 4,008,620 A | 2/1977 | Narato et al. |
| 4,018,388 A | 4/1977 | Andrews |
| 4,021,021 A | 5/1977 | Hall et al. |
| 4,127,760 A | 11/1978 | Meyer et al. |
| 4,139,497 A | 2/1979 | Castor et al. |
| 4,146,654 A | 3/1979 | Guyonnet |
| 4,157,316 A | 6/1979 | Thompson et al. |
| 4,171,288 A | 10/1979 | Keith et al. |
| 4,174,298 A | 11/1979 | Antos |
| 4,189,925 A | 2/1980 | Long |
| 4,227,928 A | 10/1980 | Wang |
| 4,248,387 A | 2/1981 | Andrews |
| 4,252,843 A | 2/1981 | Dorer et al. |
| 4,253,917 A | 3/1981 | Wang |
| 4,260,649 A | 4/1981 | Dension et al. |
| 4,284,609 A | 8/1981 | deVries |
| 4,315,874 A | 2/1982 | Ushida et al. |
| 4,326,492 A | 4/1982 | Leibrand, Sr. et al. |
| 4,335,080 A | 6/1982 | Davis et al. |
| 4,344,779 A | 8/1982 | Isserlis |
| 4,369,167 A | 1/1983 | Weir |
| 4,388,274 A | 6/1983 | Rourke et al. |
| 4,419,331 A | 12/1983 | Montalvo |
| 4,431,750 A | 2/1984 | McGinnis et al. |
| 4,436,075 A | 3/1984 | Campbell et al. |
| 4,440,733 A | 4/1984 | Lawson et al. |
| 4,458,138 A | 7/1984 | Adrian et al. |
| 4,459,327 A | 7/1984 | Wang |
| 4,505,945 A | 3/1985 | Dubust et al. |
| 4,506,136 A | 3/1985 | Smyth et al. |
| 4,513,149 A | 4/1985 | Gray et al. |
| 4,523,981 A | 6/1985 | Ang et al. |
| 4,545,872 A | 10/1985 | Sammells et al. |
| RE32,244 E | 9/1986 | Andersen |
| 4,609,441 A | 9/1986 | Frese, Jr. et al. |
| 4,610,857 A | 9/1986 | Ogawa et al. |
| 4,616,779 A | 10/1986 | Serrano et al. |
| 4,642,207 A | 2/1987 | Uda et al. |
| 4,665,296 A | 5/1987 | Iwata et al. |
| 4,723,589 A | 2/1988 | Iyer et al. |
| 4,731,517 A | 3/1988 | Cheney |
| 4,751,021 A | 6/1988 | Mollon et al. |
| 4,764,283 A | 8/1988 | Ashbrook et al. |
| 4,765,805 A | 8/1988 | Wahl et al. |
| 4,780,591 A | 10/1988 | Bernecki et al. |
| 4,824,624 A | 4/1989 | Palicka et al. |
| 4,836,084 A | 6/1989 | Vogelesang et al. |
| 4,855,505 A | 8/1989 | Koll |
| 4,866,240 A | 9/1989 | Webber |
| 4,869,936 A | 9/1989 | Moskowitz et al. |
| 4,877,937 A | 10/1989 | Müller |
| 4,885,038 A | 12/1989 | Anderson et al. |
| 4,902,870 A | 2/1990 | Frind et al. |
| 4,916,107 A | 4/1990 | Brand et al. |
| 4,921,586 A | 5/1990 | Molter |

(56) References Cited

U.S. PATENT DOCUMENTS

| | | |
|---|---|---|
| 4,970,364 A | 11/1990 | Müller |
| 4,982,050 A | 1/1991 | Gammie et al. |
| 4,983,555 A | 1/1991 | Roy et al. |
| 4,987,033 A | 1/1991 | Abkowitz et al. |
| 5,006,163 A | 4/1991 | Benn et al. |
| 5,013,883 A | 5/1991 | Fuimefreddo et al. |
| 5,015,863 A | 5/1991 | Takeshima et al. |
| 5,041,713 A | 8/1991 | Weidman |
| 5,043,548 A | 8/1991 | Whitney et al. |
| 5,070,064 A | 12/1991 | Hsu et al. |
| 5,073,193 A | 12/1991 | Chaklader et al. |
| 5,133,190 A | 7/1992 | Abdelmalek |
| 5,151,296 A | 9/1992 | Tokunaga |
| 5,157,007 A | 10/1992 | Domesle et al. |
| 5,187,140 A | 2/1993 | Thorsteinson et al. |
| 5,192,130 A | 3/1993 | Endo et al. |
| 5,217,746 A | 6/1993 | Lenling et al. |
| 5,225,652 A | 7/1993 | Landes |
| 5,225,656 A | 7/1993 | Frind |
| 5,230,844 A | 7/1993 | Macaire et al. |
| 5,233,153 A | 8/1993 | Coats |
| 5,243,169 A | 9/1993 | Tateno et al. |
| 5,260,241 A | 11/1993 | Addiego et al. |
| 5,269,848 A | 12/1993 | Nakagawa |
| 5,276,693 A | 1/1994 | Long et al. |
| 5,280,757 A | 1/1994 | Carter et al. |
| 5,294,242 A | 3/1994 | Zurecki et al. |
| 5,330,945 A | 7/1994 | Beckmeyer et al. |
| 5,338,716 A | 8/1994 | Triplett et al. |
| 5,369,241 A | 11/1994 | Taylor et al. |
| 5,371,049 A | 12/1994 | Moffett et al. |
| 5,372,629 A | 12/1994 | Anderson et al. |
| 5,392,797 A | 2/1995 | Welch |
| 5,408,066 A | 4/1995 | Trapani et al. |
| 5,436,080 A | 7/1995 | Inoue et al. |
| 5,439,865 A | 8/1995 | Abe et al. |
| 5,442,153 A | 8/1995 | Marantz et al. |
| 5,444,209 A | 8/1995 | Crawmer et al. |
| 5,452,854 A | 9/1995 | Keller |
| 5,460,701 A | 10/1995 | Parker et al. |
| 5,464,458 A | 11/1995 | Yamamoto |
| 5,485,941 A | 1/1996 | Guyomard et al. |
| 5,486,675 A | 1/1996 | Taylor et al. |
| 5,487,916 A | 1/1996 | Christensen |
| 5,489,449 A | 2/1996 | Umeya et al. |
| 5,510,086 A | 4/1996 | Hemingway et al. |
| 5,534,149 A | 7/1996 | Birkenbeil et al. |
| 5,534,270 A | 7/1996 | De Castro |
| 5,543,173 A | 8/1996 | Horn, Jr. et al. |
| 5,553,507 A | 9/1996 | Basch et al. |
| 5,558,771 A | 9/1996 | Hagen et al. |
| 5,562,966 A | 10/1996 | Clarke et al. |
| 5,582,807 A | 12/1996 | Liao et al. |
| 5,596,973 A | 1/1997 | Grice |
| 5,611,896 A | 3/1997 | Swanepoel et al. |
| 5,630,322 A | 5/1997 | Heilmann et al. |
| 5,652,304 A | 7/1997 | Calderon et al. |
| 5,676,912 A | 10/1997 | Sharma et al. |
| 5,714,644 A | 2/1998 | Irgang et al. |
| 5,723,027 A | 3/1998 | Serole |
| 5,723,187 A | 3/1998 | Popoola et al. |
| 5,726,414 A | 3/1998 | Kitahashi et al. |
| 5,726,415 A | 3/1998 | Luo et al. |
| 5,733,662 A | 3/1998 | Bogachek |
| 5,749,938 A | 5/1998 | Coombs |
| 5,776,359 A | 7/1998 | Schultz et al. |
| 5,788,738 A | 8/1998 | Pirzada et al. |
| 5,804,155 A | 9/1998 | Farrauto et al. |
| 5,811,187 A | 9/1998 | Anderson et al. |
| 5,837,959 A | 11/1998 | Muehlberger et al. |
| 5,851,507 A | 12/1998 | Pirzada et al. |
| 5,853,815 A | 12/1998 | Muehlberger |
| 5,858,470 A | 1/1999 | Bernecki et al. |
| 5,884,473 A | 3/1999 | Noda et al. |
| 5,905,000 A | 5/1999 | Yadav et al. |
| 5,928,806 A | 7/1999 | Olah et al. |
| 5,935,293 A | 8/1999 | Detering et al. |
| 5,973,289 A | 10/1999 | Read et al. |
| 5,984,997 A | 11/1999 | Bickmore et al. |
| 5,989,648 A | 11/1999 | Phillips |
| 5,993,967 A | 11/1999 | Brotzman, Jr. et al. |
| 5,993,988 A | 11/1999 | Ohara et al. |
| 6,001,426 A | 12/1999 | Witherspoon et al. |
| 6,004,620 A | 12/1999 | Camm |
| 6,012,647 A | 1/2000 | Ruta et al. |
| 6,033,781 A | 3/2000 | Brotzman, Jr. et al. |
| 6,045,765 A | 4/2000 | Nakatsuji et al. |
| 6,059,853 A | 5/2000 | Coombs |
| 6,066,587 A | 5/2000 | Kurokawa et al. |
| 6,084,197 A | 7/2000 | Fusaro, Jr. |
| 6,093,306 A | 7/2000 | Hanrahan et al. |
| 6,093,378 A | 7/2000 | Deeba et al. |
| 6,102,106 A | 8/2000 | Manning et al. |
| 6,117,376 A | 9/2000 | Merkel |
| 6,139,813 A | 10/2000 | Narula et al. |
| 6,140,539 A | 10/2000 | Sander et al. |
| 6,150,288 A | 11/2000 | Suzuki et al. |
| 6,168,694 B1 | 1/2001 | Huang et al. |
| 6,190,627 B1 | 2/2001 | Hoke et al. |
| 6,213,049 B1 | 4/2001 | Yang |
| 6,214,195 B1 | 4/2001 | Yadav et al. |
| 6,228,904 B1 | 5/2001 | Yadav et al. |
| 6,248,684 B1 | 6/2001 | Yavuz |
| 6,254,940 B1 | 7/2001 | Pratsinis et al. |
| 6,261,484 B1 | 7/2001 | Phillips et al. |
| 6,267,864 B1 | 7/2001 | Yadav et al. |
| 6,274,107 B1 | 8/2001 | Yavuz |
| 6,322,756 B1 | 11/2001 | Arno et al. |
| 6,342,465 B1 | 1/2002 | Klein et al. |
| 6,344,271 B1 | 2/2002 | Yadav et al. |
| 6,362,449 B1 | 3/2002 | Hadidi et al. |
| 6,365,016 B1 | 4/2002 | Iacovangelo et al. |
| 6,379,419 B1 | 4/2002 | Celik et al. |
| 6,387,560 B1 | 5/2002 | Yadav et al. |
| 6,395,214 B1 | 5/2002 | Kear et al. |
| 6,398,843 B1 | 6/2002 | Tarrant |
| 6,399,030 B1 | 6/2002 | Nolan |
| 6,409,851 B1 | 6/2002 | Sethuram et al. |
| 6,413,781 B1 | 7/2002 | Geis et al. |
| 6,416,818 B1 | 7/2002 | Aikens et al. |
| RE37,853 E | 9/2002 | Detering et al. |
| 6,444,009 B1 | 9/2002 | Liu et al. |
| 6,444,298 B1 | 9/2002 | Tadokoro et al. |
| 6,475,951 B1 | 11/2002 | Domesle et al. |
| 6,488,904 B1 | 12/2002 | Cox et al. |
| 6,491,423 B1 | 12/2002 | Skibo et al. |
| 6,491,985 B2 | 12/2002 | He |
| 6,506,995 B1 | 1/2003 | Fusaro, Jr. et al. |
| 6,517,800 B1 | 2/2003 | Cheng et al. |
| 6,524,662 B2 | 2/2003 | Jang et al. |
| 6,531,704 B2 | 3/2003 | Yadav et al. |
| 6,548,445 B1 | 4/2003 | Buysch et al. |
| 6,554,609 B2 | 4/2003 | Yadav et al. |
| 6,562,304 B1 | 5/2003 | Mizrahi |
| 6,562,495 B2 | 5/2003 | Yadav et al. |
| 6,569,393 B1 | 5/2003 | Hoke et al. |
| 6,569,397 B1 | 5/2003 | Yadav et al. |
| 6,569,518 B2 | 5/2003 | Yadav et al. |
| 6,572,672 B2 | 6/2003 | Yadav et al. |
| 6,579,446 B1 | 6/2003 | Teran et al. |
| 6,596,187 B2 | 7/2003 | Coll et al. |
| 6,603,038 B1 | 8/2003 | Hagemeyer et al. |
| 6,607,821 B2 | 8/2003 | Yadav et al. |
| 6,610,355 B2 | 8/2003 | Yadav et al. |
| 6,623,559 B2 | 9/2003 | Huang |
| 6,635,357 B2 | 10/2003 | Moxson et al. |
| 6,641,775 B2 | 11/2003 | Vigliotti et al. |
| 6,652,822 B2 | 11/2003 | Phillips et al. |
| 6,652,967 B2 | 11/2003 | Yadav et al. |
| 6,669,823 B1 | 12/2003 | Sarkas et al. |
| 6,682,002 B2 | 1/2004 | Kyotani |
| 6,689,192 B1 | 2/2004 | Phillips et al. |
| 6,699,398 B1 | 3/2004 | Kim |
| 6,706,097 B2 | 3/2004 | Zornes |

(56) References Cited

U.S. PATENT DOCUMENTS

| | | |
|---|---|---|
| 6,706,660 B2 | 3/2004 | Park |
| 6,710,207 B2 | 3/2004 | Bogan, Jr. et al. |
| 6,713,176 B2 | 3/2004 | Yadav et al. |
| 6,716,525 B1 | 4/2004 | Yadav et al. |
| 6,744,006 B2 | 6/2004 | Johnson et al. |
| 6,746,791 B2 | 6/2004 | Yadav et al. |
| 6,772,584 B2 | 8/2004 | Chun et al. |
| 6,780,350 B1 | 8/2004 | Kodas et al. |
| 6,786,950 B2 | 9/2004 | Yadav et al. |
| 6,813,931 B2 | 11/2004 | Yadav et al. |
| 6,817,388 B2 | 11/2004 | Tsangaris et al. |
| 6,832,735 B2 | 12/2004 | Yadav et al. |
| 6,838,072 B1 | 1/2005 | Kong et al. |
| 6,841,509 B1 | 1/2005 | Hwang et al. |
| 6,855,410 B2 | 2/2005 | Buckley |
| 6,855,426 B2 | 2/2005 | Yadav |
| 6,855,749 B1 | 2/2005 | Yadav et al. |
| 6,858,170 B2 | 2/2005 | Van Thillo et al. |
| 6,886,545 B1 | 5/2005 | Holm |
| 6,891,319 B2 | 5/2005 | Dean et al. |
| 6,896,958 B1 | 5/2005 | Cayton et al. |
| 6,902,699 B2 | 6/2005 | Fritzemeier et al. |
| 6,916,872 B2 | 7/2005 | Yadav et al. |
| 6,919,065 B2 | 7/2005 | Zhou et al. |
| 6,919,527 B2 | 7/2005 | Boulos et al. |
| 6,933,331 B2 | 8/2005 | Yadav et al. |
| 6,953,494 B2 | 10/2005 | Nelson, Jr. |
| 6,956,007 B2 | 10/2005 | Cai et al. |
| 6,972,115 B1 | 12/2005 | Ballard |
| 6,986,877 B2 | 1/2006 | Takikawa et al. |
| 6,994,837 B2 | 2/2006 | Boulos et al. |
| 7,007,872 B2 | 3/2006 | Yadav et al. |
| 7,022,305 B2 | 4/2006 | Drumm et al. |
| 7,052,777 B2 | 5/2006 | Brotzman, Jr. et al. |
| 7,066,976 B2 | 6/2006 | Hampden-Smith et al. |
| 7,073,559 B2 | 7/2006 | O'Larey et al. |
| 7,074,364 B2 | 7/2006 | Jähn et al. |
| 7,081,267 B2 | 7/2006 | Yadav |
| 7,094,370 B2 | 8/2006 | Kodas et al. |
| 7,101,819 B2 | 9/2006 | Rosenflanz et al. |
| 7,147,544 B2 | 12/2006 | Rosenflanz |
| 7,147,894 B2 | 12/2006 | Zhou et al. |
| 7,166,198 B2 | 1/2007 | Van Der Walt et al. |
| 7,166,663 B2 | 1/2007 | Cayton et al. |
| 7,172,649 B2 | 2/2007 | Conrad et al. |
| 7,172,790 B2 | 2/2007 | Koulik et al. |
| 7,178,747 B2 | 2/2007 | Yadav et al. |
| 7,208,126 B2 | 4/2007 | Musick et al. |
| 7,211,236 B2 | 5/2007 | Stark et al. |
| 7,217,407 B2 | 5/2007 | Zhang |
| 7,220,398 B2 | 5/2007 | Sutorik et al. |
| 7,255,498 B2 | 8/2007 | Bush et al. |
| 7,265,076 B2 | 9/2007 | Taguchi et al. |
| 7,282,167 B2 | 10/2007 | Carpenter |
| 7,307,195 B2 | 12/2007 | Polverejan et al. |
| 7,323,655 B2 | 1/2008 | Kim |
| 7,384,447 B2 | 6/2008 | Kodas et al. |
| 7,402,899 B1 | 7/2008 | Whiting et al. |
| 7,417,008 B2 | 8/2008 | Richards et al. |
| 7,494,527 B2 | 2/2009 | Jurewicz et al. |
| 7,507,495 B2 | 3/2009 | Wang et al. |
| 7,517,826 B2 | 4/2009 | Fujdala et al. |
| 7,534,738 B2 | 5/2009 | Fujdala et al. |
| 7,541,012 B2 | 6/2009 | Yeung et al. |
| 7,541,310 B2 | 6/2009 | Espinoza et al. |
| 7,547,400 B1 | 6/2009 | Carpenter et al. |
| 7,557,324 B2 | 7/2009 | Nylen et al. |
| 7,572,315 B2 | 8/2009 | Boulos et al. |
| 7,576,029 B2 | 8/2009 | Saito et al. |
| 7,576,031 B2 | 8/2009 | Beutel et al. |
| 7,604,843 B1 | 10/2009 | Robinson et al. |
| 7,611,686 B2 | 11/2009 | Alekseeva et al. |
| 7,615,097 B2 | 11/2009 | McKeclutie et al. |
| 7,618,919 B2 | 11/2009 | Shimazu et al. |
| 7,622,693 B2 | 11/2009 | Foret |
| 7,632,775 B2 | 12/2009 | Zhou et al. |
| 7,635,218 B1 | 12/2009 | Lott |
| 7,674,744 B2 | 3/2010 | Shiratori et al. |
| 7,678,419 B2 | 3/2010 | Kevwitch et al. |
| 7,704,369 B2 | 4/2010 | Olah et al. |
| 7,709,411 B2 | 5/2010 | Zhou et al. |
| 7,709,414 B2 | 5/2010 | Fujdala et al. |
| 7,745,367 B2 | 6/2010 | Fujdala et al. |
| 7,750,265 B2 | 7/2010 | Belashchenko et al. |
| 7,759,279 B2 | 7/2010 | Shiratori et al. |
| 7,759,281 B2 | 7/2010 | Kezuka et al. |
| 7,803,210 B2 | 9/2010 | Sekine et al. |
| 7,842,515 B2 | 11/2010 | Zou et al. |
| 7,851,405 B2 | 12/2010 | Wakamatsu et al. |
| 7,874,239 B2 | 1/2011 | Howland |
| 7,875,573 B2 | 1/2011 | Beutel et al. |
| 7,897,127 B2 | 3/2011 | Layman et al. |
| 7,897,536 B2 | 3/2011 | Saio et al. |
| 7,902,104 B2 | 3/2011 | Kalck |
| 7,905,942 B1 | 3/2011 | Layman |
| 7,935,655 B2 | 5/2011 | Tolmachev |
| 8,003,020 B2 | 8/2011 | Jankowiak et al. |
| 8,051,724 B1 | 11/2011 | Layman et al. |
| 8,076,258 B1 | 12/2011 | Biberger |
| 8,080,494 B2 | 12/2011 | Yasuda et al. |
| 8,089,495 B2 | 1/2012 | Keller |
| 8,129,654 B2 | 3/2012 | Lee et al. |
| 8,142,619 B2 | 3/2012 | Layman et al. |
| 8,168,561 B2 | 5/2012 | Virkar |
| 8,173,572 B2 | 5/2012 | Feaviour |
| 8,176,830 B1 | 5/2012 | Tan |
| 8,211,392 B2 | 7/2012 | Grubert et al. |
| 8,258,070 B2 | 9/2012 | Fujdala et al. |
| 8,278,240 B2 | 10/2012 | Tange et al. |
| 8,294,060 B2 | 10/2012 | Mohanty et al. |
| 8,309,489 B2 | 11/2012 | Roldan Cuenya et al. |
| 8,349,761 B2 | 1/2013 | Xia et al. |
| 8,378,877 B2 | 2/2013 | Tishin et al. |
| 8,404,611 B2 | 3/2013 | Nakamura et al. |
| 8,518,846 B2 | 8/2013 | Uchikawa et al. |
| 8,524,631 B2 | 9/2013 | Biberger |
| 8,557,727 B2 | 10/2013 | Yin et al. |
| 8,574,408 B2 | 11/2013 | Layman |
| 8,574,520 B2 | 11/2013 | Koplin et al. |
| 8,652,429 B2 | 2/2014 | Sumiya et al. |
| 8,652,992 B2 | 2/2014 | Yin et al. |
| 8,669,202 B2 | 3/2014 | van den Hoek et al. |
| 8,679,433 B2 | 3/2014 | Yin et al. |
| 8,679,434 B1 | 3/2014 | Li |
| 8,758,695 B2 | 6/2014 | Neubauer et al. |
| 8,765,625 B2 | 7/2014 | Hao et al. |
| 8,833,064 B2 | 9/2014 | Galligan |
| 8,877,675 B2 | 11/2014 | Nakamura |
| 8,927,403 B2 | 1/2015 | Huotari et al. |
| 8,969,237 B2 | 3/2015 | Yin |
| 9,005,559 B2 | 4/2015 | Sumiya et al. |
| 9,011,783 B2 | 4/2015 | Schuetze et al. |
| 9,034,269 B2 | 5/2015 | Hilgendorff |
| 9,039,916 B1 | 5/2015 | Lehman, Jr. |
| 9,089,840 B2 | 7/2015 | Biberger et al. |
| 9,090,475 B1 | 7/2015 | Lehman, Jr. |
| 9,119,309 B1 | 8/2015 | Lehman, Jr. |
| 9,126,191 B2 | 9/2015 | Yin et al. |
| 9,132,404 B2 | 9/2015 | Layman |
| 9,138,725 B2 | 9/2015 | Hoke |
| 9,140,167 B2 | 9/2015 | Bergeal et al. |
| 9,149,797 B2 | 10/2015 | Leamon |
| 9,156,023 B2 | 10/2015 | Klingmann |
| 9,156,025 B2 | 10/2015 | Qi et al. |
| 9,180,423 B2 | 11/2015 | Biberger et al. |
| 9,186,663 B2 | 11/2015 | Biberger et al. |
| 9,216,398 B2 | 12/2015 | Biberger et al. |
| 9,216,406 B2 | 12/2015 | Van Den Hoek et al. |
| 9,242,242 B2 | 1/2016 | Hilgendorff |
| 9,308,524 B2 | 4/2016 | Yin et al. |
| 9,332,636 B2 | 5/2016 | Biberger |
| 9,427,732 B2 | 8/2016 | Yin et al. |
| 9,433,938 B2 | 9/2016 | van den Hoek et al. |
| 9,440,192 B2 | 9/2016 | Hoke |

(56) References Cited

U.S. PATENT DOCUMENTS

| | | |
|---|---|---|
| 9,511,352 B2 | 12/2016 | Qi |
| 9,517,448 B2 | 12/2016 | Kearl |
| 9,540,980 B2 | 1/2017 | Hilgendorff |
| 2001/0004009 A1 | 6/2001 | MacKelvie |
| 2001/0042802 A1 | 11/2001 | Youds |
| 2001/0055554 A1 | 12/2001 | Hoke et al. |
| 2002/0018815 A1 | 2/2002 | Sievers et al. |
| 2002/0068026 A1 | 6/2002 | Murrell et al. |
| 2002/0071800 A1 | 6/2002 | Hoke et al. |
| 2002/0079620 A1 | 6/2002 | DuBuis et al. |
| 2002/0100751 A1 | 8/2002 | Carr |
| 2002/0102674 A1 | 8/2002 | Anderson |
| 2002/0131914 A1 | 9/2002 | Sung |
| 2002/0143417 A1 | 10/2002 | Ito et al. |
| 2002/0168466 A1 | 11/2002 | Tapphorn et al. |
| 2002/0182735 A1 | 12/2002 | Kibby et al. |
| 2002/0183191 A1 | 12/2002 | Faber et al. |
| 2002/0192129 A1 | 12/2002 | Shamouilian et al. |
| 2003/0036786 A1 | 2/2003 | Duren et al. |
| 2003/0042232 A1 | 3/2003 | Shimazu |
| 2003/0047617 A1 | 3/2003 | Shanmugham et al. |
| 2003/0066800 A1 | 4/2003 | Saim et al. |
| 2003/0085663 A1 | 5/2003 | Horsky |
| 2003/0102099 A1 | 6/2003 | Yadav et al. |
| 2003/0108459 A1 | 6/2003 | Wu et al. |
| 2003/0110931 A1 | 6/2003 | Aghajanian et al. |
| 2003/0129098 A1 | 7/2003 | Endo et al. |
| 2003/0139288 A1 | 7/2003 | Cai et al. |
| 2003/0143153 A1 | 7/2003 | Boulos et al. |
| 2003/0172772 A1 | 9/2003 | Sethuram et al. |
| 2003/0223546 A1 | 12/2003 | McGregor et al. |
| 2004/0007092 A1 | 1/2004 | Yoshimura |
| 2004/0009118 A1 | 1/2004 | Phillips et al. |
| 2004/0023302 A1 | 2/2004 | Archibald et al. |
| 2004/0023453 A1 | 2/2004 | Xu et al. |
| 2004/0077494 A1 | 4/2004 | LaBarge et al. |
| 2004/0103751 A1 | 6/2004 | Joseph et al. |
| 2004/0109523 A1 | 6/2004 | Singh et al. |
| 2004/0119064 A1 | 6/2004 | Narayan et al. |
| 2004/0127586 A1 | 7/2004 | Jin et al. |
| 2004/0129222 A1 | 7/2004 | Nylen et al. |
| 2004/0166036 A1 | 8/2004 | Chen et al. |
| 2004/0167009 A1 | 8/2004 | Kuntz et al. |
| 2004/0176246 A1 | 9/2004 | Shirk et al. |
| 2004/0178530 A1 | 9/2004 | Yadav |
| 2004/0208805 A1 | 10/2004 | Fincke et al. |
| 2004/0213998 A1 | 10/2004 | Hearley et al. |
| 2004/0235657 A1 | 11/2004 | Xiao et al. |
| 2004/0238345 A1 | 12/2004 | Koulik et al. |
| 2004/0251017 A1 | 12/2004 | Pillion et al. |
| 2004/0251241 A1 | 12/2004 | Blutke et al. |
| 2005/0000321 A1 | 1/2005 | O'Larey et al. |
| 2005/0000950 A1 | 1/2005 | Schroder et al. |
| 2005/0058797 A1 | 3/2005 | Sen et al. |
| 2005/0066805 A1 | 3/2005 | Park et al. |
| 2005/0070431 A1 | 3/2005 | Alvin et al. |
| 2005/0077034 A1 | 4/2005 | King |
| 2005/0097988 A1 | 5/2005 | Kodas et al. |
| 2005/0106865 A1 | 5/2005 | Chung et al. |
| 2005/0119398 A1 | 6/2005 | Zhang |
| 2005/0126338 A1 | 6/2005 | Yadav |
| 2005/0133121 A1 | 6/2005 | Subramanian et al. |
| 2005/0153069 A1 | 7/2005 | Tapphorn et al. |
| 2005/0163673 A1 | 7/2005 | Johnson et al. |
| 2005/0199739 A1 | 9/2005 | Kuroda et al. |
| 2005/0211018 A1 | 9/2005 | Jurewicz et al. |
| 2005/0220695 A1 | 10/2005 | Abatzoglou et al. |
| 2005/0227864 A1 | 10/2005 | Sutorik et al. |
| 2005/0233380 A1 | 10/2005 | Pesiri et al. |
| 2005/0240069 A1 | 10/2005 | Polverejan et al. |
| 2005/0258766 A1 | 11/2005 | Kim |
| 2005/0274646 A1 | 12/2005 | Lawson et al. |
| 2005/0275143 A1 | 12/2005 | Toth |
| 2006/0043651 A1 | 3/2006 | Yamamoto et al. |
| 2006/0051505 A1 | 3/2006 | Kortshagen et al. |
| 2006/0068989 A1 | 3/2006 | Ninomiya et al. |
| 2006/0094595 A1 | 5/2006 | Labarge |
| 2006/0096393 A1 | 5/2006 | Pesiri |
| 2006/0105910 A1 | 5/2006 | Zhou et al. |
| 2006/0108332 A1 | 5/2006 | Belashchenko |
| 2006/0153728 A1 | 7/2006 | Schoenung et al. |
| 2006/0153765 A1 | 7/2006 | Pham-Huu et al. |
| 2006/0159596 A1 | 7/2006 | De La Veaux et al. |
| 2006/0166809 A1 | 7/2006 | Malek et al. |
| 2006/0211569 A1 | 9/2006 | Dang et al. |
| 2006/0213326 A1 | 9/2006 | Gollob et al. |
| 2006/0222777 A1 | 10/2006 | Skoog |
| 2006/0222780 A1 | 10/2006 | Gurevich et al. |
| 2006/0231525 A1 | 10/2006 | Asakawa et al. |
| 2007/0009752 A1 | 1/2007 | Lefebvre et al. |
| 2007/0014919 A1 | 1/2007 | Hamalainen et al. |
| 2007/0020167 A1 | 1/2007 | Han et al. |
| 2007/0044513 A1 | 3/2007 | Kear et al. |
| 2007/0048206 A1 | 3/2007 | Hung et al. |
| 2007/0049484 A1 | 3/2007 | Kear et al. |
| 2007/0063364 A1 | 3/2007 | Hsiao et al. |
| 2007/0084308 A1 | 4/2007 | Nakamura et al. |
| 2007/0084834 A1 | 4/2007 | Hanus et al. |
| 2007/0087934 A1 | 4/2007 | Martens et al. |
| 2007/0092768 A1 | 4/2007 | Lee et al. |
| 2007/0153390 A1 | 7/2007 | Nakamura et al. |
| 2007/0161506 A1 | 7/2007 | Saito et al. |
| 2007/0163385 A1 | 7/2007 | Takahashi et al. |
| 2007/0172721 A1 | 7/2007 | Pak et al. |
| 2007/0173403 A1 | 7/2007 | Koike et al. |
| 2007/0178673 A1 | 8/2007 | Gole et al. |
| 2007/0221404 A1 | 9/2007 | Das et al. |
| 2007/0253874 A1 | 11/2007 | Foret |
| 2007/0266825 A1 | 11/2007 | Ripley et al. |
| 2007/0272664 A1 | 11/2007 | Schroder |
| 2007/0292321 A1 | 12/2007 | Plischke et al. |
| 2008/0006954 A1 | 1/2008 | Yubuta et al. |
| 2008/0026041 A1 | 1/2008 | Tepper et al. |
| 2008/0026932 A1 | 1/2008 | Satoh et al. |
| 2008/0031806 A1 | 2/2008 | Gavenonis et al. |
| 2008/0038578 A1 | 2/2008 | Li |
| 2008/0045405 A1 | 2/2008 | Beutel et al. |
| 2008/0047261 A1 | 2/2008 | Han et al. |
| 2008/0056977 A1 | 3/2008 | Hung et al. |
| 2008/0057212 A1 | 3/2008 | Dorier et al. |
| 2008/0064769 A1 | 3/2008 | Sato et al. |
| 2008/0104735 A1 | 5/2008 | Howland |
| 2008/0105083 A1 | 5/2008 | Nakamura et al. |
| 2008/0107586 A1 | 5/2008 | Smalley et al. |
| 2008/0116118 A1 | 5/2008 | Zhu et al. |
| 2008/0116178 A1 | 5/2008 | Weidman |
| 2008/0125308 A1 | 5/2008 | Fujdala et al. |
| 2008/0125309 A1 | 5/2008 | Fujdala et al. |
| 2008/0125313 A1 | 5/2008 | Fujdala et al. |
| 2008/0138651 A1 | 6/2008 | Doi et al. |
| 2008/0175936 A1 | 7/2008 | Tokita et al. |
| 2008/0187714 A1 | 8/2008 | Wakamatsu et al. |
| 2008/0206562 A1 | 8/2008 | Stucky et al. |
| 2008/0207858 A1 | 8/2008 | Kowaleski et al. |
| 2008/0248704 A1 | 10/2008 | Mathis et al. |
| 2008/0268270 A1 | 10/2008 | Chen et al. |
| 2008/0274344 A1 | 11/2008 | Veith et al. |
| 2008/0277092 A1 | 11/2008 | Layman et al. |
| 2008/0277264 A1 | 11/2008 | Sprague |
| 2008/0277266 A1 | 11/2008 | Layman |
| 2008/0277267 A1 | 11/2008 | Sprague |
| 2008/0277268 A1 | 11/2008 | Layman |
| 2008/0277269 A1 | 11/2008 | Layman et al. |
| 2008/0277270 A1 | 11/2008 | Biberger et al. |
| 2008/0277271 A1 | 11/2008 | Layman |
| 2008/0280049 A1 | 11/2008 | Kevwitch et al. |
| 2008/0280751 A1 | 11/2008 | Harutyunyan et al. |
| 2008/0280756 A1 | 11/2008 | Biberger |
| 2008/0283411 A1 | 11/2008 | Eastman et al. |
| 2008/0283498 A1 | 11/2008 | Yamazaki |
| 2008/0307960 A1 | 12/2008 | Hendrickson et al. |
| 2009/0010801 A1 | 1/2009 | Murphy et al. |
| 2009/0018008 A1 | 1/2009 | Jankowiak et al. |
| 2009/0054230 A1 | 2/2009 | Veeraraghavan et al. |

(56) References Cited

U.S. PATENT DOCUMENTS

| | | |
|---|---|---|
| 2009/0080592 A1 | 3/2009 | Arsenlis et al. |
| 2009/0081092 A1 | 3/2009 | Yang et al. |
| 2009/0088585 A1 | 4/2009 | Schammel et al. |
| 2009/0092887 A1 | 4/2009 | McGrath et al. |
| 2009/0098402 A1 | 4/2009 | Kang et al. |
| 2009/0114568 A1 | 5/2009 | Trevino et al. |
| 2009/0162991 A1 | 6/2009 | Beneyton et al. |
| 2009/0168506 A1 | 7/2009 | Han et al. |
| 2009/0170242 A1 | 7/2009 | Lin et al. |
| 2009/0181474 A1 | 7/2009 | Nagai |
| 2009/0200180 A1 | 8/2009 | Capote et al. |
| 2009/0208367 A1 | 8/2009 | Calio et al. |
| 2009/0209408 A1 | 8/2009 | Kitamura et al. |
| 2009/0223410 A1 | 9/2009 | Jun et al. |
| 2009/0238736 A1 | 9/2009 | Takahashi |
| 2009/0253037 A1 | 10/2009 | Park et al. |
| 2009/0274897 A1 | 11/2009 | Kaner et al. |
| 2009/0274903 A1 | 11/2009 | Addiego |
| 2009/0286899 A1 | 11/2009 | Hofmann et al. |
| 2009/0320449 A1 | 12/2009 | Beutel et al. |
| 2009/0320457 A1 | 12/2009 | Wan |
| 2009/0324468 A1 | 12/2009 | Golden et al. |
| 2010/0050868 A1 | 3/2010 | Kuznicki et al. |
| 2010/0089002 A1 | 4/2010 | Merkel |
| 2010/0089742 A1 | 4/2010 | Suslov |
| 2010/0092358 A1 | 4/2010 | Koegel et al. |
| 2010/0124514 A1 | 5/2010 | Chelluri et al. |
| 2010/0166629 A1 | 7/2010 | Deeba |
| 2010/0180581 A1 | 7/2010 | Grubert et al. |
| 2010/0180582 A1 | 7/2010 | Mueller-Stach et al. |
| 2010/0180820 A1 | 7/2010 | Ishimaru et al. |
| 2010/0186375 A1 | 7/2010 | Kazi et al. |
| 2010/0240525 A1 | 9/2010 | Golden et al. |
| 2010/0260652 A1 | 10/2010 | Nakane et al. |
| 2010/0275781 A1 | 11/2010 | Tsangaris et al. |
| 2010/0283013 A1 | 11/2010 | Sato et al. |
| 2010/0323118 A1 | 12/2010 | Mohanty et al. |
| 2011/0005211 A1 | 1/2011 | Tissler et al. |
| 2011/0006463 A1 | 1/2011 | Layman |
| 2011/0030346 A1 | 2/2011 | Neubauer et al. |
| 2011/0049045 A1 | 3/2011 | Hurt et al. |
| 2011/0052467 A1 | 3/2011 | Chase et al. |
| 2011/0052698 A1 | 3/2011 | Benoit et al. |
| 2011/0143041 A1 | 6/2011 | Layman et al. |
| 2011/0143915 A1 | 6/2011 | Yin et al. |
| 2011/0143916 A1 | 6/2011 | Leamon |
| 2011/0143926 A1 | 6/2011 | Yin et al. |
| 2011/0143930 A1 | 6/2011 | Yin et al. |
| 2011/0143933 A1 | 6/2011 | Yin et al. |
| 2011/0144382 A1 | 6/2011 | Yin et al. |
| 2011/0152550 A1 | 6/2011 | Grey et al. |
| 2011/0154807 A1 | 6/2011 | Chandler et al. |
| 2011/0158871 A1 | 6/2011 | Arnold et al. |
| 2011/0174604 A1 | 7/2011 | Duesel et al. |
| 2011/0180750 A1 | 7/2011 | Kleine Jaeger et al. |
| 2011/0243808 A1 | 10/2011 | Fossey et al. |
| 2011/0245073 A1 | 10/2011 | Oljaca et al. |
| 2011/0247336 A9 | 10/2011 | Farsad et al. |
| 2011/0271658 A1 | 11/2011 | Hoyer et al. |
| 2011/0305612 A1 | 12/2011 | Müller-Stach et al. |
| 2012/0023909 A1 | 2/2012 | Lambert et al. |
| 2012/0045373 A1 | 2/2012 | Biberger |
| 2012/0063963 A1 | 3/2012 | Watanabe et al. |
| 2012/0079817 A1 | 4/2012 | Wei et al. |
| 2012/0097033 A1 | 4/2012 | Arnold et al. |
| 2012/0122660 A1 | 5/2012 | Andersen et al. |
| 2012/0124974 A1 | 5/2012 | Li et al. |
| 2012/0171098 A1 | 7/2012 | Hung et al. |
| 2012/0214666 A1 | 8/2012 | van den Hoek et al. |
| 2012/0263633 A1 | 10/2012 | Koplin et al. |
| 2012/0308467 A1 | 12/2012 | Carpenter et al. |
| 2012/0313269 A1 | 12/2012 | Kear et al. |
| 2013/0034472 A1 | 2/2013 | Cantrell et al. |
| 2013/0079216 A1 | 3/2013 | Biberger et al. |
| 2013/0125970 A1 | 5/2013 | Ko et al. |
| 2013/0213018 A1 | 8/2013 | Yin et al. |
| 2013/0280528 A1 | 10/2013 | Biberger |
| 2013/0281288 A1 | 10/2013 | Biberger et al. |
| 2013/0294989 A1 | 11/2013 | Koch et al. |
| 2013/0316896 A1 | 11/2013 | Biberger |
| 2013/0331257 A1 | 12/2013 | Barcikowski et al. |
| 2013/0345047 A1 | 12/2013 | Biberger et al. |
| 2014/0018230 A1 | 1/2014 | Yin et al. |
| 2014/0120355 A1 | 5/2014 | Biberger |
| 2014/0128245 A1 | 5/2014 | Yin et al. |
| 2014/0140909 A1 | 5/2014 | Qi et al. |
| 2014/0148331 A1 | 5/2014 | Biberger et al. |
| 2014/0161693 A1 | 6/2014 | Brown et al. |
| 2014/0209451 A1 | 7/2014 | Biberger et al. |
| 2014/0228201 A1 | 8/2014 | Mendoza Gómez et al. |
| 2014/0243187 A1 | 8/2014 | Yin et al. |
| 2014/0249021 A1 | 9/2014 | van den Hoek et al. |
| 2014/0252270 A1 | 9/2014 | Lehman, Jr. |
| 2014/0263190 A1 | 9/2014 | Biberger et al. |
| 2014/0274676 A1 | 9/2014 | Liu et al. |
| 2014/0318318 A1 | 10/2014 | Layman et al. |
| 2014/0338519 A1 | 11/2014 | Biberger |
| 2014/0369912 A1 | 12/2014 | Zheng et al. |
| 2015/0033715 A1 | 2/2015 | Markatou et al. |
| 2015/0165418 A1 | 6/2015 | Kearl et al. |
| 2015/0165434 A1 | 6/2015 | Yin et al. |
| 2015/0196884 A1 | 7/2015 | Layman |
| 2015/0217229 A1 | 8/2015 | Yin et al. |
| 2015/0314260 A1 | 11/2015 | Biberger |
| 2015/0314581 A1 | 11/2015 | Biberger |
| 2015/0367331 A1 | 12/2015 | Biberger |
| 2016/0038874 A1 | 2/2016 | Yin |
| 2016/0045867 A1 | 2/2016 | Kearl et al. |
| 2016/0059216 A1 | 3/2016 | Qi |
| 2016/0067679 A1 | 3/2016 | Yin et al. |
| 2016/0074855 A1 | 3/2016 | Qi |
| 2016/0138870 A1 | 5/2016 | Biberger et al. |
| 2016/0144346 A1 | 5/2016 | Biberger et al. |
| 2016/0144352 A1 | 5/2016 | van den Hoek et al. |
| 2016/0184802 A1 | 6/2016 | Biberger et al. |
| 2016/0228852 A1 | 8/2016 | Biberger et al. |
| 2016/0236148 A1 | 8/2016 | Yin et al. |
| 2016/0310930 A1 | 10/2016 | Yin et al. |

FOREIGN PATENT DOCUMENTS

| | | |
|---|---|---|
| CN | 101602018 A | 12/2009 |
| CN | 102430325 A | 5/2012 |
| DE | 34 45 273 A1 | 6/1986 |
| EP | 0 223 104 A1 | 5/1987 |
| EP | 0 347 386 A1 | 12/1989 |
| EP | 0 385 742 A1 | 9/1990 |
| EP | 1 134 302 A1 | 9/2001 |
| EP | 1 195 196 A1 | 4/2002 |
| EP | 1 256 378 A2 | 11/2002 |
| EP | 1 619 168 A1 | 1/2006 |
| EP | 1 790 612 A1 | 5/2007 |
| EP | 1 955 765 A1 | 8/2008 |
| GB | 1 307 941 A | 2/1973 |
| JP | 30-13577 U | 9/1955 |
| JP | 47-21256 U | 2/1971 |
| JP | 49-31571 A | 3/1974 |
| JP | 51-7582 U | 7/1974 |
| JP | 52-165360 U | 6/1976 |
| JP | 56-146804 A | 11/1981 |
| JP | 59-59410 A | 4/1984 |
| JP | 61-086815 A | 5/1986 |
| JP | 61-242644 A | 10/1986 |
| JP | 62-102827 A | 5/1987 |
| JP | 63-214342 A | 9/1988 |
| JP | 1-164795 A | 6/1989 |
| JP | 2-6339 A | 1/1990 |
| JP | 2-160040 A | 6/1990 |
| JP | 2-203932 A | 8/1990 |
| JP | 3-226509 A | 10/1991 |
| JP | 5-193909 A | 8/1993 |
| JP | 05-228361 A | 9/1993 |
| JP | 05-324094 A | 12/1993 |
| JP | 6-91162 A | 4/1994 |

(56) References Cited

FOREIGN PATENT DOCUMENTS

| | | |
|---|---|---|
| JP | 6-93309 A | 4/1994 |
| JP | 6-135797 A | 5/1994 |
| JP | 6-172820 A | 6/1994 |
| JP | 6-272012 A | 9/1994 |
| JP | H6-065772 U | 9/1994 |
| JP | 07-031873 A | 2/1995 |
| JP | 7-20553 B2 | 3/1995 |
| JP | 7-138020 A | 5/1995 |
| JP | 7-207381 A | 8/1995 |
| JP | 07-256116 A | 10/1995 |
| JP | 8-158033 A | 6/1996 |
| JP | 8-215576 A | 8/1996 |
| JP | 8-217420 A | 8/1996 |
| JP | 9-141087 A | 6/1997 |
| JP | 10-130810 A | 5/1998 |
| JP | 10-249198 A | 9/1998 |
| JP | 11-502760 A | 3/1999 |
| JP | 11-300198 A | 11/1999 |
| JP | 2000-220978 A | 8/2000 |
| JP | 2002-88486 A | 3/2002 |
| JP | 2002-241812 A | 8/2002 |
| JP | 2002-263496 A | 9/2002 |
| JP | 2002-336688 A | 11/2002 |
| JP | 2003-126694 A | 5/2003 |
| JP | 2003-170043 A | 6/2003 |
| JP | 2003-261323 A | 9/2003 |
| JP | 2004-233007 A | 8/2004 |
| JP | 2004-249206 A | 9/2004 |
| JP | 2004-290730 A | 10/2004 |
| JP | 2005-503250 A | 2/2005 |
| JP | 2005-122621 A | 5/2005 |
| JP | 2005-218937 A | 8/2005 |
| JP | 2005-342615 A | 12/2005 |
| JP | 2006-001779 A | 1/2006 |
| JP | 2006-508885 A | 3/2006 |
| JP | 2006-87965 A | 4/2006 |
| JP | 2006-181484 A | 7/2006 |
| JP | 2006-247446 A | 9/2006 |
| JP | 2006-260385 A | 9/2006 |
| JP | 2006-326554 A | 12/2006 |
| JP | 2007-29859 A | 2/2007 |
| JP | 2007-44585 A | 2/2007 |
| JP | 2007-46162 A | 2/2007 |
| JP | 2007-138287 A | 6/2007 |
| JP | 2007-203129 A | 8/2007 |
| JP | 2007-222732 A | 9/2007 |
| JP | 2007-253037 A | 10/2007 |
| JP | 2009-254929 A | 11/2009 |
| JP | 2009-279544 A | 12/2009 |
| SU | 493241 A | 3/1976 |
| TW | 200611449 | 4/2006 |
| TW | 201023207 | 6/2010 |
| WO | WO-96/28577 A1 | 9/1996 |
| WO | WO-00/72965 A1 | 12/2000 |
| WO | WO-2002/092503 A1 | 11/2002 |
| WO | WO-03/094195 A1 | 11/2003 |
| WO | WO-2004/052778 A2 | 6/2004 |
| WO | WO-2005/063390 A1 | 7/2005 |
| WO | WO-2006/079213 A1 | 8/2006 |
| WO | WO-2006/096205 A2 | 9/2006 |
| WO | WO-2007/144447 A1 | 12/2007 |
| WO | WO-2008/092478 A1 | 8/2008 |
| WO | WO-2008/130451 A2 | 10/2008 |
| WO | WO-2008/130451 A3 | 10/2008 |
| WO | WO-2009/017479 A1 | 2/2009 |
| WO | WO-2011/081833 A1 | 7/2011 |
| WO | WO-2011/081834 A1 | 7/2011 |
| WO | WO-2012/028695 A2 | 3/2012 |
| WO | WO-2013/028575 A1 | 2/2013 |
| WO | WO-2013/093597 A2 | 6/2013 |
| WO | WO-2013/151557 A1 | 10/2013 |
| WO | WO-2015/061482 A1 | 4/2015 |
| WO | WO-2016/019067 A1 | 2/2016 |
| WO | WO-2016/033517 A1 | 3/2016 |
| WO | WO-2016/149367 A1 | 9/2016 |

OTHER PUBLICATIONS

Babin, A. et al. (1985). "Solvents Used in the Arts," *Center for Safety in the Arts*: 16 pages.

Bateman, J. E. et al. (Dec. 17, 1998). "Alkylation of Porous Silicon by Direct Reaction with Alkenes and Alkynes," *Angew. Chem Int. Ed.* 37(19):2683-2685.

Büchel, R. et al. (2009). "Influence of Pt Location on $BaCO_3$ or $Al_2O_3$ During $NO_x$ Storage Reduction," *Journal of Catalysis* 261: 201-207.

Carrot, G. et al. (Sep. 17, 2002). "Surface-Initiated Ring-Opening Polymerization: A Versatile Method for Nanoparticle Ordering," *Macromolecules* 35(22):8400-8404.

Chaim, R. et al. (2009). "Densification of Nanocrystalline $Y_2O_3$ Ceramic Powder by Spark Plasma Sintering," *Journal of European Ceramic Society* 29: 91-98.

Chau, J. K. H. et al. (2005). "Microwave Plasma Synthesis of Silver Nanopowders," *Materials Letters* 59: 905-908.

Chen, H.-S. et al. (Jul. 3, 2001). "On the Photoluminescence of Si Nanoparticles," *Mater. Phys. Mech.* 4:62-66.

Chen, W.-J. et al. (Mar. 18, 2008). "Functional $Fe_3O_4/TiO_2$ Core/Shell Magnetic Nanoparticles as Photokilling Agents for Pathogenic Bacteria," *Small* 4(4): 485-491.

Das, N. et al. (2001). "Influence of the Metal Function in the "One-Pot" Synthesis of 4-Methyl-2-Pentanone (Methyl Isobutyl Ketone) from Acetone Over Palladium Supported on Mg(Al)O Mixed Oxides Catalysts," *Catalysis Letters* 71(3-4): 181-185.

Date, A. R. et al. (1987). "The Potential of Fire Assay and Inductively Coupled Plasama Source Mass Spectrometry for the Determination of Platinum Group Elements in Geological Materials," *Analyst* 112: 1217-1222.

Faber, K. T. et al. (Sep. 1988). "Toughening by Stress-Induced Microcracking in Two-Phase Ceramics," *Journal of the American Ceramic Society* 71: C-399-C401.

Fauchais, P. et al. (Jun. 1989). "La Projection Par Plasma: Une Revue," *Ann. Phys. Fr.* 14(3):261-310.

Fauchais, P. et al. (Jan. 1993). "Les Dépôts Par Plasma Thermique," *Revue Générale De L'Electricité*, RGE, Paris, France, No. 2, pp. 7-12 (in French).

Fauchais, P. et al. (Jan. 1996). "Plasma Spray: Study of the Coating Generation," *Ceramics International* 22(4):295-303.

Fojtik, A. et al. (Apr. 29, 1994). "Luminescent Colloidal Silicon Particles,"*Chemical Physics Letters* 221:363-367.

Fojtik, A. (Jan. 13, 2006). "Surface Chemistry of Luminescent Colloidal Silicon Nanoparticles," *J. Phys. Chem. B.* 110(5):1994-1998.

Gangeri, M. et al. (2009). "Fe and Pt Carbon Nanotubes for the Electrocatalytic Conversion of Carbon Dioxide to Oxygenates," *Catalysis Today* 143: 57-63.

Gutsch, A. et al. (2002). "Gas-Phase Production of Nanoparticles," *Kona* No. 20, pp. 24-37.

Han, B. Q. et al. (Jan. 2004). "Deformation Mechanisms and Ductility of Nanostructured Al Alloys", *Mat. Res. Soc. Symp. Proc.* 821:P9.1.1-P9.1.6.

Heberlein, J. (2002). "New Approaches in Thermal Plasma Technology", *Pure Appl. Chem.* 74(3):327-335.

Hua, F. et al. (Mar. 2006). "Organically Capped Silicon Nanoparticles With Blue Photoluminescence Prepared by Hydrosilylation Followed by Oxidation," *Langmuir* 22(9):4363-4370.

Ihlein, G. et al.(1998). "Ordered Porous Materials as Media for the Organization of Matter on the Nanoscale," *Applied Organometallic Chemistry* 12: 305-314.

Ji, Y. et al. (Nov. 2002) "Processing and Mechanical Properties of $Al_2O_3$-5 vol.% Cr Nanocomposites," *Journal of the European Ceramic Society* 22(12):1927-1936.

Jouet, R. J. et al. (Jan. 25, 2005). "Surface Passivation of Bare Aluminum Nanoparticles Using Perfluoroalkyl Carboxylic Acids," *Chem. Mater*.17(11):2987-2996.

Kenvin, J. C. et al. (1992). "Supported Catalysts Prepared from Mononuclear Copper Complexes: Catalytic Properties", *J. Catalysis* 135:81-91.

(56) References Cited

OTHER PUBLICATIONS

Konrad, H. et al. (1996). "Nanostructured Cu-Bi Alloys Prepared by Co-Evaporation in a Continuous Gas Flow," *NanoStructured Materials* 7(6):605-610.
Kim, N. Y. et al. (Mar. 5, 1997). "Thermal Derivatization of Porous Silicon with Alcohols," *J. Am. Chem. Soc.* 119(9):2297-2298.
Kwon, Y.-S. et al. (Apr. 30, 2003). "Passivation Process for Superfine Aluminum Powders Obtained by Electrical Explosion of Wires," *Applied Surface Science* 211:57-67.
Lakis, R. E. et al. (1995). "Alumina-Supported Pt-Rh Catalysts: I. Microstructural Characterization," *Journal of Catalysis* 154: 261-275.
Lamouroux, E. et al. (2007). "Identification of Key Parameters for the Selective Growth of Single or Double Wall Carbon Nanotubes on FeMo/Al$_2$O$_3$ CVD Catalysts," *Applied Catalysts A: General* 323: 162-173.
Langner, A. et al. (Aug. 25, 2005). "Controlled Silicon Surface Functionalization by Alkene Hydrosilylation," *J. Am. Chem. Soc.* 127(37):12798-12799.
Li, D. et al. (Apr. 9, 2005). "Environmentally Responsive "Hairy" Nanoparticles: Mixed Homopolymer Brushes on Silica Nanoparticles Synthesized by Living Radical Polymerization Techniques," *J. Am. Chem. Soc.* 127(7):6248-6256.
Li, X. et al. (May 25, 2004). "Surface Functionalization of Silicon Nanoparticles Produced by Laser-Driven Pyrolysis of Silane Followed by HF-HNO$_3$ Etching," *Langmuir* 20(11):4720-4727.
Liao, Y.-C. et al. (Jun. 27, 2006). "Self-Assembly of Organic Monolayers on Aerosolized Silicon Nanoparticles," *J.Am. Chem. Soc.* 128(28):9061-9065.
Liu, S.-M. et al. (Jan. 13, 2006). "Enhanced Photoluminescence from Si Nano-Organosols by Functionalization With Alkenes And Their Size Evolution," *Chem. Mater.* 18(3):637-642.
Luo, J. et al. (2008). "Core/Shell Nanoparticles as Electrocatalysts for Fuel Cell Reactions," *Advanced Materials* 20: 4342-4347.
Martinez-Hansen, V. et al. (2009). "Development of Aligned Carbon Nanotubes Layers Over Stainless Steel Mesh Monoliths," *Catalysis Today* 147S: S71-S75.
Mignard, D. et al. (2003). "Methanol Synthesis from Flue-Gas CO$_2$ and Renewable Electricity: A Feasibility Study," *International Journal of Hydrogen Energy* 28: 455-464.
Mühlenweg, H. et al. (2004). "Gas-Phase Reactions—Open Up New Roads to Nanoproducts," *Degussa ScienceNewsletter* No. 08, pp. 12-16.
Nagai, Y. et al. (Jul. 3, 2006). "Sintering Inhibition Mechanism of Platinum Supported on Ceria-Based Oxide and Pt-Oxide-Support Interaction," *J. Catalysis* 242:103-109.
NASA (2009). "Enthalpy," Article located at http://www.grc.nasa.gov/WWW/K-12/airplane/enthalpy.htrnl, published by National Aeronautics and Space Administration on Nov. 23, 2009, 1 page.
Neiner, D. (Aug. 5, 2006). "Low-Temperature Solution Route to Macroscopic Amounts of Hydrogen Terminated Silicon Nanoparticles," *J. Am. Chem. Soc.* 128:11016-11017.
Netzer, L. et al. (1983). "A New Approach to Construction of Artificial Monolayer Assemblies," *J. Am. Chem. Soc.* 105(3):674-676.
Panchula, M. L. et al. (2003). "Nanocrystalline Aluminum Nitride: I, Vapor-Phase Synthesis in a Forced-Flow Reactor," *Journal of the American Ceramic Society* 86(7): 1114-1120.
Park, H.-Y. et al. (May 30, 2007). "Fabrication of Magnetic Core@Shell Fe Oxide@Au Nanoparticles for Interfacial Bioactivity and Bio-Separation," *Langmuir* 23: 9050-9056.
Park, N.-G. et al. (Feb. 17, 2004). "Morphological and Photoelectrochemical Characterization of Core-Shell Nanoparticle Films for Dye-Sensitized Solar Cells: Zn—O Type Shell on SnO$_2$ and TiO$_2$ Cores," *Langmuir* 20: 4246-4253.
"Plasma Spray and Wire Flame Spray Product Group," located at http://www.processmaterials.com/spray.html, published by Process Materials, Inc., last accessed Aug. 5, 2013, 2 pages.
"Platinum Group Metals: Annual Review 1996" (Oct. 1997). Engineering and Mining Journal, p. 63.
Rahaman, R. A. et al. (1995). "Synthesis of Powders," in *Ceramic Processing and Sintering*. Marcel Decker, Inc., New York, pp. 71-77.
Sailor, M. J. (1997). "Surface Chemistry of Luminescent Silicon Nanocrystallites," *Adv. Mater.* 9(10):783-793.
Schimpf, S. et al. (2002). "Supported Gold Nanoparticles: In-Depth Catalyst Characterization and Application in Hydrogenation and Oxidation Reactions," *Catalysis Today* 2592: 1-16.
Stiles, A. B. (Jan. 1, 1987). "Manufacture of Carbon-Supported Metal Catalysts," in *Catalyst Supports and Supported Catalysts*, Butterworth Publishers, MA, pp. 125-132.
Strobel, R. et al. (2003). "Flame-made Platinum/Alumina: Structural Properties and Catalytic Behaviour in Enantioselective Hydrogenation," *Journal of Catalysis* 213: 296-304.
Subramanian, S. et al. (1991). "Structure and Activity of Composite Oxide Supported Platinum-Iridium Catalysts," *Applied Catalysts* 74: 65-81.
Tao, Y.-T. (May 1993). "Structural Comparison of Self-Assembled Monolayers of n-Alkanoic Acids on the surfaces of Silver, Copper, and Aluminum," *J. Am. Chem. Soc.* 115(10):4350-4358.
Ünal, N. et al. (Nov. 2011). "Influence of WC Particles on the Microstructural and Mechanical Properties of 3 mol% Y$_2$O$_3$ Stabilized ZrO$_2$ Matrix Composites Produced by Hot Pressing," *Journal of the European Ceramic Society* (31)13: 2267-2275.
Vardelle, A. et al. (1996). "Coating Generation: Vaporization of Particles in Plasma Spraying and Splat Formation," Universite de Limoges, 123 Avenue A. Thomas 87000, Limoges, France, *Pure & Appl. Chem.* 68(5):1093-1099.
Vardelle, M. et al. (Jun. 1991). "Experimental Investigation of Powder Vaporization in Thermal Plasma Jets," *Plasma Chemistry and Plasma Processing* 11(2):185-201.
Viswanathan, V. et al. (2006). "Challenges and Advances in Nanocomposite Processing Techniques," *Materials Science and Engineering* R 54: 121-285.
Wan, J. et al. (2005). "Spark Plasma Sintering of Silicon Nitride/Silicon Carbide Nanocomposites with Reduced Additive Amounts," *Scripta Materialia* 53: 663-667.
Yoshida, T. (1994). "The Future of Thermal Plasma Processing for Coating", *Pure & Appl. Chem.* 66(6):1223-1230.
Zou, J. et al. (Jun. 4, 2004). "Solution Synthesis of Ultrastable Luminescent Siloxane-Coated Silicon Nanoparticles," *Nano Letters* 4(7):1181-1186.
U.S. Appl. No. 13/291,983, filed Nov. 8, 2011, for Layman et al.
U.S. Appl. No. 12/152,084, filed May 9, 2008, for Biberger.
U.S. Appl. No. 13/028,693, filed Feb. 16, 2011, for Biberger.
U.S. Appl. No. 12/943,909, filed Nov. 10, 2010, for Layman.
U.S. Appl. No. 12/152,111, filed May 9, 2008, for Biberger et al.
U.S. Appl. No. 12/151,830, filed May 8, 2008, for Biberger et al.
U.S. Appl. No. 12/968,248, filed Dec. 14, 2010, for Biberger.
U.S. Appl. No. 12/968,245, filed Dec. 14, 2010, for Biberger.
U.S. Appl. No. 12/968,241, filed Dec. 14, 2010, for Biberger.
U.S. Appl. No. 12/968,239, filed Dec. 14, 2010, for Biberger.
U.S. Appl. No. 12/969,128, filed Dec. 15, 2010, for Biberger.
U.S. Appl. No. 12/962,463, filed Dec. 7, 2010, for Leamon.
U.S. Appl. No. 12/961,030, filed Dec. 6, 2010, for Lehman.
U.S. Appl. No. 12/961,108, filed Dec. 6, 2010, for Lehman.
U.S. Appl. No. 12/961,200, filed Dec. 6, 2010, for Lehman.
U.S. Appl. No. 12/968,253, filed Dec. 14, 2010, for Biberger.
U.S. Appl. No. 12/968,235, filed Dec. 14, 2010, for Biberger.
U.S. Appl. No. 12/969,306, filed Dec. 15, 2010, for Lehman et al.
U.S. Appl. No. 12/969,447, filed Dec. 15, 2010, for Biberger et al.
U.S. Appl. No. 12/969,087, filed Dec. 15, 2010, for Biberger.
U.S. Appl. No. 12/962,533, filed Dec. 7, 2010, for Yin et al.
U.S. Appl. No. 12/962,523, filed Dec. 7, 2010, for Yin et al.
U.S. Appl. No. 12/001,643, filed Dec. 11, 2007, for Biberger et al.
U.S. Appl. No. 12/474,081, filed May 28, 2009, for Biberger et al.
U.S. Appl. No. 12/001,602, filed Dec. 11, 2007, for Biberger et al.
U.S. App. No. 12/001,644, filed Dec. 11, 2007, for Biberger et al.
U.S. Appl. No. 12/969,457, filed Nov. 15, 2010, for Leamon et al.
U.S. Appl. No. 12/969,503, filed Nov. 15, 2010, for Leamon et al.
U.S. Appl. No. 12/954,813, filed Nov. 26, 2010, for Biberger.
U.S. Appl. No. 12/954,822, filed Nov. 26, 2010, for Biberger.

(56) References Cited

OTHER PUBLICATIONS

Jensen, J. et al. (2000). "Preparation of ZnO—$Al_2O_3$ Particles in a Premixed Flame," *Journal of Nanoparticle Research* 2: 363-373.
Li, J-G. et al. (2009). "Cobalt-Doped TiO2 Nanocrystallites: Radio-Frequency Thermal Plasma Processing, Phase Structure, and Magnetic Properties," *J. Phys. Chem.* 113 (19): 8009-8015.
Magdassi, S. et al. (Apr. 2010). "Triggering the Sintering of Silver Nanoparticles at Room Temperature," *ACS Nano* 4(4): 1943-1948.
Chemwatch (Aug. 2010). "Barium Acetate," *Santa Cruz Biotechnology, Inc.*, located at http://datasheets.scbt.com/sc-202968.pdf; 12 pages.
Yu, S. (2007). *Mechanistic Investigation of Nitrogen Oxide Storage and Reduction Catalyst*. University of South Carolina, pp. 53.

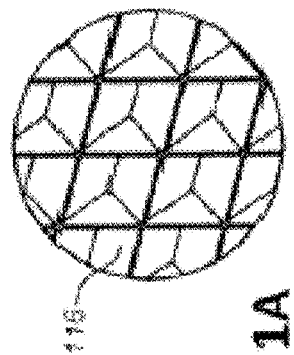
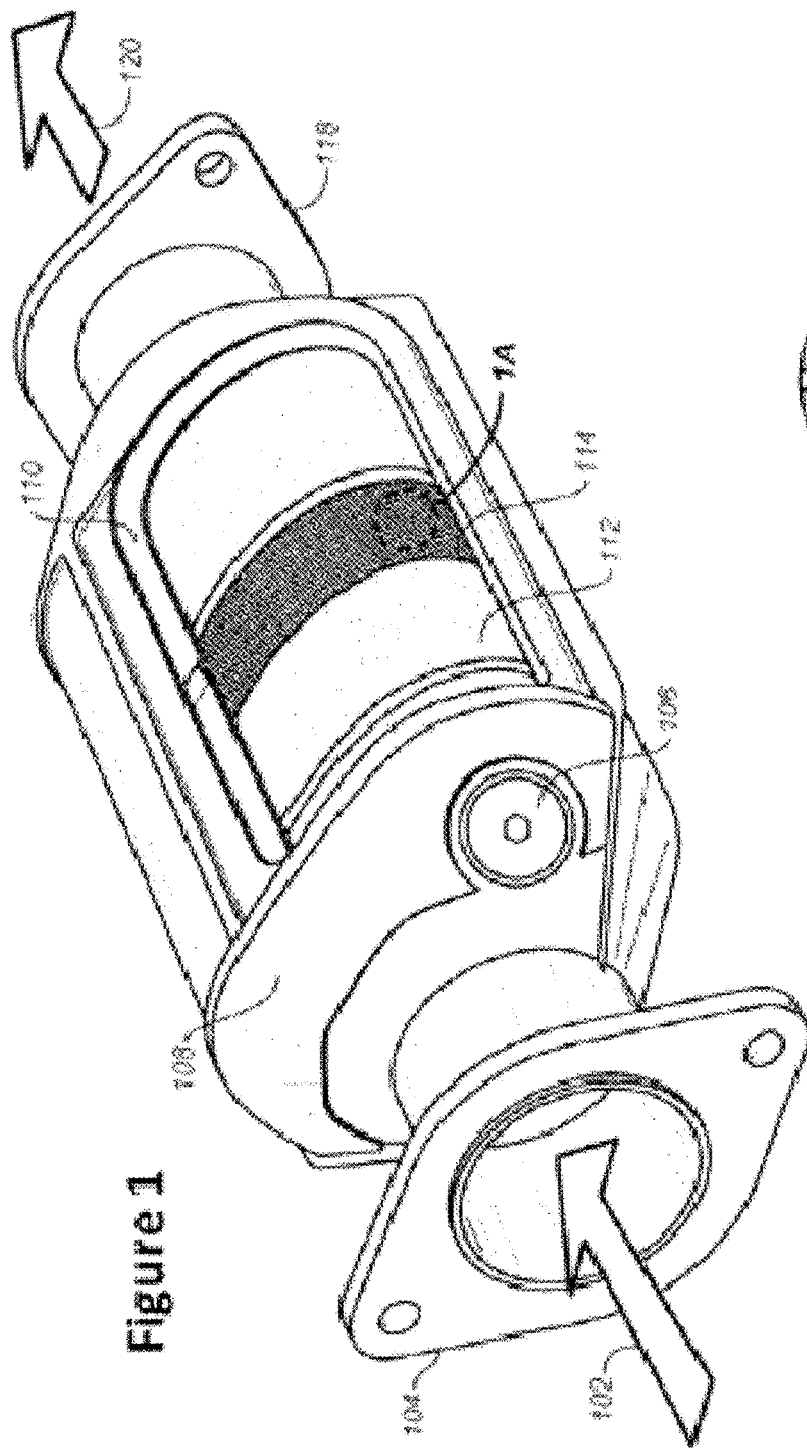
Figure 1
Figure 1A

COMPOSITIONS FOR PASSIVE NOX ADSORPTION (PNA) SYSTEMS AND METHODS OF MAKING AND USING SAME

CROSS-REFERENCE TO RELATED APPLICATIONS

This application is a division of U.S. application Ser. No. 15/605,750, filed May 25, 2017, which is a continuation of U.S. application Ser. No. 14/663,330, filed Mar. 19, 2015, now U.S. Pat. No. 9,687,811, which claims the benefit of U.S. Application No. 61/969,035, filed Mar. 21, 2014, U.S. Application No. 61/985,388, filed Apr. 28, 2014, and U.S. Application No. 62/121,444, filed Feb. 26, 2015, all of which are herein incorporated by reference in their entirety.

FIELD OF THE INVENTION

The present disclosure relates to the field of catalysts. More specifically, the present disclosure, relates to nanoparticle catalysts and storage materials for nitrogen oxides as part of a passive $NO_x$ adsorption (PNA) system for engines and vehicles.

BACKGROUND OF THE INVENTION

Car exhaust primarily contains harmful gases such as carbon monoxide (CO), nitrogen oxides ($NO_x$), and hydrocarbons (HC). Environmental concerns and government regulations have led efforts to remove these noxious combustion products from vehicle exhaust by conversion to more benign gases such as carbon dioxide ($CO_2$), nitrogen ($N_2$), and water ($H_2O$). In order to accomplish this conversion, the exhaust gases must pass through a treatment system that contains materials that can oxidize CO to $CO_2$, reduce $NO_x$ to $N_2$ and $H_2O$, and oxidize hydrocarbons to $CO_2$ and $H_2O$.

Emission regulations and standards are becoming more and more stringent worldwide, especially for $NO_x$ emissions. Two competing exhaust technologies to reduce the amount of $NO_x$ released into the atmosphere are Lean $NO_x$ Traps (LNT) and Selective Catalytic Reduction (SCR). LNTs absorb, store, or trap nitrogen oxides during lean-burn engine operation (i.e., when excess oxygen is present), and release and convert these gases when the oxygen content in the exhaust gas is reduced. An example of an LNT system can be found in International Patent Application PCT/US2014/061812 (WO 2015/061482) and U.S. Provisional Application 61/894,346, which are hereby incorporated by reference in their entirety. On the other hand, SCR units reduce nitrogen oxides regardless of the amount of oxygen in the exhaust gas. However, SCR units cannot properly reduce $NO_x$ emissions at low operating temperatures, for example, temperatures below 200° C.

Unfortunately, a significant portion of pollutant gases emitted by internal combustion engines are produced when the engine is initially started ("cold-start"), but before the catalytic converters, LNTs, or SCR units in the emissions system have warmed up to their operating temperatures. In order to reduce harmful emissions during the cold-start phase, such as that of a light-duty diesel or gasoline vehicle (for example, an automobile or light truck), washcoats that contain temporary storage for pollutants can be used to coat the substrate used in the catalytic converter of the vehicle. After the catalytic converter heats up to its operating temperature, known as the light-off temperature (the temperature at which the conversion rate reaches 50% of the maximum rate), the stored gases are released and subsequently decomposed by the catalytic converter.

A high light-off temperature is undesirable, as many vehicular trips are of short duration, and during the time required for the catalytic converter to reach its operating temperature, pollutants must either be released untreated to the environment, or stored in the exhaust system until the light-off temperature is reached. Even if pollutants are trapped effectively prior to light-off, the catalytic converter may not reach operating temperature if multiple successive short trips are made. Thus, the washcoats used for storage may become saturated, resulting once again in the release of pollutants to the environment.

In addition, the exhaust temperature of an engine or vehicle can vary depending on the type of engine or vehicle. Thus, the operating temperature of the catalytically active material or the operating temperature of the SCR unit can vary depending on the engine and vehicle. For example, large engines (e.g., greater than 2.5 Liters) typically run colder than small engines (e.g., less than 2 Liters). Accordingly a tunable material used for storage of pollutants, where the release temperature can be adjusted or tuned up or down to accommodate varying operating temperatures in engines or vehicles, is desirable.

Commercially available catalytic converters use platinum group metal (PGM) catalysts deposited on substrates by wet chemistry methods, such as precipitation of platinum ions, palladium ions, or platinum and palladium ions from solution onto a substrate. These PGM catalysts are a considerable portion of the cost of catalytic converters. Thus, any reduction in the amount of PGM catalysts used to produce a catalytic converter is desirable. Commercially available catalytic converters also display a phenomenon known as "aging," in which they become less effective over time; the light-off temperature starts to rise as the catalytic converter ages, and emission levels also start to rise. Accordingly, reduction of the aging effect is also desirable, in order to prolong the efficacy of the catalytic converter for controlling emissions.

SUMMARY OF THE INVENTION

Described herein are coated substrates for use as Passive $NO_x$ Adsorbers (PNAs), washcoat formulations for preparing coated substrates for use as PNAs, methods for preparing coated substrates for use as PNAs, and systems incorporating coated substrates employed as PNAs in an emission-control system. The disclosed PNAs can adsorb $NO_x$ emissions at low start-up temperatures, and can release the adsorbed $NO_x$ at efficient operating temperatures (for example, at or above light-off temperature) and under lean conditions.

In addition, the disclosed PNAs can reduce the amount of platinum group metals used in catalytic converters. At lower temperatures (temperatures where the $T_{50}$ of $NO_x$ has not yet been reached), $NO_x$ emissions can block the oxidation of carbon monoxide and hydrocarbons. Thus, storing $NO_x$ emissions at lower temperatures and releasing them at higher temperatures (such as temperatures above the $T_{50}$ temperature of $NO_x$), can decrease the amount of PGMs needed to oxidize car exhaust pollutants.

Furthermore, the PNA materials disclosed may also be able to store as many $NO_x$ emissions as possible at temperatures from ambient up to a maximum variable temperature. The maximum variable temperature can change depending on the type of engine and vehicle employed. Thus, the disclosed PNA materials can be tunable to store $NO_x$ emissions in some instance only up to about 100° C., in some cases up to about 150° C., and in some cases up to about 200° C. or higher. Regardless of the maximum variable temperature, the PNA materials can exhibit a "sharp" release temperature slightly above the maximum variable temperature.

In some embodiments, the Passive $NO_x$ Adsorber (PNA) composition (i.e., material) comprises nano-sized platinum group metal (PGM) on a plurality of support particles comprising cerium oxide. The plurality of support particles can be micron-sized and/or nano-sized. The plurality of support particles can include zirconium oxide, lanthanum oxide, yttrium oxide, or a combination thereof. Also, the support particles can be HSA5, HSA20, or a mixture thereof. The nano-sized PGM on the plurality of support particles can be produced by wet chemistry techniques and/or incipient wetness, followed by calcination. The nano-sized PGM on the plurality of support particles can comprise composite nano-particles that comprise a support nanoparticle and a PGM nanoparticle. These composite nanoparticles can be bonded to micron-sized carrier particles to form nano-on-nano-on micro particles and/or the composite nanoparticles can be embedded within carrier particles to form nano-on-nano-in-micro particles. The carrier particles can comprise cerium oxide, zirconium oxide, lanthanum oxide, yttrium oxide, or a combination thereof. The carrier particles can comprise 86 wt. % cerium oxide, 10 wt. % zirconium oxide, and 4 wt. % lanthanum oxide. Furthermore, the composite nano-particles can be plasma created. The PGM in the PNA composition can include palladium and/or ruthenium. The PNA composition can include 2 g/L to 4 g/L palladium including 3 g/L palladium. The PNA composition can include 3 g/L to 15 g/L ruthenium and 5 g/L to 6 g/L ruthenium. The PNA composition can include greater than or equal to about 150 g/L of the plurality of support particles or greater than or equal to about 300 g/L of the plurality of support particles.

In some embodiments, a coated substrate comprises a substrate and a Passive $NO_x$ Adsorber ("PNA") layer comprising a PNA composition. The variations described above for the previously described PNA composition are also applicable to the PNA composition recited in this coated substrate. The PNA layer can store $NO_x$ gas up to at least a first temperature and release the stored $NO_x$ gas at or above the first temperature. The first temperature can be 150° C. or 300° C. The coated substrate can be used in a greater than or equal to 2.5 L engine system or a less than or equal to 2.5 L engine system. The PNA layer can further include boehmite particles. The PNA composition (including the nano-sized PGM on the plurality of support particles) can comprise 95% to 98% by weight of the mixture of the PNA composition and boehmite particles in the PNA layer. The boehmite particles can include 2% to 5% by weight of the mixture of the PNA composition and the boehmite particles in the PNA layer. The substrate can comprise cordierite and/or a honeycomb structure. The coated substrate can also include a corner-fill layer deposited directly on the substrate. The PNA layer can include 2 g/L to 4 g/L palladium including 3 g/L palladium. The PNA layer can include 3 g/L to 15 g/L ruthenium and 5 g/L to 6 g/L ruthenium. The PNA layer can include greater than or equal to about 150 g/L of the plurality of support particles or greater than or equal to about 300 g/L of the plurality of support particles.

In some embodiments, a washcoat composition comprises a solids content of 95% to 98% by weight PNA composition and 2% to 5% by weight boehmite particles. The variations described above for the previously described PNA composition are also applicable to the PNA composition recited in this washcoat composition. The solids of the wash coat composition can be suspended in an aqueous medium at a pH between 3 and 5. The washcoat composition can include 2 g/L to 4 g/L palladium including 3 g/L palladium. The washcoat composition can include 3 g/L to 15 g/L ruthenium and 5 g/L to 6 g/L ruthenium. The washcoat composition can include greater than or equal to about 150 g/L of the plurality of support particles or greater than or equal to about 300 g/L of the plurality of support particles.

In some embodiments, a method of treating an exhaust gas comprises contacting a coated substrate with an exhaust gas comprising $NO_x$ emissions, wherein the coated substrate comprises a substrate and a PNA layer. The variations described above for the previously described coated substrates, PNA compositions, and PNA layer are also applicable to the method of treating an exhaust gas.

In some embodiments, a method of forming a coated substrate comprises coating the substrate with a washcoat composition comprising a PNA composition. The variations described above for the previously described coated substrates, PNA compositions, PNA layer, and washcoat compositions are also applicable to the method of forming a coated substrate. The method of forming a coated substrate can include coating the substrate with a corner-fill washcoat prior to coating the substrate with the PNA washcoat.

In some embodiments, a catalytic converter comprises a coated substrate comprising a PNA layer comprising a PNA composition. The variations described above for the previously described coated substrates, PNA compositions, and PNA layers are also applicable to the method of forming a coated substrate.

In some embodiments, a vehicle comprises a catalytic converter comprising a PNA layer comprising a PNA composition, wherein the vehicle complies with the European emission standard Euro 5. The variations described above for the previously described catalytic converter, PNA compositions, and PNA layers are also applicable to the vehicle. The vehicle can include an SCR unit downstream the catalytic converter. Also, the vehicle can include an LNT.

In some embodiments, an exhaust treatment system comprises a conduit for exhaust gas comprising $NO_x$ emissions and a catalytic converter comprising a coated substrate comprising a PNA layer comprising a PNA composition. The variations described above for the previously described coated substrates, PNA compositions, and PNA layers are also applicable to the method of forming a coated substrate. The exhaust treatment system can include an SCR unit downstream the catalytic converter. Also, the vehicle can include an LNT. Furthermore, the exhaust treatment system can comply with European emission standard Euro 5 and Euro 6.

In the disclosed embodiments, when a layer (layer Y) is said to be formed "on top of" another layer (layer X), either no additional layers, or any number of additional layers (layer(s) A, B, C, etc.) can be formed between the two layers X and Y. For example, if layer Y is said to be formed on top of layer X, this can refer to a situation where layer X can be formed, then layer A can be formed immediately atop layer X, then layer B can be formed immediately atop layer A, then layer Y can be formed immediately atop layer B. Alternatively, if layer Y is said to be formed on top of layer X, this can refer to a situation where layer Y can be deposited directly on top of layer X with no intervening layers between X and Y. For the specific situation where no intervening layers are present between layer X and layer Y, layer Y is said to be formed immediately atop layer X, or equivalently, layer Y is said to be formed directly on top of layer X.

In some embodiments, a method of treating an exhaust gas comprises contacting the coated substrate according to any one of the disclosed or foregoing embodiments of the coated substrate with the exhaust gas. In some embodiments, a method of treating an exhaust gas comprises contacting the coated substrate according to any one of the disclosed or foregoing embodiments of the coated substrate with the exhaust gas, wherein the substrate is housed within a catalytic converter configured to receive the exhaust gas.

In some embodiments, a coated substrate comprises a washcoat according to any of the disclosed embodiments of the washcoat compositions.

In some embodiments, a catalytic converter comprises a coated substrate according to any one of the disclosed or foregoing embodiments of the coated substrate. In some embodiments, an exhaust treatment system comprises a conduit for exhaust gas and a catalytic converter according to any one of the disclosed or foregoing embodiments of the catalytic converter. In some embodiments, a vehicle comprises a catalytic converter according to any one of the disclosed or foregoing embodiments of the catalytic converter. In any of the disclosed embodiments, including the foregoing, the vehicle can comply with European emission standard Euro 5. In any of the disclosed embodiments, including the foregoing, the vehicle can comply with European emission standard Euro 6. In any of the disclosed or foregoing embodiments the vehicle can be a diesel vehicle, a gasoline vehicle, a light-duty diesel vehicle, or a light-duty gasoline vehicle.

It is understood that aspects and embodiments of the invention described herein include "consisting" and/or "consisting essentially of" aspects and embodiments. For all methods, systems, compositions, and devices described herein, the methods, systems, compositions, and devices can either comprise the listed components or steps, or can "consist of" or "consist essentially of" the listed components or steps. When a system, composition, or device is described as "consisting essentially of" the listed components, the system, composition, or device contains the components listed, and may contain other components which do not substantially affect the performance of the system, composition, or device, but either do not contain any other components which substantially affect the performance of the system, composition, or device other than those components expressly listed; or do not contain a sufficient concentration or amount of the extra components to substantially affect the performance of the system, composition, or device. When a method is described as "consisting essentially of" the listed steps, the method contains the steps listed, and may contain other steps that do not substantially affect the outcome of the method, but the method does not contain any other steps which substantially affect the outcome of the method other than those steps expressly listed.

The systems, compositions, substrates, and methods described herein, including any embodiment of the invention as described herein, may be used alone or may be used in combination with other systems, compositions, substrates, and methods.

BRIEF DESCRIPTION OF THE DRAWINGS

FIG. 1 illustrates a catalytic converter in accordance with some embodiments of the present disclosure.

FIG. 1A is a magnified view of a portion of the drawing of FIG. 1 in accordance with some embodiments of the present disclosure.

DETAILED DESCRIPTION OF THE INVENTION

Figure 2:
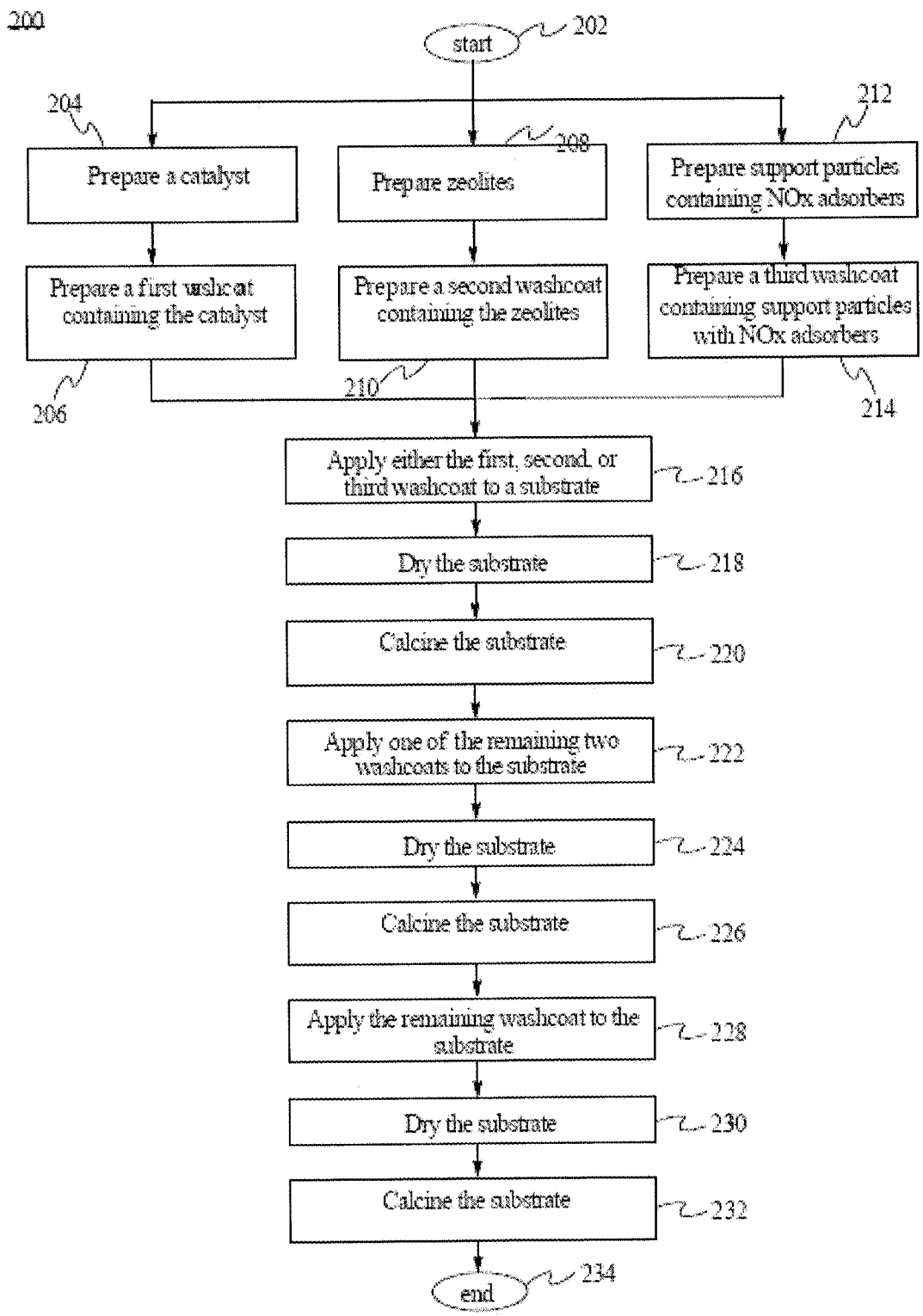
FIG. 2 is a flow chart illustrating a preparation method of a coated substrate containing catalytically active particles, zeolites, and PNA material contained in separate washcoat layers, in accordance with some embodiments of the present disclosure.

Described are PNA systems and methods of making PNA systems which can include combining washcoat layers of catalytically active particles, zeolites, and PNA materials. Also described are composite nanoparticle catalysts, washcoat formulations, coated substrates, catalytic converters, and methods of making and using these composite nanoparticle catalysts, washcoat formulations, coated substrates, and catalytic converters. The described PNA systems may use a reduced amount of precious metal relative to typical catalytic converter systems including light duty diesel systems. Accordingly, these PNA systems may provide a more economical alternative to commercially available systems.

Furthermore, the PNA materials may be able to store as many $NO_x$ emissions as possible at temperatures from ambient to about 100° C., 150° C., 200° C., 250° C., or 300° C., for example. The PNA materials may exhibit a "sharp" release temperature under lean conditions (i.e., releases all of the stored $NO_x$ emissions at slightly above about 100° C., 150° C., 200° C., 250° C., or 300° C., for example). High release temperatures and/or long release "tails" are not desirable because these high temperatures may not be reached prior to the engine being turned off. Thus, all the initially adsorbed $NO_x$ emissions may not be released from the PNA materials before the engine is running again, therefore prohibiting adsorption repeatability in the PNA materials. In addition, the PNA material may be cost efficient, may be able to handle sulfur rich fuels (i.e., can be sulfurized and de-sulfurized), and can be introduced independently to the oxidation material.

The PNA materials may also be able to store as many $NO_x$ emissions as possible at temperatures from ambient up to a maximum variable temperature. The maximum variable temperature can change depending on the type of engine and vehicle employed. Thus, the disclosed PNA materials can be tunable to store $NO_x$ emissions in some instance only up to about 100° C., in some cases up to about 150° C., in some cases up to about 200° C., and in some cases up to about 300° C. Regardless of the maximum variable temperature, the PNA materials may exhibit a "sharp" release temperature slightly above the maximum variable temperature.

In addition, the described substrates, composite nanoparticle catalysts, and washcoat solutions may provide for comparable or increased performance relative to prior PNA systems when used to produce catalytic converters, allowing for the production of catalytic converters having reduced light-off temperatures and reduced emissions using reduced platinum group metal loading requirements. The described coated substrates include washcoat layers in which the PNA material can be composed entirely of non-PGMs, or a combination of PGM and non-PGM. These coated substrates can be used to make an effective catalytic converter in a more economical fashion than has been previously possible.

The composite nanoparticles described herein include catalytic nanoparticles and support nanoparticles that are bonded together to form nano-on-nano composite nanoparticles. The composite nanoparticles may be produced, for example, in a plasma reactor so that consistent and tightly bonded nano-on-nano composite particles are produced. These composite nanoparticles can then be bonded to a micron-sized carrier particle to form micron-sized catalytically active particles ("nano-on-nano-on-micro" particles or NNm particles). The nano-on-nano composite particles are predominantly located at or near the surface of the resulting micron-sized particles. Alternatively, the composite nanoparticles can be embedded within a porous carrier to produce micron-sized catalytic particles ("nano-on-nano-in-micro" particles or NNiM particles). In this configuration, the nano-on-nano composite nanoparticles are distributed throughout the micron-sized carrier particles. In addition, hybrid NNm/wet-chemistry particles can be formed. These micron-sized catalytically active particles bearing composite nanoparticles (i.e., NNm, NNiM, and hybrid NNm/wet-chemistry particles) may offer better initial engine start-up performance, better performance over the lifetime of the catalyst and/or $NO_x$ storage material, and/or less decrease in performance over the life of the catalyst and/or $NO_x$ storage material, as compared to previous catalysts and $NO_x$ storage materials used in catalytic converters.

Further, the washcoat formulations may be formulated in order to provide one or more layers on a catalyst substrate, such as a catalytic converter substrate. In some embodiments, the washcoat formulations may form two or more layers in which catalytically active material, such as micron-sized catalytically active particles bearing composite nano particles, are in a separate layer than a layer containing the PNA material. One embodiment, for example, is a multi-layer washcoat in which a first washcoat layer includes the PNA material and a second, distinct washcoat layer includes a catalytically active material (i.e., oxidative and/or reductive material). The layer with the PNA material may include no catalytically active material, and the second layer with the catalytically active material may include no PNA material. The order and placement of these two layers on a substrate may be changed in different embodiments and, in further embodiments, additional washcoat formulations/layers may also be used over, under, or between the washcoats, for example, a corner-fill washcoat layer which is initially deposited on the substrate to be coated or a washcoat layer containing zeolites which is deposited on the PNA washcoat layer. In other embodiments, the two layers can be directly disposed on each other, that is, there are no intervening layers between the first and second washcoat layers. The described washcoat formulations may include a lower amount of platinum group metals. In addition, the described washcoat may offer better performance when compared to previous washcoat formulations, particularly when these washcoat formulations utilize the micron-sized particles bearing composite nano-particles.

The coated substrates, catalytic converters, and exhaust treatment systems described herein are useful for vehicles employing a selective catalytic reduction (SCR) system, a lean $NO_x$ trap (LNT) system, or other $NO_x$ storage catalyst (NSC) system. It is understood that the coated substrates described herein, catalytic converters using the coated substrates described herein, and exhaust treatment systems using the coated substrates described herein useful for either gasoline or diesel engines, and either gasoline or diesel vehicles. These coated substrates, catalytic converters, and exhaust treatment systems are especially useful for light-duty engines and light-duty vehicles, including but not limited to light-duty diesel vehicles.

Various aspects of the disclosure can be described through the use of flowcharts. Often, a single instance of an aspect of the present disclosure is shown. As is appreciated by those of ordinary skill in the art, however, the protocols, processes, and procedures described herein can be repeated continuously or as often as necessary to satisfy the needs described herein. In addition, it is contemplated that certain method steps can be performed in alternative sequences to those disclosed in the flowcharts.

When numerical values are expressed herein using the term "about" or the term "approximately" or the symbol "~," it is understood that both the value specified, as well as values reasonably close to the value specified, are included. For example, the description "50° C." or "approximately 50° C." or "~50° C." includes both the disclosure of 50° C. itself, as well as values close to 50° C. Thus, the phrases "about X" or "approximately X" or "~X" include a description of the value X itself. If a range is indicated, such as "approximately 50° C. to 60° C.," it is understood that both the values specified by the endpoints are included, and that values close to each endpoint or both endpoints are included for each endpoint or both endpoints; that is, "approximately 50° C. to 60° C." is equivalent to reciting both "50° C. to 60° C." and "approximately 50° C. to approximately 60° C."

As used herein, the term "embedded" when describing nanoparticles embedded in a porous carrier includes the term "bridged together by" when describing nanoparticles bridged together by a porous carrier, and refers to the configuration of the nanoparticles in the porous carrier resulting when the porous carrier is formed around or surrounds the nanoparticles, generally by using the methods described herein. That is, the resulting structure contains nanoparticles with a scaffolding of porous carrier between the nanoparticles, for example built up around or surrounding the nanoparticles. The porous carrier encompasses the nanoparticles, while at the same time, by virtue of its porosity, the porous carrier permits external gases to contact the embedded nanoparticles. Nanoparticles "embedded" within a porous carrier may include a configuration wherein nanoparticles are connected together (i.e., bridged together) by a carrier material.

It is generally understood by one of skill in the art that the unit of measure "g/l" or "grams per liter" is used as a measure of density of a substance in terms of the mass of the substance in any given volume containing that substance. In some embodiments, the "g/l" is used to refer to the loading density of a substance into, for example, a coated substrate. In some embodiments, the "g/l" is used to refer to the loading density of a substance into, for example, a layer of a coated substrate. In some embodiments, the "g/l" is used to refer to the loading density of a substance into, for example, a washcoat composition. The loading density of a substance into a layer of a coated substrate can be different then the loading density of a substance into the coated substrate. For example, if a PNA layer on the substrate is loaded with 4 g/l PGM but the layer only covers half of the substrate, then the loading density of PGM on the substrate would be 2 g/l.

By "substantial absence of any platinum group metals" is meant that less than about 5%, less than about 2%, less than about 1%, less than about 0.5%, less than about 0.1%, less than about 0.05%, less than about 0.025%, or less than about 0.01% of platinum group metals are present by weight. Preferably, substantial absence of any platinum group metals indicates that less than about 1% of platinum group metals are present by weight.

By "substantially free of" a specific component, a specific composition, a specific compound, or a specific ingredient in various embodiments, is meant that less than about 5%, less than about 2%, less than about 1%, less than about 0.5%, less than about 0.1%, less than about 0.05%, less than about 0.025%, or less than about 0.01% of the specific component, the specific composition, the specific compound, or the specific ingredient is present by weight. Preferably, "substantially free of" a specific component, a specific composition, a specific compound, or a specific ingredient indicates that less than about 1% of the specific component, the specific composition, the specific compound, or the specific ingredient is present by weight.

It should be noted that, during fabrication or during operation (particularly over long periods of time), small amounts of materials present in one washcoat layer may diffuse, migrate, or otherwise move into other washcoat layers. Accordingly, use of the terms "substantial absence of" and "substantially free of" is not to be construed as absolutely excluding minor amounts of the materials referenced.

By "substantially each" of a specific component, a specific composition, a specific compound, or a specific ingredient in various embodiments, is meant that at least about 95%, at least about 98%, at least about 99%, at least about 99.5%, at least about 99.9%, at least about 99.95%, at least about 99.975%, or at least about 99.99% of the specific component, the specific composition, the specific compound, or the specific ingredient is present by number or by weight. Preferably, "substantially each" of a specific component, a specific composition, a specific compound, or a specific ingredient is meant that at least about 99% of the specific component, the specific composition, the specific compound, or the specific ingredient is present by number or by weight.

This disclosure provides several embodiments. It is contemplated that any features from any embodiment can be combined with any features from any other embodiment. In this fashion, hybrid configurations of the disclosed features are within the scope of the present invention.

It is understood that reference to relative weight percentages in a composition assumes that the combined total weight percentages of all components in the composition add up to 100. It is further understood that relative weight percentages of one or more components may be adjusted upwards or downwards such that the weight percent of the components in the composition combine to a total of 100, provided that the weight percent of any particular component does not fall outside the limits of the range specified for that component.

This disclosure refers to both particles and powders. These two terms are equivalent, except for the caveat that a singular "powder" refers to a collection of particles. The present disclosure can apply to a wide variety of powders and particles. The terms "nanoparticle" and "nano-sized particle" are generally understood by those of ordinary skill in the art to encompass a particle on the order of nanometers in diameter, typically between about 0.5 nm to 500 nm, about 1 nm to 500 nm, about 1 nm to 100 nm, or about 1 nm to 50 nm. The nanoparticles can have an average grain size less than 250 nanometers and an aspect ratio between one and one million. In some embodiments, the nanoparticles have an average grain size of about 50 nm or less, about 30 nm or less, about 20 nm or less, about 10 nm or less, or about 5 nm or less. In additional embodiments, the nanoparticles have an average diameter of about 50 nm or less, about 30 nm or less, about 20 nm or less, about 10 nm or less, or about 5 nm or less. The aspect ratio of the particles, defined as the longest dimension of the particle divided by the shortest dimension of the particle, is preferably between one and one hundred, more preferably between one and ten, yet more preferably between one and two. "Grain size" is measured using the ASTM (American Society for Testing and Materials) standard (see ASTM E112-10). When calculating a diameter of a particle, the average of its longest and shortest dimension is taken; thus, the diameter of an ovoid particle with long axis 20 nm and short axis 10 nm would be 15 nm. The average diameter of a population of particles is the average of diameters of the individual particles, and can be measured by various techniques known to those of skill in the art.

In additional embodiments, the nanoparticles have a grain size of about 50 nm or less, about 30 nm or less, about 20 nm or less, about 10 nm or less, or about 5 nm or less. In additional embodiments, the nanoparticles have a diameter of about 50 nm or less, about 30 nm or less, about 20 nm or less, about 10 nm or less, or about 5 nm or less.

The terms "micro-particle," "micro-sized particle," "micron-particle," and "micron-sized particle" are generally understood to encompass a particle on the order of micrometers in diameter, typically between about 0.5 μm to 1000 μm, about 1 μm to 1000 μm, about 1 μm to 100 μm, or about 1 μm to 50 μm. Additionally, the term "platinum group metals" (abbreviated "PGM") used in this disclosure refers to the collective name used for six metallic elements clustered together in the periodic table. The six platinum group metals are ruthenium, rhodium, palladium, osmium, iridium, and platinum.

Composite Nanoparticles

PNA systems may include many different types of composite nanoparticles. One type of composite nanoparticle is an oxidative composite nanoparticle. A second type of composite nanoparticle is a PNA composite nanoparticle. The PNA systems can also include reductive composite nanoparticles as well.

A composite nanoparticle may include a catalytic nanoparticle attached to a support nanoparticle to form a "nano-on-nano" composite nanoparticle. Multiple nano-on-nano particles may then be bonded to or embedded within a micron-sized carrier particle to form a composite micro/nanoparticle, that is, a micro-particle bearing composite nanoparticles. These composite micro/nanoparticles may be used in washcoat formulations and catalytic converters as described herein. The use of these particles can reduce requirements for platinum group metal content and significantly enhance performance, particularly in terms of reduced light-off temperature and $NO_x$ storage, as compared with currently available commercial catalytic converters prepared by wet-chemistry methods. The wet-chemistry methods generally involve use of a solution of platinum group metal ions or metal salts, which are impregnated into supports (typically micron-sized particles), and reduced to platinum group metal in elemental form for use as the catalyst. For example, a solution of chloroplatinic acid, $H_2PtCl_6$, can be applied to alumina micro-particles, followed by drying and calcining, resulting in precipitation of platinum onto the alumina. In any embodiment, the drying and/or calcining can be done under reducing conditions as compared to atmospheric conditions in order to limit the amount of oxide formation (specifically, with regard to the PGM metal). Accordingly, the drying and/or calcining can be done using argon and/or helium. The platinum group metals deposited by wet-chemical methods onto metal oxide supports, such as alumina and cerium oxide, are mobile at high temperatures, such as temperatures encountered in catalytic converters. That is, at elevated temperatures, the PGM atoms can migrate over the surface on which they are deposited, and will clump together with other PGM atoms. The finely-divided portions of PGM combine into larger and larger agglomerations of platinum group metal as the time of exposure to high temperature increases. This agglomeration leads to reduced catalyst surface area and degrades the performance of the catalytic converter. This phenomenon is referred to as "aging" of the catalytic converter.

In contrast, the composite platinum group metal particles are prepared by plasma-based methods. In one embodiment, the platinum group nano-sized metal particle is deposited on a nano-sized metal oxide support, which has much lower mobility than PGM deposited by wet chemistry methods. The resulting plasma-produced catalysts age at a much slower rate than the catalysts produced by wet-chemistry. Thus, catalytic converters using plasma-produced catalysts can maintain a larger surface area of exposed catalyst to gases emitted by the engine over a longer period of time, leading to better emissions performance.

Oxidative Composite Nanoparticle (Oxidative "Nano-on-Nano" Particle)

One type of composite nanoparticle is an oxidative composite nanoparticle catalyst. An oxidative composite nanoparticle may include one or more oxidative catalyst nanoparticles attached to a first support nanoparticle to form an oxidative "nano-on-nano" composite nanoparticle. Platinum (Pt) and palladium (Pd) are oxidative to the hydrocarbon gases and carbon monoxide. In certain embodiments, the oxidative nanoparticle is platinum. In other embodiments, the oxidative nanoparticle is palladium. In some embodiments, the oxidative nanoparticle is a mixture of platinum and palladium. A suitable support nanoparticle for the oxidative catalyst nanoparticle includes, but is not limited to, nano-sized aluminum oxide (alumina or $Al_2O_3$).

Each oxidative catalyst nanoparticle may be supported on a first support nanoparticle. The first support nanoparticle may include one or more oxidative nanoparticles. The oxidative catalyst nanoparticles on the first support nanoparticle may include platinum, palladium, or a mixture thereof. At the high temperatures involved in gasoline or diesel exhaust engines, both palladium and platinum are effective oxidative catalysts. Accordingly, in some embodiments, the oxidative catalyst is palladium alone. In other embodiments, platinum may be used alone. In further embodiments, platinum may be used in combination with palladium. For example, the first support nanoparticle may contain a mixture of 2:1 to 100:1 platinum to palladium. In some embodiments, the first support nanoparticle may contain a mixture of 2:1 to 75:1 platinum to palladium. In some embodiments, the first support nanoparticle may contain a mixture of 2:1 to 50:1 platinum to palladium. In some embodiments, the first support nanoparticle may contain a mixture of 2:1 to 25:1 platinum to palladium. In some embodiments, the first support nanoparticle may contain a mixture of 2:1 to 15:1 platinum to palladium. In some embodiments, the first support nanoparticle may contain a mixture of 2:1 to 10:1 platinum to palladium. In some embodiments, the first support nanoparticle may contain a mixture of 2:1 to 5:1 platinum to palladium. In some embodiments, the first support nanoparticle may contain a mixture of 2:1 platinum to palladium, or approximately 2:1 platinum to palladium. In some embodiments, the support particles may contain a mixture of 2:1 to 20:1 platinum to palladium. In some embodiments, the support particles may contain a mixture of 5:1 to 15:1 platinum to palladium. In some embodiments, the support particles may contain a mixture of 8:1 to 12:1 platinum to palladium. In some embodiments, the support particles may contain a mixture of 10:1 platinum to palladium, or approximately 10:1 platinum to palladium. In some embodiments, the support particles may contain a mixture of 2:1 to 8:1 platinum to palladium. In some embodiments, the support particles may contain a mixture of 3:1 to 5:1 platinum to palladium. In some embodiments, the support particles may contain a mixture of 4:1 platinum to palladium, or approximately 4:1 platinum to palladium.

Reductive Composite Nanoparticle (Reductive "Nano-On-Nano" Particle)

As discussed above, another type of composite nanoparticle is a reductive composite nanoparticle catalyst. A reductive composite nanoparticle may include one or more reductive catalyst nanoparticles attached to a second support nanoparticle to form a reductive "nano-on-nano" composite nanoparticle. Rhodium (Rh) is reductive to the nitrogen oxides in fuel-rich conditions. In certain embodiments, the reductive catalyst nanoparticle is rhodium. The second support may be the same or different than the first support. A suitable second support nanoparticle for the reductive nanoparticle includes, but is not limited to, nano-sized cerium oxide ($CeO_2$). The nano-sized cerium oxide particles may further comprise zirconium oxide. The nano-sized cerium oxide particles can also be substantially free of zirconium oxide. In other embodiments, the nano-sized cerium oxide particles may contain up to 60% zirconium oxide. In some embodiments, the nano-sized cerium oxide particles may further comprise both zirconium oxide and lanthanum and/or lanthanum oxide. In some embodiments, the nano-sized cerium oxide particles may further comprise yttrium oxide. Accordingly, in addition to, or instead of, cerium oxide particles, particles comprising cerium-zirconium oxide, cerium-lanthanum oxide, cerium-yttrium oxide, cerium-zirconium oxide, cerium-zirconium-yttrium oxide, cerium-lanthanum-yttrium oxide, and/or cerium-zirconium-lanthanum-yttrium oxide can be used. In some embodiments, the nano-sized cerium oxide particles contain 40-90 wt % cerium oxide, 5-60 wt % zirconium oxide, 1-15 wt % lanthanum oxide, and/or 1-10 wt % yttrium oxide. In one embodiment, the nano-sized cerium oxide particles contain 80 wt % cerium oxide, 10 wt % zirconium oxide, and 10 wt % lanthanum and/or lanthanum oxide. In another embodiment, the nano-sized cerium oxide particles contain 86 wt % cerium oxide, 10 wt % zirconium oxide, and 4 wt % lanthanum oxide. In another embodiment, the nano-sized cerium oxide particles contain 40 wt % cerium oxide, 50 wt % zirconium oxide, and 10 wt % lanthanum and/or lanthanum oxide. In another embodiment, the cerium oxide particles contain 40 wt % cerium oxide, 50 wt % zirconium oxide, 5 wt % lanthanum oxide, and 5 wt % yttrium oxide.

Each reductive catalyst nanoparticle may be supported on a second support nanoparticle. The second support nanoparticle may include one or more reductive catalyst nanoparticles. The ratios of rhodium to cerium oxide and sizes of the reductive composite nanoparticle catalyst are further discussed below in the sections describing production of composite nanoparticles by plasma-based methods and production of micron-sized carrier particles bearing composite nanoparticles.

PNA Composite Nanoparticle (PNA "Nano-On-Nano" Particle)

As discussed above, another type of composite nanoparticle is a PNA composite nanoparticle. A PNA composite nanoparticle may include one or more PGM nanoparticles attached to a second support nanoparticle to form a PGM "nano-on-nano" composite nanoparticle. Palladium (Pd) and Ruthenium (Ru) can hold $NO_x$ gases during low temperature engine operation and release the gases when the temperature rises to a threshold temperature. In certain embodiments, the PGM nanoparticle is palladium. In some embodiments, palladium can be used when employed in a large engine system (e.g., greater than 2.5 L). In other embodiments, the PGM nanoparticle is ruthenium. In some embodiments, ruthenium can be used when employed in a small engine system (e.g., less than 2 L). The ruthenium can be ruthenium oxide. A suitable second support nanoparticle for the PGM nanoparticle includes, but is not limited to, nano-sized cerium oxide. The nano-sized cerium oxide particles may further comprise zirconium oxide. The nano-sized cerium oxide particles can also be substantially free of zirconium oxide. In addition, the nano-sized cerium oxide may further comprise lanthanum and/or lanthanum oxide. In some embodiments, the nano-sized cerium oxide particles may further comprise both zirconium oxide and lanthanum oxide. In some embodiments, the nano-sized cerium oxide particles may further comprise yttrium oxide. Accordingly, in addition to, or instead of, cerium oxide particles, particles comprising cerium-zirconium oxide, cerium-lanthanum oxide, cerium-yttrium oxide, cerium-zirconium oxide, cerium-zirconium-yttrium oxide, cerium-lanthanum-yttrium oxide, and/or cerium-zirconium-lanthanum-yttrium oxide can be used. In some embodiments, the nano-sized cerium oxide particles contain 40-90 wt % cerium oxide, 5-60 wt % zirconium oxide, 1-15 wt % lanthanum oxide, and/or 1-10 wt % yttrium oxide. In one embodiment, the nano-sized cerium oxide particles contain 86 wt % cerium oxide, 10 wt % zirconium oxide, and 4 wt % lanthanum and/or lanthanum oxide. In another embodiment, the cerium oxide particles contain 40 wt % cerium oxide, 50 wt % zirconium oxide, 5 wt % lanthanum oxide, and 5 wt % yttrium oxide.

Each PGM nanoparticle may be supported on a second support nanoparticle. The second support nanoparticle may include one or more PGM nanoparticles. The ratios of PGM to cerium oxide and sizes of the PNA composite nanoparticle catalyst are further discussed below in the sections describing production of composite nanoparticles by plasma-based methods and production of micron-sized carrier particles bearing composite nanoparticles.

Production of Composite Nanoparticles by Plasma-Based Methods ("Nano-On-Nano" Particles or "NN" Particles)

The initial step in producing suitable catalysts may involve producing composite nano-particles. The composite nano-particles comprise a catalytic nano-particle comprising one or more platinum group metals, and a support nano-particle, typically a metal oxide such as aluminum oxide or cerium oxide. As the name "nano-particle" implies, the nano-particles have sizes on the order of nanometers.

The composite nano-particles may be formed by plasma reactor methods, by feeding platinum group metal(s) and support material into a plasma gun, where the materials are vaporized. Plasma guns such as those disclosed in US 2011/0143041 can be used, and techniques such as those disclosed in U.S. Pat. Nos. 5,989,648, 6,689,192, 6,755,886, and US 2005/0233380 can be used to generate plasma, the disclosures of which are hereby incorporated by reference in their entireties. A working gas, such as argon, is supplied to the plasma gun for the generation of plasma; in one embodiment, an argon/hydrogen mixture (in the ratio of 10:2 $Ar/H_2$) is used as the working gas.

The platinum group metal or metals, such as platinum, palladium, or ruthenium, and which are generally in the form of metal particles of about 0.5 to 6 microns in diameter, can be introduced into the plasma reactor as a fluidized powder in a carrier gas stream such as argon. Metal oxide, typically aluminum oxide or cerium oxide in a particle size of about 15 to 25 microns diameter, is also introduced as a fluidized powder in carrier gas. However, other methods of introducing the materials into the reactor can be used, such as in a liquid slurry. A composition of about 1% to about 40% platinum group metal(s) and about 99% to about 60% metal oxide (by weight) can be used. Furthermore, a composition of about 40% to about 60% platinum group metal(s) and about 60% to about 40% metal oxide (by weight) can be used. Examples of ranges of materials that can be used for oxidative composite nanoparticles are from about 0% to about 40% platinum, about 0% to about 40% palladium, and about 55% to about 65% aluminum oxide; in some embodiments, from about 20% to about 30% platinum, about 10% to about 15% palladium, and about 50% to about 65% aluminum oxide are used; in further embodiments, from about 23.3% to about 30% platinum, about 11.7% to about 15% palladium, and about 55% to about 65% aluminum oxide are used. An exemplary composition contains about 26.7% platinum, about 13.3% palladium, and about 60% aluminum oxide.

The oxidative composite nanoparticles may contain a mixture of 2:1 to 100:1 platinum to palladium. In some embodiments, the oxidative composite nanoparticles may contain a mixture of 2:1 to 75:1 platinum to palladium. In some embodiments, the oxidative composite nanoparticles may contain a mixture of 2:1 to 50:1 platinum to palladium. In some embodiments, the oxidative composite nanoparticles may contain a mixture of 2:1 to 25:1 platinum to palladium. In some embodiments, the oxidative composite nanoparticles may contain a mixture of 2:1 to 15:1 platinum to palladium. In some embodiments, the oxidative composite nanoparticles may contain a mixture of 2:1 to 10:1 platinum to palladium. In some embodiments, the oxidative composite nanoparticles may contain a mixture of 2:1 platinum to palladium, or approximately 2:1 platinum to palladium. In some embodiments, the support particles may contain a mixture of 2:1 to 20:1 platinum to palladium. In some embodiments, the support particles may contain a mixture of 5:1 to 15:1 platinum to palladium. In some embodiments, the support particles may contain a mixture of 8:1 to 12:1 platinum to palladium. In some embodiments, the support particles may contain a mixture of 10:1 platinum to palladium, or approximately 10:1 platinum to palladium. In some embodiments, the support particles may contain a mixture of 2:1 to 8:1 platinum to palladium. In some embodiments, the support particles may contain a mixture of 3:1 to 5:1 platinum to palladium. In some embodiments, the support particles may contain a mixture of 4:1 platinum to palladium, or approximately 4:1 platinum to palladium.

Examples of ranges of materials that can be used for reductive composite nanoparticles are from about 1% to about 10% rhodium and 90% to 99% cerium oxide. In one embodiment, the composition contains about 5% rhodium and 95% cerium oxide.

Examples of ranges of materials that can be used for PNA composite nanoparticles are from about 1% to about 40% palladium and about 99% to about 60% cerium oxide, from about 5% to about 20% palladium and about 95% to about 80% cerium oxide, and from about 8% to about 12% palladium and about 92% to about 88% cerium oxide. These examples can be for PNA material to be used in large engine systems. In one embodiment, the composition contains about 10% palladium and about 90% cerium oxide. Other Examples of ranges of materials that can be used for PNA composite nanoparticles are from about 1% to about 40% ruthenium and about 99% to about 60% cerium oxide, from about 5% to about 20% ruthenium and about 95% to about 80% cerium oxide, and from about 8% to about 12% ruthenium and about 92% to about 88% cerium oxide. These examples can be for PNA material to be used in small engine systems. In one embodiment, the composition contains about 10% ruthenium and about 90% cerium oxide. As discussed below, in all embodiments, the cerium oxide can include cerium-zirconium oxide, cerium-zirconium-lanthanum oxide, and cerium-zirconium-lanthanum-yttrium oxide among others.

In a plasma reactor, any solid or liquid materials are rapidly vaporized or turned into plasma. The kinetic energy of the superheated material, which can reach temperatures of 20,000 to 30,000 Kelvin, ensures extremely thorough mixture of all components.

The superheated material of the plasma stream is then rapidly quenched, using methods such as the turbulent quench chamber disclosed in U.S. Publication No. 2008/0277267, the disclosure of which is hereby incorporated by reference in their entireties. Argon quench gas at high flow rates, such as 2400 to 2600 liters per minute, may be injected into the superheated material. The material may be further cooled in a cool-down tube, and collected and analyzed to ensure proper size ranges of material.

The plasma production method described above produces highly uniform composite nanoparticles, where the composite nanoparticles comprise a catalytic nanoparticle bonded to a support nanoparticle. The catalytic nanoparticle comprises the platinum group metal or metals, such as Pt:Pd in a 2:1 ratio by weight. In some embodiments, the catalytic nanoparticles have an average diameter or average grain size between approximately 0.3 nm and approximately 10 nm, preferably between approximately 1 nm to approximately 5 nm, that is, approximately 3 nm±2 nm. These size of catalytic nanoparticles can be the size of the catalytic nanoparticles employed when using wet chemistry methods. In some embodiments, the support nanoparticles, comprising the metal oxide such as aluminum oxide or cerium oxide, have an average diameter of approximately 20 nm or less, or approximately 15 nm or less, or between approximately 10 nm and approximately 20 nm, that is, approximately 15 nm±5 nm, or between approximately 10 nm and approximately 15 nm, that is, approximately 12.5 nm±2.5 nm, or between approximately 5 nm and approximately 10 nm, that is, approximately 7.5 nm±2.5 nm.

The composite nanoparticles, when produced under reducing conditions, such as by using argon/hydrogen working gas, results in a partially reduced surface on the support nanoparticle to which the PGM nanoparticle is bonded, as described in U.S. Publication No. 2011/0143915 at paragraphs 0014-0022. For example, when palladium is present in the plasma, the particles produced under reducing conditions can be a palladium aluminate. The partially reduced surface inhibits migration of the platinum group metal on the support surface at high temperatures. This, in turn, limits the agglomeration of platinum group metal when the particles are exposed to prolonged elevated temperatures. Such agglomeration is undesirable for many catalytic applications, as it reduces the surface area of PGM catalyst available for reaction.

The composite nanoparticles comprising two nanoparticles (catalytic or support) are referred to as "nano-on-nano" particles or "NN" particles.

Production of Micron-Sized Carrier Particles Bearing Composite Nanoparticles ("Nano-On-Nano-On-Micro" Particles or "NNm"™ Particles)

The composite nanoparticles (nano-on-nano particles) may be further bonded to micron-sized carrier particles to produce composite micro/nanoparticles, referred to as "nano-on-nano-on-micro" particles or "NNm"™ particles, which are catalytically active particles.

The micron-sized particles can have an average size between about 1 micron and about 100 microns, such as between about 1 micron and about 10 microns, between about 3 microns and about 7 microns, or between about 4 microns and about 6 microns. In one embodiment, the micron-sized particles have an average size of 5 microns. These sizes of micron-sized particles can be the size of the micron-sized particles employed when using wet chemistry methods.

In general, the nano-on-nano-on-micro particles are produced by a process of suspending the composite nanoparticles (nano-on-nano particles) in water, adjusting the pH of the suspension to between about 2 and about 7, between about 3 and about 5, or about 4, adding one or more surfactants to the suspension (or, alternatively, adding the surfactants to the water before suspending the composite nanoparticles in the water) to form a first solution. The process includes sonicating the composite nanoparticle suspension and applying the suspension to micron-sized metal oxide particles until the point of incipient wetness, thereby impregnating the micron-sized particles with composite nanoparticles and nano-sized metal oxide. This process of drying and calcining can also be applied to producing nanoparticles on support particles (either micron-sized or on nano-sized) via incipient wetness in general.

In some embodiments, the micron-sized metal oxide particles are pre-treated with a gas at high temperature. The pre-treatment of the micron-sized metal oxide particles allows the nano-on-nano-on-micro particles to withstand the high temperatures of an engine. Without pre-treatment, the nano-on-nano-on-micro particles would more likely change phase on exposure to high temperature, compared to the nano-on-nano-on-micro particles that have been pretreated. In some embodiments, pre-treatment includes exposure of the micron-sized metal oxide particles at temperatures, such as about 700° C. to about 1500° C.; 700° C. to about 1400° C.; 700° C. to about 1300° C.; and 700° C. to about 1200° C. In some embodiments, pre-treatment includes exposure of the micron-sized metal oxide particles at temperatures, such as about 700° C., 1110° C., 1120° C., 1130° C., 1140° C., 1150° C., 1155° C., 1160° C., 1165° C., 1170° C., 1175° C., 1180° C., 1190° C., and 1200° C.

The process includes drying the micron-sized metal oxide particles which have been impregnated with composite nanoparticles and nano-sized metal oxide, and calcining the micron-sized metal oxide particles which have been impregnated with composite nanoparticles and nano-sized metal oxide.

Typically, the composite nanoparticles and nano-sized metal oxide are suspended in water, and the suspension is adjusted to have a pH of between about 2 and about 7, preferably between about 3 and about 5, more preferably a pH of about 4 (the pH is adjusted with acetic acid or another organic acid). Dispersants, surfactants, or mixtures thereof may be added to the composite nanoparticles and nano-sized metal oxide. Surfactants suitable for use include Jeffsperse® X3202 (Chemical Abstracts Registry No. 68123-18-2, described as 4,4'-(1-methylethylidene)bis-phenol polymer with 2-(chloromethyl)oxirane, 2-methyloxirane, and oxirane), Jeffsperse® X3204, and Jeffsperse® X3503 surfactants from Huntsman (JEFFSPERSE is a registered trademark of Huntsman Corporation, The Woodlands, Tex., United States of America for chemicals for use as dispersants and stabilizers), which are non-ionic polymeric dispersants. Other suitable surfactants include Solsperse® 24000 and Solsperse® 46000 from Lubrizol (SOLSPERSE is a registered trademark of Lubrizol Corporation, Derbyshire, United Kingdom for chemical dispersing agents). The Jeffsperse® X3202 surfactant, Chemical Abstracts Registry No. 68123-18-2 (described as 4,4'-(1-methylethylidene)bis-phenol polymer with 2-(chloromethyl)oxirane, 2-methyloxirane, and oxirane), is preferred. The surfactant may be added in a range, for example, of about 0.5% to about 5%, with about 2% being a typical value.

The mixture of aqueous surfactants, composite nanoparticles, and nano-sized metal oxide may be sonicated to disperse the composite nanoparticles and nano-sized metal oxide. The quantity of composite nanoparticles and nano-sized metal oxide in the dispersion may be in the range of about 2% to about 15% (by mass). The dispersion is then applied to porous, micron sized metal oxides, such as $Al_2O_3$ which may be purchased from companies such as Rhodia or Sasol or cerium oxide. The porous, micron sized, metal oxide powders may be stabilized with a small percentage of lanthanum and/or lanthanum oxide (about 2% to about 4% La). In addition, the porous, micron sized, metal oxide powder may include a percentage of zirconium oxide (about 5% to about 15%, preferably 10%). In some embodiments, the porous, micron sized, metal oxide powders may further comprise yttrium oxide. Accordingly, the porous, micron sized, metal oxide powders can include cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, cerium-zirconium-lanthanum-yttrium oxide, or a combination thereof. In some embodiments, the nano-sized cerium oxide particles contain 40-90 wt % cerium oxide, 5-60 wt % zirconium oxide, 1-15 wt % lanthanum oxide, and/or 1-10 wt % yttrium oxide. In one embodiment, the micron-sized cerium oxide particles contain 86 wt % cerium oxide, 10 wt % zirconium oxide, and 4 wt % lanthanum and/or lanthanum oxide. In another embodiment, the cerium oxide particles contain 40 wt % cerium oxide, 50 wt % zirconium oxide, 5 wt % lanthanum oxide, and 5 wt % yttrium oxide. One commercial alumina powder suitable for use is MI-386, purchased from Grace Davison or Rhodia. The usable surface for this powder, defined by pore sizes greater than 0.28 μm, is approximately 2.8 m²/g. One commercial cerium oxide powder suitable for use is HSA5, HSA20, or a mixture thereof, purchased from Rhodia-Solvay.

The ratio of composite nano-particles used to micron-sized carrier particles used may be from about 3:100 to about 10:100, about 5:100 to about 8:100, or about 6.5:100, in terms of (weight of composite nanoparticle):(weight of micron carrier particle). In some embodiments, about 8 grams of composite nano-particles may be used with about 122 grams of carrier micro-particles. The aqueous dispersion of composite nano-particles is applied in small portions (such as by dripping or other methods) to the micron-sized powder until the point of incipient wetness, producing a material similar to damp sand.

The micron-sized carrier particles, impregnated with the composite nano-particles, may then be dried (for example, at about 30° C. to about 95° C., preferably about 60° C. to about 70° C., at atmospheric pressure or at reduced pressure such as from about 1 pascal to about 90,000 pascal). After drying, the particles may then be calcined (at elevated temperatures, such as from 400° C. to about 700° C., preferably about 500° C. to about 600° C., more preferably at about 540° C. to about 560° C., still more preferably at about 550° C. to about 560° C., or at about 550° C.; at atmospheric pressure or at reduced pressure, for example, from about 1 pascal to about 90,000 pascal, in ambient atmosphere or under an inert atmosphere such as nitrogen or argon) to yield the composite micro/nano-particles, also referred to as nano-on-nano-on-micron particles, or NNm particles. The drying step may be performed before the calcining step to remove the water before heating at the higher calcining temperatures; this avoids boiling of the water, which would disrupt the impregnated nano-particles which are lodged in the pores of the micron-sized carrier. In any embodiment, the drying and/or calcining can be done under reducing conditions as compared to atmospheric conditions in order to limit the amount of oxide formation (specifically, with regard to the PGM metal). Accordingly, the drying and/or calcining can be done using argon and/or helium.

The NNm particles may contain from about 0.1% to about 6% PGM by weight, or in another embodiment from about 0.5% to 3.5% by weight, or in another embodiment about 1% to 2.5% by weight, or in another embodiment about 2% to about 3% by weight, or in another embodiment, about 2.5% by weight, of the total mass of the NNm particle. The NNm particles can then be used for formulations for coating substrates, where the coated substrates may be used in catalytic converters.

Examples of production of NNm material are described in the following co-owned patents and patent applications the disclosures of which are hereby incorporated by reference in their entireties: U.S. Patent Publication No. 2005/0233380, U.S. Patent Publication No. 2006/0096393, U.S. patent application Ser. No. 12/151,810 (now abandoned), U.S. patent application Ser. No. 12/152,084 (now abandoned), U.S. patent application Ser. No. 12/151,809 (now abandoned), U.S. Pat. No. 7,905,942, U.S. patent application Ser. No. 12/152,111 (now abandoned), U.S. Patent Publication 2008/0280756, U.S. Patent Publication 2008/0277270, U.S. patent application Ser. No. 12/001,643 (now U.S. Pat. No. 8,507,401), U.S. patent application Ser. No. 12/474,081

(now U.S. Pat. No. 8,507,402), U.S. patent application Ser. No. 12/001,602 (now U.S. Pat. No. 8,575,059), U.S. patent application Ser. No. 12/001,644 (now U.S. Pat. No. 8,481,449), U.S. patent application Ser. No. 12/962,518 (U.S. Patent Publication 2011/0143930), now abandoned, U.S. patent application Ser. No. 12/962,473 (now U.S. Pat. No. 8,652,992), U.S. patent application Ser. No. 12/962,490 (now U.S. Pat. No. 9,126,191), U.S. patent application Ser. No. 12/969,264 (U.S. Patent Publication 2011-0144382), now abandoned, U.S. patent application Ser. No. 12/962,508 (now U.S. Pat. No. 8,557,727), U.S. patent application Ser. No. 12/965,745 (now U.S. Pat. No. 9,149,797), U.S. patent application Ser. No. 12/969,503 (now U.S. Pat. No. 8,828,328), and U.S. patent application Ser. No. 13/033,514 (now U.S. Pat. No. 8,669,202), WO 2011/081834 (PCT/US2010/59763) and US 2011/0143915 (U.S. patent application Ser. No. 12/962,473, now U.S. Pat. No. 8,652,992).

Production of Hybrid Micron-Sized Carrier Particles Bearing Composite Nanoparticles ("Nano-On-Nano-On-Micro" Particles or "NNm"™ Particles) and Also Impregnated with Platinum Group Metal(s) Using Wet Chemistry Methods—"Hybrid NNm/Wet-Chemistry Particles" or "Hybrid Composite/Wet-Chemistry Particles"

Furthermore, the micron-sized particles which bear the composite nanoparticles can additionally be impregnated with platinum group metals using wet-chemistry methods, so that PGM is present on the micron-sized particle due to the nano-on-nano composite nanoparticles and also due to the deposition via wet chemistry. The micron-sized particles can be impregnated with PGM before or after the composite nanoparticles (nano-on-nano) are bonded to the micron-sized particles. When the nano-on-nano particles are added to the micron-sized carrier particles, the nano-on-nano particles tend to stay near the surface of the micron particle, as they are too large to penetrate into the smaller pores of the micron particle. Therefore, impregnating these micron-sized particles via wet-chemistry methods allows for PGM to penetrate deeper into the micron-sized particles than the corresponding nano-on-nano particles. In addition, because the nano-on-nano particles of these hybrid NNm/wet-chemistry particles contain PGM, lower amounts of PGM can be impregnated by wet-chemistry on the micron-sized particles to achieve the total desired loading. For example, if a final loading of 5 g/l of PGM is desired on the final catalyst or PNA material, loading 3 g/l of PGM as nano-on-nano (NN) particles requires only 2 g/l of PGM to be loaded via wet-chemistry methods. A lower amount of wet-chemistry impregnated PGM can reduce the agglomeration rate of these wet-chemistry impregnated catalytic particles when the catalyst or PNA material is exposed to prolonged elevated temperatures since there is less PGM to agglomerate. That is, the rate of aging of the catalyst will be reduced, since the rate of collision and agglomeration of mobile wet-chemistry-deposited PGM is reduced at a lower concentration of the wet-chemistry-deposited PGM, but without lowering the overall loading of PGM due to the contribution of PGM from the nano-on-nano particles. Thus, employing the nano-on-nano-on-micro configuration and using a micron-sized particle with wet-chemistry deposited platinum group metal can enhance catalyst performance and $NO_x$ storage while avoiding an excessive aging rate.

Methods for impregnation of carriers and production of catalysts by wet chemistry methods are discussed in Heck, Ronald M.; Robert J. Farrauto; and Suresh T. Gulati, *Catalytic Air Pollution Control: Commercial Technology*, Third Edition, Hoboken, N.J.: John Wiley & Sons, 2009, at Chapter 2, pages 24-40 (see especially pages 30-32) and references disclosed therein, and also in Marceau, Eric; Xavier Carrier, and Michel Che, "Impregnation and Drying," Chapter 4 of *Synthesis of Solid Catalysts* (Editor: de Jong, Krijn) Weinheim, Germany: Wiley-VCH, 2009, at pages 59-82 and references disclosed therein.

For wet chemistry impregnation, typically a solution of a platinum group metal salt is added to the micron sized carrier particle to the point of incipient wetness, followed by drying, calcination, and reduction as necessary to elemental metal. Platinum can be deposited on carriers such as alumina by using Pt salts such as chloroplatinic acid $H_2PtCl_6$), followed by drying, calcining, and reduction to elemental metal. Palladium can be deposited on carriers such as alumina using salts such as palladium nitrate ($Pd(NO_3)_2$), palladium chloride ($PdCl_2$), palladium(II) acetylacetonate ($Pd(acac)_2$), followed by drying, calcining, and reduction to elemental metal (see, e.g., Toebes et al., "Synthesis of supported palladium catalysts," Journal of Molecular Catalysis A: Chemical 173 (2001) 75-98).

General Procedures for Preparation of Catalysts for Oxidation Reaction (Oxidative "Nano-On-Nano-On-Micro" Particles or "NNm"™ Particles)

To prepare an oxidative catalytically active particle, a dispersion of oxidative composite nanoparticles may be applied to porous, micron-sized $Al_2O_3$, which may be purchased, for example, from companies such as Rhodia or Sasol. The porous, micron-sized, $Al_2O_3$ powders may be stabilized with a small percentage of lanthanum and/or lanthanum oxide (about 2% to about 4% La). One commercial alumina powder suitable for use is MI-386, which may be purchased from Grace Davison or Rhodia. The usable surface for this powder, defined by pore sizes greater than 0.28 μm, is approximately 2.8 $m^2$/g. The ratio of composite nanoparticles used to micron-sized carrier particles used may be from about 3:100 to about 10:100, about 5:100 to about 8:100, or about 6.5:100, in terms of (weight of composite nanoparticle):(weight of micron carrier particle). In some embodiments, about 8 grams of composite nanoparticles may be used with about 122 grams of carrier micro-particles. The aqueous dispersion of composite nanoparticles may be applied in small portions (such as by dripping or other methods) to the micron-sized powder until the point of incipient wetness, producing a material similar to damp sand as described below.

In some instances, the sizes of the nano-sized oxidative catalysts, for example Pd, Pt, or Pt/Pd are about 1 nm and the sizes of the nano-sized $Al_2O_3$ are about 10 nm. In some instances, the sizes of the nano-sized oxidative catalysts are approximately 1 nm or less and the sizes of the nano-sized $Al_2O_3$ are approximately 10 nm or less. In some instances, Pd is used as the oxidative catalyst and the weight ratio of nano-sized Pd:nano-sized aluminum oxide is about 5%:95%. In some instances, the weight percentage of nano-sized Pd is between about 5% to about 20% of nano-sized Pd on nano-sized aluminum oxide. The nano-on-nano material that contains nano-sized Pd on nano-sized $Al_2O_3$ shows a dark black color. In some instances, Pt is used as the oxidative catalyst and the weight ratio of nano-sized Pt:nano-sized aluminum oxide is about 40%:60%. In some instances, a mixture of Pt and Pd is used as the oxidative catalyst. In some embodiments, the weight ratio of nano-sized Pt/Pd:nano-sized aluminum oxide is about 5%:95%. In some embodiments, the weight ratio of nano-sized Pt/Pd: nano-sized aluminum oxide is about 10%:90%. In some embodiments, the weight ratio of nano-sized Pt/Pd:nano-sized aluminum oxide is about 20%:80%. In some embodiments, the weight ratio of nano-sized Pt/Pd:nano-sized aluminum oxide is about 30%:70%. In some embodiments, the weight ratio of nano-sized Pt/Pd:nano-sized aluminum oxide is about 40%:60%.

A solution containing dispersed nano-on-nano material can be prepared using a sonication process to disperse nano-on-nano particles into water with pH~4. Subsequently, 100 g of micron-sized MI-386 $Al_2O_3$ is put into a mixer, and a 100 g dispersion containing the nano-on-nano material is injected into the mixing aluminum oxide. This process is referred to as the incipient wetness process or method.

Next, the wet powder is dried at 60° C. in a convection oven overnight until it is fully dried. Once the powder is dried, calcination is performed. The dried powder from the previous step, that is, the nanomaterials on the micron-sized material, is baked at 550° C. for two hours under ambient air conditions. During the calcination, the surfactant is burned off and the nanomaterials are glued or fixed onto the surface of the micron-sized materials or onto the surface of the pores of the micron-materials. One explanation for why the nanomaterials can be glued or fixed more permanently onto the micron-sized material during the calcination is because oxygen-oxygen (O—O) bonds, oxide-oxide bonds, or covalent bonds are formed during the calcination step. The oxide-oxide bonds can be formed between the nanomaterials (nano-on-nano with nano-on-nano, nano-on-nano with nano-sized aluminum oxide, and nano-sized aluminum oxide with nano-sized aluminum oxide), between the nanomaterials and the micron-sized materials, and between the micron-sized materials themselves. The oxide-oxide bond formation is sometimes referred to as a solid state reaction. At this stage, the material produced contains a micron-sized particle having nano-on-nano and nano-sized $Al_2O_3$ randomly distributed on the surface.

The oxidative NNm™ particles may contain from about 0.5% to about 5% palladium by weight, or in another embodiment from about 1% to 3% by weight, or in another embodiment, about 1.2% to 2.5% by weight, of the total mass of the NNm™ particle. The oxidative NNm™ particles may contain from about 1% to about 6% platinum by weight, of the total mass of the NNm™ particle. The oxidative NNm™ particles may contain from about 1% to about 6% platinum/palladium by weight, or in another embodiment, about 2% to 3% by weight, of the total mass of the NNm™ particle.

General Procedures for Preparation of Catalysts for Reduction Reaction (Reductive "Nano-On-Nano-On-Micro" Particles or "NNm"™ Particles)

To prepare a reductive catalytically active particle, a dispersion of reductive composite nanoparticles may be applied to porous, micron-sized cerium oxide, which may be purchased, for example, from companies such as Rhodia-Solvay. One commercial cerium oxide powder suitable for use is HSA5, HSA20, or a mixture thereof, available from Rhodia-Solvay. The micron-sized cerium oxide may contain zirconium oxide. In some embodiments, the micron-sized cerium oxide is substantially free of zirconium oxide. In other embodiments, the micron-sized cerium oxide contains up to 100% zirconium oxide. In one embodiment, the reductive composite nanoparticle is rhodium.

The micron-sized carrier particles, impregnated with the composite reductive nanoparticles and nano-sized metal oxide, may then be dried (for example, at about 30° C. to about 95° C., preferably about 60° C. to about 70° C., at atmospheric pressure or at reduced pressure, such as from about 1 pascal to about 90,000 pascal). After drying, the particles may be calcined (at elevated temperatures, such as from 400° C. to about 700° C., preferably about 500° C. to about 600° C., more preferably at about 540° C. to about 560° C., still more preferably at about 550° C. to about 560° C., or at about 550° C.; at atmospheric pressure or at reduced pressure, for example, from about 1 pascal to about 90,000 pascal, in ambient atmosphere or under an inert atmosphere such as nitrogen or argon) to yield the composite micro/nanoparticles, also referred to as nano-on-nano-on-micro particles, or NNm™ particles. The drying step may be performed before the calcining step to remove water prior to heating at the higher calcining temperatures; this avoids boiling of the water, which would disrupt the impregnated nanoparticles, which are lodged in the pores of the micron-sized carrier.

The catalyst for reduction reactions can be made using a procedure similar to that employed for production of the catalyst for oxidation reactions. The nano-on-nano materials, for example nano-sized Rh on nano-sized cerium oxide, can be prepared using the method described above. In some instances, the sizes of the nano-sized Rh are about 1 nm and the sizes of the nano-sized cerium oxide are about 10 nm. In some instances, the sizes of the nano-sized Rh are approximately 1 nm or less and the sizes of the nano-sized cerium oxide are approximately 10 nm or less. In some embodiments, the weight ratio of nano-sized Rh:nano-sized cerium oxide is from 1%:99% to 20%:80%. In some embodiments, the weight ratio of nano-sized Rh:nano-sized cerium oxide is from 2%:98% to 15%:85%. In some embodiments, the weight ratio of nano-sized Rh:nano-sized cerium oxide is from 3%:97% to 10%:90%. In some embodiments, the weight ratio of nano-sized Rh:nano-sized cerium oxide is from 4%:96% to 6%:94%. In some embodiments, the weight ratio of nano-sized Rh:nano-sized cerium oxide is about 5%:95%.

Next, calcination can be performed. The dried powder from the previous step, that is, the nanomaterials on the micron-sized material, can be baked at 550° C. for two hours under ambient air conditions. During the calcination step, the surfactant is evaporated and the nanomaterials are glued or fixed onto the surface of the micron-sized materials or the surface of the pores of the micron-sized materials. At this stage, the material produced (a catalytic active material) contains a micron-sized particle (micron-sized cerium oxide) having nano-on-nano (such as nano-sized Rh on nano-sized cerium oxide) and nano-sized cerium oxide randomly distributed on the surface.

The reductive NNm™ particles may contain from about 0.1% to 1.0% rhodium by weight, or in another embodiment from about 0.2% to 0.5% by weight, or in another embodiment, about 0.3% by weight, or in another embodiment, about 0.4% by weight, of the total mass of the NNm™ particle. The NNm™ particles can then be used for formulations for coating substrates, where the coated substrates may be used in catalytic converters.

General Procedures for Preparation of Catalysts for PNA Material (PNA "Nano-On-Nano-On-Micro" Particles or "NNm"™ Particles)

To prepare a PNA particle, a dispersion of PNA composite nanoparticles may be applied to porous, micron-sized cerium oxide, which may be purchased, for example, from companies such as Rhodia-Solvay. One commercial cerium oxide powder suitable for use is HSA5, HSA20, or a mixture thereof, available from Rhodia-Solvay. The micron-sized cerium oxide may further comprise zirconium oxide. In some embodiments, the micron-sized cerium oxide is substantially free of zirconium oxide. In other embodiments, the micron-sized cerium oxide contains up to 100% zirconium oxide. In addition, the micron-sized cerium oxide may further comprise lanthanum and/or lanthanum oxide. In some embodiments, the micro-sized cerium oxide may further comprise both zirconium oxide and lanthanum oxide. In some embodiments, the micron-sized cerium oxide may further comprise yttrium oxide. Accordingly, the micron-sized cerium oxide can be cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, cerium-zirconium-lanthanum-yttrium oxide, or a combination thereof. In some embodiments, the nano-sized cerium oxide particles contain 40-90 wt % cerium oxide, 5-60 wt % zirconium oxide, 1-15 wt % lanthanum oxide, and/or 1-10 wt % yttrium oxide. In one embodiment, the micro-sized cerium oxide contains 86 wt. % cerium oxide, 10 wt. % zirconium oxide; and 4 wt. % lanthanum and/or lanthanum oxide. In another embodiment, the cerium oxide particles contain 40 wt % cerium oxide, 50 wt % zirconium oxide, 5 wt % lanthanum oxide, and 5 wt % yttrium oxide. In one embodiment, the PGM of the PNA composite nanoparticle is palladium. In one embodiment, the PGM of the PNA composite nanoparticle is ruthenium. The ruthenium of the PNA composite nanoparticle can be ruthenium oxide.

The micron-sized carrier particles, impregnated with the composite PNA nanoparticles and nano-sized metal oxide, may then be dried (for example, at about 30° C. to about 95° C., preferably about 60° C. to about 70° C., at atmospheric pressure or at reduced pressure, such as from about 1 pascal to about 90,000 pascal). After drying, the particles may be calcined (at elevated temperatures, such as from 400° C. to about 700° C., preferably about 500° C. to about 600° C., more preferably at about 540° C. to about 560° C., still more preferably at about 550° C. to about 560° C., or at about 550° C.; at atmospheric pressure or at reduced pressure, for example, from about 1 pascal to about 90,000 pascal, in ambient atmosphere or under an inert atmosphere such as nitrogen or argon) to yield the composite micro/nanoparticles, also referred to as nano-on-nano-on-micro particles, or NNm™ particles. The drying step may be performed before the calcining step to remove water prior to heating at the higher calcining temperatures; this avoids boiling of the water, which would disrupt the impregnated nanoparticles, which are lodged in the pores of the micron-sized carrier.

The PNA material can be made using a procedure similar to that employed for production of the catalyst for oxidation reactions. The nano-on-nano materials, for example nano-sized Pd, Ru, or ruthenium oxide on nano-sized cerium oxide, can be prepared using the method described above. In some instances, the sizes of the nano-sized Pd, Ru, or ruthenium oxide are from about 1 nm to about 5 nm and the sizes of the nano-sized cerium oxide are from about 5 nm to about 10 nm. In some instances, the sizes of the nano-sized Pd, Ru, or ruthenium oxide are approximately 1 nm or less and the sizes of the nano-sized cerium oxide are approximately 10 nm or less. In some embodiments, the weight ratio of nano-sized Pd, Ru, or ruthenium oxide:nano-sized cerium oxide is from 1%:99% to 40%:60%. In some embodiments, the weight ratio of nano-sized Pd, Ru, or ruthenium oxide:nano-sized cerium oxide is from 5%:95% to 20%:80%. In some embodiments, the weight ratio of nano-sized Pd, Ru, or ruthenium oxide:nano-sized cerium oxide is from 8%:92% to 12%:88%. In some embodiments, the weight ratio of nano-sized Pd, Ru, or ruthenium oxide:nano-sized cerium oxide is from 9%:91% to 11%:89%. In some embodiments, the weight ratio of nano-sized Pd, Ru, or ruthenium oxide:nano-sized cerium oxide is about 10%:90%.

Next, calcination can be performed. The dried powder from the previous step, that is, the nanomaterials on the micron-sized material, can be baked at 550° C. for two hours under ambient air conditions. During the calcination step, the surfactant is evaporated and the nanomaterials are glued or fixed onto the surface of the micron-sized materials or the surface of the pores of the micron-sized materials. At this stage, the material produced (a catalytic active material) contains a micron-sized particle (micron-sized cerium oxide) having nano-on-nano (such as nano-sized Pd, Ru, or ruthenium oxide on nano-sized cerium oxide) and nano-sized cerium oxide randomly distributed on the surface.

The PNA NNm™ particles may contain from about 0.1% to 6% Pd, Ru, or ruthenium oxide by weight, or in another embodiment from about 0.5% to 3.5% by weight, or in another embodiment, about 1% to about 2.5% by weight, or in another embodiment about 2% to about 3% by weight, or in another embodiment, about 2.5% by weight, of the total mass of the NNm™ particle. The NNm™ particles can then be used for formulations for coating substrates, where the coated substrates may be used in catalytic converters.

Porous Materials for Use in "Nano-On-Nano-In-Micro" Particles ("NNiM" Particles)

Porous materials, production of porous materials, micron-sized particles comprising composite nanoparticles and a porous carrier ("Nano-on-Nano-in-Micro" particles or "NNiM" particles), and production of micron-sized particles comprising composite nanoparticles and a porous carrier ("Nano-on-Nano-in-Micro" particles or "NNiM" particles) are described in the co-owned U.S. Provisional Patent Application No. 61/881,337, filed on Sep. 23, 2013, U.S. patent application Ser. No. 14/494,156 (U.S. Patent Appl. Publ. 2015/0140317), and International Patent Application No. PCT/US2014/057036 (WO 2015/042598), the disclosures of which are hereby incorporated by reference in their entirety.

Generally, a preferred porous material is a material that contains a large number of interconnected pores, holes, channels, or pits, with an average pore, hole, channel, or pit width (diameter) ranging from 1 nm to about 200 nm, or about 1 nm to about 100 nm, or about 2 nm to about 50 nm, or about 3 nm to about 25 nm. In some embodiments, the porous material has a mean pore, hole, channel, or pit width (diameter) of less than about 1 nm, while in some embodiments, a porous carrier has a mean pore, hole, channel, or pit width (diameter) of greater than about 100 nm. In some embodiments, the porous material has an average pore surface area in a range of about 50 $m^2/g$ to about 500 $m^2/g$. In some embodiments, the porous material has an average pore surface area in a range of about 100 $m^2/g$ to about 400 $m^2/g$. In some embodiments, a porous material has an average pore surface area in a range of about 150 $m^2/g$ to about 300 $m^2/g$. In some embodiments, the porous material has an average pore surface area of less than about 50 $m^2/g$. In some embodiments, the porous material has an average pore surface area of greater than about 200 $m^2/g$. In some embodiments, the porous material has an average pore surface area of greater than about 300 $m^2/g$. In some embodiments, a porous material has an average pore surface area of about 200 $m^2/g$. In some embodiments, a porous material has an average pore surface area of about 300 $m^2/g$.

In some embodiments, the porous material may comprise porous metal oxide, such as aluminum oxide or cerium oxide. In some embodiments, a porous material may comprise an organic polymer, such as polymerized resorcinol. In some embodiments, the porous material may comprise amorphous carbon. In some embodiments, the porous material may comprise silica. In some embodiments, a porous material may be porous ceramic. In some embodiments, the porous material may comprise a mixture of two or more different types of interspersed porous materials, for example, a mixture of aluminum oxide and polymerized resorcinol. In some embodiments, the porous carrier may comprise aluminum oxide after a spacer material has been removed. For example, in some embodiments, a composite material may be formed with interspersed aluminum oxide and polymerized resorcinol, and the polymerized resorcinol is removed, for example, by calcination, resulting in a porous carrier. In another embodiment, a composite material may be formed with interspersed aluminum oxide and carbon black, and the carbon black is removed, for example, by calcination, resulting in a porous carrier.

In some embodiments, the porous material is a micron-sized particle, with an average size between about 1 micron and about 100 microns, between about 1 micron and about 10 microns, between about 3 microns and about 7 microns, or between about 4 microns and about 6 microns. In other embodiments, the porous material may be particles larger than about 7 microns. In some embodiments, the porous material may not be in the form of particles, but a continuous material.

The porous materials may allow gases and fluids to slowly flow throughout the porous material via the interconnected channels, being exposed to the high surface area of the porous material. The porous materials can therefore serve as an excellent carrier material for embedding particles in which high surface area exposure is desirable, such as catalytic nanoparticles, as described below.

Production of Porous Materials for Use in "Nano-On-Nano-In-Micro" Particles ("NNiM" Particles)

A catalyst or PNA material may be formed using a porous material. This porous material includes, for example, nanoparticles embedded within the porous structure of the material. This can include nano-on-nano particles (composite nanoparticles) embedded into a porous carrier formed around the nano-on-nano particles. Nanoparticles embedded in a porous carrier can refer to the configuration of the nanoparticles in the porous carrier resulting when the porous carrier is formed around the nanoparticles, generally by using the methods described herein. That is, the resulting structure contains nanoparticles with a scaffolding of porous carrier built up around or surrounding the nanoparticles. The porous carrier encompasses the nanoparticles, while at the same time, by virtue of its porosity, the porous carrier permits external gases to contact the embedded nanoparticles.

PNA nano-on-nano particles can be produced, where the PGM can comprise palladium, ruthenium, or ruthenium oxide, and the support nanoparticles can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. Oxidative nano-on-nano particles can be produced, where the catalytic nanoparticle can comprise platinum, palladium, or platinum/palladium alloy, and the support nanoparticle can comprise aluminum oxide. Reductive nano-on-nano particles can be produced, where the catalytic nanoparticle can comprise rhodium, and the support nanoparticle can comprise cerium oxide. The support nanoparticle can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide.

In some embodiments, the porous structure comprises alumina or cerium oxide. In some embodiments, the cerium oxide can include zirconium oxide, lanthanum, lanthanum oxide, yttrium oxide or a combination thereof. In some embodiments, the nano-sized cerium oxide particles contain 40-90 wt % cerium oxide, 5-60 wt % zirconium oxide, 1-15 wt % lanthanum oxide, and/or 1-10 wt % yttrium oxide. In one embodiment, the cerium oxide particles contain 86 wt % cerium oxide, 10 wt % zirconium oxide, and 4 wt % lanthanum and/or lanthanum oxide. In another embodiment, the cerium oxide particles contain 40 wt % cerium oxide, 50 wt % zirconium oxide, 5 wt % lanthanum oxide, and 5 wt % yttrium oxide.

The porous materials with embedded nano-on-nano particles within the porous structure of the material, where the porous structure comprises alumina, or where the porous structure comprises ceria, or where the porous structure comprises cerium-zirconium oxide, cerium-zirconium-lanthanum oxide, or cerium-zirconium-lanthanum-yttrium oxide, can be prepared as follows. Alumina porous structures may be formed, by the methods described in U.S. Pat. No. 3,520,654, the disclosure of which is hereby incorporated by reference in its entirety. In some embodiments, a sodium aluminate solution, prepared by dissolving sodium oxide and aluminum oxide in water, can be treated with sulfuric acid or aluminum sulfate to reduce the pH to a range of about 4.5 to about 7. The decrease in pH results in a precipitation of porous hydrous alumina which may be spray dried, washed, and flash dried, resulting in a porous alumina material. Optionally, the porous alumina material may be stabilized with silica, as described in EP0105435 A2, the disclosure of which is hereby incorporated by reference in its entirety. A sodium aluminate solution can be added to an aluminum sulfate solution, forming a mixture with a pH of about 8.0. An alkaline metal silicate solution, such as a sodium silicate solution, can be slowly added to the mixture, resulting in the precipitation of a silica-stabilized porous alumina material.

A porous material may also be generated by co-precipitating aluminum oxide nanoparticles and amorphous carbon particles, such as carbon black. Upon drying and calcination of the precipitate in an ambient or oxygenated environment, the amorphous carbon is exhausted, that is, burned off. Simultaneously, the heat from the calcination process causes the aluminum oxide nanoparticles to sinter together, resulting in pores throughout the precipitated aluminum oxide where the carbon black once appeared in the structure. In some embodiments, aluminum oxide nanoparticles can be suspended in ethanol, water, or a mix of ethanol and water. In some embodiments, dispersant, such as DisperBYK®-145 from BYK (DisperBYK is a registered trademark of BYK-Chemie GmbH LLC, Wesel, Germany for chemicals for use as dispersing and wetting agents) may be added to the aluminum oxide nanoparticle suspension. Carbon black with an average grain size ranging from about 1 nm to about 200 nm, or about 20 nm to about 100 nm, or about 20 nm to about 50 nm, or about 35 nm, may be added to the aluminum oxide suspension. In some embodiments, sufficient carbon black is added to obtain a pore surface area of about 50 $m^2/g$ to about 500 $m^2/g$ should be used, such as about 50 $m^2/g$, about 100 $m^2/g$, about 150 $m^2/g$, about 200 $m^2/g$, about 250 $m^2/g$, about 300 $m^2/g$, about 350 $m^2/g$, about 400 $m^2/g$, about 450 $m^2/g$, or about 500 $m^2/g$. The pH of the resulting mixture can be adjusted to a range of about 2 to about 7, such as a pH of between about 3 and about 5, preferably a pH of about 4, allowing the particles to precipitate. In some embodiments, the precipitant can be dried, for example by warming the precipitant (for example, at about 30° C. to about 95° C., preferably about 60° C. to about 70° C., at atmospheric pressure or at reduced pressure such as from about 1 pascal to about 90,000 pascal). Alternatively, in some embodiments, the precipitant may be freeze-dried.

After drying, the material may then be calcined (at elevated temperatures, such as from 400° C. to about 700° C., preferably about 500° C. to about 600° C., more preferably at about 540° C. to about 560° C., still more preferably at about 550° C. to about 560° C., or at about 550° C.; at atmospheric pressure or at reduced pressure, for example, from about 1 pascal to about 90,000 pascal, in ambient atmosphere). The calcination process causes the carbon black to substantially burn away and the aluminum oxide nanoparticles sinter together, yielding a porous aluminum oxide material.

In other embodiments, a porous material may also be generated by co-precipitating cerium oxide nanoparticles and amorphous carbon particles, such as carbon black. Upon drying and calcination of the precipitate in an ambient or oxygenated environment, the amorphous carbon is exhausted, that is, burned off. Simultaneously, the heat from the calcination process causes the cerium oxide nanoparticles to sinter together, resulting in pores throughout the precipitated cerium oxide where the carbon black once appeared in the structure. In some embodiments, cerium oxide nanoparticles can be suspended in ethanol, water, or a mix of ethanol and water. In some embodiments, dispersant, such as DisperBYK®-145 from BYK (DisperBYK is a registered trademark of BYK-Chemie GmbH LLC, Wesel, Germany for chemicals for use as dispersing and wetting agents) may be added to the cerium oxide nanoparticle suspension. Carbon black with an average grain size ranging from about 1 nm to about 200 nm, or about 20 nm to about 100 nm, or about 20 nm to about 50 nm, or about 35 nm, may be added to the cerium oxide suspension. In some embodiments, sufficient carbon black is added to obtain a pore surface area of about 50 $m^2/g$ to about 500 $m^2/g$ should be used, such as about 50 $m^2/g$, about 100 $m^2/g$, about 150 $m^2/g$, about 200 $m^2/g$, about 250 $m^2/g$, about 300 $m^2/g$, about 350 $m^2/g$, about 400 $m^2/g$, about 450 $m^2/g$, or about 500 $m^2/g$. The pH of the resulting mixture can be adjusted to a range of about 2 to about 7, such as a pH of between about 3 and about 5, preferably a pH of about 4, allowing the particles to precipitate. In some embodiments, the precipitant can be dried, for example by warming the precipitant (for example, at about 30° C. to about 95° C., preferably about 60° C. to about 70° C., at atmospheric pressure or at reduced pressure such as from about 1 pascal to about 90,000 pascal). Alternatively, in some embodiments, the precipitant may be freeze-dried.

After drying, the material may then be calcined (at elevated temperatures, such as from 400° C. to about 700° C., preferably about 500° C. to about 600° C., more preferably at about 540° C. to about 560° C., still more preferably at about 550° C. to about 560° C., or at about 550° C.; at atmospheric pressure or at reduced pressure, for example, from about 1 pascal to about 90,000 pascal, in ambient atmosphere). The calcination process causes the carbon black to substantially burn away and the cerium oxide nanoparticles sinter together, yielding a porous cerium oxide material.

In some embodiments, a porous material may be made using the sol-gel process. For example, a sol-gel precursor to an alumina porous material may be formed by reacting aluminum chloride with propylene oxide. Propylene oxide can be added to a solution of aluminum chloride dissolved in a mixture of ethanol and water, which forms a porous material that may be dried and calcined. In some embodiments, epichlorohydrin may be used in place of propylene oxide. As another example, a sol-gel precursor to a ceria porous material may be formed by reacting cerium nitrate with resorcinol and formaldehyde. Other methods of producing a porous material using the sol-gel method known in the art may also be used, for example, a porous material formed using the sol-gel process may be also be formed using tetraethyl orthosilicate.

In some embodiments, the porous material may be formed by mixing the precursors of a combustible gel with the precursors of a metal oxide material prior to polymerization of the gel, allowing the polymerization of the gel, drying the composite material, and calcining the composite material, thereby exhausting the organic gel components. In some embodiments, a gel activation solution comprising a mixture of formaldehyde and propylene oxide can be mixed with a gel monomer solution comprising a mixture of aluminum chloride and resorcinol. Upon mixing of the gel activation solution and the gel monomer solution, a combustible organic gel component forms as a result of the mixing of formaldehyde and resorcinol, and a non-combustible inorganic metal oxide material forms as a result of mixing the propylene oxide and aluminum chloride. The resulting composite material can be dried and calcined, causing the combustible organic gel component to burn away, resulting in a porous metal oxide material (aluminum oxide). In another embodiment, a solution of formaldehyde can be reacted with a solution of resorcinol and cerium nitrate. The resulting material can be dried and calcined, causing the combustible organic gel component to burn away, resulting in a porous metal oxide material (cerium oxide). The resulting material can be dried and calcined, causing the combustible organic gel component to burn away, resulting in a porous metal oxide material (cerium oxide). In yet further embodiments, a solution of formaldehyde can be reacted with a solution of resorcinol, cerium nitrate, and one or more of zirconium oxynitrate, lanthanum acetate, and/or yttrium nitrate as appropriate to form cerium-zirconium oxide, cerium-zirconium-lanthanum oxide, or cerium-zirconium-lanthanum-yttrium oxide. The resulting material can be dried and calcined, causing the combustible organic gel component to burn away, resulting in a porous metal oxide material (cerium-zirconium oxide, cerium-zirconium-lanthanum oxide, or cerium-zirconium-lanthanum-yttrium oxide).

In some embodiments, the gel activation solution may be prepared by mixing aqueous formaldehyde and propylene oxide. The formaldehyde is preferably in an aqueous solution. In some embodiments, the concentration of the aqueous formaldehyde solution is about 5 wt % to about 50 wt % formaldehyde, about 20 wt % to about 40 wt % formaldehyde, or about 30 wt % to about 40 wt % formaldehyde. Preferably, the aqueous formaldehyde is about 37 wt % formaldehyde. In some embodiments, the aqueous formaldehyde may contain about 5 wt % to about 15 wt % methanol to stabilize the formaldehyde in solution. The aqueous formaldehyde can be added in a range of about 25% to about 50% of the final weight of the gel activation solution, with the remainder being propylene oxide. Preferably, the gel activation solution comprises 37.5 wt % of the aqueous formaldehyde solution (which itself comprises 37 wt % formaldehyde) and 62.5 wt % propylene oxide, resulting in a final formaldehyde concentration of about 14 wt % of the final gel activation solution.

Separately from the gel activation solution, a gel monomer solution may be produced by dissolving aluminum chloride in a mixture of resorcinol and ethanol. Resorcinol can be added at a range of about 2 wt % to about 10 wt %, with about 5 wt % being a typical value. Aluminum chloride can be added at a range of about 0.8 wt % to about 5 wt %, with about 1.6 wt % being a typical value.

The gel activation solution and gel monomer solution can be mixed together at a ratio at about 1:1 in terms of (weight of gel activation solution):(weight of gel monomer solution). The final mixture may then be dried (for example, at about 30° C. to about 95° C., preferably about 50° C. to about 60° C., at atmospheric pressure or at reduced pressure such as from about 1 pascal to about 90,000 pascal, for about one day to about 5 days, or for about 2 days to about 3 days). After drying, the material may then be calcined (at elevated temperatures, such as from 400° C. to about 700° C., preferably about 500° C. to about 600° C., more preferably at about 540° C. to about 560° C., still more preferably at about 550° C. to about 560° C., or at about 550° C.; at atmospheric pressure or at reduced pressure, for example, from about 1 pascal to about 90,000 pascal, in ambient atmosphere, for about 12 hours to about 2 days, or about 16 hours to about 24 hours) to burn off the combustible organic gel component and yield a porous aluminum oxide carrier.

Gel monomer solutions can be prepared with cerium nitrate, zirconium oxynitrate, lanthanum acetate, and/or yttrium nitrate in a process similar to that described above, for preparation of porous cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide carrier.

The porous materials prepared above are then ground or milled into micron-sized particles.

Nano-on-nano-in-micro ("NNiM"™) materials are prepared by mixing nano-on-nano (NN) particles into the precursors to the porous materials, for example, by using a portion of NN particles when mixing together nanoparticles with amorphous carbon, or by mixing NN particles into the sol-gel solution, followed by preparation of the porous material as described above. After grinding or milling the porous material with embedded NN particles into micron-sized particles (to form "NNiM"™ materials), the resulting material can then be used in an oxidative washcoat, a reductive washcoat, a PNA washcoat, or a combined washcoat of any of the oxidative, reductive, and PNA washcoats. The amount of NN particles added is guided by the desired loading of PGM metal in the final NNiM material.

Oxidative NNiM material can be formed, where the nano-on-nano composite nanoparticles comprise a platinum catalytic nanoparticle disposed on an aluminum oxide support particle; where the nano-on-nano composite nanoparticles comprise a palladium catalytic nanoparticle disposed on an aluminum oxide support particle; or where the nano-on-nano composite nanoparticles comprise a platinum/palladium alloy catalytic nanoparticle disposed on an aluminum oxide support particle; and one or more of those NN particles is then embedded in a porous carrier formed of aluminum oxide, which is ground or milled into micron-sized particles. Reductive NNiM material can be formed, where the nano-on-nano composite nanoparticles comprise a rhodium catalytic nanoparticle disposed on a cerium oxide support particle; where the nano-on-nano composite nanoparticles comprise a rhodium catalytic nanoparticle disposed on a cerium-zirconium oxide support particle; where the nano-on-nano composite nanoparticles comprise a rhodium catalytic nanoparticle disposed on a cerium-zirconium-lanthanum oxide support particle; or where the nano-on-nano composite nanoparticles comprise a rhodium catalytic nanoparticle disposed on a cerium-zirconium-lanthanum-yttrium oxide support particle; and one or more of those NN particles is then embedded in a porous carrier formed of porous cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide carrier, which is ground or milled into micron-sized particles. PNA NNiM material can be formed, where the nano-on-nano composite nanoparticles comprise a palladium nanoparticle disposed on a cerium oxide support particle; where the nano-on-nano composite nanoparticles comprise a palladium nanoparticle disposed on a cerium-zirconium oxide support particle; where the nano-on-nano composite nanoparticles comprise a palladium nanoparticle disposed on a cerium-zirconium-lanthanum oxide support particle; or where the nano-on-nano composite nanoparticles comprise a palladium nanoparticle disposed on a cerium-zirconium-lanthanum-yttrium oxide support particle; and one or more of those NN particles is then embedded in a porous carrier formed of aluminum oxide, cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide, which is ground or milled into micron-sized particles. PNA NNiM material can be formed, where the nano-on-nano composite nanoparticles comprise a ruthenium or ruthenium oxide nanoparticle disposed on a cerium oxide support particle; where the nano-on-nano composite nanoparticles comprise a ruthenium or ruthenium oxide nanoparticle disposed on a cerium-zirconium oxide support particle; where the nano-on-nano composite nanoparticles comprise a ruthenium or ruthenium oxide nanoparticle disposed on a cerium-zirconium-lanthanum oxide support particle; or where the nano-on-nano composite nanoparticles comprise a ruthenium or ruthenium oxide nanoparticle disposed on a cerium-zirconium-lanthanum-yttrium oxide support particle; and one or more of those NN particles is then embedded in a porous carrier formed of aluminum oxide, cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide, which is ground or milled into micron-sized particles Aluminum oxide porous material can also be used as the porous material in which any of the foregoing rhodium-containing composite NN nanoparticles can be embedded. The weight ratios of the NN particles used can be those described in the above NNm section. For example, the weight ratio of nano-sized Pd, Ru, or ruthenium oxide:nano-sized cerium oxide can be from 1%:99% to 40%:60%, from 5%:95% to 20%:80%, from 8%:92% to 12%:88%, from 9%:91% to 11%:89%, and 10%:90%.

Micron-Sized Particles Comprising Composite Nanoparticles and a Porous Carrier ("Nano-On-Nano-In-Micro" Particles or "NNiM" Particles)

Nanoparticles or composite nanoparticles produced by plasma production or other methods may be embedded within a porous material to enhance the surface area of catalytic components (this includes PNA components because PNA components include PGM which by its very nature is catalytic). The porous material may then serve as a carrier for the composite nanoparticles, allowing gasses and fluids to slowly flow throughout the porous material via the interconnected channels. The high porosity of the carrier results in a high surface area within the carrier allowing increased contact of the gasses and fluids with the embedded catalytic components, such as composite nanoparticles. Embedding the composite nanoparticles within the porous carrier results in a distinct advantage over those technologies where catalytically active nanoparticles are positioned on the surface of carrier micro-particles or do not penetrate as effectively into the pores of the support. When catalytically active nanoparticles are position on the surface of carrier micro-particles, some catalytically active nanoparticles can become buried by other catalytically active nanoparticles, causing them to be inaccessible to target gases because of the limited exposed surface area. When the composite nanoparticles are embedded within the porous carrier, however, gases can flow through the pores of the carrier to catalytically active components.

The porous carrier may contain any large number of interconnected pores, holes, channels, or pits, preferably with an average pore, hole, channel, or pit width (diameter) ranging from 1 nm to about 200 nm, or about 1 nm to about 100 nm, or about 2 nm to about 50 nm, or about 3 nm to about 25 nm. In some embodiments, the porous carrier has a mean pore, hole, channel, or pit width (diameter) of less than about 1 nm, while in some embodiments, a porous carrier has a mean pore, hole, channel, or pit width (diameter) of greater than about 100 nm. In some embodiments, a porous material has an average pore surface area in a range of about 50 $m^2/g$ to about 500 $m^2/g$. In some embodiments, a porous material has an average pore surface area in a range of about 100 $m^2/g$ to about 400 $m^2/g$. In some embodiments, a porous material has an average pore surface area in a range of about 150 $m^2/g$ to about 300 $m^2/g$. In some embodiments, a porous material has an average pore surface area of less than about 50 $m^2/g$. In some embodiments, a porous material has an average pore surface area of greater than about 200 $m^2/g$. In some embodiments, a porous material has an average pore surface area of greater than about 300 $m^2/g$. In some embodiments, a porous material has an average pore surface area of about 200 $m^2/g$. In some embodiments, a porous material has an average pore surface area of about 300 $m^2/g$.

A porous carrier embedded with nanoparticles can be formed with any porous material. A porous carrier may include, but is not limited to, any gel produced by the sol-gel method, for example, alumina ($Al_2O_3$), cerium oxide, or silica aerogels as described herein. In some embodiments, the porous carrier may comprise a porous metal oxide, such as aluminum oxide or cerium oxide. In some embodiments, a porous carrier may comprise an organic polymer, such as polymerized resorcinol. In some embodiments, the porous carrier may comprise amorphous carbon. In some embodiments, the porous carrier may comprise silica. In some embodiments, a porous carrier may be porous ceramic. In some embodiments, the porous carrier may comprise a mixture of two or more different types of interspersed porous materials, for example, a mixture of aluminum oxide and polymerized resorcinol.

In some embodiments, a carrier may comprise a combustible component, for example amorphous carbon or a polymerized organic gel such as polymerized resorcinol, and a non-combustible component, for example a metal oxide such as aluminum oxide. A catalytic material can include composite nanoparticles embedded in a carrier comprising a combustible component and a non-combustible component.

Catalytic and/or PNA particles, such as the catalytic nanoparticles or catalytic and/or PNA composite nanoparticles described herein, are embedded within the porous carrier. This can be accomplished by including the catalytic and/or PNA particles in the mixture used to form the porous carrier. In some embodiments, the catalytic and/or PNA particles are evenly distributed throughout the porous carrier. In other embodiments, the catalytic and/or PNA particles are clustered throughout the porous carrier. In some embodiments, platinum group metals comprise about 0.001 wt % to about 10 wt % of the total catalytic and/or PNA material (catalytic and/or PNA particles and porous carrier). For example, platinum group metals may comprise about 1 wt % to about 8 wt % of the total catalytic and/or PNA material (catalytic and/or PNA particles and porous carrier). In some embodiments, platinum group metals may comprise less than about 10 wt %, less than about 8 wt %, less than about 6 wt %, less than about 4 wt %, less than about 2 wt %, or less than about 1 wt % of the total catalytic and/or PNA material (catalytic and/or PNA particles and porous carrier). In some embodiments, platinum group metals may comprise about 1 wt %, about 2 wt %, about 3 wt %, about 4 wt %, about 5 wt %, about 6 wt %, about 7 wt %, about 8 wt %, about 9 wt %, or about 10 wt % of the total catalytic and/or PNA material (catalytic and/or PNA particles and porous carrier).

In some embodiments, the catalytic and/or PNA nanoparticles comprise one or more platinum group metals. In embodiments with two or more platinum group metals, the metals may be in any ratio. In some embodiments, the catalytic nanoparticles comprise platinum group metal or metals, such as Pt:Pd in about a 2:1 ratio to about 100:1 ratio by weight, or about 2:1 to about 75:1 ratio by weight, or about 2:1 to about 50:1 ratio by weight, or about 2:1 to about 25:1 ratio by weight, or about 2:1 to about 15:1 ratio by weight. In one embodiment, the catalytic nanoparticles comprise platinum group metal or metals, such as Pt:Pd in about 2:1 ratio by weight.

The composite nanoparticles (nano-on-nano particles) embedded within a porous carrier may take the form of a powder to produce composite catalytic micro-particles, referred to as "nano-on-nano-in-micron" particles or "NNiM" particles. In typical NNiM particles, a porous material (or matrix) may be formed around and surround nanoparticles or composite nanoparticle produced by plasma production or other methods. The porous material can bridge together the surrounded nanoparticles or composite nanoparticles, thereby embedding the particles within the matrix. The porous material may then serve as a carrier for the composite nanoparticles, allowing gases and fluids to slowly flow throughout the porous material (i.e., the interconnected bridges) via the interconnected channels. The high porosity of the carrier results in a high surface area within the carrier allowing increased contact of the gases and fluids with the contained catalytic components, such as composite nanoparticles.

The micron-sized NNiM particles can have an average size between about 1 micron and about 100 microns, such as between about 1 micron and about 10 microns, between about 3 microns and about 7 microns, or between about 4 microns and about 6 microns. The PGM particles may comprise about 0.001 wt % to about 10 wt % of the total mass of the NNiM particle (catalytic and/or PNA particles and porous carrier). For example, platinum group metals may comprise about 1 wt % to about 8 wt % of the total mass of the NNiM particle (catalytic and/or PNA particles and porous carrier). In some embodiments, platinum group metals may comprise less than about 10 wt %, less than about 8 wt %, less than about 6 wt %, less than about 4 wt %, less than about 2 wt %, or less than about 1 wt % of the total mass of the NNiM particle (catalytic and/or PNA particles and porous carrier). In some embodiments, platinum group metals may comprise about 1 wt %, about 2 wt %, about 3 wt %, about 4 wt %, about 5 wt %, about 6 wt %, about 7 wt %, about 8 wt %, about 9 wt %, or about 10 wt % of the total mass of the NNiM particle (catalytic and/or PNA particles and porous carrier).

NNiM particles may be used for any catalytic purpose or $NO_x$ storage purpose. For example, NNiM particles may be suspended in a liquid, for example ethanol or water, which may catalyze dissolved compounds. Alternatively, the NNiM particles may be used as a solid state catalyst. For example, the NNiM particles can then be used in catalytic converters.

Production of Micron-Sized Particles Comprising Composite Nanoparticles and a Porous Carrier ("Nano-On-Nano-in-Micro" Particles or "NNiM" Particles)

In some embodiments, catalytic nanoparticles or composite nanoparticles can be embedded in a porous carrier by forming a suspension or colloid of nanoparticles, and mixing the suspension or colloid of nanoparticles with a porous material precursor solution. Upon solidification of the porous material with the mixture, such as by polymerization, precipitation, or freeze-drying, the porous material will form around the nanoparticles, resulting in a catalytic material comprising nanoparticles embedded in a porous carrier. In some embodiments, the catalytic and/or PNA material is then processed, such as by grinding or milling, into a micron-sized powder, resulting in NNiM particles.

Described below is the production of NNiM particles using a porous aluminum oxide carrier formed using a composite carrier comprising a combustible organic gel component and an aluminum oxide component, followed by drying and calcination. However, one skilled in the art would understand any manner of porous carrier (such as cerium oxide) originating from soluble precursors may be used to produce catalytic (including PNA) material comprising composite nanoparticles embedded within a porous carrier using the methods described herein.

For typical NNiM particles produced using a porous aluminum oxide carrier formed using a composite carrier comprising a combustible organic gel component and an aluminum oxide component, the composite nanoparticles are initially dispersed in ethanol. In some embodiments, at least 95 vol % ethanol is used. In some embodiments, at least 99 vol % ethanol is used. In some embodiments, at least 99.9 vol % ethanol is used. Dispersants, surfactants, or mixtures thereof are typically added to the ethanol before suspension of the composite nanoparticles. A suitable surfactant includes DisperBYK®-145 from BYK-Chemie GmbH LLC, Wesel, which can be added in a range of about 2 wt % to about 12 wt %, with about 7 wt % being a typical value, and dodecylamine, which can be added in a range of about 0.25 wt % to about 3 wt %, with about 1 wt % being a typical value. Preferably, both DisperBYK®-145 and dodecylamine are used at about 7 wt % and 1 wt %, respectively. In some embodiments, the mixture of ethanol, composite nanoparticles, and surfactants, dispersants, or mixtures thereof is sonicated to uniformly disperse the composite nanoparticles. The quantity of composite nanoparticles particles in the dispersion may be in the range of about 5 wt % to about 20 wt %.

Separately from the composite nanoparticle suspension, a gel activation solution is prepared by mixing formaldehyde and propylene oxide. The formaldehyde is preferably in an aqueous solution. In some embodiments, the concentration of the aqueous formaldehyde solution is about 5 wt % to about 50 wt % formaldehyde, about 20 wt % to about 40 wt % formaldehyde, or about 30 wt % to about 40 wt % formaldehyde. Preferably, the aqueous formaldehyde is about 37 wt % formaldehyde. In some embodiments, the aqueous formaldehyde may contain about 5 wt % to about 15 wt % methanol to stabilize the formaldehyde in solution. The aqueous formaldehyde solution can be added in a range of about 25% to about 50% of the final weight of the gel activation solution, with the remainder being propylene oxide. Preferably, the gel activation solution comprises 37.5 wt % of the aqueous formaldehyde solution (which itself comprises 37 wt % formaldehyde) and 62.5 wt % propylene oxide, resulting in a final formaldehyde concentration of about 14 wt % of the final gel activation solution.

Separately from the composite nanoparticle suspension and gel activation solution, an aluminum chloride solution is produced by dissolving aluminum chloride in a mixture of resorcinol and ethanol. Resorcinol can be added at a range of about 10 wt % to about 30 wt %, with about 23 wt % being a typical value. Aluminum chloride can be added at a range of about 2 wt % to about 12 wt %, with about 7 wt % being a typical value.

The composite nanoparticle suspension, gel activation solution, and aluminum chloride solution can be mixed together at a ratio from of about 100:10:10 to about 100:40:40, or about 100:20:20 to about 100:30:30, or about 100:25:25, in terms of (weight of composite nanoparticle suspension):(weight of gel activation solution):(weight of aluminum chloride solution). The final mixture will begin to polymerize into a carrier embedded with composite nanoparticles. The carrier comprises a combustible component, an organic gel, and a non-combustible component, aluminum oxide. The resulting carrier may then be dried (for example, at about 30° C. to about 95° C., preferably about 50° C. to about 60° C., at atmospheric pressure or at reduced pressure such as from about 1 pascal to about 90,000 pascal, for about one day to about 5 days, or for about 2 days to about 3 days). After drying, the resulting carrier may then be calcined (at elevated temperatures, such as from 400° C. to about 700° C., preferably about 500° C. to about 600° C., more preferably at about 540° C. to about 560° C., still more preferably at about 550° C. to about 560° C., or at about 550° C.; at atmospheric pressure or at reduced pressure, for example, from about 1 pascal to about 90,000 pascal, in ambient atmosphere or under an inert atmosphere such as nitrogen or argon), to yield a porous carrier comprising composite catalytic nanoparticles and aluminate. When the composite carrier is calcined under ambient atmosphere or other oxygenated conditions, organic material, such as polymerized resorcinol, formaldehyde, or propylene oxide, is burnt off, resulting in a substantially pure aluminum oxide porous carrier embedded with composite nanoparticles. If the composite carrier is calcined under an inert atmosphere, such as argon or nitrogen, the organic materials may become substantially porous amorphous carbon interspersed with the porous aluminum oxide embedded with composite nanoparticles. The resulting porous carrier can be processed, such as by grinding or milling, into a micro-sized powder of NNiM particles.

In another embodiment, a composite catalytic nanoparticles may be mixed with a dispersion comprising metal oxide nanoparticles, such as aluminum oxide nanoparticles, and amorphous carbon, such as carbon black. The dispersed solid particles from resulting dispersed colloid may be separated from the liquid by co-precipitation, dried, and calcined. Upon calcination of the solid material in an ambient or oxygenated environment, the amorphous carbon is exhausted. Simultaneously, the heat from the calcination process causes the aluminum oxide nanoparticles to sinter together, resulting in pores throughout the precipitated aluminum oxide.

In some embodiments, aluminum oxide nanoparticles can be suspended in ethanol, water, or a mix of ethanol and water. Carbon black with an average grain size ranging from about 1 nm to about 200 nm, or about 20 nm to about 100 nm, or about 20 nm to about 50 nm, or about 35 nm, may be added to the aluminum oxide suspension. In some embodiments, sufficient carbon black to obtain a pore surface area of about 50 $m^2$/g to about 500 $m^2$/g should be used, such as about 50 $m^2$/g, about 100 $m^2$/g, about 150 $m^2$/g, about 200 $m^2$/g, about 250 $m^2$/g, about 300 $m^2$/g, about 350 $m^2$/g, about 400 $m^2$/g, about 450 $m^2$/g, or about 500 $m^2$/g. Composite nanoparticles may be mixed into the dispersion comprising aluminum oxide nanoparticles and carbon black. In some embodiments, the composite nanoparticles are dispersed in a separate colloid, optionally with dispersants or surfactants, before being mixed with the dispersion comprising aluminum oxide nanoparticles and carbon black. The pH of the resulting mixture can be adjusted to a range of about 2 to about 7, such as a pH of between about 3 and about 5, preferably a pH of about 4, allowing the particles to precipitate. The precipitant can be dried (for example, at about 30° C. to about 95° C., preferably about 50° C. to about 70° C., at atmospheric pressure or at reduced pressure such as from about 1 pascal to about 90,000 pascal, for about one day to about 5 days, or for about 2 days to about 3 days). After drying, the carrier may then be calcined (at elevated temperatures, such as from 400° C. to about 700° C., preferably about 500° C. to about 600° C., more preferably at about 540° C. to about 560° C., still more preferably at about 550° C. to about 560° C., or at about 550° C.; at atmospheric pressure or at reduced pressure, for example, from about 1 pascal to about 90,000 pascal, in ambient atmosphere). The calcination process causes the carbon black to substantially burn away and the aluminum oxide nanoparticles sinter together, yielding a porous aluminum oxide carrier embedded with composite nanoparticles.

The resulting carrier may be further processed, for example by grinding or milling, into micron-sized NNiM particles.

NNm™ and NNiM Particles with Inhibited Migration of Platinum Group Metals

The NNm™ particles including micron-sized carrier particle bearing composite nanoparticles, where the composite nanoparticles are produced by methods described herein, are particularly advantageous for use in catalytic converter applications. The NNiM particles, including those made using a porous carrier and composite nanoparticles, where the carrier is produced by methods described herein and composite nanoparticles produced under reducing conditions, are also particularly advantageous for use in catalytic converter applications. The platinum group metal of the catalytic and/or PNA nanoparticle has a greater affinity for the partially reduced surface of the support nanoparticle than for the surface of the micron-sized carrier particles. Thus, at elevated temperatures, neighboring PGM nanoparticles bound to neighboring support nano-particles are less likely to migrate on the micron-sized carrier particle surface and agglomerate into larger catalyst and/or PNA clumps. Since the larger agglomerations of catalyst and/or PNA have less surface area and are less effective as catalysts and $NO_x$ adsorbers, the inhibition of migration and agglomeration provides a significant advantage for the NNm™ and NNiM particles. In contrast, PGM particles deposited solely by wet-chemical precipitation onto alumina support demonstrate higher mobility and migration, forming agglomerations of PGM and leading to decreased catalytic efficacy over time (that is, catalyst aging).

PNA Material (or Composition)

A PNA material or composition is a material that holds $NO_x$ gases during low temperature engine operation and releases the gases when the temperature rises to a threshold temperature. PNA material can be made up of a single type of particle or multiple types of particles. PNA material can also refer to a PNA washcoat composition or a PNA layer on a substrate.

The PNA material can comprise PGM on support particles; alkali oxide or alkaline earth oxide on support particles; alkali oxide or alkaline earth oxide and PGM on support particles; a combination of alkali oxide or alkaline earth oxide on support particles and different alkali oxides or alkaline earth oxides each on different support particles in any ratio; a combination of alkali oxide or alkaline earth oxide on support particles and PGM on support particles in any ratio; a combination of alkali oxide or alkaline earth oxide on support particles, different alkali oxides or alkaline earth oxides each on different support particles, and PGM on support particles in any ratio; a combination of alkali oxide or alkaline earth oxide and PGM on support particles and the same or different alkali oxides or alkaline earth oxides each on different support particles in any ratio; a combination of alkali oxide or alkaline earth oxide and PGM on support particles and PGM on support particles in any ratio; a combination of alkali oxide or alkaline earth oxide and PGM on support particles; the same or different alkali oxides or alkaline earth oxides each on different support particles; and PGM on support particles in any ratio. In addition, various other combinations of PGM on support particles; alkali oxides and alkaline earth oxides on support particles; and alkali oxides and alkaline earth oxides and PGM on support particles in any ratio can be employed. These PGM particles can refer to any of the above mentioned catalytic particles.

The alkali oxides or alkaline earth oxides can include, for example, magnesium oxide, calcium oxide, manganese oxide, barium oxide, and strontium oxide. The PGM can include, for example, palladium, ruthenium, or mixtures thereof. In addition, the PGM can include their oxides, such as ruthenium oxide.

In some embodiments, the PNA material can comprise palladium on support particles; ruthenium or ruthenium oxide on support particles; manganese oxide (preferably $Mn_3O_4$) on support particles; magnesium oxide on support particles; calcium oxide on support particles; a combination of manganese oxide on support particles and magnesium oxide on support particles in any ratio; a combination of manganese oxide on support particles and calcium oxide on support particles in any ratio; a combination of magnesium oxide on support particles and calcium oxide on support particles in any ratio; or a combination of manganese oxide on support particles, magnesium oxide on support particles, and calcium oxide on support particles in any ratio. Other embodiments include PNA material comprising a combination of manganese oxide on support particles and PGM on support particles in any ratio; a combination of magnesium oxide on support particles and PGM on support particles in any ratio; a combination of calcium oxide on support particles and PGM on support particles in any ratio; a combination of manganese oxide on support particles, magnesium oxide on support particles, and PGM on support particles in any ratio; a combination of manganese oxide on support particles, calcium oxide on support particles, and PGM on support particles in any ratio; a combination of magnesium oxide on support particles, calcium oxide on support particles, and PGM on support particles in any ratio; or a combination of manganese oxide on support particles, magnesium oxide on support particles, calcium oxide on support particles, and PGM on support particles in any ratio.

Support particles can include, for example, bulk refractory oxides such as alumina or cerium oxide. The cerium oxide particles may further comprise zirconium oxide. The cerium oxide particles may further comprise lanthanum and/or lanthanum oxide. In addition, the cerium oxide particles may further comprise both zirconium oxide and lanthanum oxide. In some embodiments, the cerium oxide particles may further comprise yttrium oxide. Accordingly, the cerium oxide particles can be cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, cerium-zirconium-lanthanum-yttrium oxide particles, or a combination thereof. In some embodiments, the nano-sized cerium oxide particles contain 40-90 wt % cerium oxide, 5-60 wt % zirconium oxide, 1-15 wt % lanthanum oxide, and/or 1-10 wt % yttrium oxide. In one embodiment, the cerium oxide particles contain 86 wt % cerium oxide, 10 wt % zirconium oxide, and 4 wt % lanthanum and/or lanthanum oxide. In another embodiment, the cerium oxide particles contain 40 wt % cerium oxide, 50 wt % zirconium oxide, 5 wt % lanthanum oxide, and 5 wt % yttrium oxide.

The support particles can be micron-sized, nano-sized, or a mixture thereof. An example of micron-sized support particles include micron-sized cerium oxide particles including, but not limited to, HSA5, HSA20, or a mixture thereof from Rhodia-Solvay.

In some embodiments, the support particles may include PGM, alkali oxides, and/or alkaline earth oxides. For example, the micron-sized cerium oxide particles may include palladium, ruthenium, or a mixture thereof in addition to alkali oxide or alkaline earth oxide or mixtures thereof.

In some embodiments, different PNA materials may not be mixed on a support material. For example, if a combination of manganese oxide on cerium oxide support and magnesium oxide on cerium oxide support is used, the manganese oxide is impregnated onto cerium oxide support material and set aside. Separately, magnesium oxide is then impregnated onto fresh cerium oxide support material. The manganese oxide/cerium oxide and magnesium oxide/cerium oxide are then combined in the desired ratio of the PNA material.

The PNA materials are adsorbers that hold $NO_x$ compounds during low temperature engine operation. These gases are then released and reduced by the catalysts during high temperature engine operation. During low temperature engine operation, PNA particles physisorbs the $NO_x$ via non-covalent adsorption. Subsequently, during high temperature engine operation, the $NO_x$ sharply releases from the PNA particles. In this way, the released $NO_x$ can then be reduced to the benign gases $N_2$ and $H_2O$.

PGM, Alkali Oxide, and Alkaline Earth Oxide Nanoparticles and Micron-Particles

Alkali oxide, alkaline earth oxide, and PGM nanoparticles may be included in an oxidative washcoat layer, a reductive washcoat layer, a PNA layer, a zeolite layer, or any combination of the oxidative, reductive, PNA, and zeolite washcoat layers. As an alternative embodiment, micron-sized alkali oxide, alkaline earth oxide, and PGM particles may be included in any combination of the oxidative, reductive, PNA, and zeolite washcoat layers. In another alternative embodiment, both nanoparticles and micron particles of alkali oxide, alkaline earth oxide, and PGM may be included in any combination of the oxidative, reductive, PNA, and zeolite washcoat layers.

Alkali oxides, alkaline earth oxides, and PGM particles are adsorbers that hold $NO_x$ compounds during low temperature engine operation. The $NO_x$ compounds are then released and reduced by catalysts during high temperature engine operation. The temperature at which the $NO_x$ compounds are released varies depending on the oxide, PGM, combination of oxides, or combination of oxides and PGM, among other factors. For example, alkali oxides or alkaline earth oxides can be used to release $NO_x$ compounds at temperatures lower than PGM particles. In addition, the alkali oxides or alkaline earth oxides can be magnesium oxide, calcium oxide, manganese oxide, barium oxide, and/or strontium oxide. Furthermore, the PGM can be palladium, ruthenium, or mixtures thereof. When used alone or in combination with other $NO_x$ adsorbing materials, such as those described herein, the amount of PGM needed to store $NO_x$ gases can be substantially reduced or even eliminated.

Alkali oxide, alkaline earth oxide, and PGM nanoparticles and micron particles on support particles may be produced via wet chemistry techniques or by the plasma-based methods described above. The PNA nanoparticles can include the composite nanoparticles described above. As such, the alkali oxide, alkaline earth oxide, and PGM nanoparticles on support particles can include PNA nano-on-nano particles, PNA NNm particles, PNA NNiM particles, or PNA hybrid NNm/wet-chemistry particles described above.

In some embodiments, the alkali oxide, alkaline earth oxide, and PGM nanoparticles have an average diameter of approximately 20 nm or less, or approximately 15 nm or less, or approximately 10 nm or less, or approximately 5 nm or less, or between approximately 1 nm and approximately 20 nm, that is, approximately 10.5 nm±9.5 nm, or between approximately 1 nm and approximately 15 nm, that is, approximately 8 nm±7 nm, or between approximately 1 nm and approximately 10 nm, that is, approximately 5.5 nm±4.5 nm, or between approximately 1 nm and approximately 5 nm, that is, approximately 3 nm±2 nm. In some embodiments, the alkali oxide, alkaline earth oxide, and PGM nanoparticles have a diameter of approximately 20 nm or less, or approximately 15 nm or less, or approximately 10 nm or less, or approximately 5 nm or less, or between approximately 1 nm and approximately 10 nm, that is, approximately 5.5 nm±4.5 nm, or between approximately 1 nm and approximately 5 nm, that is, approximately 3 nm±2 nm.

In some embodiments, the alkali oxide, alkaline earth oxide, and PGM micron particles may have an average diameter of approximately 10 µm or less, or approximately 8 µm or less, or approximately 5 µm or less, or approximately 2 µm or less, or approximately 1.5 µm or less, or approximately 1 µm or less, or approximately 0.5 µm or less. In some embodiments, the alkali oxide, alkaline earth oxide, and PGM micron particles have an average diameter between approximately 6 µm and approximately 10 µm, that is, approximately 8 µm±2 µm, or between approximately 7 µm and approximately 9 µm, that is, approximately 8 µm±1 µm. In some embodiments, the alkali oxide, alkaline earth oxide, and PGM micron particles have an average diameter between approximately 0.5 µm and approximately 2 µm, that is, approximately 1.25 µm±0.75 m, or between approximately 1.0 µm and approximately 1.5 µm, that is, approximately 1.25 µm±0.25 µm.

The alkali oxide, alkaline earth oxide, and PGM particles can be applied to support particles by any of the processes described above with respect to applying nanoparticles to support and/or carrier particles including wet chemistry, incipient wetness, and plasma nano-on-nano methods. These support particles can be nano-sized or micron-sized. In addition, these support particles can be, for example, refractory oxides including cerium oxide. As discussed above, the cerium oxide particles may contain zirconium oxide, lanthanum, lanthanum oxide, yttrium oxide, or a combination thereof.

In one embodiment, the oxide and PGM nanoparticles can be impregnated into micron-sized cerium oxide supports. The procedure for impregnating these supports may be similar to the process described above with respect to impregnating the composite nanoparticles into micron-sized cerium oxide supports. One of ordinary skill in the art would understand that the support particles can be impregnated one at a time or simultaneously co-impregnated with the alkali and/or alkaline earth oxides and PGM. In some embodiments, the alkali oxide, alkaline earth oxide, and PGM nanoparticles on supports can be prepared by applying a dispersion of alkali oxide, alkaline earth oxide, or PGM nanoparticles to porous, micron-sized cerium oxide, as described with respect to incipient wetness techniques described above, including subsequent drying and calcination. In some embodiments, the alkali oxide, alkaline earth oxide, and PGM nanoparticles on supports can be prepared using wet chemistry techniques described above, including subsequent drying and calcination. The porous, micron-sized cerium oxide powders may contain zirconium oxide, lanthanum, yttrium oxide, and/or lanthanum oxide. In some embodiments, the cerium oxide is substantially free of zirconium oxide. In other embodiments, the cerium oxide contains up to 50 mole % zirconium oxide (at exactly 50 mole %, the material is cerium-zirconium oxide, $CeZrO_4$). One commercial cerium oxide powder suitable for use is HSA5, HSA20, or a mixture thereof. These nanoparticles may also be impregnated into micron-sized aluminum oxide supports.

In one embodiment, palladium is used in an amount of from about 0.01% to about 5% (by weight) of the amount of cerium oxide used in the PNA material (i.e., composition). (As described above, in all embodiments, the cerium oxide can include zirconium oxide, lanthanum, lanthanum oxide, yttrium oxide, or a combination thereof). In one embodiment, palladium is used in an amount of from about 0.5% to about 3% (by weight) of the amount of cerium oxide used in the PNA material. In one embodiment, palladium is used in an amount of from about 0.67% to about 2.67% (by weight) of the amount of cerium oxide used in the PNA material. In another embodiment, the amount of cerium oxide used in the PNA material is from about 50 g/L to about 400 g/L. In another embodiment, the amount of cerium oxide used in the PNA material is from about 100 g/L to about 350 g/L. In another embodiment, the amount of cerium oxide used in the PNA material is from about 150 g/L to about 300 g/L. In another embodiment, the amount of cerium oxide used in the PNA material is greater than or equal to about 150 g/L. In another embodiment, Pd is used in an amount of from about 1.5% to about 2.5% (by weight) of the amount of cerium oxide used in the PNA material, and the amount of cerium oxide used is from about 100 g/L to about 200 g/L. In another embodiment, Pd is used in an amount of from about 0.5% to about 1.5% (by weight) of the amount of cerium oxide used in the PNA material, and the amount of cerium oxide used is from about 250 g/L to about 350 g/L. In another embodiment, Pd is used in an amount of from about 1% to about 2% (by weight) of the amount of cerium oxide used in the PNA material, and the amount of cerium oxide used is greater than or equal to about 150 g/L. In another embodiment, Pd is used in an amount of about 2% (by weight) of the amount of cerium oxide used in the PNA material, and the amount of cerium oxide used is greater than or equal to about 150 g/L. In another embodiment, Pd is used in an amount of about 1% (by weight) of the amount of cerium oxide used in the PNA material, and the amount of cerium oxide used is greater than or equal to about 300 g/L. In another embodiment, Pd is used in an amount of about 1 g/L to about 5 g/L. In another embodiment, Pd is used in an amount of about 2 g/L to about 4 g/L. In another embodiment, Pd is used in an amount of about 3 g/L. In another embodiment, Pd is used in an amount of about 1 g/L to about 5 g/L, and the amount of cerium oxide used in the PNA material is from about 100 g/L to about 350 g/L. In another embodiment, Pd is used in an amount of about 2 g/L to about 4 g/L, and the amount of cerium oxide used in the PNA material is from about 100 g/L to about 350 g/L. In another embodiment, Pd is used in an amount of about 3 g/L, and the amount of cerium oxide used in the PNA material is from about 150 g/L to about 300 g/L. In another embodiment, Pd is used in an amount of about 1 g/L to about 5 g/L, and the amount of cerium oxide used in the PNA material is from greater than or equal to about 150 g/L. In another embodiment, Pd is used in an amount of about 2 g/L to about 4 g/L, and the amount of cerium oxide used in the PNA material is from greater than or equal to about 150 g/L. In another embodiment, Pd is used in an amount of about 3 g/L, and the amount of cerium oxide used in the PNA material is from greater than or equal to about 150 g/L. The PNA material can include Pd in larger (cooler) engine systems (e.g., greater than 2.5 Liters).

In one embodiment, ruthenium is used in an amount of from about 0.01% to about 15% (by weight) of the amount of cerium oxide used in the PNA material (i.e., composition). (As described above, in all embodiments, the cerium oxide can include zirconium oxide, lanthanum, lanthanum oxide, yttrium oxide, or a combination thereof). In one embodiment, ruthenium is used in an amount of from about 0.5% to about 12% (by weight) of the amount of cerium oxide used in the PNA material. In one embodiment, ruthenium is used in an amount of from about 1% to about 10% (by weight) of the amount of cerium oxide used in the PNA material. In another embodiment, the amount of cerium oxide used in the PNA material is from about 50 g/L to about 400 g/L. In another embodiment, the amount of cerium oxide used in the PNA material is from about 100 g/L to about 350 g/L. In another embodiment, the amount of cerium oxide used in the PNA material is from about 150 g/L to about 300 g/L. In another embodiment, the amount of cerium oxide used in the PNA material is greater than or equal to about 150 g/L. In another embodiment, the amount of cerium oxide used in the PNA material is greater than or equal to about 300 g/L. In another embodiment, Ru is used in an amount of from about 3% to about 4.5% (by weight)

of the amount of cerium oxide used in the PNA material, and the amount of cerium oxide used is from about 100 g/L to about 200 g/L. In another embodiment, Ru is used in an amount of from about 1% to about 2.5% (by weight) of the amount of cerium oxide used in the PNA material, and the amount of cerium oxide used is from about 250 g/L to about 350 g/L. In another embodiment, Ru is used in an amount of from about 1.67% to about 4% (by weight) of the amount of cerium oxide used in the PNA material, and the amount of cerium oxide used is greater than or equal to about 150 g/L. In another embodiment, Ru is used in an amount of from about 1.67% to about 4% (by weight) of the amount of cerium oxide used in the PNA material, and the amount of cerium oxide used is greater than or equal to about 300 g/L. In another embodiment, Ru is used in an amount of about 3.33% to about 4% (by weight) of the amount of cerium oxide used in the PNA material, and the amount of cerium oxide used is greater than or equal to about 150 g/L. In another embodiment, Ru is used in an amount of about 1.67% to about 2% (by weight) of the amount of cerium oxide used in the PNA material, and the amount of cerium oxide used is greater than or equal to about 300 g/L. In another embodiment, Ru is used in an amount of about 1 g/L to about 20 g/L. In another embodiment, Ru is used in an amount of about 3 g/L to about 15 g/L. In another embodiment, Ru is used in an amount of about 4 g/L to about 8 g/L. In another embodiment, Ru is used in an amount of about 5 g/L to about 6 g/L. In another embodiment, Ru is used in an amount of about 1 g/L to about 20 g/L, and the amount of cerium oxide used in the PNA material is from about 100 g/L to about 350 g/L. In another embodiment, Ru is used in an amount of about 3 g/L to about 15 g/L, and the amount of cerium oxide used in the PNA material is from about 100 g/L to about 350 g/L. In another embodiment, Ru is used in an amount of about 4 g/L to about 8 g/L, and the amount of cerium oxide used in the PNA material is from about 100 g/L to about 350 g/L. In another embodiment, Ru is used in an amount of about 5 g/L to about 6 g/L, and the amount of cerium oxide used in the PNA material is from about 150 g/L to about 350 g/L. In another embodiment, Ru is used in an amount of about 1 g/L to about 20 g/L, and the amount of cerium oxide used in the PNA material is from greater than or equal to about 150 g/L. In another embodiment, Ru is used in an amount of about 3 g/L to about 15 g/L, and the amount of cerium oxide used in the PNA material is from greater than or equal to about 150 g/L. In another embodiment, Ru is used in an amount of about 4 g/L to about 8 g/L, and the amount of cerium oxide used in the PNA material is from greater than or equal to about 150 g/L. In another embodiment, Ru is used in an amount of about 5 g/L to about 6 g/L, and the amount of cerium oxide used in the PNA material is from greater than or equal to about 150 g/L. In another embodiment, Ru is used in an amount of about 1 g/L to about 20 g/L, and the amount of cerium oxide used in the PNA material is from greater than or equal to about 300 g/L. In another embodiment, Ru is used in an amount of about 3 g/L to about 15 g/L, and the amount of cerium oxide used in the PNA material is from greater than or equal to about 300 g/L. In another embodiment, Ru is used in an amount of about 4 g/L to about 8 g/L, and the amount of cerium oxide used in the PNA material is from greater than or equal to about 300 g/L. In another embodiment, Ru is used in an amount of about 5 g/L to about 6 g/L, and the amount of cerium oxide used in the PNA material is from greater than or equal to about 300 g/L. The PNA material can include Ru in small (hotter) engine systems (e.g., less than 2 Liters).

In one embodiment, MgO is used in an amount of from about 1% to about 20% (by weight) of the amount of the cerium oxide used in the PNA material (i.e., composition). In one embodiment, MgO is used in an amount of from about 1% to about 15% (by weight) of the amount of the cerium oxide used in the PNA material. In one embodiment, MgO is used in an amount of from about 1% to about 10% (by weight) of the amount of the cerium oxide used in the PNA material. In another embodiment, the amount of cerium oxide used in the PNA material is from about 50 g/L to about 450 g/L. In another embodiment, the amount of cerium oxide used in the PNA material is from about 100 g/L to about 400 g/L. In another embodiment, the amount of cerium oxide used in the PNA material is from about 150 g/L to about 350 g/L. In another embodiment, MgO is used in an amount of from about 2% to about 8% (by weight) of the amount of the cerium oxide used in the PNA material, and the amount of cerium oxide used is from about 150 g/L to about 350 g/L. In another embodiment, MgO is used in an amount of from about 2% to about 4% (by weight) of the amount of the cerium oxide used in the PNA material, and the amount of cerium oxide used is from about 250 g/L to about 350 g/L. In another embodiment, MgO is used in an amount of from about 6% to about 8% (by weight) of the amount of the cerium oxide used in the PNA material, and the amount of cerium oxide used is from about 150 g/L to about 250 g/L. In another embodiment, MgO is used in an amount of about 3% (by weight) of the amount of the cerium oxide used in the PNA material, and the amount of cerium oxide used in the PNA material is about 350 g/L. In another embodiment, MgO is used in an amount of about 7% (by weight) of the amount of the cerium oxide used in the PNA material, and the amount of cerium oxide used is about 150 g/L. In another embodiment, MgO is used in an amount of about 10.5 g/L, and the amount of cerium oxide used in the PNA material is from about 150 g/L to about 350 g/L.

In one embodiment, $Mn_3O_4$ is used in an amount of from about 1% to about 30% (by weight) of the amount of the cerium oxide used in the PNA material (i.e., composition). In one embodiment, $Mn_3O_4$ is used in an amount of from about 1% to about 25% (by weight) of the amount of the cerium oxide used in the PNA material. In one embodiment, $Mn_3O_4$ is used in an amount of from about 1% to about 20% (by weight) of the amount of the cerium oxide used in the PNA material. In another embodiment, the amount of cerium oxide used in the PNA material is from about 50 g/L to about 450 g/L. In another embodiment, the amount of cerium oxide used in the PNA material is from about 100 g/L to about 400 g/L. In another embodiment, the amount of cerium oxide used in the PNA material is from about 150 g/L to about 350 g/L. In another embodiment, $Mn_3O_4$ is used in an amount of from about 5% to about 20% (by weight) of the amount of the cerium oxide used in the PNA material, and the amount of cerium oxide used is from about 150 g/L to about 350 g/L. In another embodiment, $Mn_3O_4$ is used in an amount of from about 5% to about 10% (by weight) of the amount of the cerium oxide used in the PNA material, and the amount of cerium oxide used is from about 250 g/L to about 350 g/L. In another embodiment, $Mn_3O_4$ is used in an amount of from about 15% to about 20% (by weight) of the amount of the cerium oxide used in the PNA material, and the amount of cerium oxide used is from about 150 g/L to about 250 g/L. In another embodiment, $Mn_3O_4$ is used in an amount of about 8% (by weight) of the amount of the cerium oxide used in the PNA material, and the amount of cerium oxide used is about 350 g/L. In another embodiment, $Mn_3O_4$ is used in an amount of about 18.67% (by weight) of the amount of the cerium oxide used in the PNA material, and the amount of cerium oxide used is about 150 g/L. In another embodiment, $Mn_3O_4$ is used in an amount of about 28 g/L, and the amount of cerium oxide used in the PNA material is from about 150 g/L to about 350 g/L.

In one embodiment, calcium oxide is used in an amount of from about 1% to about 20% (by weight) of the amount of the cerium oxide used in the PNA material (i.e., composition). In one embodiment, calcium oxide is used in an amount of from about 1% to about 15% (by weight) of the amount of the cerium oxide used in the PNA material. In one embodiment, calcium oxide is used in an amount of from about 1% to about 10% (by weight) of the amount of the cerium oxide used in the PNA material. In another embodiment, the amount of cerium oxide used in the PNA material is from about 50 g/L to about 450 g/L. In another embodiment, the amount of cerium oxide used in the PNA material is from about 100 g/L to about 400 g/L. In another embodiment, the amount of cerium oxide used in the PNA material is from about 150 g/L to about 350 g/L. In another embodiment, calcium oxide is used in an amount of from about 2% to about 8% (by weight) of the amount of the cerium oxide used in the PNA material, and the amount of cerium oxide used is from about 150 g/L to about 350 g/L. In another embodiment, calcium oxide is used in an amount of from about 2% to about 4% (by weight) of the amount of the cerium oxide used in the PNA material, and the amount of cerium oxide used is from about 250 g/L to about 350 g/L. In another embodiment, calcium oxide is used in an amount of from about 6% to about 8% (by weight) of the amount of the cerium oxide used in the PNA material, and the amount of cerium oxide used is from about 150 g/L to about 250 g/L. In another embodiment, calcium oxide is used in an amount of about 3% (by weight) of the amount of the cerium oxide used in the PNA material, and the amount of cerium oxide used is about 350 g/L. In another embodiment, calcium oxide is used in an amount of about 7% (by weight) of the amount of the cerium oxide used in the PNA material, and the amount of cerium oxide used is about 150 g/L. In another embodiment, calcium oxide is used in an amount of about 10.5 g/L, and the amount of cerium oxide used in the PNA material is from about 150 g/L to about 350 g/L.

In one embodiment, MgO is used in an amount of about 10.5 g/L, $Mn_3O_4$ is used in an amount of about 28 g/L, calcium oxide is used in an amount of about 10.5 g/L, and the amount of cerium oxide used in the PNA material (i.e., composition) is from about 150 g/L to about 350 g/L.

The PNA material can be used to store $NO_x$ emissions from ambient temperatures to a variety of operating temperatures. For example, the PNA material can store $NO_x$ emissions from ambient to about 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., 200° C., 205° C., 210° C., 215° C., 220° C., 225° C., 230° C., 235° C., 240° C., 245° C., 250° C., 255° C., 260° C., 265° C., 270° C., 275° C., 280° C., 285° C., 290° C., 295° C., 300° C., 305° C., 310° C., 315° C., 320° C., 325° C., 330° C., 335° C., 340° C., 345° C., 350° C., 355° C., 375° C., or 400° C.

In one embodiment, palladium based PNA material can be used for storing $NO_x$ emissions from ambient temperature to greater than or equal to about 200° C. In another embodiment, Pd based PNA material can be used for storing $NO_x$ emissions from ambient temperature to greater than or equal to about 190° C. In another embodiment, Pd based PNA material can be used for storing $NO_x$ emissions from ambient temperature to greater than or equal to about 180° C. In another embodiment, Pd based PNA material can be used for storing $NO_x$ emissions from ambient temperature to greater than or equal to about 170° C. In another embodiment, Pd based PNA material can be used for storing $NO_x$ emissions from ambient temperature to greater than or equal to about 160° C. In another embodiment, Pd based PNA material can be used for storing $NO_x$ emissions from ambient temperature to greater than or equal to about 150° C. In another embodiment, Pd based PNA material can be used for storing $NO_x$ emissions from ambient temperature to greater than or equal to about 140° C. Once the temperature surpasses the upper storage temperature, the PNA material can "cross over" (i.e., can stop adsorbing $NO_x$ emissions and can start releasing the $NO_x$ emissions). The cross over range for Pd based PNA material can be from about 130° C. to about 180° C., from about 140° C. to about 170° C., from about 145° C. to about 165° C., or from about 150° C. to about 160° C.

The $NO_x$ desorption temperature range depends on a variety of factors including the amount of PGM in the PNA material. In one embodiment, the desorption temperature range can be greater than or equal to the cross over temperature. At a certain temperature, the PNA material may no longer be storing any $NO_x$ emissions. At this point, the PNA material can be said to have fully released all $NO_x$ emissions. In one embodiment, the full release temperature of the Pd based PNA material is greater than about 150° C. In one embodiment, the full release temperature of the Pd based PNA material is greater than about 200° C. In another embodiment, the full release temperature of the Pd based PNA material is between about 200° C. and about 240° C. In another embodiment, the full release temperature of the Pd based PNA material is about 240° C. In another embodiment, the full release temperature of the Pd based PNA material is greater than about 240° C. In another embodiment, the Pd based PNA material no longer has any $NO_x$ emissions stored at temperatures greater than or equal to about 200° C. In another embodiment, the Pd based PNA material no longer has any $NO_x$ emissions stored at temperatures greater than or equal to about 240° C. In another embodiment, the Pd based PNA material no longer has any $NO_x$ emissions stored at temperatures from about 200° C. to about 300° C. In another embodiment, the Pd based PNA material no longer has any $NO_x$ emissions stored at about greater than or equal to 300° C.

In one embodiment, ruthenium based PNA material can be used for storing $NO_x$ emissions from ambient temperature to greater than or equal to about 300° C. In another embodiment, Ru based PNA material can be used for storing $NO_x$ emissions from ambient temperature to greater than or equal to about 275° C. In another embodiment, Ru based PNA material can be used for storing $NO_x$ emissions from ambient temperature to greater than or equal to about 250° C. In another embodiment, Ru based PNA material can be used for storing $NO_x$ emissions from ambient temperature to greater than or equal to about 225° C. In another embodiment, Ru based PNA material can be used for storing $NO_x$ emissions from ambient temperature to greater than or equal to about 200° C. In another embodiment, Ru based PNA material can be used for storing $NO_x$ emissions from ambient temperature to greater than or equal to about 190° C. Once the temperature surpasses the upper storage temperature, the PNA material can "cross over" (i.e., can stop adsorbing $NO_x$ emissions and can start releasing the $NO_x$ emissions). The cross over range for Ru based PNA material can be from about 170° C. to about 220° C., from about 180° C. to about 210° C., from about 185° C. to about 205° C., or from about 190° C. to about 200° C.

The $NO_x$ desorption temperature depends on a variety of factors including the amount of PGM and/or oxide in the PNA material. In one embodiment, the desorption temperature range can be greater than or equal to the cross over temperature. At a certain temperature, the PNA material may no longer be storing any $NO_x$ emissions. At this point, the PNA material can be said to have fully released all $NO_x$ emissions. In one embodiment, the full release temperature of the Ru based PNA material is greater than about 200° C. In one embodiment, the full release temperature of the Ru based PNA material is greater than about 250° C. In one embodiment, the full release temperature of the Ru based PNA material is greater than or equal to about 300° C. In one embodiment, the full release temperature of the Ru based PNA material is greater than or equal to about 340° C. In another embodiment, the full release temperature of the Ru based PNA material is between about 300° C. and about 350° C. In another embodiment, the full release temperature of the Ru based PNA material is about 340° C. In another embodiment, the Ru based PNA material no longer has any $NO_x$ emissions stored at temperatures greater than or equal to about 200° C. In another embodiment, the Ru based PNA material no longer has any $NO_x$ emissions stored at temperatures greater than or equal to about 250° C. In another embodiment, the Ru based PNA material no longer has any $NO_x$ emissions stored at temperatures greater than or equal to about 300° C. In another embodiment, the Ru based PNA material no longer has any $NO_x$ emissions stored at temperatures greater than or equal to about 340° C. In another embodiment, the Ru based PNA material no longer has any $NO_x$ emissions stored at temperatures from about 300° C. to about 400° C. In another embodiment, the Ru based PNA material no longer has any $NO_x$ emissions stored at temperatures greater than or equal to about 400° C.

In one embodiment, manganese oxide based PNA material can be used for storing $NO_x$ emissions from ambient temperature to about 150° C. In another embodiment, manganese oxide based PNA material can be used for storing $NO_x$ emissions from ambient temperature to about 125° C. In another embodiment, manganese oxide based PNA material can be used for storing $NO_x$ emissions from ambient temperature to about 110° C. In another embodiment, manganese oxide based PNA material can be used for storing $NO_x$ emissions from ambient temperature to about 100° C. In another embodiment, manganese oxide based PNA material can be used for storing $NO_x$ emissions from ambient temperature to less than about 100° C. Once the temperature surpasses the upper storage temperature, the PNA material can "cross over" (i.e., can stop adsorbing $NO_x$ emissions and can start releasing the $NO_x$ emissions).

In one embodiment, the manganese oxide based PNA material no longer has any $NO_x$ emissions stored at temperatures from about 200° C. to about 250° C. In another embodiment, the manganese oxide based PNA material no longer has any $NO_x$ emissions stored at temperatures from about 210° C. to about 240° C. In another embodiment, the manganese based PNA material no longer has any $NO_x$ emissions stored at temperatures from about 215° C. to about 225° C. In another embodiment, the manganese based PNA material no longer has any $NO_x$ emissions stored at about 220° C.

In one embodiment, magnesium oxide based PNA material can be used for storing $NO_x$ emissions from ambient temperature to about 200° C. In another embodiment, magnesium oxide based PNA material can be used for storing $NO_x$ emissions from ambient temperature to about 175° C. In another embodiment, magnesium oxide based PNA material can be used for storing $NO_x$ emissions from ambient temperature to about 150° C. In another embodiment, magnesium oxide based PNA material can be used for storing $NO_x$ emissions from ambient temperature to less than about 150° C. Once the temperature surpasses the upper storage temperature, the PNA material can "cross over" (i.e., can stop adsorbing $NO_x$ emissions and can start releasing the $NO_x$ emissions).

In one embodiment, the magnesium oxide based PNA material no longer has any $NO_x$ emissions stored at temperatures from about 210° C. to about 260° C. In another embodiment, the magnesium oxide based PNA material no longer has any $NO_x$ emissions stored at temperatures from about 220° C. to about 250° C. In another embodiment, the magnesium based PNA material no longer has any $NO_x$ emissions stored at temperatures from about 235° C. to about 245° C. In another embodiment, the magnesium based PNA material no longer has any $NO_x$ emissions stored at about 240° C.

In one embodiment, calcium oxide based PNA material can be used for storing $NO_x$ emissions from ambient temperature to about 250° C. In another embodiment, calcium oxide based PNA material can be used for storing $NO_x$ emissions from ambient temperature to about 225° C. In another embodiment, calcium oxide based PNA material can be used for storing $NO_x$ emissions from ambient temperature to about 200° C. In another embodiment, calcium oxide based PNA material can be used for storing $NO_x$ emissions from ambient temperature to less than about 200° C. In another embodiment, calcium oxide based PNA material can be used for storing $NO_x$ emissions from ambient temperature to about 180° C. In another embodiment, calcium oxide based PNA material can be used for storing $NO_x$ emissions from ambient temperature to less than about 180° C. Once the temperature surpasses the upper storage temperature, the PNA material can "cross over" (i.e., can stop adsorbing $NO_x$ emissions and can start releasing the $NO_x$ emissions).

In one embodiment, the calcium oxide based PNA material no longer has any $NO_x$ emissions stored at temperatures from about 290° C. to about 340° C. In another embodiment, the calcium oxide based PNA material no longer has any $NO_x$ emissions stored at temperatures from about 300° C. to about 330° C. In another embodiment, the calcium based PNA material no longer has any $NO_x$ emissions stored at temperatures from about 305° C. to about 315° C. In another embodiment, the calcium based PNA material no longer has any $NO_x$ emissions stored at about 310° C.

In some embodiments, the support particles are impregnated with alkali oxide, alkaline earth oxide, and PGM using wet chemistry techniques. In some embodiments, the PNA material may be prepared by incipient wetness techniques. In some embodiments, the PNA material is prepared by plasma based methods. In some embodiments, the PNA material includes NNm particles, NNiM particles, and/or hybrid NNm/wet-chemistry particles. In another embodiment, alkali oxide, alkaline earth oxide, and PGM nano or micron particles can be used simply by adding them to the washcoat when desired, in the amount desired, along with the other solid ingredients.

PNA Material Compositions

The PNA material can comprise PGM on support particles, alkali oxide or alkaline earth oxide on support particles; alkali oxide or alkaline earth oxide and PGM on support particles; a combination of alkali oxide or alkaline earth oxide on support particles and different alkali oxides or alkaline earth oxides each on different support particles in any ratio; a combination of alkali oxide or alkaline earth oxide on support particles and PGM on support particles in any ratio; a combination of alkali oxide or alkaline earth oxide on support particles, different alkali oxides or alkaline earth oxides each on different support particles, and PGM on support particles in any ratio; a combination of alkali oxide or alkaline earth oxide and PGM on support particles and the same or different alkali oxides or alkaline earth oxides each on different support particles in any ratio; a combination of alkali oxide or alkaline earth oxide and PGM on support particles and PGM on support particles in any ratio; a combination of alkali oxide or alkaline earth oxide and PGM on support particles; the same or different alkali oxides or alkaline earth oxides each on different support particles; and PGM on support particles in any ratio. In addition, various other combinations of alkali oxides and alkaline earth oxides on support particles; PGM on support particles; and alkali oxides and alkaline earth oxides and PGM on support particles in any ratio can be employed, as discussed above. The PGM can include, for example, palladium, ruthenium, or mixtures thereof. In addition, the PGM can include their oxides, such as ruthenium oxide.

In some embodiments, the PNA material can comprise palladium on support particles; ruthenium on support particles; manganese oxide (preferably $Mn_3O_4$) on support particles; magnesium oxide on support particles; calcium oxide on support particles; a combination of manganese oxide on support particles and magnesium oxide on support particles in any ratio; a combination of manganese oxide on support particles and calcium oxide on support particles in any ratio; a combination of magnesium oxide on support particles and calcium oxide on support particles in any ratio; or a combination of manganese oxide on support particles, magnesium oxide on support particles, and calcium oxide on support particles in any ratio. Other embodiments include PNA material comprising a combination of manganese oxide on support particles and PGM on support particles in any ratio; a combination of magnesium oxide on support particles and PGM on support particles in any ratio; a combination of calcium oxide on support particles and PGM on support particles in any ratio; a combination of manganese oxide on support particles, magnesium oxide on support particles, and PGM on support particles in any ratio; a combination of manganese oxide on support particles, calcium oxide on support particles, and PGM on support particles in any ratio; a combination of magnesium oxide on support particles, calcium oxide on support particles, and PGM on support particles in any ratio; or a combination of manganese oxide on support particles, magnesium oxide on support particles, calcium oxide on support particles, and PGM on support particles in any ratio, which are discussed above.

In some embodiments, different PNA materials may not be mixed on a support material. For example, if a combination of manganese oxide on cerium oxide support and magnesium oxide on cerium oxide support is used, the manganese oxide is impregnated onto cerium oxide support material and set aside. Separately, magnesium oxide is then impregnated onto fresh cerium oxide support material. The manganese oxide/cerium oxide and magnesium oxide/cerium oxide are then combined in the desired ratio of the PNA material.

In one embodiment, palladium is used in an amount of from about 0.01% to about 5% (by weight) of the amount of cerium oxide used in the PNA composition. (As described above, in all embodiments, the cerium oxide can include zirconium oxide, lanthanum, lanthanum oxide, yttrium oxide, or a combination thereof). In one embodiment, palladium is used in an amount of from about 0.5% to about 3% (by weight) of the amount of cerium oxide used in the PNA composition. In one embodiment, palladium is used in an amount of from about 0.67% to about 2.67% (by weight) of the amount of cerium oxide used in the PNA composition. In another embodiment, the amount of cerium oxide used in the PNA composition is from about 50 g/L to about 400 g/L. In another embodiment, the amount of cerium oxide used in the PNA composition is from about 100 g/L to about 350 g/L. In another embodiment, the amount of cerium oxide used in the PNA composition is from about 150 g/L to about 300 g/L. In another embodiment, the amount of cerium oxide used in the PNA composition is greater than or equal to about 150 g/L. In another embodiment, Pd is used in an amount of from about 1.5% to about 2.5% (by weight) of the amount of cerium oxide used in the PNA composition, and the amount of cerium oxide used is from about 100 g/L to about 200 g/L. In another embodiment, Pd is used in an amount of from about 0.5% to about 1.5% (by weight) of the amount of cerium oxide used in the PNA composition, and the amount of cerium oxide used is from about 250 g/L to about 350 g/L. In another embodiment, Pd is used in an amount of from about 1% to about 2% (by weight) of the amount of cerium oxide used in the PNA composition, and the amount of cerium oxide used is greater than or equal to about 150 g/L. In another embodiment, Pd is used in an amount of about 2% (by weight) of the amount of cerium oxide used in the PNA composition, and the amount of cerium oxide used is greater than or equal to about 150 g/L. In another embodiment, Pd is used in an amount of about 1% (by weight) of the amount of cerium oxide used in the PNA composition, and the amount of cerium oxide used is greater than or equal to about 300 g/L. In another embodiment, Pd is used in an amount of about 1 g/L to about 5 g/L. In another embodiment, Pd is used in an amount of about 2 g/L to about 4 g/L. In another embodiment, Pd is used in an amount of about 3 g/L. In another embodiment, Pd is used in an amount of about 1 g/L to about 5 g/L, and the amount of cerium oxide used in the PNA composition is from about 100 g/L to about 350 g/L. In another embodiment, Pd is used in an amount of about 2 g/L to about 4 g/L, and the amount of cerium oxide used in the PNA composition is from about 100 g/L to about 350 g/L. In another embodiment, Pd is used in an amount of about 3 g/L, and the amount of cerium oxide used in the PNA composition is from about 150 g/L to about 300 g/L. In another embodiment, Pd is used in an amount of about 1 g/L to about 5 g/L, and the amount of cerium oxide used in the PNA composition is from greater than or equal to about 150 g/L. In another embodiment, Pd is used in an amount of about 2 g/L to about 4 g/L, and the amount of cerium oxide used in the PNA composition is from greater than or equal to about 150 g/L. In another embodiment, Pd is used in an amount of about 3 g/L, and the amount of cerium oxide used in the PNA composition is from greater than or equal to about 150 g/L. The PNA composition can include Pd in larger (cooler) engine systems (e.g., greater than 2.5 Liters).

In one embodiment, ruthenium is used in an amount of from about 0.01% to about 15% (by weight) of the amount of cerium oxide used in the PNA composition. (As described above, in all embodiments, the cerium oxide can include zirconium oxide, lanthanum, lanthanum oxide, yttrium oxide, or a combination thereof). In one embodiment, ruthenium is used in an amount of from about 0.5% to about 12% (by weight) of the amount of cerium oxide used in the PNA composition. In one embodiment, ruthenium is used in an amount of from about 1% to about 10% (by weight) of the amount of cerium oxide used in the PNA composition. In another embodiment, the amount of cerium oxide used in the PNA composition is from about 50 g/L to about 400 g/L. In another embodiment, the amount of cerium oxide used in the PNA composition is from about 100 g/L to about 350 g/L. In another embodiment, the amount of cerium oxide used in the PNA composition is from about 150 g/L to about 300 g/L. In another embodiment, the amount of cerium oxide used in the PNA composition is greater than or equal to about 150 g/L. In another embodiment, the amount of cerium oxide used in the PNA composition is greater than or equal to about 300 g/L. In another embodiment, Ru is used in an amount of from about 3% to about 4.5% (by weight) of the amount of cerium oxide used in the PNA composition, and the amount of cerium oxide used is from about 100 g/L to about 200 g/L. In another embodiment, Ru is used in an amount of from about 1% to about 2.5% (by weight) of the amount of cerium oxide used in the PNA composition, and the amount of cerium oxide used is from about 250 g/L to about 350 g/L. In another embodiment, Ru is used in an amount of from about 1.67% to about 4% (by weight) of the amount of cerium oxide used in the PNA composition, and the amount of cerium oxide used is greater than or equal to about 150 g/L. In another embodiment, Ru is used in an amount of from about 1.67% to about 4% (by weight) of the amount of cerium oxide used in the PNA composition, and the amount of cerium oxide used is greater than or equal to about 300 g/L. In another embodiment, Ru is used in an amount of about 3.33% to about 4% (by weight) of the amount of cerium oxide used in the PNA composition, and the amount of cerium oxide used is greater than or equal to about 150 g/L. In another embodiment, Ru is used in an amount of about 1.67% to about 2% (by weight) of the amount of cerium oxide used in the PNA composition, and the amount of cerium oxide used is greater than or equal to about 300 g/L. In another embodiment, Ru is used in an amount of about 1 g/L to about 20 g/L. In another embodiment, Ru is used in an amount of about 3 g/L to about 15 g/L. In another embodiment, Ru is used in an amount of about 4 g/L to about 8 g/L. In another embodiment, Ru is used in an amount of about 5 g/L to about 6 g/L. In another embodiment, Ru is used in an amount of about 1 g/L to about 20 g/L, and the amount of cerium oxide used in the PNA composition is from about 100 g/L to about 350 g/L. In another embodiment, Ru is used in an amount of about 3 g/L to about 15 g/L, and the amount of cerium oxide used in the PNA composition is from about 100 g/L to about 350 g/L. In another embodiment, Ru is used in an amount of about 4 g/L to about 8 g/L, and the amount of cerium oxide used in the PNA composition is from about 100 g/L to about 350 g/L. In another embodiment, Ru is used in an amount of about 5 g/L to about 6 g/L, and the amount of cerium oxide used in the PNA composition is from about 150 g/L to about 350 g/L. In another embodiment, Ru is used in an amount of about 1 g/L to about 20 g/L, and the amount of cerium oxide used in the PNA composition is from greater than or equal to about 150 g/L. In another embodiment, Ru is used in an amount of about 3 g/L to about 15 g/L, and the amount of cerium oxide used in the PNA composition is from greater than or equal to about 150 g/L. In another embodiment, Ru is used in an amount of about 4 g/L to about 8 g/L, and the amount of cerium oxide used in the PNA composition is from greater than or equal to about 150 g/L. In another embodiment, Ru is used in an amount of about 5 g/L to about 6 g/L, and the amount of cerium oxide used in the PNA composition is from greater than or equal to about 150 g/L. In another embodiment, Ru is used in an amount of about 1 g/L to about 20 g/L, and the amount of cerium oxide used in the PNA composition is from greater than or equal to about 300 g/L. In another embodiment, Ru is used in an amount of about 3 g/L to about 15 g/L, and the amount of cerium oxide used in the PNA composition is from greater than or equal to about 300 g/L. In another embodiment, Ru is used in an amount of about 4 g/L to about 8 g/L, and the amount of cerium oxide used in the PNA composition is from greater than or equal to about 300 g/L. In another embodiment, Ru is used in an amount of about 5 g/L to about 6 g/L, and the amount of cerium oxide used in the PNA composition is from greater than or equal to about 300 g/L. The PNA composition can include Ru in small (hotter) engine systems (e.g., less than 2 Liters).

In one embodiment, MgO is used in an amount of from about 1% to about 20% (by weight) of the amount of the cerium oxide used in the PNA composition. In one embodiment, MgO is used in an amount of from about 1% to about 15% (by weight) of the amount of the cerium oxide used in the PNA composition. In one embodiment, MgO is used in an amount of from about 1% to about 10% (by weight) of the amount of the cerium oxide used in the PNA composition. In another embodiment, the amount of cerium oxide used in the PNA composition is from about 50 g/L to about 450 g/L. In another embodiment, the amount of cerium oxide used in the PNA composition is from about 100 g/L to about 400 g/L. In another embodiment, the amount of cerium oxide used in the PNA composition is from about 150 g/L to about 350 g/L. In another embodiment, MgO is used in an amount of from about 2% to about 8% (by weight) of the amount of the cerium oxide used in the PNA composition, and the amount of cerium oxide used is from about 150 g/L to about 350 g/L. In another embodiment, MgO is used in an amount of from about 2% to about 4% (by weight) of the amount of the cerium oxide used in the PNA composition, and the amount of cerium oxide used is from about 250 g/L to about 350 g/L. In another embodiment, MgO is used in an amount of from about 6% to about 8% (by weight) of the amount of the cerium oxide used in the PNA composition, and the amount of cerium oxide used is from about 150 g/L to about 250 g/L. In another embodiment, MgO is used in an amount of about 3% (by weight) of the amount of the cerium oxide used in the PNA composition, and the amount of cerium oxide used is about 350 g/L. In another embodiment, MgO is used in an amount of about 7% (by weight) of the amount of the cerium oxide used in the PNA composition, and the amount of cerium oxide used is about 150 g/L. In another embodiment, MgO is used in an amount of about 10.5 g/L, and the amount of cerium oxide used in the PNA composition is from about 150 g/L to about 350 g/L.

In one embodiment, $Mn_3O_4$ is used in an amount of from about 1% to about 30% (by weight) of the amount of the cerium oxide used in the PNA composition. In one embodiment, $Mn_3O_4$ is used in an amount of from about 1% to about 25% (by weight) of the amount of the cerium oxide used in the PNA composition. In one embodiment, $Mn_3O_4$ is used in an amount of from about 1% to about 20% (by weight) of the amount of the cerium oxide used in the PNA composition. In another embodiment, the amount of cerium oxide used in the PNA composition is from about 50 g/L to about 450 g/L. In another embodiment, the amount of cerium oxide used in the PNA composition is from about 100 g/L to about 400 g/L. In another embodiment, the amount of cerium oxide used in the PNA composition is from about 150 g/L to about 350 g/L. In another embodiment, $Mn_3O_4$ is used in an amount of from about 5% to about 20% (by weight) of the amount of the cerium oxide used in the PNA composition, and the amount of cerium oxide used is from about 150 g/L to about 350 g/L. In another embodiment, $Mn_3O_4$ is used in an amount of from about 5% to about 10% (by weight) of the amount of the cerium oxide used in the PNA composition, and the amount of cerium oxide used is from about 250 g/L to about 350 g/L. In another embodiment, $Mn_3O_4$ is used in an amount of from about 15% to about 20% (by weight) of the amount of the cerium oxide used in the PNA composition, and the amount of cerium oxide used is from about 150 g/L to about 250 g/L. In another embodiment, $Mn_3O_4$ is used in an amount of about 8% (by weight) of the amount of the cerium oxide used in the PNA composition, and the amount of cerium oxide used is about 350 g/L. In another embodiment, $Mn_3O_4$ is used in an amount of about 18.67% (by weight) of the amount of the cerium oxide used in the PNA composition, and the amount of cerium oxide used is about 150 g/L. In another embodiment, $Mn_3O_4$ is used in an amount of about 28 g/L, and the amount of cerium oxide used in the PNA composition is from about 150 g/L to about 350 g/L.

In one embodiment, calcium oxide is used in an amount of from about 1% to about 20% (by weight) of the amount of the cerium oxide used in the PNA composition. In one embodiment, calcium oxide is used in an amount of from about 1% to about 15% (by weight) of the amount of the cerium oxide used in the PNA composition. In one embodiment, calcium oxide is used in an amount of from about 1% to about 10% (by weight) of the amount of the cerium oxide used in the PNA composition. In another embodiment, the amount of cerium oxide used in the PNA composition is from about 50 g/L to about 450 g/L. In another embodiment, the amount of cerium oxide used in the PNA composition is from about 100 g/L to about 400 g/L. In another embodiment, the amount of cerium oxide used in the PNA composition is from about 150 g/L to about 350 g/L. In another embodiment, calcium oxide is used in an amount of from about 2% to about 8% (by weight) of the amount of the cerium oxide used in the PNA composition, and the amount of cerium oxide used is from about 150 g/L to about 350 g/L. In another embodiment, calcium oxide is used in an amount of from about 2% to about 4% (by weight) of the amount of the cerium oxide used in the PNA composition, and the amount of cerium oxide used in the PNA composition is from about 250 g/L to about 350 g/L. In another embodiment, calcium oxide is used in an amount of from about 6% to about 8% (by weight) of the amount of the cerium oxide used in the PNA composition, and the amount of cerium oxide used is from about 150 g/L to about 250 g/L. In another embodiment, calcium oxide is used in an amount of about 3% (by weight) of the amount of the cerium oxide used in the PNA composition, and the amount of cerium oxide used is about 350 g/L. In another embodiment, calcium oxide is used in an amount of about 7% (by weight) of the amount of the cerium oxide used in the PNA composition, and the amount of cerium oxide used is about 150 g/L. In another embodiment, calcium oxide is used in an amount of about 10.5 g/L, and the amount of cerium oxide used in the PNA composition is from about 150 g/L to about 350 g/L.

In one embodiment, MgO is used in an amount of about 10.5 g/L, $Mn_3O_4$ is used in an amount of about 28 g/L, calcium oxide is used in an amount of about 10.5 g/L, and the amount of cerium oxide used in the PNA composition is from about 150 g/L to about 350 g/L.

The amount of cerium oxide can correspond to the total amount of cerium oxide used to form the alkali oxide or alkaline earth oxide/cerium oxide; PGM/cerium oxide (including if NNm or NNiM particles are employed); the alkali oxide or alkaline earth oxide/cerium oxide and PGM/cerium oxide; the alkali oxide or alkaline earth oxide/cerium oxide and other alkali oxide(s) or alkaline earth oxide(s)/cerium oxide; or the alkali oxide or alkaline earth oxide/cerium oxide, other alkali oxide(s) or alkaline earth oxide(s)/cerium oxide, and PGM/cerium oxide.

PNA Material with PGM Compositions

In some embodiments, the PNA material is loaded with about 1 g/L to about 20 g/L of PGM. In another embodiment, the PNA material is loaded with about 1 g/L to about 15 g/L of PGM. In another embodiment, the PNA material is loaded with about 6.0 g/L and less of PGM. In another embodiment, the PNA material is loaded with about 5.0 g/L and less of PGM. In another embodiment, the PNA material is loaded with about 4.0 g/L and less of PGM. In another embodiment, the PNA material is loaded with about 3.0 g/L and less of PGM. In another embodiment, the PNA material is loaded with about 2 g/L to about 4 g/L Pd. In another embodiment, the PNA material is loaded with about 3 g/L Pd. In another embodiment, the PNA material is loaded with about 3 g/L to about 15 g/L Ru. In another embodiment, the PNA material is loaded with about 5 g/L to about 6 g/L Ru.

The PNA material can include support particles impregnated with PGM. In some embodiments, PGM may be added to support particles using wet chemistry techniques. In some embodiments, PGM may be added to support particles using incipient wetness. In some embodiments, PGM may be added to support particles using plasma based methods such as nano-on-nano to form PNA composite nanoparticles. In some embodiments, these PNA composite nanoparticles are added to carrier particles to form NNm PNA particles or are embedded within carrier particles to form NNiM PNA particles. As such, the PGM on support particles can include micro-PGM on micron support particles, nano-PGM on micron support particles, PNA nano-on-nano particles, PNA NNm particles, PNA NNiM particles, or PNA hybrid NNm/wet-chemistry particles described above. In some embodiments, the micron-sized particles of the PGM NNm particles can be the micron-sized supports impregnated with the alkali oxides or alkaline earth oxides. In some embodiments, the micron-sized particles of the PGM NNm particles can be impregnated with alkali oxides or alkaline earth oxides. In some embodiments, the alkali oxides or alkaline earth oxides and PGM are on the same support particle. In other embodiments, the alkali oxides or alkaline earth oxides and PGM are on different support particles.

In some embodiments, the support particles of the PNA material may contain platinum. In some embodiments, the support particles of the PNA material may contain rhodium. In some embodiments, the support particles of the PNA material may contain palladium. In some embodiments, the support particles of the PNA material may contain ruthenium. In some embodiments, the support particles of the PNA material may contain a mixture of platinum and palladium. For example, the support particles of the PNA material may contain a mixture of 2:1 to 100:1 platinum to palladium. In some embodiments, the support particles of the PNA material may contain a mixture of 2:1 to 75:1 platinum to palladium. In some embodiments, the support particles of the PNA material may contain a mixture of 2:1 to 50:1 platinum to palladium. In some embodiments, the support particles of the PNA material may contain a mixture of 2:1 to 25:1 platinum to palladium. In some embodiments, the support particles of the PNA material may contain a mixture of 2:1 to 15:1 platinum to palladium. In some embodiments, the support particles of the PNA material may contain a mixture of 2:1 to 10:1 platinum to palladium. In some embodiments, the support particles of the PNA material may contain a mixture of 2:1 platinum to palladium, or approximately 2:1 platinum to palladium. In some embodiments, the support particles may contain a mixture of 2:1 to 20:1 platinum to palladium. In some embodiments, the support particles may contain a mixture of 5:1 to 15:1 platinum to palladium. In some embodiments, the support particles may contain a mixture of 8:1 to 12:1 platinum to palladium. In some embodiments, the support particles may contain a mixture of 10:1 platinum to palladium, or approximately 10:1 platinum to palladium. In some embodiments, the support particles may contain a mixture of 2:1 to 8:1 platinum to palladium. In some embodiments, the support particles may contain a mixture of 3:1 to 5:1 platinum to palladium. In some embodiments, the support particles may contain a mixture of 4:1 platinum to palladium, or approximately 4:1 platinum to palladium.

In some embodiments, the PNA material can include NNm™ particles comprising composite PNA nanoparticles. In other embodiments, the PNA material can include NNiM particle comprising composite PNA nanoparticles. The PGM NNm's micro-sized components can further be impregnated with alkali oxides or alkaline earth oxides to form a PNA material. The micro-sized component of the PGM NNm can be cerium oxide. As described above, in all embodiments, the cerium oxide can include zirconium oxide, lanthanum, lanthanum oxide, yttrium oxide, or a combination thereof. In some embodiments, the cerium oxide includes 86 wt % cerium oxide, 10 wt % zirconium oxide, and 4 wt % lanthanum and/or lanthanum oxide. In addition, micro-sized cerium oxide that has been impregnated with alkali oxides or alkaline earth oxides can be used as the micro-sized component of the NNm and NNiM particles.

The following discussion will be exemplified using NNm™ particles, but applies equally well to NNiM particles. The composite nanoparticle may include one or more nanoparticles attached to a support nanoparticle to form a "nano-on-nano" composite nanoparticle that may trap or store $NO_x$ gases. Platinum group metals may be used to prepare the composite nanoparticle. In certain embodiments, the composite nanoparticle may contain palladium. In other embodiments, the composite nanoparticle may contain ruthenium. A suitable support nanoparticle for the composite nanoparticles includes, but is not limited to, nano-sized cerium oxide (which can include zirconium oxide, lanthanum, lanthanum oxide, yttrium oxide, or a combination thereof).

Each composite nanoparticle may be supported on a single support nanoparticle or each support nanoparticle may include one or more composite nanoparticles. The composite nanoparticles on the support nanoparticle may include palladium, ruthenium, or a mixture thereof. In some embodiments, palladium is used alone. In other embodiments, ruthenium may be used alone. In further embodiments, platinum may be used in combination with palladium. For example, the support nanoparticle may contain a mixture of 2:1 to 100:1 platinum to palladium. In some embodiments, the support nanoparticle may contain a mixture of 2:1 to 75:1 platinum to palladium. In some embodiments, the support nanoparticle may contain a mixture of 2:1 to 50:1 platinum to palladium. In some embodiments, the support nanoparticle may contain a mixture of 2:1 to 25:1 platinum to palladium. In some embodiments, the support nanoparticle may contain a mixture of 2:1 to 15:1 platinum to palladium. In some embodiments, the support nanoparticle may contain a mixture of 2:1 to 10:1 platinum to palladium. In some embodiments, the support nanoparticle may contain a mixture of 2:1 platinum to palladium, or approximately 2:1 platinum to palladium. In some embodiments, the support particles may contain a mixture of 2:1 to 20:1 platinum to palladium. In some embodiments, the support particles may contain a mixture of 5:1 to 15:1 platinum to palladium. In some embodiments, the support particles may contain a mixture of 8:1 to 12:1 platinum to palladium. In some embodiments, the support particles may contain a mixture of 10:1 platinum to palladium, or approximately 10:1 platinum to palladium. In some embodiments, the support particles may contain a mixture of 2:1 to 8:1 platinum to palladium. In some embodiments, the support particles may contain a mixture of 3:1 to 5:1 platinum to palladium. In some embodiments, the support particles may contain a mixture of 4:1 platinum to palladium, or approximately 4:1 platinum to palladium.

The composite nanoparticles for use as components of the PNA material can be produced by plasma-based methods as described above. Platinum group metals (such as ruthenium, palladium, or a mixture thereof) can be introduced into the plasma reactor as a fluidized powder in a carrier gas stream. The resulting nano-on-nano particles have similar properties (i.e., diameter or grain size) to that of the oxidative nano-on-nano particles and reductive nano-on-nano particles. In one embodiment, for $NO_x$ adsorbing composite nanoparticles, ruthenium, palladium, or a mixture of palladium and platinum, can be deposited on nano-sized cerium oxide.

To prepare a PNA material that comprises a nano-on-nano-on-micro particle (NNm), a dispersion of the composite nanoparticles may be applied to porous, micron-sized cerium oxide or aluminum oxide. After the composite nanoparticles are applied to the micron-sized cerium oxide, the micron-sized cerium oxide may be impregnated with alkali oxide or alkaline earth oxide nanoparticles. In some embodiments, the NNm particles are combined with separate alkali oxides or alkaline earth oxides on cerium oxide supports to form the PNA material. The micron-sized cerium oxide may contain zirconium oxide. In some embodiments, the micron-sized cerium oxide is substantially free of zirconium oxide. In other embodiments, the micron-sized cerium oxide contains up to 100% zirconium oxide. In one embodiment, the nanoparticle is a PGM. In one embodiment, the PGM is platinum, palladium, or a mixture thereof. In another embodiment, the PGM is ruthenium. In other embodiments, the nanoparticle is a non-PGM. In some embodiments, the non-PGM is tungsten, molybdenum, niobium, manganese, or chromium.

The micron-sized carrier particles, impregnated with the composite nanoparticles may be prepared as described above for the Nano-on-Nano-on-Micro particles.

In some embodiments, the PNA material comprises multiple types of particles comprising micron-sized cerium oxide particles impregnated with alkali oxide or alkaline earth oxide particles, and separate NNm or NNiM particles comprising ruthenium, platinum, palladium, or mixtures thereof.

In some instances, the weight ratio of nano-sized Ru, Pt, Pd, or Pt/Pd:nano-sized cerium oxide is about 1%:99% to about 40%:60%. In one embodiment, the weight ratio of nano-sized Ru, Pt, Pd, or Pt/Pd:nano-sized cerium oxide is about 10%:90%. In addition, the Ru, Pt, Pd, or Pt/Pd can include their oxides, such as ruthenium oxide.

The PNA NNm™ particles may contain from about 0.1% to 6% Pd, Ru, or ruthenium oxide by weight, or in another embodiment from about 0.5% to 3.5% by weight, or in another embodiment, about 1% to about 2.5% by weight, or in another embodiment about 2% to about 3% by weight, or in another embodiment, about 2.5% by weight, of the total mass of the NNm™ particle. The NNm™ particles can then be used for formulations for coating substrates, where the coated substrates may be used in catalytic converters.

In further embodiments, the NNm™ particles may be comprised of metals such as W, Mo, Nb, Mn, or Cr produced using the plasma-based methods described above.

Substrates

The initial substrate is preferably a catalytic converter substrate that demonstrates good thermal stability, including resistance to thermal shock, and to which the described washcoats can be affixed in a stable manner. Suitable substrates include, but are not limited to, substrates formed from cordierite or other ceramic materials, and substrates formed from metal. The substrate may be a honeycomb structure. The substrates may include a grid array structure or coiled foil structure, which provide numerous channels and result in a high surface area. The high surface area of the coated substrate with its applied washcoats in the catalytic converter provides for effective treatment of the exhaust gas flowing through the catalytic converter. A corner fill layer, or a buffer layer or adhesion layer such as a thin Boehmite layer, may be applied to the substrate prior to applying any of the active washcoat layers, but is not required.

Washcoat Compositions and Layers Using PNA Material: Application to Substrates

Washcoat formulations comprising the PNA material may be used to provide one or more layers on substrates used for catalysis, such as a catalytic converter substrate. Additional washcoats can also be used for improved performance. In some embodiments, the washcoat formulations may include two or more different washcoats formulations that allow for the separation of one or more washcoat layers containing high concentrations of zeolite particles from one or more washcoat layers containing platinum group metal catalyst, such as the NNm particles described above, on a catalytic converter substrate. The formulations may be used to form washcoat layers and catalytic converter substrates that include reduced amounts of platinum group metals and offer better performance when compared to previous washcoat layers and formulations and catalytic converter substrates.

Many of the washcoat compositions disclosed herein can include boehmite. Boehmite can be added to the washcoat compositions as a binder and is converted to aluminum oxide upon calcination.

Some embodiments of washcoat formulations may be formulated to form one or more of the following basic washcoat layer configurations:
Substrate-Catalytic Layer-PNA Layer-Zeolite Layer (S-C-P-Z)
Substrate-Catalytic Layer-Zeolite Layer-PNA Layer (S-C-Z-P)
Substrate-PNA Layer-Zeolite Layer-Catalytic Layer (S-P-Z-C)
Substrate-PNA Layer-Catalytic Layer-Zeolite Layer (S-P-C-Z)
Substrate-Zeolite Layer-PNA Layer-Catalytic Layer (S-Z-P-C)
Substrate-Zeolite Layer-Catalytic Layer-PNA Layer (S-Z-C-P)
Substrate-Catalytic Layer-(PNA/Zeolite Layer) (S-C-PZ)
Substrate-(PNA/Zeolite Layer)-Catalytic Layer (S-PZ-C)
Substrate-(PNA/Zeolite/Catalytic Layer) (S-PZC)
Substrate-PNA Layer (S-P)

Any of the above configurations can contain a Corner Fill Layer (F) that may be used to fill corners of the substrate prior to deposition of additional layers. In addition, any of the above configurations can have more than one of any layer. In addition, any of the above configurations may remove one or more than one layer. In the configurations above: 1) the Substrate (S) may be any substrate suitable for use in a catalytic converter, 2) the Zeolite Layer (Z) is a washcoat layer that includes zeolite particles, 3) the Catalytic Layer (C) is a washcoat layer that includes catalytically active particles (there can be more than one catalytic layer such as a reductive catalytic layer and an oxidative catalytic layer), 4) the PNA Layer (P) is a washcoat layer that includes a $NO_x$ adsorber, 5) the PNA/Zeolite Layer (PZ) is a washcoat layer that includes a $NO_x$ adsorber and zeolites and 6) the PNA/Zeolite/Catalytic Layer (PZC) which is a washcoat layer that includes an $NO_x$ adsorber, zeolites, and catalytically active particles.

It should be noted that, in some embodiments, additional washcoat layers can be disposed under, over, on top of, or between any of the washcoat layers indicated in these basic configurations; that is, further layers can be present on the catalytic converter substrate in addition to the ones listed in the configurations above. When a layer (layer Y) is said to be formed "on top of" another layer (layer X), either no additional layers, or any number of additional layers (layer(s) A, B, C, etc.) can be formed between the two layers X and Y. For example, if layer Y is said to be formed on top of layer X, this can refer to a situation where layer X can be formed, then layer A can be formed immediately atop layer X, then layer B can be formed immediately atop layer A, then layer Y can be formed immediately atop layer B. Alternatively, if layer Y is said to be formed on top of layer X, this can refer to a situation where layer Y can be deposited directly on top of layer X with no intervening layers between X and Y. For the specific situation where no intervening layers are present between layer X and layer Y, layer Y is said to be formed immediately atop layer X, or equivalently, layer Y is said to be formed directly on top of layer X.

In other embodiments, additional washcoat layers are not applied; that is, the washcoats listed in the configurations above are the only washcoats present on the catalytic converter substrate. In other embodiments, the washcoats listed in the configurations above might have a layer not present (that is, a layer may be omitted).

In the following washcoat descriptions, the composite nanoparticles are described as a component of the NNm™ particles for illustrative purposes only. However, the composite nanoparticles could equally well be a component of the NNiM particles. In the following descriptions, the percentages of the components of the washcoat compositions are provided in terms of the amount of solids present in the washcoat compositions, as the washcoat compositions can be provided in an aqueous suspension or, in some instances, as dry powder. The "layers" refers to the corresponding washcoat composition after it has been applied to the substrate, dried, and calcined.

General Washcoat Preparation Procedure

Washcoats are prepared by suspending the designated materials in an aqueous solution, adjusting the pH to between about 2 and about 7, to between about 3 and about 5, or to about 4, and adjusting the viscosity, if necessary, using cellulose, cornstarch, or other thickeners, to a value between about 300 cP to about 1200 cP.

The washcoat is applied to the substrate (which may already have one or more previously-applied washcoats) by coating the substrate with the aqueous solution, blowing excess washcoat off of the substrate (and optionally collecting and recycling the excess washcoat blown off of the substrate), drying the substrate, and calcining the substrate.

General Drying and Calcining of Washcoats

Once each washcoat is applied to the substrate (which may or may not have already been coated with previous substrates), excess washcoat is blown off and the residue collected and recycled. The washcoat may then be dried. Drying of the washcoats can be performed at room temperature or elevated temperature (for example, from about 30° C. to about 95° C., preferably about 60° C. to about 70° C.), at atmospheric pressure or at reduced pressure (for example, from about 1 pascal to about 90,000 pascal, or from about 7.5 mTorr to about 675 Torr), in ambient atmosphere or under an inert atmosphere (such as nitrogen or argon), and with or without passing a stream of gas over the substrate (for example, dry air, dry nitrogen gas or dry argon gas). In some embodiments, the drying process is a hot-drying process. A hot drying process includes any way to remove the solvent at a temperature greater than room temperature, but at a temperature below a standard calcining temperature. In some embodiments, the drying process may be a flash drying process, involving the rapid evaporation of moisture from the substrate via a sudden reduction in pressure or by placing the substrate in an updraft of warm air. It is contemplated that other drying processes may also be used.

After drying the washcoat onto the substrate, the washcoat may then be calcined onto the substrate. Calcining takes place at elevated temperatures, such as from 400° C. to about 700° C., preferably about 500° C. to about 600° C., more preferably at about 540° C. to about 560° C. or at about 550° C. Calcining can take place at atmospheric pressure or at reduced pressure (for example, from about 1 pascal to about 90,000 pascal, or about 7.5 mTorr to about 675 Torr), in ambient atmosphere or under an inert atmosphere (such as nitrogen or argon), and with or without passing a stream of gas over the substrate (for example, dry air, dry nitrogen gas, or dry argon gas).

Corner-Fill Washcoat Compositions and Layers

The corner fill washcoat layer (F) may be a relatively inexpensive layer, which can be applied to the substrate to fill up the "corners" and other areas of the substrate where exhaust gases are unlikely to penetrate in significant amounts. Preferably, this layer does not include any PGM, zeolites, or PNA material. The corner fill layer is schematically diagrammed in FIG. 4, which shows a single rectangular channel 400 in a substrate coated in the S-F-C-P-Z configuration. The wall 410 of the substrate channel has been coated with corner-fill washcoat layer 420, then catalyst-containing washcoat layer 430, then PNA material-containing washcoat layer 440, then zeolite particle-containing washcoat layer 450. When the coated substrate is operating in the catalytic converter, exhaust gases pass through the lumen 460 of the channel. The corners of the channel (one of which, 470, is indicated by an arrow) have a relatively thick coating, and exhaust gases will be less likely to contact those regions. In, for example, the S-C—P-Z configuration, the layers 420, 430, and 440 would be a single layer, the catalyst-containing washcoat layer, and significant amounts of expensive platinum group metal would be located in the corners (such as 470) where they are relatively inaccessible for catalysis. Thus, while the S—C—P-Z configuration can be used, it may not be as cost-effective. The corner fill washcoat layer may not provide an equivalent cost savings in the S-Z-P-C configuration, for example, as zeolites are relatively inexpensive.

While a rectangular shape is shown for illustration, an equivalent analysis holds for any substrate with polygonal-shaped channels, or any substrate with channels that are not essentially cylindrical. For substrates with essentially cylindrical channels, which by definition do not have corners, a corner-fill washcoat may not be necessary for economic reasons (although it may still be applied for other reasons, such as to adjust the diameter of the channels).

The corner-fill washcoat compositions may comprise aluminum oxide particles (i.e., alumina). Aluminum-oxide particles such as MI-386 material from Grace Davison, or the like, for example, can be used. The size of the aluminum oxide particles is generally above about 0.2 microns, preferably above about 1 micron. The solids content of the corner-fill washcoat include about 80% to about 98% by weight porous alumina (MI-386 or the like) and about 20% to about 2% boehmite, such as about 90% to 97% alumina and about 10% to 3% boehmite, or about 95% to 97% alumina and about 5% to about 3% boehmite, such as a corner-fill washcoat including about 97% porous alumina and about 3% boehmite.

In some embodiments, each of the aluminum oxide particles or substantially each of the aluminum oxide particles in the corner-fill washcoat composition have a diameter of approximately 0.2 microns to approximately 8 microns, such as about 4 microns to about 6 microns. In some embodiments, the aluminum oxide particles in the corner-fill washcoat composition have an average grain size of approximately 0.2 microns to approximately 8 microns, such as about 4 microns to about 6 microns. In some embodiments, at least about 75%, at least about 80%, at least about 90%, or at least about 95% of the aluminum oxide particles in the corner-fill washcoat composition have a particle size falling within the range of approximately 0.2 microns to approximately 8 microns, such as within the range of about 4 microns to about 6 microns. After a washcoat layer has been applied to a substrate, it may be dried, then calcined, onto the substrate. The corner-fill washcoat may be applied in a thickness of from about 30 g/l up to about 100 g/l; a typical value may be about 50 g/l.

Zeolite Washcoat Compositions and Zeolite Layers

Zeolite particles may be used to trap hazardous gases, such as hydrocarbons, carbon monoxide, and nitrogen oxides, during cold start of an internal combustion engine. The Zeolite Layer is a washcoat layer, deposited using a washcoat composition that includes a higher percentage of zeolite than the Catalytic layer. In some embodiments, the Zeolite Layer and washcoat includes no catalytically active particles.

In some embodiments, the zeolite layer and washcoat compositions comprise, consist essentially of, or consist of zeolite particles, boehmite particles, and metal-oxide particles. The metal-oxide particles are preferably porous. The metal-oxide particles may be aluminum-oxide particles (e.g., MI-386 from Grace Davison or the like). The aluminum-oxide particles may be porous. Different configurations of the weight concentrations of the zeolite particles, boehmite particles, and metal-oxide particles may be employed. In the following descriptions, the percentages of the components of the washcoat compositions are provided in terms of the amount of solids present in the washcoat compositions, as the washcoat compositions can be provided in an aqueous suspension or, in some instances, as dry powder. The zeolite layer refers to the zeolite washcoat composition after it has been applied to the substrate, dried, and calcined.

In some embodiments, the zeolite particles comprise at least 50%, comprise more than about 50%, or comprise about 50% to about 100% by weight of the combination of zeolite particles, boehmite particles, and metal-oxide particles in the zeolite washcoat composition or zeolite layer. In some embodiments, the zeolite particles make up approximately 60% to approximately 80%, for example, approximately 65% to approximately 70% or approximately 70% to approximately 80%, by weight of the combination of zeolite particles, boehmite particles, and metal-oxide particles in the zeolite particle-containing washcoat composition or zeolite layer. In some embodiments, the zeolite particles in the zeolite particle-containing washcoat composition or zeolite layer each have a diameter of approximately 0.2 microns to approximately 8 microns, such as about 4 microns to about 6 microns, prior to coating. In some embodiments, at least about 75%, at least about 80%, at least about 90%, or at least about 95% of the zeolite particles in the zeolite particle-containing washcoat composition or zeolite layer have a particle size falling with the range of approximately 0.2 microns to approximately 8 microns, such as within the range of about 4 microns to about 6 microns. In some embodiments, the boehmite particles make up approximately 2% to approximately 5% by weight of the combination of zeolite particles, boehmite particles, and metal-oxide particles in the zeolite particle-containing washcoat composition or zeolite layer. In some embodiments, the boehmite particles make up approximately 3% by weight of the combination of zeolite particles, boehmite particles, and metal-oxide particles in the zeolite particle-containing washcoat composition or zeolite layer. In some embodiments, the metal-oxide particles make up approximately 15% to approximately 38%, for example, approximately 15% to approximately 30%, approximately 17% to approximately 23% or approximately 17% to approximately 22%, by weight of the mixture of zeolite particles, metal-oxide particles, and boehmite particles in the zeolite particle-containing washcoat composition or zeolite layer. In some embodiments, the metal-oxide particles make up approximately 15% to approximately 23% by weight of the mixture of zeolite particles, metal-oxide particles, and boehmite particles in the zeolite particle-containing washcoat composition or zeolite layer. In some embodiments, the metal-oxide particles make up approximately 25% to approximately 35% by weight of the mixture of zeolite particles, metal-oxide particles, and boehmite particles in the zeolite particle-containing washcoat composition or zeolite layer. In some embodiments, the zeolite-particle containing washcoat composition or zeolite layer contains about 3% boehmite particles, about 67% zeolite particles, and about 30% porous aluminum-oxide particles.

In some embodiments, the zeolite particle-containing washcoat composition or zeolite layer does not comprise any platinum group metals. As discussed above, the six platinum group metals are ruthenium, rhodium, palladium, osmium, iridium, and platinum. In some embodiments, the zeolite particle-containing washcoat composition or zeolite layer is characterized by a substantial absence of any platinum group metals. In some embodiments, the zeolite particle-containing washcoat composition or zeolite layer is 100% free of any platinum group metals. In some embodiments, the zeolite particle-containing washcoat composition or zeolite layer is approximately 100% free of any platinum group metals. In some embodiments, the zeolite particle-containing washcoat composition or zeolite layer does not comprise any catalytic particles. In some embodiments, the zeolite particle-containing washcoat composition or zeolite layer is characterized by a substantial absence of any catalytic particles. In some embodiments, the zeolite particle-containing washcoat composition or zeolite layer is 100% free of any catalytic particles. In some embodiments, the zeolite particle-containing washcoat composition or zeolite layer is approximately 100% free of any catalytic particles.

In some embodiments, the zeolite particle-containing washcoat composition or zeolite layer may include by weight about 2% to about 5% boehmite particles, about 60% to about 80% zeolite particles, and the rest porous aluminum-oxide particles (i.e., about 15% to about 38%). In one embodiment, the zeolite particle-containing washcoat composition or zeolite layer includes by weight about 2% to about 5% boehmite particles, about 75% to about 80% zeolite particles, and the rest porous aluminum-oxide particles (i.e., about 15% to about 23%). In another embodiments, the zeolite particle-containing washcoat composition or zeolite layer includes by weight about 2% to about 5% boehmite particles, about 65% to about 70% zeolite particles, and the rest porous aluminum-oxide particles (i.e., about 25% to about 33%). In some embodiment, the zeolite-particle containing washcoat composition or zeolite layer contains about 3% boehmite particles, about 67% zeolite particles, and about 30% porous aluminum-oxide particles. In some embodiments, the zeolite particle-containing washcoat composition or zeolite layer does not contain any catalytic material. In some embodiments, the zeolite particle-containing washcoat composition or zeolite layer does not contain any platinum group metals.

In some embodiments, the zeolite particle-containing washcoat composition or zeolite layer may include PNA material.

In some embodiments, the zeolite particle-containing washcoat composition is mixed with water and acid, such as acetic acid, prior to coating of a substrate with the zeolite particle-containing washcoat composition, thereby forming an aqueous mixture of the zeolite particle-containing washcoat composition, water, and acid. This aqueous mixture of the zeolite particle-containing washcoat composition, water, and acid may then be applied to the substrate (where the substrate may or may not already have other washcoat layers applied to it). In some embodiments, the pH of this aqueous mixture may be adjusted to a pH level of about 2 to about 7 prior to it being applied to the substrate. In some embodiments, the pH of this aqueous mixture may be adjusted to a pH level of about 4 prior to it being applied to the substrate.

In some embodiments, the zeolite layer (that is, the zeolite particle-containing washcoat composition applied to the substrate, or the zeolite-particle containing washcoat layer) has a thickness of approximately 25 g/l to approximately 90 g/l (grams/liter), approximately 50 g/l to approximately 80 g/l, or approximately 70 to approximately 90 g/l. In some embodiments, the zeolite layer has a thickness of approximately 50 g/l, 60 g/l, 70 g/l, 80 g/l, or 90 g/l. In some embodiments, the zeolite layer has a thickness of approximately 80 g/l.

In some embodiments, where the zeolite layer is applied on top of the catalyst-containing layer (i.e., the catalyst-containing layer is closer to the substrate than the zeolite layer), the zeolite layer has a thickness of about 70 g/l to about 90 g/l.

In some embodiments, where the zeolite layer is applied under the catalyst-containing layer (i.e., the zeolite layer is closer to the substrate than the catalyst-containing layer), the zeolite layer has a thickness of about 50 g/l to about 80 g/l.

Catalytically Active Particle-Containing Washcoat Compositions and Catalytically Active Layers The catalyst-containing washcoat composition and the catalyst layer on the substrate, contains catalytically active material and can be formed in a variety of ways. In addition, there can be more than one catalyst layer on the substrate. For example, there can be an oxidative catalyst layer and a reductive catalyst layer. Examples of catalytically active particle washcoats and additional washcoats are disclosed in U.S. Provisional Application 61/894,346, which has been incorporated by reference in its entirety.

Preferred catalysts are platinum group metals (PGMs). Platinum group metals are the metals platinum, palladium, rhodium, ruthenium, osmium, and iridium. The individual metals can be used as catalysts, and various combinations of metals can also be used. For example, the NNm micron-sized particles described above are preferably used. The catalytically active particles may have composite nano-particles, where the composite nanoparticles have a population of support nano-particles bearing catalytic nano-particles comprising platinum and a population of support nano-particles bearing catalytic nano-particles comprising palladium. The micron-sized support particles bearing composite particles may include support nano-particles bearing catalytic nano-particles, where the catalytic nanoparticles include a platinum/palladium alloy, such as a 2:1 Pt/Pd ratio (weight/weight). In some embodiments, the micron-sized carrier particles are alumina (aluminum oxide) particles on which a plurality of composite nano-particles are attached, the composite nano-particles comprising a support nano-particle and a catalytic nano-particle. In one embodiment, MI-386 alumina powder from Grace Davison is used as the micron-sized alumina particles.

In the following descriptions, the percentages of the components of the washcoat compositions are provided in terms of the amount of solids present in the washcoat compositions, as the washcoat compositions can be provided in an aqueous suspension or, in some instances, as dry powder. The catalyst layer (or catalyst-containing layer) refers to the catalyst-containing washcoat composition after it has been applied to the substrate, dried, and calcined.

The previously described zeolite-particle containing washcoat compositions and zeolite-particle containing layers are preferably free of, or in an alternative embodiment, substantially free of, catalytic particles or platinum group metals. It is preferred that the catalyst-containing washcoat compositions and layers are free of, or substantially free of, zeolites. However, in some embodiments, the catalyst-containing washcoat compositions and catalyst layers can contain an amount of zeolites, such as up to about 20%, up to about 10%, or up to about 5% of the total solids in the catalyst-containing washcoat compositions or catalyst-containing layers.

In some embodiments, the catalyst-containing washcoat composition further includes "spacer" or "filler" particles, where the spacer particles may be ceramic, metal oxide, or metallic particles. In some embodiments, the spacer particles may be silica, alumina, boehmite, or zeolite particles, or any mixture of the foregoing, such as boehmite particles, silica particles and zeolite particles in any proportion.

In some embodiments where the catalyst-containing washcoat composition and catalyst layers are substantially free of zeolites and PNA material, the catalyst-containing washcoat composition comprises, consists essentially of, or consists of silica particles, alumina/sealant particles with or without BaO, boehmite particles, and NNm particles. In some embodiments, the NNm particles make up between approximately 35% to approximately 95% by weight of the combination of the NNm particles, the boehmite particles, and the alumina/sealant and cerium oxide particles in the catalyst-containing washcoat composition or catalyst-containing layer. In some embodiments, the NNm particles make up between approximately 40% to approximately 92% by weight of the combination of the NNm particles, the boehmite particles, and the alumina/sealant and ceria particles in the catalyst-containing washcoat composition or catalyst-containing layer. In some embodiments, the NNm particles make up between approximately 60% to approximately 95% by weight of the combination of the NNm particles, the boehmite particles, and the alumina/sealant and ceria particles in the catalyst-containing washcoat composition or catalyst-containing layer. In some embodiments, the NNm particles make up between approximately 80% to approximately 95% by weight of the combination of the NNm particles, the boehmite particles, and the alumina/sealant and ceria particles in the catalyst-containing washcoat composition or catalyst-containing layer. In some embodiments, the NNm particles make up between approximately 80% to approximately 92% by weight of the combination of the NNm particles, the boehmite particles, and the alumina/sealant and ceria particles in the catalyst-containing washcoat composition or catalyst-containing layer. In some embodiments, the NNm particles make up approximately 92% by weight of the combination of the NNm particles, the boehmite particles, and the alumina/sealant and ceria particles in the catalyst-containing washcoat composition or catalyst-containing layer.

In some embodiments, the NNm™ particles make up between approximately 35% to approximately 75% by weight of the combination of the NNm particles, the boehmite particles, and the alumina/sealant and ceria particles. In some embodiments, the NNm™ particles make up between approximately 40% to approximately 60% by weight of the combination of the NNm particles, the boehmite particles, and the alumina/sealant and ceria particles. In some embodiments, the NNm™ particles make up between approximately 45% to approximately 55% by weight of the combination of the NNm particles, the boehmite particles, and the alumina/sealant and ceria particles. In some embodiments, the NNm™ particles make up about 50% by weight of the combination of the NNm particles, the boehmite particles, and the alumina/sealant and ceria particles.

In some embodiments, the percentage of platinum group metal in the catalyst-containing washcoat composition and catalyst layers ranges from between about 0.25% to about 4%, about 0.5% to about 4%, about 0.5% to about 3%, about 1% to about 3%, about 1% to about 2%, about 1% to about 1.5%, about 1.5% to about 3%, about 1.5% to about 2.5%, about 1.5% to about 2%, about 2% to about 3%, about 2.5% to about 3%, or about 2% to about 2.5%. In some embodiments, the percentage of platinum group metal in the catalyst-containing washcoat composition and catalyst layers is about 0.5%, about 0.75%, about 1%, about 1.25%, about 1.5%, about 1.75%, about 2%, about 2.25%, about 2.5%, about 2.75%, or about 3%. In some embodiments, the percentage of platinum group metal in the catalyst-containing washcoat composition and catalyst layers is about 2.3%.

In some embodiments, the NNm™ particles make up between approximately 50% to approximately 95% by weight of the combination of the NNm particles, the boehmite particles, and the alumina/sealant and ceria particles. In some embodiments, the NNm™ particles make up between approximately 60% to approximately 90% by weight of the combination of the NNm particles, the boehmite particles, and the alumina/sealant and ceria particles. In some embodiments, the NNm™ particles make up between approximately 75% to approximately 85% by weight of the combination of the NNm particles, the boehmite particles, and the alumina/sealant and ceria particles. In some embodiments, the NNm™ particles make up about 80% by weight of the combination of the NNm particles, the boehmite particles, and the alumina/sealant and ceria particles. In some embodiments, the catalytically active particle in the NNm™ particles is rhodium at a loading of about 0.3-2 wt % in the NNm™ particles. In some embodiments, the catalytically active particle in the NNm™ particles is rhodium at a loading of about 0.3-1 wt % in the NNm™ particles. In some embodiments, the catalytically active particle in the NNm™ particles is rhodium at a loading of about 0.3-0.5 wt % in the NNm™ particles. In one embodiment, the catalytically active particle in the NNm™ particles is rhodium at a loading of about 0.3 wt % in the NNm™ particles. In another embodiment, the catalytically active particle in the NNm™ particles is rhodium at a loading of about 0.4 wt % in the NNm™ particles. Other loadings described previously may also be used.

In some embodiments, the silica particles make up approximately 20% or less by weight of the combination of the NNm particles, the boehmite particles, and the alumina/sealant and ceria particles in the catalyst-containing washcoat composition or catalyst-containing layer; or the silica particles make up approximately 10% or less by weight of the combination of the NNm particles, the boehmite particles, and the alumina/sealant and ceria particles in the catalyst-containing washcoat composition or catalyst-containing layer; in further embodiments, the silica particles make up approximately 5% or less by weight of the combination of the NNm particles, the boehmite particles, and the alumina/sealant and ceria particles in the catalyst-containing washcoat composition or catalyst-containing layer. In various embodiments, the silica particles make up approximately 1% to approximately 20%, approximately 1% to approximately 10%, approximately 1% to approximately 5%, about 20%, about 10%, about 5%, or about 1% by weight of the combination of the NNm particles, the boehmite particles, and the alumina/sealant and ceria particles in the catalyst-containing washcoat composition or catalyst-containing layer.

In some embodiments, the boehmite particles make up approximately 2% to approximately 5% by weight of the combination of the NNm particles, the boehmite particles, and the alumina/sealant and ceria particles in the catalyst-containing washcoat composition or catalyst-containing layer. In some embodiments, the boehmite particles make up approximately 3% by weight of the combination of the NNm particles, the boehmite particles, and the alumina/sealant and ceria particles in the catalyst-containing washcoat composition or catalyst-containing layer.

In some embodiments, the alumina filler/sealant particles make up between approximately 30% to approximately 70% by weight of the combination of the NNm particles, the boehmite particles, and the alumina/sealant and ceria particles. In some embodiments, the alumina filler/sealant particles make up between approximately 40% to approximately 60% by weight of the combination of the NNm particles, the boehmite particles, and the alumina/sealant and ceria particles. In some embodiments, the alumina filler/sealant particles make up between approximately 45% to approximately 55% by weight of the combination of the NNm particles, the boehmite particles, and the alumina/sealant and ceria particles. In some embodiments, the alumina filler/sealant particles make up about 50% by weight of the combination of the NNm particles, the boehmite particles, and the alumina/sealant and ceria particles. The alumina filler/sealant particles may be porous lanthanum-stabilized alumina, for example MI-386. In some embodiments, a different filler particle may be used in place of some or all of the alumina particles.

In some embodiments, the alumina filler/sealant particles make up between approximately 5% to approximately 40% by weight of the combination of the NNm particles, the boehmite particles, and the alumina/sealant and ceria particles. In some embodiments, the alumina filler/sealant particles make up between approximately 10% to approximately 30% by weight of the combination of the NNm particles, the boehmite particles, and the alumina/sealant and ceria particles. In some embodiments, the alumina filler/sealant particles make up between approximately 15% to approximately 20% by weight of the combination of the NNm particles, the boehmite particles, and the alumina/sealant and ceria particles. In some embodiments, the alumina filler/sealant particles make up about 17% by weight of the combination of the NNm particles, the boehmite particles, and the alumina/sealant and ceria particles. The alumina filler/sealant particles may be porous lanthanum-stabilized alumina, for example MI-386. In some embodiments, a different filler particle may be used in place of some or all of the alumina particles.

In the washcoat, from 0 to 100% of the alumina filler/sealant particles may be alumina impregnated with nano-sized BaO particles, alumina mixed with micron-sized BaO particles, or both alumina impregnated with nano-sized BaO particles and admixed with micron-sized BaO particles. In some embodiments, from 1 wt %-100 wt %, from 20 wt %-80 wt %, or from 30 wt %-60 wt % micron-sized BaO may be used in place of non-BaO-impregnated alumina. In some embodiments, a 50:50 mixture of regular MI-386 and BaO-impregnated MI-386 (impregnated with nano-sized BaO particles), or a 50:50 mixture of MI-386 and micron-sized BaO particles, or a mixture of MI-386 impregnated with nano-sized BaO particles and admixed with micron-sized BaO particles, may be used for this component of the washcoat. In some embodiments, the alumina can comprise from 5% to 30% nano-BaO-impregnated alumina and from 70% to 95% non-BaO-impregnated alumina. In some embodiments, the alumina can comprise from 5% to 20% nano-BaO-impregnated alumina and from 80% to 95% non-BaO-impregnated alumina. In some embodiments, the alumina can comprise from 8% to 16% nano-BaO-impregnated alumina and from 84% to 92% non-BaO-impregnated alumina. In one embodiment, 12%, or about 12%, nano-BaO-impregnated alumina is mixed with 88%, or about 88%, alumina without impregnated BaO. In one embodiment, 15%, or about 15%, nano-BaO-impregnated alumina is mixed with 85%, or about 85%, alumina without impregnated BaO.

In some embodiments, the alumina can comprise from 5% to 30% micron-sized BaO and from 70% to 95% non-BaO-impregnated alumina. In some embodiments, the alumina can comprise from 5% to 20% micron-sized BaO and from 80% to 95% non-BaO-impregnated alumina. In some embodiments, the alumina can comprise from 8% to 16% micron-sized-BaO and from 84% to 92% non-BaO-impregnated alumina. In one embodiment, 12%, or about 12%, micron-sized BaO is mixed with 88%, or about 88%, alumina without impregnated BaO. In one embodiment, 15%, or about 15%, micron-sized BaO is mixed with 85%, or about 85%, alumina without impregnated BaO.

The ranges for the nano-sized BaO-alumina ratio, that is, the amount of nano-BaO impregnated into the alumina, include 1-25% BaO to 75% to 99% aluminum oxide micron support; 3-20% BaO to 80% to 97% aluminum oxide micron support; 5%-15% BaO to 85% to 95% aluminum oxide micron support; and about 15% BaO to about 85% aluminum oxide micron support, expressed as weight percentages. In one embodiment, the nano-BaO-impregnated aluminum oxide comprises 15%, or about 15%, nano-BaO by weight and 85%, or about 85%, aluminum oxide by weight.

In some embodiments, the catalyst-containing washcoat composition or catalyst-containing layer further comprises metal-oxide particles, such as the metal oxide particles discussed above (e.g., porous metal-oxides, aluminum-oxides, porous aluminum-oxides, etc.). In some embodiments, these metal-oxide particles further comprise up to approximately 65%, up to approximately 60%, up to approximately 55%, or up to approximately 54%, such as approximately 2% to approximately 54%, by weight of the combination of the nano-on-nano-on-micron particles, the boehmite particles, the silica particles, and the metal-oxide particles in the catalyst-containing washcoat composition or catalyst-containing layer. It is contemplated that the concentration ranges discussed above for the nano-on-nano-on-micron particles, the boehmite particles, and the silica particles can be applied to the combination of those materials with the metal-oxide particles.

In other embodiments, the catalyst-containing washcoat composition or catalyst-containing layer comprises, consists essentially of, or consists of zeolite particles, boehmite particles, and nano-on-nano-on-micron particles. In some embodiments, the nano-on-nano-on-micron particles make up between approximately 35% to approximately 95% by weight of the combination of the nano-on-nano-on-micron particles, the boehmite particles, and the zeolite particles in the catalyst-containing washcoat composition or catalyst-containing layer. In some embodiments, the nano-on-nano-on-micron particles make up between approximately 40% to approximately 92% by weight of the combination of the nano-on-nano-on-micron particles, the boehmite particles, and the zeolite particles in the catalyst-containing washcoat composition or catalyst-containing layer. In some embodiments, the nano-on-nano-on-micron particles make up between approximately 60% to approximately 95% by weight of the combination of the nano-on-nano-on-micron particles, the boehmite particles, and the zeolite particles in the catalyst-containing washcoat composition or catalyst-containing layer. In some embodiments, the nano-on-nano-on-micron particles make up between approximately 80% to approximately 95% by weight of the combination of the nano-on-nano-on-micron particles, the boehmite particles, and the zeolite particles in the catalyst-containing washcoat composition or catalyst-containing layer. In some embodiments, the nano-on-nano-on-micron particles make up between approximately 80% to approximately 92% by weight of the combination of the nano-on-nano-on-micron particles, the boehmite particles, and the zeolite particles in the catalyst-containing washcoat composition or catalyst-containing layer. In some embodiments, the nano-on-nano-on-micron particles make up approximately 92% by weight of the combination of the nano-on-nano-on-micron particles, the boehmite particles, and the zeolite particles in the catalyst-containing washcoat composition or catalyst-containing layer. In some embodiments, the zeolite particles make up less than approximately 20%, less than approximately 10%, or less than approximately 5%, by weight of the combination of the nano-on-nano-on-micron particles, the boehmite particles, and the zeolite particles in the catalyst-containing washcoat composition or catalyst-containing layer. In some embodiments, the zeolite particles make up approximately 1% to approximately 5% by weight, such as about 5% by weight, of the combination of the nano-on-nano-on-micron particles, the boehmite particles, and the zeolite particles in the catalyst-containing washcoat composition or catalyst-containing layer. In some embodiments, the boehmite particles make up approximately 2% to approximately 5% by weight of the combination of the nano-on-nano-on-micron particles, the boehmite particles, and the zeolite particles in the catalyst-containing washcoat composition or catalyst-containing layer. In some embodiments, the boehmite particles make up approximately 3% by weight of the combination of the nano-on-nano-on-micron particles, the boehmite particles, and the zeolite particles in the catalyst-containing washcoat composition or catalyst-containing layer.

In some embodiments, the catalyst-containing washcoat composition or catalyst-containing layer further includes metal-oxide particles, such as the metal oxide particles discussed above (e.g., porous metal-oxides, aluminum-oxides, porous aluminum-oxides, etc.). In some embodiments, these metal-oxide particles make up approximately 0% to approximately 54%, such as approximately 2% to approximately 54%, by weight of the combination of the nano-on-nano-on-micron particles, the boehmite particles, the zeolite particles, and the metal-oxide particles in the catalyst-containing washcoat composition or catalyst-containing layer. It is contemplated that the concentration ranges discussed above for the nano-on-nano-on-micron particles, the boehmite particles, and the zeolite particles can be applied to the combination of those materials with the metal-oxide particles.

In some embodiments, the catalyst-containing washcoat compositions or catalyst-containing layer further includes PNA material.

In some embodiments, the catalyst-containing washcoat composition is mixed with water and acid, such as acetic acid, prior to the coating of the substrate with the catalyst-containing washcoat composition, thereby forming an aqueous mixture of the catalyst-containing washcoat composition, water, and acid. This aqueous mixture of the catalyst-containing washcoat composition, water, and acid is then applied to the substrate (where the substrate may or may not already have other washcoat layers applied to it). In some embodiments, the pH of this aqueous mixture is adjusted to a pH level of about 2 to about 7 prior to it being applied to the substrate. In some embodiments, the pH of this aqueous mixture is adjusted to a pH level of about 4 prior to it being applied to the substrate. In some embodiments, the viscosity of the aqueous washcoat is adjusted by mixing with a cellulose solution, with corn starch, or with similar thickeners. In some embodiments, the viscosity is adjusted to a value between about 300 cP to about 1200 cP.

In some embodiments, the catalyst-containing washcoat composition comprises a thickness of approximately 50 g/l to approximately 250 g/l, such as approximately 50 g/l to approximately 140 g/l, approximately 70 g/l to approximately 140 g/l, approximately 90 g/l to approximately 140 g/l, or approximately 110 g/l to approximately 130 g/l. In some embodiments, the catalyst-containing washcoat composition comprises a thickness of approximately 50 g/l, approximately 60 g/l, approximately 70 g/l, approximately 80 g/l, approximately 90 g/l, approximately 100 g/l, approximately 110 g/l, approximately 120 g/l, approximately 130 g/l, or approximately 140 g/l. Preferably, the catalyst-containing washcoat composition comprises a thickness of approximately 120 g/l.

PNA Material Washcoat Compositions and PNA Layers

PNA material may be used to store nitrogen oxide gases during the cold start of an internal combustion engine. The PNA material can be applied to a substrate of a catalytic converter as part of a washcoat. The PNA material stores nitrogen oxide gases during low temperature engine operation. In some embodiments, the PNA material in the PNA material washcoat can comprise PGM on support particles; alkali oxide or alkaline earth oxide on support particles; alkali oxide or alkaline earth oxide and PGM on support particles; a combination of alkali oxide or alkaline earth oxide on support particles and different alkali oxides or alkaline earth oxides each on different support particles in any ratio; a combination of alkali oxide or alkaline earth oxide on support particles and PGM on support particles in any ratio; a combination of alkali oxide or alkaline earth oxide on support particles, different alkali oxides or alkaline earth oxides each on different support particles, and PGM on support particles in any ratio; a combination of alkali oxide or alkaline earth oxide and PGM on support particles and the same or different alkali oxides or alkaline earth oxides each on different support particles in any ratio; a combination of alkali oxide or alkaline earth oxide and PGM on support particles and PGM on support particles in any ratio; a combination of alkali oxide or alkaline earth oxide and PGM on support particles; the same or different alkali oxides or alkaline earth oxides each on different support particles; and PGM on support particles in any ratio. In addition, various other combinations of alkali oxides and alkaline earth oxides on support particles; PGM on support particles; and alkali oxides and alkaline earth oxides and PGM on support particles in any ratio can be employed, as discussed above.

In some embodiments, different PNA materials may not be mixed on a support material. For example, if a combination of manganese oxide on cerium oxide support and magnesium oxide on cerium oxide support is used, the manganese oxide is impregnated onto cerium oxide support material and set aside. Separately, magnesium oxide is then impregnated onto fresh cerium oxide support material. The manganese oxide/cerium oxide and magnesium oxide/cerium oxide are then combined in the desired ratio of the PNA material.

Support particles can include, for example, bulk refractory oxides such as alumina or cerium oxide. On example of cerium oxide includes HSA5, HSA20, or a mixture thereof from Rhodia. The cerium oxide particles may contain zirconium oxide. The cerium oxide particles may contain lanthanum and/or lanthanum oxide. In addition, the cerium oxide particles may contain both zirconium oxide and lanthanum oxide. The cerium oxide particles may also contain yttrium oxide. As such, the cerium oxide particles can include cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, cerium-zirconium-lanthanum-yttrium oxide particles, or a combination thereof. In some embodiments, the nano-sized cerium oxide particles contain 40-90 wt % cerium oxide, 5-60 wt % zirconium oxide, 1-15 wt % lanthanum oxide, and/or 1-10 wt % yttrium oxide. In one embodiment, the cerium oxide particles contain 86 wt % cerium oxide, 10 wt % zirconium oxide, and 4 wt % lanthanum and/or lanthanum oxide. In another embodiment, the cerium oxide particles contain 40 wt % cerium oxide, 50 wt % zirconium oxide, 5 wt % lanthanum oxide, and 5 wt % yttrium oxide.

Support particles can be micron-sized and/or nano-sized. Suitable micron-sized support particles include micron-sized cerium oxide particles including, but are not limited to, HSA5, HSA20, or a mixture thereof. In some embodiments, the support particles may include PGM in addition to alkali oxide or alkaline earth oxide particles or mixture thereof. The PGM can include ruthenium, platinum, palladium, or a mixture thereof. The alkali oxide or alkaline earth oxide particles can be nano-sized or micron-sized, as described above. In some embodiments, PGM are added to the micron-sized support particles using wet chemistry techniques. In some embodiments, PGM are added to the micron-sized support particles using incipient wetness techniques. In some embodiments, PGM are added to nano-sized support particles using incipient wetness and/or wet chemistry techniques. In some embodiments, PGM are added to support particles by plasma based methods described above to form composite PNA nanoparticles. In some embodiments, these PNA composite nanoparticles are added to carrier particles to form NNm PNA particles or are embedded within carrier particles to form NNiM PNA particles. As such, the PGM on support particles can include micro-PGM on micron support particles, nano-PGM on micron support particles, PNA nano-on-nano particles, PNA NNm particles, PNA NNiM particles, or PNA hybrid NNm/wet-chemistry particles described above. In some embodiments, the alkali oxide or alkaline earth oxide particles and PGM are on the same micron-sized support particle. In other embodiments, the alkali oxide or alkaline earth oxide particles and PGM are on different micron-sized support particles.

In some embodiments, the PNA layer and washcoat compositions comprise, consist essentially of, or consist of PNA material and boehmite particles. Different configurations of the weight concentrations of the PNA material and boehmite particles may be employed. In the following descriptions, the percentages of the components of the washcoat compositions are provided in terms of the amount of solids present in the washcoat compositions, as the washcoat compositions can be provided in an aqueous suspension or, in some instances, as dry powder. The PNA layer refers to the PNA washcoat composition after it has been applied to the substrate, dried, and calcined.

In some embodiments, the PNA material comprises at least 50%, comprise more than about 50%, or comprises about 50% to about 100% by weight of the combination of PNA material and boehmite particles in the PNA washcoat composition or PNA material layer. In some embodiments, the PNA material makes up approximately 60% to approximately 80%, for example, approximately 65% to approximately 70% or approximately 70% to approximately 80%, by weight of the combination of PNA material and boehmite particles in the PNA material particle-containing washcoat composition or PNA material layer. In some embodiments, the PNA material makes up approximately 90% to approximately 100%, for example, approximately 90% to approximately 95% or approximately 95% to approximately 100%, by weight of the combination of PNA material and boehmite particles in the PNA material particle-containing washcoat composition or PNA material layer. In some embodiments, the PNA material makes up approximately 95% to approximately 98% by weight of the combination of PNA material and boehmite particles in the PNA material particle-containing washcoat composition or PNA material layer.

In some embodiments, the PNA material comprises cerium oxide. In some embodiments, cerium oxide (which may include zirconium oxide, lanthanum, lanthanum oxide, yttrium oxide or a combination thereof) makes up approximately 57% to approximately 99% by weight of the combination of PNA material and boehmite particles in the PNA washcoat composition or PNA material layer. In some embodiments, cerium oxide (which may include zirconium oxide, lanthanum, lanthanum oxide, yttrium oxide or a combination thereof) makes up approximately 59% to approximately 98% by weight of the combination of PNA material and boehmite particles in the PNA washcoat composition or PNA material layer. In some embodiments, cerium oxide (which may include zirconium oxide, lanthanum, lanthanum oxide, yttrium oxide or a combination thereof) makes up approximately 85% to approximately 97% by weight of the combination of PNA material and boehmite particles in the PNA washcoat composition or PNA material layer. In some embodiments, cerium oxide (which may include zirconium oxide, lanthanum, lanthanum oxide, yttrium oxide or a combination thereof) makes up approximately 85% to approximately 88% by weight of the combination of PNA material and boehmite particles in the PNA washcoat composition or PNA material layer. In some embodiments, cerium oxide (which may include zirconium oxide, lanthanum, lanthanum oxide, yttrium oxide or a combination thereof) makes up approximately 90% to approximately 98% by weight of the combination of PNA material and boehmite particles in the PNA washcoat composition or PNA material layer. In some embodiments, cerium oxide (which may include zirconium oxide, lanthanum, lanthanum oxide, yttrium oxide, or a combination thereof) makes up approximately 93% to approximately 95% by weight of the combination of PNA material and boehmite particles in the PNA washcoat composition or PNA material layer.

In some embodiments, the boehmite particles make up approximately 1% to approximately 10% by weight of the combination of PNA material and boehmite particles in the PNA material-containing washcoat composition or PNA material layer. In some embodiments, the boehmite particles make up approximately 2% to approximately 5% by weight of the combination of PNA material and boehmite particles in the PNA material-containing washcoat composition or PNA material layer. In some embodiments, the boehmite particles make up approximately 3% by weight of the combination of PNA material particles and boehmite particles in the PNA material-containing washcoat composition or PNA material layer.

In one embodiment, palladium is used in an amount of from about 0.01% to about 5% (by weight) of the amount of cerium oxide used in the PNA washcoat composition or layer. (As described above, in all embodiments, the cerium oxide can include zirconium oxide, lanthanum, lanthanum oxide, yttrium oxide, or a combination thereof). In one embodiment, palladium is used in an amount of from about 0.5% to about 3% (by weight) of the amount of cerium oxide used in the PNA washcoat composition or layer. In one embodiment, palladium is used in an amount of from about 0.67% to about 2.67% (by weight) of the amount of cerium oxide used in the PNA washcoat composition or layer. In another embodiment, the amount of cerium oxide used in the PNA washcoat composition or layer is from about 50 g/L to about 400 g/L. In another embodiment, the amount of cerium oxide used in the PNA washcoat composition or layer is from about 100 g/L to about 350 g/L. In another embodiment, the amount of cerium oxide used in the PNA washcoat composition or layer is from about 150 g/L to about 300 g/L. In another embodiment, the amount of cerium oxide used in the PNA washcoat composition or layer is greater than or equal to about 150 g/L. In another embodiment, Pd is used in an amount of from about 1.5% to about 2.5% (by weight) of the amount of cerium oxide used in the PNA washcoat composition or layer, and the amount of cerium oxide used is from about 100 g/L to about 200 g/L. In another embodiment, Pd is used in an amount of from about 0.5% to about 1.5% (by weight) of the amount of cerium oxide used in the PNA washcoat composition or layer, and the amount of cerium oxide used is from about 250 g/L to about 350 g/L. In another embodiment, Pd is used in an amount of from about 1% to about 2% (by weight) of the amount of cerium oxide used in the PNA washcoat composition or layer, and the amount of cerium oxide used is greater than or equal to about 150 g/L. In another embodiment, Pd is used in an amount of about 2% (by weight) of the amount of cerium oxide used in the PNA washcoat composition or layer, and the amount of cerium oxide used is greater than or equal to about 150 g/L. In another embodiment, Pd is used in an amount of about 1% (by weight) of the amount of cerium oxide used in the PNA washcoat composition or layer, and the amount of cerium oxide used is greater than or equal to about 300 g/L. In another embodiment, Pd is used in an amount of about 1 g/L to about 5 g/L. In another embodiment, Pd is used in an amount of about 2 g/L to about 4 g/L. In another embodiment, Pd is used in an amount of about 3 g/L. In another embodiment, Pd is used in an amount of about 1 g/L to about 5 g/L, and the amount of cerium oxide used in the PNA washcoat composition or layer is from about 100 g/L to about 350 g/L. In another embodiment, Pd is used in an amount of about 2 g/L to about 4 g/L, and the amount of cerium oxide used in the PNA washcoat composition or layer is from about 100 g/L to about 350 g/L. In another embodiment, Pd is used in an amount of about 3 g/L, and the amount of cerium oxide used in the PNA washcoat composition or layer is from about 150 g/L to about 300 g/L. In another embodiment, Pd is used in an amount of about 1 g/L to about 5 g/L, and the amount of cerium oxide used in the PNA washcoat composition or layer is from greater than or equal to about 150 g/L. In another embodiment, Pd is used in an amount of about 2 g/L to about 4 g/L, and the amount of cerium oxide used in the PNA washcoat composition or layer is from greater than or equal to about 150 g/L. In another embodiment, Pd is used in an amount of about 3 g/L, and the amount of cerium oxide used in the PNA washcoat composition or layer is from greater than or equal to about 150 g/L. The PNA washcoat composition or layer can include Pd in larger (cooler) engine systems (e.g., greater than 2.5 Liters).

In one embodiment, ruthenium is used in an amount of from about 0.01% to about 15% (by weight) of the amount of cerium oxide used in the PNA washcoat composition or layer. (As described above, in all embodiments, the cerium oxide can include zirconium oxide, lanthanum, lanthanum oxide, yttrium oxide, or a combination thereof). In one embodiment, ruthenium is used in an amount of from about 0.5% to about 12% (by weight) of the amount of cerium oxide used in the PNA washcoat composition or layer. In one embodiment, ruthenium is used in an amount of from about 1% to about 10% (by weight) of the amount of cerium oxide used in the PNA washcoat composition or layer. In another embodiment, the amount of cerium oxide used in the PNA washcoat composition or layer is from about 50 g/L to about 400 g/L. In another embodiment, the amount of cerium oxide used in the PNA washcoat composition or layer is from about 100 g/L to about 350 g/L. In another embodiment, the amount of cerium oxide used in the PNA washcoat composition or layer is from about 150 g/L to about 300 g/L. In another embodiment, the amount of cerium oxide used in the PNA washcoat composition or layer is greater than or equal to about 150 g/L. In another embodiment, the amount of cerium oxide used in the PNA washcoat composition or layer is greater than or equal to about 300 g/L. In another embodiment, Ru is used in an amount of from about 3% to about 4.5% (by weight) of the amount of cerium oxide used in the PNA washcoat composition or layer, and the amount of cerium oxide used is from about 100 g/L to about 200 g/L. In another embodiment, Ru is used in an amount of from about 1% to about 2.5% (by weight) of the amount of cerium oxide used in the PNA washcoat composition or layer, and the amount of cerium oxide used is from about 250 g/L to about 350 g/L. In another embodiment, Ru is used in an amount of from about 1.67% to about 4% (by weight) of the amount of cerium oxide used in the PNA washcoat composition or layer, and the amount of cerium oxide used is greater than or equal to about 150 g/L. In another embodiment, Ru is used in an amount of from about 1.67% to about 4% (by weight) of the amount of cerium oxide used in the PNA washcoat composition or layer, and the amount of cerium oxide used is greater than or equal to about 300 g/L. In another embodiment, Ru is used in an amount of about 3.33% to about 4% (by weight) of the amount of cerium oxide used in the PNA washcoat composition or layer, and the amount of cerium oxide used is greater than or equal to about 150 g/L. In another embodiment, Ru is used in an amount of about 1.67% to about 2% (by weight) of the amount of cerium oxide used in the PNA washcoat composition or layer, and the amount of cerium oxide used is greater than or equal to about 300 g/L. In another embodiment, Ru is used in an amount of about 1 g/L to about 20 g/L. In another embodiment, Ru is used in an amount of about 3 g/L to about 15 g/L. In another embodiment, Ru is used in an amount of about 4 g/L to about 8 g/L. In another embodiment, Ru is used in an amount of about 5 g/L to about 6 g/L. In another embodiment, Ru is used in an amount of about 1 g/L to about 20 g/L, and the amount of cerium oxide used in the PNA washcoat composition or layer is from about 100 g/L to about 350 g/L. In another embodiment, Ru is used in an amount of about 3 g/L to about 15 g/L, and the amount of cerium oxide used in the PNA washcoat composition or layer is from about 100 g/L to about 350 g/L. In another embodiment, Ru is used in an amount of about 4 g/L to about 8 g/L, and the amount of cerium oxide used in the PNA washcoat composition or layer is from about 100 g/L to about 350 g/L. In another embodiment, Ru is used in an amount of about 5 g/L to about 6 g/L, and the amount of cerium oxide used in the PNA washcoat composition or layer is from about 150 g/L to about 350 g/L. In another embodiment, Ru is used in an amount of about 1 g/L to about 20 g/L, and the amount of cerium oxide used in the PNA washcoat composition or layer is from greater than or equal to about 150 g/L. In another embodiment, Ru is used in an amount of about 3 g/L to about 15 g/L, and the amount of cerium oxide used in the PNA washcoat composition or layer is from greater than or equal to about 150 g/L. In another embodiment, Ru is used in an amount of about 4 g/L to about 8 g/L, and the amount of cerium oxide used in the PNA washcoat composition or layer is from greater than or equal to about 150 g/L. In another embodiment, Ru is used in an amount of about 5 g/L to about 6 g/L, and the amount of cerium oxide used in the PNA washcoat composition or layer is from greater than or equal to about 150 g/L. In another embodiment, Ru is used in an amount of about 1 g/L to about 20 g/L, and the amount of cerium oxide used in the PNA washcoat composition or layer is from greater than or equal to about 300 g/L. In another embodiment, Ru is used in an amount of about 3 g/L to about 15 g/L, and the amount of cerium oxide used in the PNA washcoat composition or layer is from greater than or equal to about 300 g/L. In another embodiment, Ru is used in an amount of about 4 g/L to about 8 g/L, and the amount of cerium oxide used in the PNA washcoat composition or layer is from greater than or equal to about 300 g/L. In another embodiment, Ru is used in an amount of about 5 g/L to about 6 g/L, and the amount of cerium oxide used in the PNA washcoat composition or layer is from greater than or equal to about 300 g/L. The PNA washcoat composition or layer can include Ru in small (hotter) engine systems (e.g., less than 2 Liters).

In one embodiment, MgO is used in an amount of from about 1% to about 20% (by weight) of the amount of the cerium oxide used in the washcoat or layer. In one embodiment, MgO is used in an amount of from about 1% to about 15% (by weight) of the amount of the cerium oxide used in the washcoat or layer. In one embodiment, MgO is used in an amount of from about 1% to about 10% (by weight) of the amount of the cerium oxide used in the washcoat or layer. In another embodiment, the amount of cerium oxide used in the washcoat or layer is from about 50 g/L to about 450 g/L. In another embodiment, the amount of cerium oxide used in the washcoat or layer is from about 100 g/L to about 400 g/L. In another embodiment, the amount of cerium oxide used in the washcoat or layer is from about 150 g/L to about 350 g/L. In another embodiment, MgO is used in an amount of from about 2% to about 8% (by weight) of the amount of the cerium oxide used in the washcoat or layer, and the amount of cerium oxide used is from about 150 g/L to about 350 g/L. In another embodiment, MgO is used in an amount of from about 2% to about 4% (by weight) of the amount of the cerium oxide used in the washcoat or layer, and the amount of cerium oxide used is from about 250 g/L to about 350 g/L. In another embodiment, MgO is used in an amount of from about 6% to about 8% (by weight) of the amount of the cerium oxide used in the washcoat or layer, and the amount of cerium oxide used is from about 150 g/L to about 250 g/L. In another embodiment, MgO is used in an amount of about 3% (by weight) of the amount of the cerium oxide used in the washcoat or layer, and the amount of cerium oxide used is about 350 g/L. In another embodiment, MgO is used in an amount of about 7% (by weight) of the amount of the cerium oxide used in the washcoat or layer, and the amount of cerium oxide used is about 150 g/L. In another embodiment, MgO is used in an amount of about 10.5 g/L, and the amount of cerium oxide used in the washcoat or layer is from about 150 g/L to about 350 g/L.

In one embodiment, $Mn_3O_4$ is used in an amount of from about 1% to about 30% (by weight) of the amount of the cerium oxide used in the washcoat or layer. In one embodiment, $Mn_3O_4$ is used in an amount of from about 1% to about 25% (by weight) of the amount of the cerium oxide used in the washcoat or layer. In one embodiment, $Mn_3O_4$ is used in an amount of from about 1% to about 20% (by weight) of the amount of the cerium oxide used in the washcoat or layer. In another embodiment, the amount of cerium oxide used in the washcoat or layer is from about 50 g/L to about 450 g/L. In another embodiment, the amount of cerium oxide used in the washcoat or layer is from about 100 g/L to about 400 g/L. In another embodiment, the amount of cerium oxide used in the washcoat or layer is from about 150 g/L to about 350 g/L. In another embodiment, $Mn_3O_4$ is used in an amount of from about 5% to about 20% (by weight) of the amount of the cerium oxide used in the washcoat or layer, and the amount of cerium oxide used is from about 150 g/L to about 350 g/L. In another embodiment, $Mn_3O_4$ is used in an amount of from about 5% to about 10% (by weight) of the amount of the cerium oxide used in the washcoat or layer, and the amount of cerium oxide used is from about 250 g/L to about 350 g/L. In another embodiment, $Mn_3O_4$ is used in an amount of from about 15% to about 20% (by weight) of the amount of the cerium oxide used in the washcoat or layer, and the amount of cerium oxide used is from about 150 g/L to about 250 g/L. In another embodiment, $Mn_3O_4$ is used in an amount of about 8% (by weight) of the amount of the cerium oxide used in the washcoat or layer, and the amount of cerium oxide used is about 350 g/L. In another embodiment, $Mn_3O_4$ is used in an amount of about 18.67% (by weight) of the amount of the cerium oxide used in the washcoat or layer, and the amount of cerium oxide used is about 150 g/L. In another embodiment, $Mn_3O_4$ is used in an amount of about 28 g/L, and the amount of cerium oxide used in the washcoat or layer is from about 150 g/L to about 350 g/L.

In one embodiment, calcium oxide is used in an amount of from about 1% to about 20% (by weight) of the amount of the cerium oxide used in the washcoat or layer. In one embodiment, calcium oxide is used in an amount of from about 1% to about 15% (by weight) of the amount of the cerium oxide used in the washcoat or layer. In one embodiment, calcium oxide is used in an amount of from about 1% to about 10% (by weight) of the amount of the cerium oxide used in the washcoat or layer. In another embodiment, the amount of cerium oxide used in the washcoat or layer is from about 50 g/L to about 450 g/L. In another embodiment, the amount of cerium oxide used in the washcoat or layer is from about 100 g/L to about 400 g/L. In another embodiment, the amount of cerium oxide used in the washcoat or layer is from about 150 g/L to about 350 g/L. In another embodiment, calcium oxide is used in an amount of from about 2% to about 8% (by weight) of the amount of the cerium oxide used in the washcoat or layer, and the amount of cerium oxide used is from about 150 g/L to about 350 g/L. In another embodiment, calcium oxide is used in an amount of from about 2% to about 4% (by weight) of the amount of the cerium oxide used in the washcoat or layer, and the amount of cerium oxide used in the washcoat or layer is from about 250 g/L to about 350 g/L. In another embodiment, calcium oxide is used in an amount of from about 6% to about 8% (by weight) of the amount of the cerium oxide used in the washcoat or layer, and the amount of cerium oxide used is from about 150 g/L to about 250 g/L. In another embodiment, calcium oxide is used in an amount of about 3% (by weight) of the amount of the cerium oxide used in the washcoat or layer, and the amount of cerium oxide used is about 350 g/L. In another embodiment, calcium oxide is used in an amount of about 7% (by weight) of the amount of the cerium oxide used in the washcoat or layer, and the amount of cerium oxide used is about 150 g/L. In another embodiment, calcium oxide is used in an amount of about 10.5 g/L, and the amount of cerium oxide used in the washcoat or layer is from about 150 g/L to about 350 g/L.

In one embodiment, MgO is used in an amount of about 10.5 g/L, $Mn_3O_4$ is used in an amount of about 28 g/L, calcium oxide is used in an amount of about 10.5 g/L, and the amount of cerium oxide used in the washcoat or layer is from about 150 g/L to about 350 g/L.

In one embodiment, MgO is used in an amount of about 10.5 g/L, $Mn_3O_4$ is used in an amount of about 28 g/L, calcium oxide is used in an amount of about 10.5 g/L, and the amount of cerium oxide used in the washcoat or layer is from about 150 g/L to about 350 g/L.

In some embodiments, the PNA material-containing washcoat composition or PNA material does not comprise any platinum group metals. As discussed above, the six platinum group metals are ruthenium, rhodium, palladium, osmium, iridium, and platinum. (PGM is often referred to catalyst metals). In some embodiments, the PNA material-containing washcoat composition or PNA material is characterized by a substantial absence of any platinum group metals. In some embodiments, the PNA material-containing washcoat composition or PNA material layer is 100% free of any platinum group metals. In some embodiments, the PNA material containing washcoat composition or PNA material layer is approximately 100% free of any platinum group metals. In some embodiments, the PNA material-containing washcoat composition or PNA material layer does not comprise any catalytic particles. In some embodiments, the PNA material particle-containing washcoat composition or PNA material layer is characterized by a substantial absence of any catalytic particles. In some embodiments, the PNA material particle-containing washcoat composition or PNA material layer is 100% free of any catalytic particles. In some embodiments, the PNA material particle-containing washcoat composition or PNA material layer is approximately 100% free of any catalytic particles.

As discussed above, in other embodiments, the PNA material washcoat may contain PGM. In some embodiments, the PNA material is loaded with about 1 g/L to about 20 g/L of PGM. In another embodiment, the PNA material is loaded with about 1 g/L to about 15 g/L of PGM. In another embodiment, the PNA material is loaded with about 6.0 g/L and less of PGM. In another embodiment, the PNA material is loaded with about 5.0 g/L and less of PGM. In another embodiment, the PNA material is loaded with about 4.0 g/L and less of PGM. In another embodiment, the PNA material is loaded with about 3.0 g/L and less of PGM. In another embodiment, the PNA material is loaded with about 2 g/L to about 4 g/L Pd. In another embodiment, the PNA material is loaded with about 3 g/L Pd. In another embodiment, the PNA material is loaded with about 3 g/L to about 15 g/L Ru. In another embodiment, the PNA material is loaded with about 5 g/L to about 6 g/L Ru.

PGM can be added to the support particles using wet chemistry techniques described above. PGM can also be added to the support particles using incipient wetness techniques described above. PGM can be added to support particles using plasma based methods described above. In some embodiments, the PNA material washcoat includes support particles impregnated with alkali oxide or alkaline earth oxide particles and separate PGM particles, including, for example, NNm or NNiM particles. In some embodiments, the micro-sized particles of the PGM NNm and NNiM particles can be the micron-sized supports impregnated with alkali oxide or alkaline earth oxide particles. In some embodiments, the micro-sized particles of the PGM NNm can be impregnated with alkali oxide or alkaline earth oxide particles. In one embodiment, the NNm particles are nano-platinum group metals supported on nano-cerium oxide, wherein the nano-on-nano particles are supported on micron-sized cerium oxide. In another embodiment, the NNiM particles are nano-sized platinum group metals supported on nano-sized cerium oxide. In some embodiments, the platinum group metal is Pt, Pd, Ru, or a mixture thereof. In some embodiments, the alkali oxide or alkaline earth oxide particles and PGM are on the same support particle. In other embodiments, the alkali oxide or alkaline earth oxide particles and PGM are on different support particles. The support particles can also be aluminum oxide.

The composite nanoparticles for use as components of the PNA washcoat or layer can be produced by plasma-based methods as described above.

In some embodiments, the support particles may contain a mixture of 2:1 to 100:1 platinum to palladium. In some embodiments, the support particles may contain a mixture of 2:1 to 75:1 platinum to palladium. In some embodiments, the support particles may contain a mixture of 2:1 to 50:1 platinum to palladium. In some embodiments, the support particles may contain a mixture of 2:1 to 25:1 platinum to palladium. In some embodiments, the support particles may contain a mixture of 2:1 to 15:1 platinum to palladium. In some embodiments, the support particles may contain a mixture of 2:1 to 10:1 platinum to palladium. In some embodiments, the support particles may contain a mixture of 2:1 platinum to palladium, or approximately 2:1 platinum to palladium. In some embodiments, the support particles may contain a mixture of 2:1 to 20:1 platinum to palladium. In some embodiments, the support particles may contain a mixture of 5:1 to 15:1 platinum to palladium. In some embodiments, the support particles may contain a mixture of 8:1 to 12:1 platinum to palladium. In some embodiments, the support particles may contain a mixture of 10:1 platinum to palladium, or approximately 10:1 platinum to palladium. In some embodiments, the support particles may contain a mixture of 2:1 to 8:1 platinum to palladium. In some embodiments, the support particles may contain a mixture of 3:1 to 5:1 platinum to palladium. In some embodiments, the support particles may contain a mixture of 4:1 platinum to palladium, or approximately 4:1 platinum to palladium.

In some embodiments, the PNA material-containing washcoat composition or PNA material layer may include zeolites.

In some embodiments, the PNA material-containing washcoat composition is mixed with water and acid, such as acetic acid, prior to coating of a substrate with the PNA material-containing washcoat composition, thereby forming an aqueous mixture of the PNA material-containing washcoat composition, water, and acid. This aqueous mixture of the PNA material-containing washcoat composition, water, and acid may then be applied to the substrate (where the substrate may or may not already have other washcoat layers applied to it). In some embodiments, the pH of this aqueous mixture may be adjusted to a pH level of about 2 to about 7 prior to it being applied to the substrate. In some embodiments, the pH of this aqueous mixture may be adjusted to a pH level of about 4 prior to it being applied to the substrate.

The washcoat layers can include materials that are less active or inert to exhausts. Such materials can be incorporated as supports for the reactive catalysts or to provide surface area for the metals. In some embodiments, the catalyst-containing washcoat composition further includes "spacer" or "filler" particles, where the spacer particles may, for example, be ceramic, metal oxide, or metallic particles. In some embodiments, the spacer particles may be boehmite.

PNA Material/Zeolite Washcoat Compositions and PNA/Zeolite Layers

The PNA material and zeolite particles can be applied to a substrate of a catalytic converter as part of the same washcoat. Both the PNA material and the zeolite particles can be used to trap hazardous gases during cold start of an internal combustion engine.

In some embodiments, the PNA material and the zeolite particles layer (P/Z layer) and washcoat compositions comprise, consist essentially of, or consist of PNA material, zeolite particles, boehmite particles, and metal-oxide particles. The metal-oxide particles are preferably porous. The metal-oxide particles may be aluminum-oxide particles (e.g., MI-386 from Grace Davison or the like) or cerium oxide particles. The aluminum-oxide particles may be porous. Different configurations of the weight concentrations of the PNA material, zeolite particles, boehmite particles, and metal-oxide particles may be employed. In the following descriptions, the percentages of the components of the washcoat compositions are provided in terms of the amount of solids present in the washcoat compositions, as the washcoat compositions can be provided in an aqueous suspension or, in some instances, as dry powder. The P/Z layer refers to the P/Z washcoat composition after it has been applied to the substrate, dried, and calcined.

In some embodiments, the PNA material and zeolite particles comprise at least 50%, comprise more than about 50%, or comprise about 50% to about 100% by weight of the combination of PNA material, zeolite particles, boehmite particles, and metal-oxide particles in the P/Z washcoat composition or P/Z 1 layer. In some embodiments, the PNA material and zeolite particles make up approximately 60% to approximately 80%, for example, approximately 65% to approximately 70% or approximately 70% to approximately 80%, by weight of the combination of PNA material, zeolite particles, boehmite particles, and metal-oxide particles in the P/Z-containing washcoat composition or P/Z layer.

In some embodiments, the boehmite particles make up approximately 1% to approximately 10% by weight of the combination of PNA material, zeolite particles, boehmite particles, and metal-oxide particles in the P/Z-containing washcoat composition or P/Z layer. In some embodiments, the boehmite particles make up approximately 2% to approximately 5% by weight of the combination of PNA material, zeolite particles, boehmite particles, and metal-oxide particles in the P/Z-containing washcoat composition or P/Z layer. In some embodiments, the boehmite particles make up approximately 3% by weight of the combination of PNA material, zeolite particles, boehmite particles, and metal-oxide particles in the P/Z-containing washcoat composition or P/Z layer.

In one embodiment, palladium is used in an amount of from about 0.01% to about 5% (by weight) of the amount of cerium oxide used in the PNA washcoat composition or layer. (As described above, in all embodiments, the cerium oxide can include zirconium oxide, lanthanum, lanthanum oxide, yttrium oxide, or a combination thereof). In one embodiment, palladium is used in an amount of from about 0.5% to about 3% (by weight) of the amount of cerium oxide used in the PNA washcoat composition or layer. In one embodiment, palladium is used in an amount of from about 0.67% to about 2.67% (by weight) of the amount of cerium oxide used in the PNA washcoat composition or layer. In another embodiment, the amount of cerium oxide used in the PNA washcoat composition or layer is from about 50 g/L to about 400 g/L. In another embodiment, the amount of cerium oxide used in the PNA washcoat composition or layer is from about 100 g/L to about 350 g/L. In another embodiment, the amount of cerium oxide used in the PNA washcoat composition or layer is from about 150 g/L to about 300 g/L. In another embodiment, the amount of cerium oxide used in the PNA washcoat composition or layer is greater than or equal to about 150 g/L. In another embodiment, Pd is used in an amount of from about 1.5% to about 2.5% (by weight) of the amount of cerium oxide used in the PNA washcoat composition or layer, and the amount of cerium oxide used is from about 100 g/L to about 200 g/L. In another embodiment, Pd is used in an amount of from about 0.5% to about 1.5% (by weight) of the amount of cerium oxide used in the PNA washcoat composition or layer, and the amount of cerium oxide used is from about 250 g/L to about 350 g/L. In another embodiment, Pd is used in an amount of from about 1% to about 2% (by weight) of the amount of cerium oxide used in the PNA washcoat composition or layer, and the amount of cerium oxide used is greater than or equal to about 150 g/L. In another embodiment, Pd is used in an amount of about 2% (by weight) of the amount of cerium oxide used in the PNA washcoat composition or layer, and the amount of cerium oxide used is greater than or equal to about 150 g/L. In another embodiment, Pd is used in an amount of about 1% (by weight) of the amount of cerium oxide used in the PNA washcoat composition or layer, and the amount of cerium oxide used is greater than or equal to about 300 g/L. In another embodiment, Pd is used in an amount of about 1 g/L to about 5 g/L. In another embodiment, Pd is used in an amount of about 2 g/L to about 4 g/L. In another embodiment, Pd is used in an amount of about 3 g/L. In another embodiment, Pd is used in an amount of about 1 g/L to about 5 g/L, and the amount of cerium oxide used in the PNA washcoat composition or layer is from about 100 g/L to about 350 g/L. In another embodiment, Pd is used in an amount of about 2 g/L to about 4 g/L, and the amount of cerium oxide used in the PNA washcoat composition or layer is from about 100 g/L to about 350 g/L. In another embodiment, Pd is used in an amount of about 3 g/L, and the amount of cerium oxide used in the PNA washcoat composition or layer is from about 150 g/L to about 300 g/L. In another embodiment, Pd is used in an amount of about 1 g/L to about 5 g/L, and the amount of cerium oxide used in the PNA washcoat composition or layer is from greater than or equal to about 150 g/L. In another embodiment, Pd is used in an amount of about 2 g/L to about 4 g/L, and the amount of cerium oxide used in the PNA washcoat composition or layer is from greater than or equal to about 150 g/L. In another embodiment, Pd is used in an amount of about 3 g/L, and the amount of cerium oxide used in the PNA washcoat composition or layer is from greater than or equal to about 150 g/L. The PNA washcoat composition or layer can include Pd in larger (cooler) engine systems (e.g., greater than 2.5 Liters).

In one embodiment, ruthenium is used in an amount of from about 0.01% to about 15% (by weight) of the amount of cerium oxide used in the PNA washcoat composition or layer. (As described above, in all embodiments, the cerium oxide can include zirconium oxide, lanthanum, lanthanum oxide, yttrium oxide, or a combination thereof). In one embodiment, ruthenium is used in an amount of from about 0.5% to about 12% (by weight) of the amount of cerium oxide used in the PNA washcoat composition or layer. In one embodiment, ruthenium is used in an amount of from about 1% to about 10% (by weight) of the amount of cerium oxide used in the PNA washcoat composition or layer. In another embodiment, the amount of cerium oxide used in the PNA washcoat composition or layer is from about 50 g/L to about 400 g/L. In another embodiment, the amount of cerium oxide used in the PNA washcoat composition or layer is from about 100 g/L to about 350 g/L. In another embodiment, the amount of cerium oxide used in the PNA washcoat composition or layer is from about 150 g/L to about 300 g/L. In another embodiment, the amount of cerium oxide used in the PNA washcoat composition or layer is greater than or equal to about 150 g/L. In another embodiment, the amount of cerium oxide used in the PNA washcoat composition or layer is greater than or equal to about 300 g/L. In another embodiment, Ru is used in an amount of from about 3% to about 4.5% (by weight) of the amount of cerium oxide used in the PNA washcoat composition or layer, and the amount of cerium oxide used is from about 100 g/L to about 200 g/L. In another embodiment, Ru is used in an amount of from about 1% to about 2.5% (by weight) of the amount of cerium oxide used in the PNA washcoat composition or layer, and the amount of cerium oxide used is from about 250 g/L to about 350 g/L. In another embodiment, Ru is used in an amount of from about 1.67% to about 4% (by weight) of the amount of cerium oxide used in the PNA washcoat composition or layer, and the amount of cerium oxide used is greater than or equal to about 150 g/L. In another embodiment, Ru is used in an amount of from about 1.67% to about 4% (by weight) of the amount of cerium oxide used in the PNA washcoat composition or layer, and the amount of cerium oxide used is greater than or equal to about 300 g/L. In another embodiment, Ru is used in an amount of about 3.33% to about 4% (by weight) of the amount of cerium oxide used in the PNA washcoat composition or layer, and the amount of cerium oxide used is greater than or equal to about 150 g/L. In another embodiment, Ru is used in an amount of about 1.67% to about 2% (by weight) of the amount of cerium oxide used in the PNA washcoat composition or layer, and the amount of cerium oxide used is greater than or equal to about 300 g/L. In another embodiment, Ru is used in an amount of about 1 g/L to about 20 g/L. In another embodiment, Ru is used in an amount of about 3 g/L to about 15 g/L. In another embodiment, Ru is used in an amount of about 4 g/L to about 8 g/L. In another embodiment, Ru is used in an amount of about 5 g/L to about 6 g/L. In another embodiment, Ru is used in an amount of about 1 g/L to about 20 g/L, and the amount of cerium oxide used in the PNA washcoat composition or layer is from about 100 g/L to about 350 g/L. In another embodiment, Ru is used in an amount of about 3 g/L to about 15 g/L, and the amount of cerium oxide used in the PNA washcoat composition or layer is from about 100 g/L to about 350 g/L. In another embodiment, Ru is used in an amount of about 4 g/L to about 8 g/L, and the amount of cerium oxide used in the PNA washcoat composition or layer is from about 100 g/L to about 350 g/L. In another embodiment, Ru is used in an amount of about 5 g/L to about 6 g/L, and the amount of cerium oxide used in the PNA washcoat composition or layer is from about 150 g/L to about 350 g/L. In another embodiment, Ru is used in an amount of about 1 g/L to about 20 g/L, and the amount of cerium oxide used in the PNA washcoat composition or layer is from greater than or equal to about 150 g/L. In another embodiment, Ru is used in an amount of about 3 g/L to about 15 g/L, and the amount of cerium oxide used in the PNA washcoat composition or layer is from greater than or equal to about 150 g/L. In another embodiment, Ru is used in an amount of about 4 g/L to about 8 g/L, and the amount of cerium oxide used in the PNA washcoat composition or layer is from greater than or equal to about 150 g/L. In another embodiment, Ru is used in an amount of about 5 g/L to about 6 g/L, and the amount of cerium oxide used in the PNA washcoat composition or layer is from greater than or equal to about 150 g/L. In another embodiment, Ru is used in an amount of about 1 g/L to about 20 g/L, and the amount of cerium oxide used in the PNA washcoat composition or layer is from greater than or equal to about 300 g/L. In another embodiment, Ru is used in an amount of about 3 g/L to about 15 g/L, and the amount of cerium oxide used in the PNA washcoat composition or layer is from greater than or equal to about 300 g/L. In another embodiment, Ru is used in an amount of about 4 g/L to about 8 g/L, and the amount of cerium oxide used in the PNA washcoat composition or layer is from greater than or equal to about 300 g/L. In another embodiment, Ru is used in an amount of about 5 g/L to about 6 g/L, and the amount of cerium oxide used in the PNA washcoat composition or layer is from greater than or equal to about 300 g/L. The PNA washcoat composition or layer can include Ru in small (hotter) engine systems (e.g., less than 2 Liters).

In one embodiment, MgO is used in an amount of from about 1% to about 20% (by weight) of the amount of the cerium oxide used in the washcoat or layer. In one embodiment, MgO is used in an amount of from about 1% to about 15% (by weight) of the amount of the cerium oxide used in the washcoat or layer. In one embodiment, MgO is used in an amount of from about 1% to about 10% (by weight) of the amount of the cerium oxide used in the washcoat or layer. In another embodiment, the amount of cerium oxide used in the washcoat or layer is from about 50 g/L to about 450 g/L. In another embodiment, the amount of cerium oxide used in the washcoat or layer is from about 100 g/L to about 400 g/L. In another embodiment, the amount of cerium oxide used in the washcoat or layer is from about 150 g/L to about 350 g/L. In another embodiment, MgO is used in an amount of from about 2% to about 8% (by weight) of the amount of the cerium oxide used in the washcoat or layer, and the amount of cerium oxide used is from about 150 g/L to about 350 g/L. In another embodiment, MgO is used in an amount of from about 2% to about 4% (by weight) of the amount of the cerium oxide used in the washcoat or layer, and the amount of cerium oxide used is from about 250 g/L to about 350 g/L. In another embodiment, MgO is used in an amount of from about 6% to about 8% (by weight) of the amount of the cerium oxide used in the washcoat or layer, and the amount of cerium oxide used is from about 150 g/L to about 250 g/L. In another embodiment, MgO is used in an amount of about 3% (by weight) of the amount of the cerium oxide used in the washcoat or layer, and the amount of cerium oxide used is about 350 g/L. In another embodiment, MgO is used in an amount of about 7% (by weight) of the amount of the cerium oxide used in the washcoat or layer, and the amount of cerium oxide used is about 150 g/L. In another embodiment, MgO is used in an amount of about 10.5 g/L, and the amount of cerium oxide used in the washcoat or layer is from about 150 g/L to about 350 g/L.

In one embodiment, $Mn_3O_4$ is used in an amount of from about 1% to about 30% (by weight) of the amount of the cerium oxide used in the washcoat or layer. In one embodiment, $Mn_3O_4$ is used in an amount of from about 1% to about 25% (by weight) of the amount of the cerium oxide used in the washcoat or layer. In one embodiment, $Mn_3O_4$ is used in an amount of from about 1% to about 20% (by weight) of the amount of the cerium oxide used in the washcoat or layer. In another embodiment, the amount of cerium oxide used in the washcoat or layer is from about 50 g/L to about 450 g/L. In another embodiment, the amount of cerium oxide used in the washcoat or layer is from about 100 g/L to about 400 g/L. In another embodiment, the amount of cerium oxide used in the washcoat or layer is from about 150 g/L to about 350 g/L. In another embodiment, $Mn_3O_4$ is used in an amount of from about 5% to about 20% (by weight) of the amount of the cerium oxide used in the washcoat or layer, and the amount of cerium oxide used is from about 150 g/L to about 350 g/L. In another embodiment, $Mn_3O_4$ is used in an amount of from about 5% to about 10% (by weight) of the amount of the cerium oxide used in the washcoat or layer, and the amount of cerium oxide used is from about 250 g/L to about 350 g/L. In another embodiment, $Mn_3O_4$ is used in an amount of from about 15% to about 20% (by weight) of the amount of the cerium oxide used in the washcoat or layer, and the amount of cerium oxide used is from about 150 g/L to about 250 g/L. In another embodiment, $Mn_3O_4$ is used in an amount of about 8% (by weight) of the cerium oxide used in the washcoat or layer, and the amount of cerium oxide used is about 350 g/L. In another embodiment, $Mn_3O_4$ is used in an amount of about 18.67% (by weight) of the amount of the cerium oxide used in the washcoat or layer, and the amount of cerium oxide used is about 150 g/L. In another embodiment, $Mn_3O_4$ is used in an amount of about 28 g/L, and the amount of cerium oxide used in the washcoat or layer is from about 150 g/L to about 350 g/L.

In one embodiment, calcium oxide is used in an amount of from about 1% to about 20% (by weight) of the amount of the cerium oxide used in the washcoat or layer. In one embodiment, calcium oxide is used in an amount of from about 1% to about 15% (by weight) of the amount of the cerium oxide used in the washcoat or layer. In one embodiment, calcium oxide is used in an amount of from about 1% to about 10% (by weight) of the amount of the cerium oxide used in the washcoat or layer. In another embodiment, the amount of cerium oxide used in the washcoat or layer is from about 50 g/L to about 450 g/L. In another embodiment, the amount of cerium oxide used in the washcoat or layer is from about 100 g/L to about 400 g/L. In another embodiment, the amount of cerium oxide used in the washcoat or layer is from about 150 g/L to about 350 g/L. In another embodiment, calcium oxide is used in an amount of from about 2% to about 8% (by weight) of the amount of the cerium oxide used in the washcoat or layer, and the amount of cerium oxide used is from about 150 g/L to about 350 g/L. In another embodiment, calcium oxide is used in an amount of from about 2% to about 4% (by weight) of the amount of the cerium oxide used in the washcoat or layer, and the amount of cerium oxide used in the washcoat or layer is from about 250 g/L to about 350 g/L. In another embodiment, calcium oxide is used in an amount of from about 6% to about 8% (by weight) of the amount of the cerium oxide used in the washcoat or layer, and the amount of cerium oxide used is from about 150 g/L to about 250 g/L. In another embodiment, calcium oxide is used in an amount of about 3% (by weight) of the amount of the cerium oxide used in the washcoat or layer, and the amount of cerium oxide used is about 350 g/L. In another embodiment, calcium oxide is used in an amount of about 7% (by weight) of the amount of the cerium oxide used in the washcoat or layer, and the amount of cerium oxide used is about 150 g/L. In another embodiment, calcium oxide is used in an amount of about 10.5 g/L, and the amount of cerium oxide used in the washcoat or layer is from about 150 g/L to about 350 g/L.

In one embodiment, MgO is used in an amount of about 10.5 g/L, $Mn_3O_4$ is used in an amount of about 28 g/L, calcium oxide is used in an amount of about 10.5 g/L, and the amount of cerium oxide used in the washcoat or layer is from about 150 g/L to about 350 g/L.

In some embodiments, the metal-oxide particles make up approximately 15% to approximately 38%, for example, approximately 15% to approximately 30%, approximately 17% to approximately 23% or approximately 17% to approximately 22%, by weight of the mixture of PNA material particles, zeolite particles, metal-oxide particles, and boehmite particles in the P/Z-containing washcoat composition or P/Z layer. In some embodiments, the metal-oxide particles make up approximately 15% to approximately 23% by weight of the mixture of PNA material, zeolite particles, metal-oxide particles, and boehmite particles in the P/Z- containing washcoat composition or P/Z layer. In some embodiments, the metal-oxide particles make up approximately 25% to approximately 35% by weight of the mixture of PNA material, zeolite particles, metal-oxide particles, and boehmite particles in the P/Z-containing washcoat composition or P/Z layer. In some embodiments, the P/Z containing washcoat composition or P/Z layer contains about 3% boehmite particles, about 67% PNA material and zeolite particles, and about 30% porous aluminum-oxide particles.

In some embodiments, the P/Z-containing washcoat composition or P/Z does not comprise any platinum group metals. As discussed above, the six platinum group metals are ruthenium, rhodium, palladium, osmium, iridium, and platinum. In some embodiments, the P/Z containing washcoat composition or P/Z is characterized by a substantial absence of any platinum group metals. In some embodiments, the P/Z-containing washcoat composition or P/Z layer is 100% free of any platinum group metals. In some embodiments, the P/Z containing washcoat composition or P/Z layer is approximately 100% free of any platinum group metals. In some embodiments, the P/Z-containing washcoat composition or P/Z layer does not comprise any catalytic particles. In some embodiments, the P/Z particle-containing washcoat composition or P/Z layer is characterized by a substantial absence of any catalytic particles. In some embodiments, the P/Z-containing washcoat composition or P P/Z layer is 100% free of any catalytic particles. In some embodiments, the P/Z containing washcoat composition or P/Z layer is approximately 100% free of any catalytic particles.

In other embodiments, the P/Z washcoat may comprise PGM. In some embodiments, the PNA material is loaded with about 1 g/L to about 20 g/L of PGM. In another embodiment, the PNA material is loaded with about 1 g/L to about 15 g/L of PGM. In another embodiment, the PNA material is loaded with about 6.0 g/L and less of PGM. In another embodiment, the PNA material is loaded with about 5.0 g/L and less of PGM. In another embodiment, the PNA material is loaded with about 4.0 g/L and less of PGM. In another embodiment, the PNA material is loaded with about 3.0 g/L and less of PGM. In another embodiment, the PNA material is loaded with about 2 g/L to about 4 g/L Pd. In another embodiment, the PNA material is loaded with about 3 g/L Pd. In another embodiment, the PNA material is loaded with about 3 g/L to about 15 g/L Ru. In another embodiment, the PNA material is loaded with about 5 g/L to about 6 g/L Ru.

PGM can be added to the support particles using wet chemistry techniques described above. PGM can also be added to the support particles using incipient wetness techniques described above. PGM can be added to support particles using plasma based methods described above. In some embodiments, the PNA material washcoat includes support particles impregnated with alkali oxide or alkaline earth oxide particles and separate PGM particles, including, for example, NNm or NNiM particles. In some embodiments, the micro-sized particles of the PGM NNm and NNiM particles can be the micron-sized supports impregnated with alkali oxide or alkaline earth oxide particles. In some embodiments, the micro-sized particles of the PGM NNm can be impregnated with alkali oxide or alkaline earth oxide particles. In one embodiment, the NNm particles are nano-platinum group metals supported on nano-cerium oxide, wherein the nano-on-nano particles are supported on micron-sized cerium oxide. In another embodiment, the NNiM particles are nano-sized platinum group metals supported on nano-sized cerium oxide. In some embodiments, the platinum group metal is Pt, Pd, Ru, or a mixture thereof. In some embodiments, the alkali oxide or alkaline earth oxide particles and PGM are on the same support particle. In other embodiments, the alkali oxide or alkaline earth oxide particles and PGM are on different support particles. The support particles can also be aluminum oxide.

The composite nanoparticles for use as components of the P/Z washcoat or layer can be produced by plasma-based methods as described above.

In some embodiments, the support particles may contain a mixture of 2:1 to 100:1 platinum to palladium. In some embodiments, the support particles may contain a mixture of 2:1 to 75:1 platinum to palladium. In some embodiments, the support particles may contain a mixture of 2:1 to 50:1 platinum to palladium. In some embodiments, the support particles may contain a mixture of 2:1 to 25:1 platinum to palladium. In some embodiments, the support particles may contain a mixture of 2:1 to 15:1 platinum to palladium. In some embodiments, the support particles may contain a mixture of 2:1 to 10:1 platinum to palladium. In some embodiments, the support particles may contain a mixture of 2:1 platinum to palladium, or approximately 2:1 platinum to palladium. In some embodiments, the support particles may contain a mixture of 2:1 to 20:1 platinum to palladium. In some embodiments, the support particles may contain a mixture of 5:1 to 15:1 platinum to palladium. In some embodiments, the support particles may contain a mixture of 8:1 to 12:1 platinum to palladium. In some embodiments, the support particles may contain a mixture of 10:1 platinum to palladium, or approximately 10:1 platinum to palladium. In some embodiments, the support particles may contain a mixture of 2:1 to 8:1 platinum to palladium. In some embodiments, the support particles may contain a mixture of 3:1 to 5:1 platinum to palladium. In some embodiments, the support particles may contain a mixture of 4:1 platinum to palladium, or approximately 4:1 platinum to palladium.

In some embodiments, the P/Z-containing washcoat composition or P/Z layer may include by weight about 2% to about 5% boehmite particles, about 60% to about 80% PNA material and zeolite particles, and the rest porous aluminum-oxide particles (i.e., about 15% to about 38%). In one embodiment, the P/Z containing washcoat composition or P/Z layer includes by weight about 2% to about 5% boehmite particles, about 75% to about 80% PNA material and zeolite particles, and the rest porous aluminum-oxide particles (i.e., about 15% to about 23%). In another embodiments, the P/Z containing washcoat composition or P/Z 1 layer includes by weight about 2% to about 5% boehmite particles, about 65% to about 70% PNA material and zeolite particles, and the rest porous aluminum-oxide particles (i.e., about 25% to about 33%). In some embodiment, the P/Z containing washcoat composition or P/Z layer contains about 3% boehmite particles, about 67% PNA material and zeolite particles, and about 30% porous aluminum-oxide particles. In some embodiments, the P/Z containing washcoat composition or P/Z layer does not contain any catalytic material. In some embodiments, the P/Z containing washcoat composition or P/Z layer does not contain any platinum group metals.

In some embodiments, the P/Z containing washcoat composition is mixed with water and acid, such as acetic acid, prior to coating of a substrate with the P/Z containing washcoat composition, thereby forming an aqueous mixture of the P/Z containing washcoat composition, water, and acid. This aqueous mixture of the P/Z containing washcoat composition, water, and acid may then be applied to the substrate (where the substrate may or may not already have other washcoat layers applied to it). In some embodiments, the pH of this aqueous mixture may be adjusted to a pH level of about 2 to about 7 prior to it being applied to the substrate. In some embodiments, the pH of this aqueous mixture may be adjusted to a pH level of about 4 prior to it being applied to the substrate.

The washcoat layers can include materials that are less active or inert to exhausts. Such materials can be incorporated as supports for the reactive catalysts or to provide surface area for the metals. In some embodiments, the catalyst-containing washcoat composition further includes "spacer" or "filler" particles, where the spacer particles may, for example, be ceramic, metal oxide, or metallic particles. In some embodiments, the spacer particles may be boehmite.

PNA Material/Zeolite/Catalytically Active Washcoat Compositions and PNA/Zeolite/Catalyst Layers The PNA material, zeolite particles, and catalytically active material can be applied to a substrate of a catalytic converter as part of the same washcoat, thereby eliminated the need for excess washcoats. Both the PNA material and the zeolite particles can be used to trap hazardous gases during cold start of an internal combustion engine and the catalytically active particles can reduce and oxidize the hazardous particles when they are released from the zeolites and PNA material.

In some embodiments, the PNA material and the zeolite particles layer (P/Z layer) and washcoat compositions comprise, consist essentially of, or consist of PNA material, zeolite particles, boehmite particles, metal-oxide particles, silica particles, alumina/sealant particles with or without BaO, and NNm particles. The compositions of the zeolite particles, PNA material, and catalytically active particles can be any of those described above.

Catalytic Converters and Methods of Producing Catalytic Converters

In some embodiments, the disclosure provides for catalytic converters, which can comprise any of the washcoat layers and washcoat configurations described herein. The catalytic converters are useful in a variety of applications, such as in diesel or gasoline vehicles, such as in light-duty diesel or gasoline vehicles.

FIG. 1 illustrates a catalytic converter in accordance with some embodiments. Catalytically active material is included in a washcoat composition, which is coated onto a substrate to form a coated substrate. The coated substrate 114 is enclosed within an insulating material 112, which in turn is enclosed within a metallic container 110 (of, for example, stainless steel). A heat shield 108 and a gas sensor (for example, an oxygen sensor) 106 are depicted. The catalytic converter may be affixed to the exhaust system of the vehicle through flanges 104 and 118. The exhaust gas, which includes the raw emissions of hydrocarbons, carbon monoxide, and nitrogen oxides, enters the catalytic converter at 102. As the raw emissions pass through the catalytic converter, they react with the catalytically active material on the coated substrate, resulting in tailpipe emissions of water, carbon dioxide, and nitrogen exiting at 120. FIG. 1A is a magnified view of a section of the coated substrate 114, which shows the honeycomb structure of the coated substrate. The coated substrates, as described below, may be incorporated into a catalytic converter for use in a vehicle emissions control system.

Figure 3:
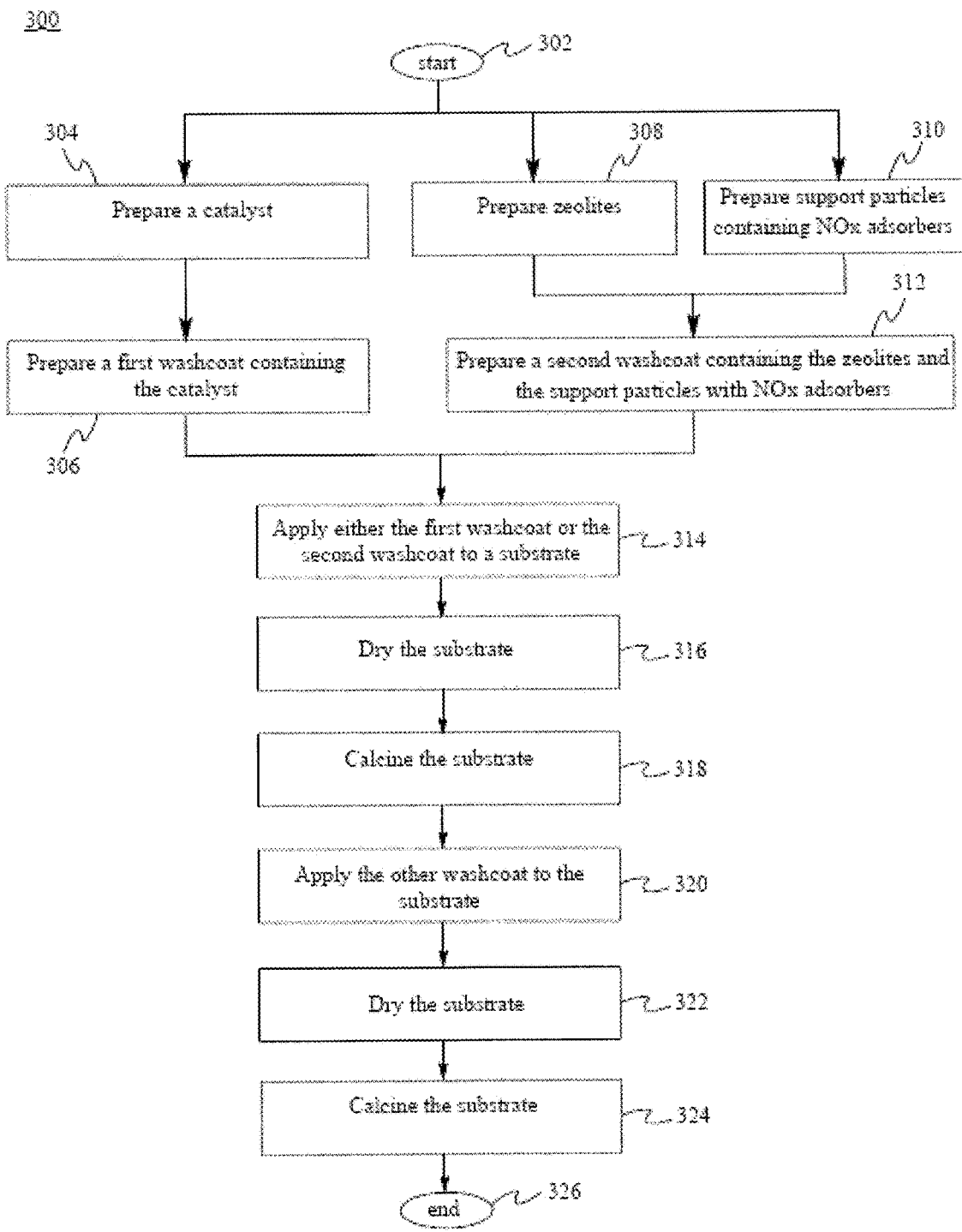
FIG. 3 is a flow chart illustrating a preparation method of a coated substrate containing catalytically active particles contained in a washcoat layers, and the zeolites and PNA material contained in a single washcoat layer, in accordance with some embodiments of the present disclosure.

FIGS. 2 and 3 illustrate various methods of forming coated substrates for use in a catalytic converter. Any of the catalyst-containing washcoats, zeolite particle-containing washcoats, and PNA material-containing washcoats disclosed herein can be used in these illustrative methods. In addition, any of the corner-fill washcoats disclosed herein can be used in any of the illustrative methods. In addition, layers or washcoats can be added to or removed from the substrates in any order.

FIG. 2 is a flow chart illustrating a PNA system preparation method 200 in accordance with embodiments of the present disclosure. The PNA system includes catalytically active particles, zeolites, and PNA material in separate washcoat layers on a substrate.

The PNA system preparation method 200 can start from Step 202. At Step 204, a catalyst is prepared. At Step 206, a first washcoat containing the catalyst is prepared. At Step 208, zeolite particles are prepared. At Step 210, a second washcoat containing the zeolite is prepared. At step 212, support particles containing $NO_x$ adsorbers are prepared. At Step 214, a third washcoat containing the support particles containing $NO_x$ adsorbers is prepared. At Step 216, either the first washcoat, the second, or the third washcoat is applied to a substrate. At Step 218, the substrate is dried. Examples of such drying processes include, but are not limited to, a hot-drying process, or a flash drying process. At Step 220, the washcoat-covered substrate is calcined. It is contemplated that the length and temperature of the calcination process can vary depending on the characteristics of the components in a particular embodiment. At Step 222, one of the remaining two washcoats is applied on the substrate. At Step 224, the substrate is dried. Examples of such drying processes include, but are not limited to, a hot-drying process, or a flash drying process. At Step 226, the washcoat-covered substrate is calcined. It is contemplated that the length and temperature of the calcination process can vary depending on the characteristics of the components in a particular embodiment. At Step 228, the final remaining washcoat is applied on the substrate. At Step 230, the substrate is dried. At Step 232, the washcoat-covered substrate with catalytically active particles, zeolite particles, and support particles impregnated with $NO_x$ storing materials contained in separate layers is calcined. It is contemplated that the length and temperature of the calcination process can vary depending on the characteristics of the components in a particular embodiment. The method 200 ends at Step 234. The oxide-oxide bonds formed during the calcination process firmly retain the nanoparticles, so that the chances for the nanoparticles to move at high temperature and to encounter and react with each other are avoided.

The method 200 can be readily modified to apply additional washcoat layers as desired, before or after any step illustrated. Preferably, a drying process and a calcining process are performed between each coating step.

FIG. 3 is a flow chart illustrating an PNA system preparation method 300 in accordance with embodiments of the present disclosure. The PNA system includes catalytically active particles in a washcoat layer on a substrate and zeolites and PNA material contained in a separate single washcoat layer.

The PNA system preparation method 300 can start from Step 302. At Step 304, a catalyst is prepared. At Step 306, a first washcoat containing the catalyst is prepared. At Step 308, zeolites are prepared. At step 310, support particles containing $NO_x$ adsorbers are prepared. At Step 312, a second washcoat containing the zeolites and the support particles for $NO_x$ adsorption/storage is prepared. At Step 314, either the first washcoat or the second washcoat is applied to a substrate. At Step 316, the substrate is dried. Examples of such drying processes include, but are not limited to, a hot-drying process, or a flash drying process. At Step 318, the washcoat-covered substrate is calcined. It is contemplated that the length and temperature of the calcination process can vary depending on the characteristics of the components in a particular embodiment. At Step 320, the other washcoat is applied on the substrate. At Step 322, the substrate is dried. Examples of such drying processes include, but are not limited to, a hot-drying process, or a flash drying process. At Step 324, the washcoat-covered substrate with catalytically active particles, and zeolite particles and support particles impregnated with $NO_x$ storing materials contained in the same layer, is calcined. It is contemplated that the length and temperature of the calcination process can vary depending on the characteristics of the components in a particular embodiment. The method 300 ends at Step 326. The oxide-oxide bonds formed during the calcination process firmly retain the nanoparticles, so that the chances for the nanoparticles to move at high temperature and to encounter and react with each other are avoided.

The method 300 can be readily modified to apply additional washcoat layers as desired, before or after any step illustrated. Preferably, a drying process and a calcining process are performed between each coating step.

In addition, a PNA system can include catalytically active particles, zeolites, and PNA material contained in a single washcoat layer on a substrate.

Figure 4:
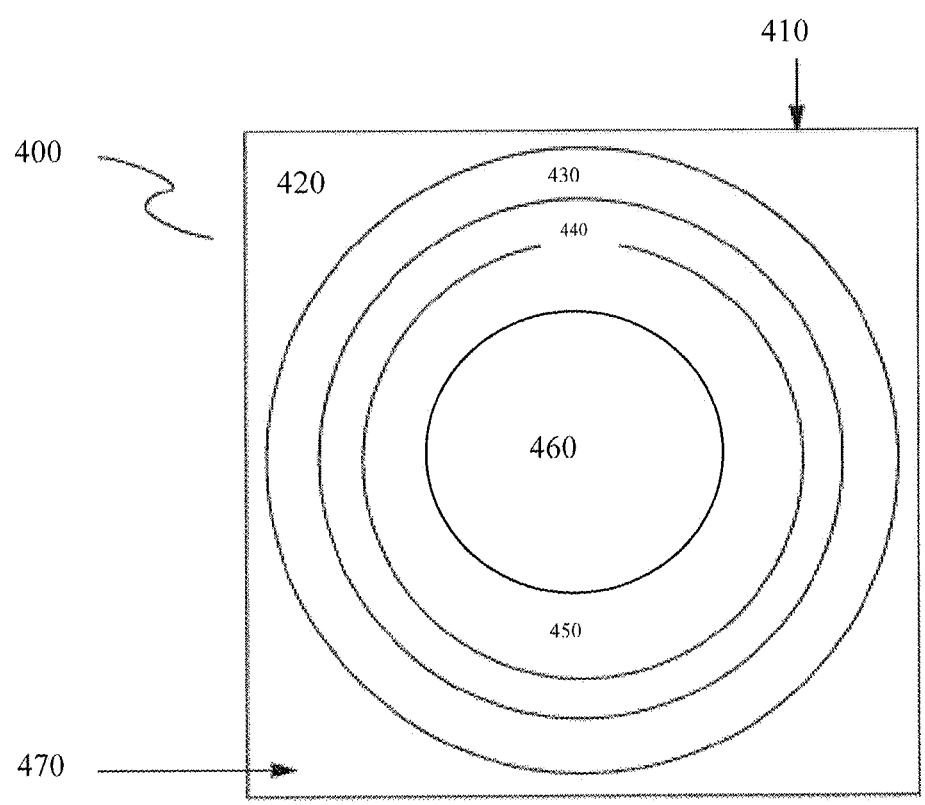
FIG. 4 shows a single rectangular channel in a coated substrate prepared according to one embodiment of the present disclosure.

FIG. 4 shows a single rectangular channel 400 in a coated substrate coated in the S-F—C-P-Z configuration, without additional washcoat layers. The wall 410 of the substrate channel has been coated with corner-fill washcoat layer 420, then catalyst-containing washcoat layer 430, then PNA material-containing washcoat layer 440, then zeolite particle-containing washcoat layer 450. Exhaust gases pass through the lumen 460 of the channel when the coated substrate is employed in a catalytic converter as part of an emissions control system.

Exhaust Systems, Vehicles, and Emissions Performance

Emission standards for unburned hydrocarbons, carbon monoxide and nitrogen oxide contaminants have been set by various governments and must be met by older, as well as new, vehicles. In order to meet such standards, catalytic converters containing a PNA system are located in the exhaust gas line of internal combustion engines. PNA systems first store, then reduce, nitrogen oxides to nitrogen.

In some embodiments, a coated substrate as disclosed herein is housed within a catalytic converter in a position configured to receive exhaust gas from an internal combustion engine, such as in an exhaust system of an internal combustion engine. The catalytic converter can be used with the exhaust from a diesel or gasoline engine, such as a light-duty diesel or gasoline engine. The catalytic converter can be installed on a vehicle containing a diesel or gasoline engine, such as a light-duty diesel or gasoline engine. The catalytic converter may even be installed on a vehicle containing a gasoline engine.

The coated substrate is placed into a housing, such as that shown in FIG. 1, which can in turn be placed into an exhaust system (also referred to as an exhaust treatment system) of an internal combustion engine. The internal combustion engine can be a diesel or gasoline engine, such as a light-duty diesel or gasoline engine, such as the engine of a light-duty diesel or gasoline vehicle. The exhaust system of the internal combustion engine receives exhaust gases from the engine, typically into an exhaust manifold, and delivers the exhaust gases to an exhaust treatment system. The catalytic converter forms part of the exhaust system and is often referred to as the diesel oxidation catalyst (DOC). An example of a DOC can be found in U.S. patent application Ser. No. 13/589,024 (now U.S. Pat. No. 8,679,433), Ser. No. 14/340,351 (U.S. Patent Publ. No. 2015/0093312), and Ser. No. 14/521,295 (now U.S. Pat. No. 9,427,732) and U.S. Pat. No. 8,679,433, which are hereby incorporated by reference in its entirety. The exhaust system can also include a diesel particulate filter (DPF) and/or a selective catalytic reduction unit (SCR unit) and/or a lean $NO_x$ trap (LNT); typical arrangements, in the sequence that exhaust gases are received from the engine, are DOC-DPF and DOC-DPF-SCR or in an LNT system. The exhaust system can also include other components, such as oxygen sensors, HEGO (heated exhaust gas oxygen) sensors, UEGO (universal exhaust gas oxygen) sensors, sensors for other gases, and temperature sensors. The exhaust system can also include a controller such as an engine control unit (ECU), a microprocessor, or an engine management computer, which can adjust various parameters in the vehicle (fuel flow rate, fuel/air ratio, fuel injection, engine timing, valve timing, etc.) in order to optimize the components of the exhaust gases that reach the exhaust treatment system, so as to manage the emissions released into the environment.

"Treating" an exhaust gas, such as the exhaust gas from a gasoline or diesel or gasoline engine, refers to having the exhaust gas proceed through an exhaust system (exhaust treatment system) prior to release into the environment.

The United States Environmental Protection Agency defines a "light-duty diesel vehicle" ("LDDV") as a diesel-powered motor vehicle, other than a diesel bus, that has a gross vehicle weight rating of 8,500 pounds or less and is designed primarily for transporting persons or property. In Europe, a "light-duty diesel or gasoline engine" has been considered to be an engine used in a vehicle of 3.5 metric tons or less (7,716 pounds or less) (see European directives 1992/21 EC and 1995/48 EC). In some embodiments, a light-duty diesel vehicle is a diesel vehicle weighing about 8,500 pounds or less, or about 7,700 pounds or less, and a light-duty diesel engine is an engine used in a light-duty diesel vehicle.

When used in a catalytic converter, the coated substrates disclosed herein may provide a significant improvement over other catalytic converters. The PNA material or the PNA material and the zeolites in the coated substrate act as an intermediate storage device for the exhaust gases while the exhaust gas is still cold. The undesirable gases (including, but not limited to, hydrocarbons, carbon monoxide, and nitrogen oxides or $NO_x$) adsorb to the PNA material or the PNA and zeolites ($NO_x$ adsorbs to the PNA material) during the cold start phase, while the catalyst is not yet active, and are released later when the catalyst reaches a temperature sufficient to effectively decompose the gases (that is, the light-off temperature). The coated substrates, catalytic converters, and exhaust treatment systems described herein are useful for any vehicle employing an LNT, SCR, or other NSC system.

In some embodiments, catalytic converters and exhaust treatment systems employing the coated substrates disclosed herein display emissions of 3400 mg/mile or less of CO emissions and 400 mg/mile or less of $NO_x$ emissions; 3400 mg/mile or less of CO emissions and 200 mg/mile or less of $NO_x$ emissions; or 1700 mg/mile or less of CO emissions and 200 mg/mile or less of $NO_x$ emissions. The disclosed coated substrates, used as catalytic converter substrates, can be used in an emission system to meet or exceed these standards. In some embodiments, the coated substrate is used in a catalytic converter (diesel oxidation catalyst) in the configuration DOC-DPF or DOC-DPF-SCR or in an LNT system to meet or exceed these standards.

Emissions limits for Europe are summarized at the URL europa.eu/legislation_summaries/environment/air_pollution/128186_en.htm. The Euro 5 emissions standards, in force as of September 2009, specify a limit of 500 mg/km of CO emissions, 180 mg/km of $NO_x$ emissions, and 230 mg/km of HC (hydrocarbon)+$NO_x$ emissions. The Euro 6 emissions standards, scheduled for implementation as of September 2014, specify a limit of 500 mg/km of CO emissions, 80 mg/km of $NO_x$ emissions, and 170 mg/km of HC (hydrocarbon)+$NO_x$ emissions. The disclosed catalytic converter substrates can be used in an emission system to meet or exceed these standards. In some embodiments, the coated substrate is used in a catalytic converter (diesel oxidation catalyst) in the configuration DOC-DPF or DOC-DPF-SCR or in an LNT system to meet or exceed these standards.

In some embodiments, a catalytic converter made with a coated substrate of the present disclosure, loaded with 4.0 g/L of PGM or less displays a carbon monoxide light-off temperature at least 5° C. lower than a catalytic converter made with wet chemistry methods and having the same or similar PGM loading. In some embodiments, a catalytic converter made with a coated substrate of the present disclosure, loaded with 4.0 g/L of PGM or less, displays a carbon monoxide light-off temperature at least 10° C. lower than a catalytic converter made with wet chemistry methods and having the same or similar PGM loading. In some embodiments, a catalytic converter made with a coated substrate of the present disclosure, loaded with 4.0 g/L of PGM or less, displays a carbon monoxide light-off temperature at least 15° C. lower than a catalytic converter made with wet chemistry methods and having the same or similar PGM loading. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure, loaded with 4.0 g/L of PGM or less, displays a hydrocarbon light-off temperature at least 5° C. lower than a catalytic converter made with wet chemistry methods and having the same or similar PGM loading. In some embodiments, a catalytic converter made with a coated substrate of the present disclosure, loaded with 4.0 g/L of PGM or less, displays a hydrocarbon light-off temperature at least 10° C. lower than a catalytic converter made with wet chemistry methods and having the same or similar PGM loading. In some embodiments, a catalytic converter made with a coated substrate of the present disclosure, loaded with 4.0 g/L of PGM or less, displays a hydrocarbon light-off temperature at least 15° C. lower than a catalytic converter made with wet chemistry methods and having the same or similar PGM loading. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure, loaded with 4.0 g/L of PGM or less, displays a nitrogen oxide light-off temperature at least 5° C. lower than a catalytic converter made with wet chemistry methods and having the same or similar PGM loading. In some embodiments, a catalytic converter made with a coated substrate of the present disclosure, loaded with 4.0 g/L of PGM or less, displays a nitrogen oxide light-off temperature at least 10° C. lower than a catalytic converter made with wet chemistry methods and having the same or similar PGM loading. In some embodiments, a catalytic converter made with a coated substrate of the present disclosure, loaded with 4.0 g/L of PGM or less, displays a nitrogen oxide light-off temperature at least 15° C. lower than a catalytic converter made with wet chemistry methods and having the same or similar PGM loading. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure, loaded with 3.0 g/L of PGM or less, displays a carbon monoxide light-off temperature at least 5° C. lower than a catalytic converter made with wet chemistry methods and having the same or similar PGM loading. In some embodiments, a catalytic converter made with a coated substrate of the present disclosure, loaded with 3.0 g/L of PGM or less, displays a carbon monoxide light-off temperature at least 10° C. lower than a catalytic converter made with wet chemistry methods and having the same or similar PGM loading. In some embodiments, a catalytic converter made with a coated substrate of the present disclosure, loaded with 3.0 g/L of PGM or less, displays a carbon monoxide light-off temperature at least 15° C. lower than a catalytic converter made with wet chemistry methods and having the same or similar PGM loading. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure, loaded with 3.0 g/L of PGM or less, displays a hydrocarbon light-off temperature at least 5° C. lower than a catalytic converter made with wet chemistry methods and having the same or similar PGM loading. In some embodiments, a catalytic converter made with a coated substrate of the present disclosure, loaded with 3.0 g/L of PGM or less, displays a hydrocarbon light-off temperature at least 10° C. lower than a catalytic converter made with wet chemistry methods and having the same or similar PGM loading. In some embodiments, a catalytic converter made with a coated substrate of the present disclosure, loaded with 3.0 g/L of PGM or less, displays a hydrocarbon light-off temperature at least 15° C. lower than a catalytic converter made with wet chemistry methods and having the same or similar PGM loading. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure, loaded with 3.0 g/L of PGM or less, displays a nitrogen oxide light-off temperature at least 5° C. lower than a catalytic converter made with wet chemistry methods and having the same or similar PGM loading. In some embodiments, a catalytic converter made with a coated substrate of the present disclosure, loaded with 3.0 g/L of PGM or less, displays a nitrogen oxide light-off temperature at least 10° C. lower than a catalytic converter made with wet chemistry methods and having the same or similar PGM loading. In some embodiments, a catalytic converter made with a coated substrate of the present disclosure, loaded with 3.0 g/L of PGM or less, displays a nitrogen oxide light-off temperature at least 15° C. lower than a catalytic converter made with wet chemistry methods and having the same or similar PGM loading. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure, loaded with 2.0 g/L of PGM or less, displays a carbon monoxide light-off temperature at least 5° C. lower than a catalytic converter made with wet chemistry methods and having the same or similar PGM loading. In some embodiments, a catalytic converter made with a coated substrate of the present disclosure, loaded with 2.0 g/L of PGM or less, displays a carbon monoxide light-off temperature at least 10° C. lower than a catalytic converter made with wet chemistry methods and having the same or similar PGM loading. In some embodiments, a catalytic converter made with a coated substrate of the present disclosure, loaded with 2.0 g/L of PGM or less, displays a carbon monoxide light-off temperature at least 15° C. lower than a catalytic converter made with wet chemistry methods and having the same or similar PGM loading. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure, loaded with 2.0 g/L of PGM or less, displays a hydrocarbon light-off temperature at least 5° C. lower than a catalytic converter made with wet chemistry methods and having the same or similar PGM loading. In some embodiments, a catalytic converter made with a coated substrate of the present disclosure, loaded with 2.0 g/L of PGM or less, displays a hydrocarbon light-off temperature at least 10° C. lower than a catalytic converter made with wet chemistry methods and having the same or similar PGM loading. In some embodiments, a catalytic converter made with a coated substrate of the present disclosure, loaded with 2.0 g/L of PGM or less, displays a hydrocarbon light-off temperature at least 15° C. lower than a catalytic converter made with wet chemistry methods and having the same or similar PGM loading. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure, loaded with 2.0 g/L of PGM or less, displays a nitrogen oxide light-off temperature at least 5° C. lower than a catalytic converter made with wet chemistry methods and having the same or similar PGM loading. In some embodiments, a catalytic converter made with a coated substrate of the present disclosure, loaded with 2.0 g/L of PGM or less, displays a nitrogen oxide light-off temperature at least 10° C. lower than a catalytic converter made with wet chemistry methods and having the same or similar PGM loading. In some embodiments, a catalytic converter made with a coated substrate of the present disclosure, loaded with 2.0 g/L of PGM or less, displays a nitrogen oxide light-off temperature at least 15° C. lower than a catalytic converter made with wet chemistry methods and having the same or similar PGM loading. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure displays a carbon monoxide light-off temperature within ±3° C. of the carbon monoxide light-off temperature of a catalytic converter made with wet chemistry methods, while the catalytic converter made with a coated substrate employing at least about 30% less, up to about 30% less, at least about 40% less, up to about 40% less, at least about 50% less, or up to about 50% less catalyst than the catalytic converter made with wet chemistry methods. In some embodiments, the catalytic converter made with a coated substrate of the present disclosure demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure displays a carbon monoxide light-off temperature within ±2° C. of the carbon monoxide light-off temperature of a catalytic converter made with wet chemistry methods, while the catalytic converter made with a coated substrate employing at least about 30% less, up to about 30% less, at least about 40% less, up to about 40% less, at least about 50% less, or up to about 50% less catalyst than the catalytic converter made with wet chemistry methods. In some embodiments, the catalytic converter made with a coated substrate of the present disclosure demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure displays a carbon monoxide light-off temperature within ±1° C. of the carbon monoxide light-off temperature of a catalytic converter made with wet chemistry methods, while the catalytic converter made with a coated substrate employing at least about 30% less, up to about 30% less, at least about 40% less, up to about 40% less, at least about 50% less, or up to about 50% less catalyst than the catalytic converter made with wet chemistry methods. In some embodiments, the catalytic converter made with a coated substrate of the present disclosure demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure displays a carbon monoxide light-off temperature within ±3° C. of the hydrocarbon light-off temperature of a catalytic converter made with wet chemistry methods, while the catalytic converter made with a coated substrate employing at least about 30% less, up to about 30% less, at least about 40% less, up to about 40% less, at least about 50% less, or up to about 50% less catalyst than the catalytic converter made with wet chemistry methods. In some embodiments, the catalytic converter made with a coated substrate of the present disclosure demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure displays a carbon monoxide light-off temperature within ±2° C. of the hydrocarbon light-off temperature of a catalytic converter made with wet chemistry methods, while the catalytic converter made with a coated substrate employing at least about 30% less, up to about 30% less, at least about 40% less, up to about 40% less, at least about 50% less, or up to about 50% less catalyst than the catalytic converter made with wet chemistry methods. In some embodiments, the catalytic converter made with a coated substrate of the present disclosure demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure displays a carbon monoxide light-off temperature within ±1° C. of the hydrocarbon light-off temperature of a catalytic converter made with wet chemistry methods, while the catalytic converter made with a coated substrate employing at least about 30% less, up to about 30% less, at least about 40% less, up to about 40% less, at least about 50% less, or up to about 50% less catalyst than the catalytic converter made with wet chemistry methods. In some embodiments, the catalytic converter made with a coated substrate of the present disclosure demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure displays a carbon monoxide light-off temperature within ±5° C. of the nitrogen oxide light-off temperature of a catalytic converter made with wet chemistry methods, while the catalytic converter made with a coated substrate employing at least about 30% less, up to about 30% less, at least about 40% less, up to about 40% less, at least about 50% less, or up to about 50% less catalyst than the catalytic converter made with wet chemistry methods. In some embodiments, the catalytic converter made with a coated substrate of the present disclosure demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure displays a carbon monoxide light-off temperature within ±4° C. of the nitrogen oxide light-off temperature of a catalytic converter made with wet chemistry methods, while the catalytic converter made with a coated substrate employing at least about 30% less, up to about 30% less, at least about 40% less, up to about 40% less, at least about 50% less, or up to about 50% less catalyst than the catalytic converter made with wet chemistry methods. In some embodiments, the catalytic converter made with a coated substrate of the present disclosure demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure displays a carbon monoxide light-off temperature within ±3° C. of the nitrogen oxide light-off temperature of a catalytic converter made with wet chemistry methods, while the catalytic converter made with a coated substrate employing at least about 30% less, up to about 30% less, at least about 40% less, up to about 40% less, at least about 50% less, or up to about 50% less catalyst than the catalytic converter made with wet chemistry methods. In some embodiments, the catalytic converter made with a coated substrate of the present disclosure demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure displays a carbon monoxide light-off temperature within ±2° C. of the nitrogen oxide light-off temperature of a catalytic converter made with wet chemistry methods, while the catalytic converter made with a coated substrate employing at least about 30% less, up to about 30% less, at least about 40% less, up to about 40% less, at least about 50% less, or up to about 50% less catalyst than the catalytic converter made with wet chemistry methods. In some embodiments, the catalytic converter made with a coated substrate of the present disclosure demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure displays a carbon monoxide light-off temperature within ±1° C. of the nitrogen oxide light-off temperature of a catalytic converter made with wet chemistry methods, while the catalytic converter made with a coated substrate employing at least about 30% less, up to about 30% less, at least about 40% less, up to about 40% less, at least about 50% less, or up to about 50% less catalyst than the catalytic converter made with wet chemistry methods. In some embodiments, the catalytic converter made with a coated substrate of the present disclosure demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure employed on a diesel or gasoline engine or diesel or gasoline vehicle, such as a light-duty diesel or gasoline engine or light-duty diesel or gasoline vehicle, complies with United States EPA emissions requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with the same standard. In some embodiments, the coated substrate is used in a catalytic converter (diesel oxidation catalyst) in the configuration DOC-DPF or DOC-DPF-SCR or in an LNT system to meet or exceed these standards. The emissions requirements can be intermediate life requirements or full life requirements. The requirements can be TLEV requirements, LEV requirements, or ULEV requirements. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure employed on a diesel or gasoline engine or diesel or gasoline vehicle, such as a light-duty diesel or gasoline engine or light-duty diesel or gasoline vehicle, complies with EPA TLEV/LEV intermediate life requirements. In some embodiments, a catalytic converter made with a coated substrate of the present disclosure employed on a diesel or gasoline engine or diesel or gasoline vehicle, such as a light-duty diesel or gasoline engine or light-duty diesel or gasoline vehicle, complies with EPA TLEV/LEV full life requirements. In some embodiments, a catalytic converter made with a coated substrate of the present disclosure employed on a diesel or gasoline engine or diesel or gasoline vehicle, such as a light-duty diesel or gasoline engine or light-duty diesel or gasoline vehicle, complies with EPA ULEV intermediate life requirements. In some embodiments, a catalytic converter made with a coated substrate of the present disclosure employed on a diesel or gasoline engine or diesel or gasoline vehicle, such as a light-duty diesel or gasoline engine or light-duty diesel or gasoline vehicle, complies with EPA ULEV full life requirements. In some embodiments, the coated substrate is used in a catalytic converter (diesel oxidation catalyst) in the configuration DOC-DPF or DOC-DPF-SCR or in an LNT system to meet or exceed these standards. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the present disclosure employed on a diesel or gasoline engine or diesel or gasoline vehicle, such as a light-duty diesel or gasoline engine or light-duty diesel or gasoline vehicle, complies with EPA TLEV/LEV intermediate life requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with that standard. In some embodiments, a catalytic converter made with a coated substrate of the present disclosure employed on a diesel or gasoline engine or diesel or gasoline vehicle, such as a light-duty diesel or gasoline engine or light-duty diesel or gasoline vehicle, complies with EPA TLEV/LEV full life requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with that standard. In some embodiments, a catalytic converter made with a coated substrate of the present disclosure employed on a diesel or gasoline engine or diesel or gasoline vehicle, such as a light-duty diesel v engine or light-duty diesel or gasoline vehicle, complies with EPA ULEV intermediate life requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with that standard. In some embodiments, a catalytic converter made with a coated substrate of the present disclosure employed on a diesel or gasoline engine or diesel or gasoline vehicle, such as a light-duty diesel or gasoline engine or light-duty diesel or gasoline vehicle, complies with EPA ULEV full life requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with that standard. In some embodiments, the coated substrate is used in a catalytic converter (diesel oxidation catalyst) in the configuration DOC-DPF or DOC-DPF-SCR or in an LNT system to meet or exceed these standards. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure employed on a diesel or gasoline engine or diesel or gasoline vehicle, such as a light-duty diesel or gasoline engine or light-duty diesel or gasoline vehicle, complies with Euro 5 requirements. In some embodiments, a catalytic converter made with a coated substrate of the present disclosure employed on a diesel or gasoline engine or diesel or gasoline vehicle, such as a light-duty diesel or gasoline engine or light-duty diesel or gasoline vehicle, complies with Euro 6 requirements. In some embodiments, the coated substrate is used in a catalytic converter (diesel oxidation catalyst) in the configuration DOC-DPF or DOC-DPF-SCR or in an LNT system to meet or exceed these standards. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the present disclosure employed on a diesel or gasoline engine or diesel or gasoline vehicle, such as a light-duty diesel or gasoline engine or light-duty diesel or gasoline vehicle, complies with Euro 5 requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with Euro 5 requirements. In some embodiments, the coated substrate is used in a catalytic converter (diesel oxidation catalyst) in the configuration DOC-DPF or DOC-DPF-SCR or in an LNT system to meet or exceed these standards. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure employed on a diesel or gasoline engine or diesel or gasoline vehicle, such as a light-duty diesel or gasoline engine or light-duty diesel or gasoline vehicle, complies with Euro 6 requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with Euro 6 requirements. In some embodiments, the coated substrate is used in a catalytic converter (diesel oxidation catalyst) in the configuration DOC-DPF or DOC-DPF-SCR or in an LNT system to meet or exceed these standards. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure employed on a diesel or gasoline engine or diesel or gasoline vehicle, such as a light-duty diesel or gasoline engine or light-duty diesel or gasoline vehicle, displays carbon monoxide emissions of 4200 mg/mile or less. In some embodiments, a catalytic converter made with a coated substrate of the present disclosure and employed on a diesel or gasoline engine or diesel or gasoline vehicle, such as a light-duty diesel or gasoline engine or light-duty diesel or gasoline vehicle, displays carbon monoxide emissions of 3400 mg/mile or less. In some embodiments, a catalytic converter made with a coated substrate of the present disclosure and employed on a diesel or gasoline engine or diesel or gasoline vehicle, such as a light-duty diesel or gasoline engine or light-duty diesel or gasoline vehicle, displays carbon monoxide emissions of 2100 mg/mile or less. In another embodiment, a catalytic converter made with a coated substrate of the present disclosure and employed on a diesel or gasoline engine or diesel or gasoline vehicle, such as a light-duty diesel or gasoline engine or light-duty diesel or gasoline vehicle, displays carbon monoxide emissions of 1700 mg/mile or less. In some embodiments, the coated substrate is used in a catalytic converter (diesel oxidation catalyst) in the configuration DOC-DPF or DOC-DPF-SCR or in an LNT system to meet or exceed these standards. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the present disclosure and employed on a diesel or gasoline engine or diesel or gasoline vehicle, such as a light-duty diesel or gasoline engine or light-duty diesel or gasoline vehicle, displays carbon monoxide emissions of 500 mg/km or less. In some embodiments, a catalytic converter made with a coated substrate of the present disclosure and employed on a diesel or gasoline engine or diesel or gasoline vehicle, such as a light-duty diesel or gasoline engine or light-duty diesel or gasoline vehicle, displays carbon monoxide emissions of 375 mg/km or less. In some embodiments, a catalytic converter made with a coated substrate of the present disclosure and employed on a diesel or gasoline engine or diesel or gasoline vehicle, such as a light-duty diesel or gasoline engine or light-duty diesel or gasoline vehicle, displays carbon monoxide emissions of 250 mg/km or less. In some embodiments, the coated substrate is used in a catalytic converter (diesel oxidation catalyst) in the configuration DOC-DPF or DOC-DPF-SCR or in an LNT system to meet or exceed these standards. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the present disclosure and employed on a diesel or gasoline engine or diesel or gasoline vehicle, such as a light-duty diesel or gasoline engine or light-duty diesel or gasoline vehicle, displays $NO_x$ emissions of 180 mg/km or less. In some embodiments, a catalytic converter made with a coated substrate of the present disclosure and employed on a diesel or gasoline engine or diesel or gasoline vehicle, such as a light-duty diesel or gasoline engine or light-duty diesel or gasoline vehicle, displays $NO_x$ emissions of 80 mg/km or less. In some embodiments, a catalytic converter made with a coated substrate of the present disclosure and employed on a diesel or gasoline engine or diesel or gasoline vehicle, such as a light-duty diesel or gasoline engine or light-duty diesel or gasoline vehicle, displays $NO_x$ emissions of 40 mg/km or less. In some embodiments, the coated substrate is used in a catalytic converter (diesel oxidation catalyst) in the configuration DOC-DPF or DOC-DPF-SCR or in an LNT system to meet or exceed these standards. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the present disclosure and employed on a diesel or gasoline engine or diesel or gasoline vehicle, such as a light-duty diesel or gasoline engine or light-duty diesel or gasoline vehicle, displays $NO_x$ plus HC emissions of 230 mg/km or less. In some embodiments, a catalytic converter made with a coated substrate of the present disclosure and employed on a diesel or gasoline engine or diesel or gasoline vehicle, such as a light-duty diesel or gasoline engine or light-duty diesel or gasoline vehicle, displays $NO_x$ plus HC emissions of 170 mg/km or less. In some embodiments, a catalytic converter made with a coated substrate of the present disclosure and employed on a diesel or gasoline engine or diesel or gasoline vehicle, such as a light-duty diesel or gasoline engine or light-duty diesel or gasoline vehicle, displays $NO_x$ plus HC emissions of 85 mg/km or less. In some embodiments, the coated substrate is used in a catalytic converter (diesel oxidation catalyst) in the configuration DOC-DPF or DOC-DPF-SCR or in an LNT system to meet or exceed these standards. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the present disclosure and employed on a diesel or gasoline engine or diesel or gasoline vehicle, such as a light-duty diesel or gasoline engine or light-duty diesel or gasoline vehicle, displays carbon monoxide emissions of 500 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the present disclosure and employed on a diesel or gasoline engine or diesel or gasoline vehicle, such as a light-duty diesel or gasoline engine or light-duty diesel or gasoline vehicle, displays carbon monoxide emissions of 375 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the present disclosure and employed on a diesel or gasoline engine or diesel or gasoline vehicle, such as a light-duty diesel or gasoline engine or light-duty diesel or gasoline vehicle, displays carbon monoxide emissions of 250 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, the coated substrate is used in a catalytic converter (diesel oxidation catalyst) in the configuration DOC-DPF or DOC-DPF-SCR or in an LNT system to meet or exceed these standards. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure and employed on a diesel or gasoline engine or diesel or gasoline vehicle, such as a light-duty diesel or gasoline engine or light-duty diesel or gasoline vehicle, displays $NO_x$ emissions of 180 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the present disclosure and employed on a diesel or gasoline engine or diesel or gasoline vehicle, such as a light-duty diesel or gasoline engine or light-duty diesel or gasoline vehicle, displays $NO_x$ emissions of 80 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the present disclosure and employed on a diesel or gasoline engine or diesel or gasoline vehicle, such as a light-duty diesel or gasoline engine or light-duty diesel or gasoline vehicle, displays $NO_x$ emissions of 40 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, the coated substrate is used in a catalytic converter (diesel oxidation catalyst) in the configuration DOC-DPF or DOC-DPF-SCR or in an LNT system to meet or exceed these standards. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, a catalytic converter made with a coated substrate of the present disclosure and employed on a diesel or gasoline engine or diesel or gasoline vehicle, such as a light-duty diesel or gasoline engine or light-duty diesel or gasoline vehicle, displays $NO_x$ plus HC emissions of 230 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the present disclosure and employed on a diesel or gasoline engine or diesel or gasoline vehicle, such as a light-duty diesel or gasoline engine or light-duty diesel or gasoline vehicle, displays $NO_x$ plus HC emissions of 170 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the present disclosure and employed on a diesel or gasoline engine or diesel or gasoline vehicle, such as a light-duty diesel or gasoline engine or light-duty diesel or gasoline vehicle, displays $NO_x$ plus HC emissions of 85 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, the coated substrate is used in a catalytic converter (diesel oxidation catalyst) in the configuration DOC-DPF or DOC-DPF-SCR or in an LNT system to meet or exceed these standards. In some embodiments, the catalytic converter made with a coated substrate of the present disclosure demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the present disclosure and the comparative catalytic converter).

In some embodiments, for the above-described comparisons, the thrifting (reduction) of platinum group metal for the catalytic converters made with substrates of the present disclosure is compared with either 1) a commercially available catalytic converter, made using wet chemistry, for the application disclosed (e.g., for use on a diesel or gasoline engine or vehicle, such as a light-duty diesel or gasoline engine or light-duty diesel or gasoline vehicle), or 2) a catalytic converter made with wet chemistry, which uses the minimal amount of platinum group metal to achieve the performance standard indicated.

In some embodiments, for the above-described comparisons, both the coated substrate according to the present disclosure, and the catalyst used in the commercially available catalytic converter or the catalyst prepared using wet chemistry methods, are aged (by the same amount) prior to testing. In some embodiments, both the coated substrate according to the present disclosure, and the catalyst substrate used in the commercially available catalytic converter or the catalyst substrate prepared using wet chemistry methods, are aged to about (or up to about) 50,000 kilometers, about (or up to about) 50,000 miles, about (or up to about) 75,000 kilometers, about (or up to about) 75,000 miles, about (or up to about) 100,000 kilometers, about (or up to about) 100,000 miles, about (or up to about) 125,000 kilometers, about (or up to about) 125,000 miles, about (or up to about) 150,000 kilometers, or about (or up to about) 150,000 miles. In some embodiments, for the above-described comparisons, both the coated substrate according to the present disclosure, and the catalyst substrate used in the commercially available catalytic converter or the catalyst substrate prepared using wet chemistry methods, are artificially aged (by the same amount) prior to testing. In some embodiments, they are artificially aged by heating to about 400° C., about 500° C., about 600° C., about 700°, about 800° C., about 900° C., about 1000° C., about 1100° C., or about 1200° C. for about (or up to about) 4 hours, about (or up to about) 6 hours, about (or up to about) 8 hours, about (or up to about) 10 hours, about (or up to about) 12 hours, about (or up to about) 14 hours, about (or up to about) 16 hours, about (or up to about) 18 hours, about (or up to about) 20 hours, about (or up to about) 22 hours, or about (or up to about) 24 hours. In some embodiments, they are artificially aged by heating to about 800° C. for about 16 hours.

In some embodiments, for the above-described comparisons, the thrifting (reduction) of platinum group metal for the catalytic converters made with substrates of the present disclosure is compared with either 1) a commercially available catalytic converter, made using wet chemistry, for the application disclosed (e.g., for use on a diesel or gasoline engine or vehicle, such as a light-duty diesel or gasoline engine or light-duty diesel or gasoline vehicle), or 2) a catalytic converter made with wet chemistry, which uses the minimal amount of platinum group metal to achieve the performance standard indicated, and after the coated substrate according to the present disclosure and the catalytic substrate used in the commercially available catalyst or catalyst made using wet chemistry with the minimal amount of PGM to achieve the performance standard indicated are aged as described above.

In some embodiments, for the above-described catalytic converters employing the coated substrates of the present disclosure, for the exhaust treatment systems using catalytic converters employing the coated substrates of the present disclosure, and for vehicles employing these catalytic converters and exhaust treatment systems, the catalytic converter is employed as a diesel oxidation catalyst along with a diesel particulate filter, or the catalytic converter is employed as a diesel oxidation catalyst along with a diesel particulate filter and a selective catalytic reduction unit, to meet or exceed the standards for CO and/or $NO_x$, and/or HC described above.

EXEMPLARY EMBODIMENTS

The invention is further described by the following embodiments. The features of each of the embodiments are combinable with any of the other embodiments where appropriate and practical.

Embodiment 1

A PNA material comprising: manganese oxide on a first plurality of micron-sized support particles; magnesium oxide on a second plurality of micron-sized support particles; and calcium oxide on a third plurality of micron-sized support particles.

Embodiment 2

The PNA material of embodiment 1, wherein manganese oxide, magnesium oxide, and calcium oxide are nano-sized.

Embodiment 3

The PNA material of any one of embodiments 1-2, wherein the pluralities of support particles comprise ceria.

Embodiment 4

The PNA material of embodiment 3, wherein the PNA material comprises about 150 g/L to about 350 g/L ceria.

Embodiment 5

The PNA material of any one of embodiments 3-4, wherein the PNA material comprises about 1% to about 20% manganese oxide by weight of the amount of ceria.

Embodiment 6

The PNA material of any one of embodiments 3-5, wherein the PNA material comprises about 1% to about 10% magnesium oxide by weight of the amount of ceria.

Embodiment 7

The PNA material of any one of embodiments 3-6, wherein the PNA material comprises about 1% to about 10% calcium oxide by weight of the amount of ceria.

Embodiment 8

The PNA material of any one of embodiments 3-7, wherein the PNA material comprises about 28 g/L manganese oxide.

Embodiment 9

The PNA material of any one of embodiments 3-8, wherein the PNA material comprises about 10.5 g/L magnesium oxide.

Embodiment 10

The PNA material of any one of embodiments 3-9, wherein the PNA material comprises about 10.5 g/L calcium oxide.

Embodiment 11

The PNA material of any one of embodiments 1-10, wherein the PNA material stores NOx emissions from ambient temperature to about 100° C.

Embodiment 12

The PNA material of any one of embodiments 1-11, wherein the PNA material stores NOx emissions from ambient temperature to about 150° C.

Embodiment 13

The PNA material of any one of embodiments 1-12, wherein the PNA material stores NOx emissions from ambient temperature to about 200° C.

Embodiment 14

The PNA material of any one of embodiments 1-13, further comprising platinum group metals.

Embodiment 15

The PNA material of embodiment 14, wherein the platinum group metals are on a fourth plurality of micron-sized support particles.

Embodiment 16

The PNA material of embodiment 14-15, wherein the platinum group metals are on at least one of the first, second, or third pluralities of micron-sized support materials.

Embodiment 17

The PNA material of any one of embodiments 14-16, wherein the platinum group metals are added to the support particles using wet chemistry techniques.

Embodiment 18

The PNA material of embodiment 14-17, wherein the platinum group metals are added to the support particles using incipient wetness.

Embodiment 19

The PNA material of embodiment 18, wherein the platinum group metals comprises nano-on-nano particles.

Embodiment 20

The PNA material of any one of embodiments 14-19, wherein the PGM loading is 1.0 g/L to 5.0 g/L.

Embodiment 21

The PNA material of any one of embodiments 14-20, wherein the PGM is platinum, palladium, or a mixture thereof.

Embodiment 22

A method of forming a PNA material comprising: applying manganese oxide to a first plurality of micron-sized support particles; applying magnesium oxide to a second plurality of micron-sized support particles; applying calcium oxide to a third plurality of micron-sized support particles; and combining the manganese oxide, magnesium oxide, and calcium oxide pluralities of micron-sized support particles.

Embodiment 23

The method of embodiment 22, wherein manganese oxide, magnesium oxide, and calcium oxide are nano-sized.

Embodiment 24

The method of any one of embodiments 22-23, wherein the pluralities of support particles comprise ceria.

Embodiment 25

The method of embodiment 24, wherein the PNA material comprises about 150 g/L to about 350 g/L ceria.

Embodiment 26

The method of any one of embodiments 24-25, wherein the PNA material comprises about 1% to about 20% manganese oxide by weight of the amount of ceria.

Embodiment 27

The method of any one of embodiments 24-26, wherein the PNA material comprises about 1% to about 10% magnesium oxide by weight of the amount of ceria.

Embodiment 28

The method of any one of embodiments 24-27, wherein the PNA material comprises about 1% to about 10% calcium oxide by weight of the amount of ceria.

Embodiment 29

The method of any one of embodiments 24-28, wherein the PNA material comprises about 28 g/L manganese oxide.

Embodiment 30

The method of any one of embodiments 24-29, wherein the PNA material comprises about 10.5 g/L magnesium oxide.

Embodiment 31

The method of any one of embodiments 24-30, wherein the PNA material comprises about 10.5 g/L calcium oxide.

Embodiment 32

The method of any one of embodiments 22-31, wherein the PNA material stores NOx emissions from ambient temperature to about 100° C.

Embodiment 33

The method of any one of embodiments 22-32, wherein the PNA material stores NOx emissions from ambient temperature to about 150° C.

Embodiment 34

The method of any one of embodiments 22-33, wherein the PNA material stores NOx emissions from ambient temperature to about 200° C.

Embodiment 35

The method of any one of embodiments 22-34, further comprising applying platinum group metals to a fourth plurality of micron-sized support particles.

Embodiment 36

The method of any one of embodiments 22-35, further comprising applying platinum group metals to at least one of the first, second, or third pluralities of micron-sized support materials.

Embodiment 37

The method of any one of embodiments 35-36, wherein the platinum group metals are applied to the support particles using wet chemistry techniques.

Embodiment 38

The method of embodiment 35-37, wherein the platinum group metals are applied to the support particles using incipient wetness.

Embodiment 39

The method of embodiment 38, wherein the platinum group metals comprises nano-on-nano particles.

Embodiment 40

The method of any one of embodiments 35-39, wherein the PGM loading is 1.0 g/L to 5.0 g/L.

Embodiment 41

The method of any one of embodiments 14-20, wherein the PGM is platinum, palladium, or a mixture thereof.

Embodiment 42

A washcoat composition comprising a solids content of: 95% to 98% by weight PNA material comprising manganese oxide on a plurality of micron-sized support particles; and 2% to 5% by weight of boehmite particles.

Embodiment 43

The washcoat composition of embodiment 42, wherein the 95% to 98% by weight PNA material further comprises magnesium oxide on a second plurality of micron-sized support particles.

Embodiment 44

The washcoat composition of any one of embodiments 42-43, wherein the 95% to 98% by weight PNA material further comprises calcium oxide on a third plurality of micron-sized support particles.

Embodiment 45

A washcoat composition comprising a solids content of: 95% to 98% by weight PNA material comprising magnesium oxide on a plurality of micron-sized support particles; and 2% to 5% by weight of boehmite particles.

Embodiment 46

The washcoat composition of embodiment 45, wherein the 95% to 98% by weight PNA material further comprises manganese oxide on a second plurality of micron-sized support particles.

Embodiment 47

The washcoat composition of anyone of embodiments 45-46, wherein the 95% to 98% by weight PNA material further comprises calcium oxide on a third plurality of micron-sized support particles.

Embodiment 48

A washcoat composition comprising a solids content of: 95% to 98% by weight PNA material comprising calcium oxide on a plurality of micron-sized support particles; and 2% to 5% by weight of boehmite particles.

Embodiment 49

The washcoat composition of embodiment 48, wherein the 95% to 98% by weight PNA material further comprises manganese oxide on a second plurality of micron-sized support particles.

Embodiment 50

The washcoat composition of anyone of embodiments 48-49, wherein the 95% to 98% by weight PNA material further comprises magnesium on a third plurality of micron-sized support particles.

Embodiment 51

The washcoat composition of anyone of embodiments 42-50, wherein manganese oxide, magnesium oxide, and calcium oxide are nano-sized.

Embodiment 52

The washcoat composition of anyone of embodiments 42-51, wherein the pluralities of support particles comprise ceria.

Embodiment 53

The washcoat composition of anyone of embodiments 52, wherein the PNA material comprises about 150 g/L to about 350 g/L ceria.

Embodiment 54

The washcoat composition of anyone of embodiments 52-53, wherein the PNA material comprises about 1% to about 20% manganese oxide by weight of the amount of ceria.

Embodiment 55

The washcoat composition of anyone of embodiments 52-54, wherein the PNA material comprises about 1% to about 10% magnesium oxide by weight of the amount of ceria.

Embodiment 56

The washcoat composition of anyone of embodiments 52-55, wherein the PNA material comprises about 1% to about 10% calcium oxide by weight of the amount of ceria.

Embodiment 57

The washcoat composition of anyone of embodiments 52-56, wherein the PNA material comprises about 28 g/L manganese oxide.

Embodiment 58

The washcoat composition of anyone of embodiments 52-57, wherein the PNA material comprises about 10.5 g/L magnesium oxide.

Embodiment 59

The washcoat composition of anyone of embodiments 52-58, wherein the PNA material comprises about 10.5 g/L calcium oxide.

Embodiment 60

The washcoat composition of anyone of embodiments 42-59, wherein the PNA material stores NOx emissions from ambient temperature to about 100° C.

Embodiment 61

The washcoat composition of anyone of embodiments 42-60, wherein the PNA material stores NOx emissions from ambient temperature to about 150° C.

Embodiment 62

The washcoat composition of anyone of embodiments 42-61, wherein the PNA material stores NOx emissions from ambient temperature to about 200° C.

Embodiment 63

The washcoat composition of anyone of embodiments 42-62, wherein the PNA material further comprises platinum group metals.

Embodiment 64

The washcoat composition of embodiments 63, wherein the platinum group metals are on a fourth plurality of micron-sized support particles.

Embodiment 65

The washcoat composition of anyone of embodiments 63-64, wherein the platinum group metals are on at least one of the first, second, or third pluralities of micron-sized support materials.

Embodiment 66

The washcoat composition of anyone of embodiments 63-65, wherein the platinum group metals are added to the support particles using wet chemistry techniques.

Embodiment 67

The washcoat composition of anyone of embodiments 63-66, wherein the platinum group metals are added to the support particles using incipient wetness.

Embodiment 68

The washcoat composition of embodiment 67, wherein the platinum group metals comprises nano-on-nano particles.

Embodiment 69

The washcoat composition of anyone of embodiments 63-68, wherein the PGM loading is 1.0 g/L to 5.0 g/L.

Embodiment 70

The washcoat composition of anyone of embodiments 63-69, wherein the PGM is platinum, palladium, or a mixture thereof.

Embodiment 71

The washcoat composition of anyone of embodiments 42-70, wherein the solids are suspended in an aqueous medium at a pH between 3 and 5.

Embodiment 72

A coated substrate comprising: a substrate; a washcoat layer comprising zeolite particles; a washcoat layer comprising a PNA material; and a washcoat layer comprising catalytically active particles, wherein the catalytically active particles comprise composite nano-particles bonded to micron-sized carrier particles, and the composite nano-particles comprise a support nano-particle and a catalytic nano-particle.

Embodiment 73

The coated substrate of embodiment 72, wherein the PNA material comprises manganese oxide on a plurality of micron-sized support particles.

Embodiment 74

The coated substrate of any one of embodiments 72-73, wherein the PNA material comprises magnesium oxide on a plurality of micron-sized support particles.

Embodiment 75

The coated substrate of any one of embodiments 72-74, wherein the PNA material comprises calcium oxide on a plurality of micron-sized support particles.

Embodiment 76

The coated substrate of any one of embodiments 72-75, wherein the PNA material comprises manganese oxide, magnesium oxide, and calcium oxide on different pluralities of micron-sized support particles.

Embodiment 77

The coated substrate of any one of embodiments 73-76, wherein the manganese oxide, magnesium oxide, and calcium oxide are nano-sized.

Embodiment 78

The coated substrate of any one of embodiments 73-76, wherein the pluralities of support particles comprise ceria.

Embodiment 79

The coated substrate of any one of embodiments 78, wherein the PNA material comprises about 150 g/L to about 350 g/L ceria.

Embodiment 80

The coated substrate of any one of embodiments 78-79, wherein the PNA material comprises about 1% to about 20% manganese oxide by weight of the amount of ceria.

Embodiment 81

The coated substrate of any one of embodiments 78-80, wherein the PNA material comprises about 1% to about 10% magnesium oxide by weight of the amount of ceria.

Embodiment 82

The coated substrate of any one of embodiments 78-81, wherein the PNA material comprises about 1% to about 10% calcium oxide by weight of the amount of ceria.

Embodiment 83

The coated substrate of any one of embodiments 78-82, wherein the PNA material comprises about 28 g/L manganese oxide.

Embodiment 84

The coated substrate of any one of embodiments 78-83, wherein the PNA material comprises about 10.5 g/L magnesium oxide.

Embodiment 85

The coated substrate of any one of embodiments 78-84, wherein the PNA material comprises about 10.5 g/L calcium oxide.

Embodiment 86

The coated substrate of any one of embodiments 72-85, wherein the PNA material stores NOx emissions from ambient temperature to about 100° C.

Embodiment 87

The coated substrate of any one of embodiments 72-86, wherein the PNA material stores NOx emissions from ambient temperature to about 150° C.

Embodiment 88

The coated substrate of any one of embodiments 72-87, wherein the PNA material stores NOx emissions from ambient temperature to about 200° C.

Embodiment 89

The coated substrate of any one of embodiments 72-88, wherein the washcoat layer comprising the PNA material further comprises boehmite particles.

Embodiment 90

The coated substrate of any one of embodiments 72-89, wherein the PNA material comprises 95% to 98% by weight of the mixture of PNA material and boehmite particles in the washcoat layer comprising PNA material.

Embodiment 91

The coated substrate of any one of embodiments 72-90, wherein the boehmite particles comprise 2% to 5% by weight of the mixture of PNA material and boehmite particles in the washcoat layer comprising PNA material.

Embodiment 92

The coated substrate of any one of embodiments 72-91, wherein the catalytic nano-particles comprise at least one platinum group metal.

Embodiment 93

The coated substrate of any one of embodiments 72-92, wherein the catalytic nano-particles comprise platinum and palladium.

Embodiment 94

The coated substrate of any one of embodiments 72-93, wherein the catalytic nano-particles comprise platinum and palladium in a weight ratio of 2:1 platinum:palladium

Embodiment 95

The coated substrate of any one of embodiments 72-94, wherein the support nano-particles have an average diameter of 10 nm to 20 nm.

Embodiment 96

The coated substrate of any one of embodiments 72-95, wherein the catalytic nano-particles have an average diameter of between 1 nm and 5 nm.

Embodiment 97

The coated substrate of any one of embodiments 72-96, wherein the washcoat layer comprising zeolite particles comprises metal-oxide particles and boehmite particles.

Embodiment 98

The coated substrate of any one of embodiments 72-97, wherein the metal-oxide particles are aluminum-oxide particles.

Embodiment 99

The coated substrate of any one of embodiments 97-98, wherein the zeolite particles comprise 60% to 80% by weight of the mixture of zeolite particles, metal-oxide particles, and boehmite particles in the washcoat layer comprising zeolite particles.

Embodiment 100

The coated substrate of any one of embodiments 97-99, wherein the boehmite particles comprise 2% to 5% by weight of the mixture of zeolite particles, metal-oxide particles, and boehmite particles in the washcoat layer comprising zeolite particles.

Embodiment 101

The coated substrate of embodiment 97-100, wherein the metal-oxide particles comprise 15% to 38% by weight of the mixture of zeolite particles, metal-oxide particles, and boehmite particles in the washcoat layer comprising zeolite particles.

Embodiment 102

The coated substrate of any one of embodiments 72-101, wherein the washcoat layer comprising zeolite particles does not include platinum group metals.

Embodiment 103

The coated substrate of any one of embodiments 72-102, wherein the zeolite particles in the washcoat layer comprising zeolite particles each have a diameter of 0.2 microns to 8 microns.

Embodiment 104

The coated substrate of any one of embodiments 72-103, wherein the washcoat layer comprising catalytically active particles further comprises boehmite particles and silica particles.

Embodiment 105

The coated substrate of any one of embodiments 72-104, wherein the washcoat layer comprising catalytically active particles is substantially free of zeolites

Embodiment 106

The coated substrate of any one of embodiments 72-105, wherein the catalytically active particles comprise 35% to 95% by weight of the combination of the catalytically active particles, boehmite particles, and silica particles in the washcoat layer comprising catalytically active particles.

Embodiment 107

The coated substrate of any one of embodiments 72-106, wherein the silica particles are present in an amount up to 20% by weight of the combination of the catalytically active particles, boehmite particles, and silica particles in the washcoat layer comprising catalytically active particles Embodiment 108

The coated substrate of any one of embodiments 72-107, wherein the boehmite particles comprise 2% to 5% by weight of the combination of the catalytically active particles, the boehmite particles, and the silica particles in the washcoat layer comprising catalytically active particles Embodiment 109

The coated substrate of any one of embodiments 72-108, wherein the washcoat layer comprising catalytically active particles comprises 92% by weight of the catalytically active particles, 3% by weight of the boehmite particles, and 5% by weight of the silica particles Embodiment 110

The coated substrate of any one of embodiments 72-109, wherein the substrate comprises cordierite.

Embodiment 111

The coated substrate of any one of embodiments 72-110, wherein the substrate comprises a honeycomb structure.

Embodiment 112

The coated substrate of any one of embodiments 72-111, wherein the washcoat layer comprising zeolite particles has a thickness of 25 g/l to 90 g/l.

Embodiment 113

The coated substrate of any one of embodiments 72-112, wherein the washcoat layer comprising catalytically active particles has a thickness of 50 g/l to 250 g/l.

Embodiment 114

The coated substrate of any one of embodiments 72-113, further comprising a corner-fill layer deposited directly on the substrate.

Embodiment 115

The coated substrate of any one of embodiments 72-114, wherein the coated substrate has a platinum group metal loading of 4 g/l or less and a light-off temperature for carbon monoxide at least 5° C. lower than the light-off temperature of a substrate with the same platinum group metal loading deposited by wet-chemistry methods.

Embodiment 116

The coated substrate of any one of embodiments 72-115, wherein the coated substrate has a platinum group metal loading of about 1.0 g/l to about 4.0 g/l.

Embodiment 117

The coated substrate of any one of embodiments 72-116, said coated substrate having a platinum group metal loading of about 1.0 g/l to about 5.5 g/l, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 118

The coated substrate of any one of embodiments 72-117, said coated substrate having a platinum group metal loading of about 1.0 g/l to about 5.5 g/l, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 119

A catalytic converter comprising a coated substrate of any one of embodiments 72-118.

Embodiment 120

An exhaust treatment system comprising a conduit for exhaust gas and a catalytic converter according to embodiment 119.

Embodiment 121

A vehicle comprising a catalytic converter according to embodiment 119.

Embodiment 122

A diesel vehicle comprising a catalytic converter according to embodiment 119.

Embodiment 123

The diesel vehicle of embodiment 122, wherein the diesel vehicle is a light-duty diesel vehicle.

Embodiment 124

A method of treating an exhaust gas, comprising contacting the coated substrate of any one of embodiments 72-118 with the exhaust gas.

Embodiment 125

A method of treating an exhaust gas, comprising contacting the coated substrate of any one of embodiments 72-118 with the exhaust gas, wherein the substrate is housed within a catalytic converter configured to receive the exhaust gas.

Embodiment 126

A coated substrate comprising: a substrate; a washcoat layer comprising zeolite particles and a PNA material; and a washcoat layer comprising catalytically active particles, wherein the catalytically active particles comprise composite nano-particles bonded to micron-sized carrier particles, and the composite nano-particles comprise a support nano-particle and a catalytic nano-particle.

Embodiment 127

The coated substrate of embodiment 126, wherein the PNA material comprises manganese oxide on a plurality of micron-sized support particles.

Embodiment 128

The coated substrate of any one of embodiments 126-127, wherein the PNA material comprises magnesium oxide on a plurality of micron-sized support particles.

Embodiment 129

The coated substrate of any one of embodiments 126-128, wherein the PNA material comprises calcium oxide on a plurality of micron-sized support particles.

Embodiment 130

The coated substrate of any one of embodiments 126-129, wherein the PNA material comprises manganese oxide, magnesium oxide, and calcium oxide on different pluralities of micron-sized support particles.

Embodiment 131

The coated substrate of any one of embodiments 126-130, wherein the manganese oxide, magnesium oxide, and calcium oxide are nano-sized.

Embodiment 132

The coated substrate of any one of embodiments 126-131, wherein the pluralities of support particles comprise ceria.

Embodiment 133

The coated substrate of any one of embodiments 132, wherein the PNA material comprises about 150 g/L to about 350 g/L ceria.

Embodiment 134

The coated substrate of any one of embodiments 132-133, wherein the PNA material comprises about 1% to about 20% manganese oxide by weight of the amount of ceria.

Embodiment 135

The coated substrate of any one of embodiments 132-134, wherein the PNA material comprises about 1% to about 10% magnesium oxide by weight of the amount of ceria.

Embodiment 136

The coated substrate of any one of embodiments 132-135, wherein the PNA material comprises about 1% to about 10% calcium oxide by weight of the amount of ceria.

Embodiment 137

The coated substrate of any one of embodiments 132-136, wherein the PNA material comprises about 28 g/L manganese oxide.

Embodiment 138

The coated substrate of any one of embodiments 132-137, wherein the PNA material comprises about 10.5 g/L magnesium oxide.

Embodiment 139

The coated substrate of any one of embodiments 132-138, wherein the PNA material comprises about 10.5 g/L calcium oxide.

Embodiment 140

The coated substrate of any one of embodiments 126-139, wherein the PNA material stores NOx emissions from ambient temperature to about 100° C.

Embodiment 141

The coated substrate of any one of embodiments 126-140, wherein the PNA material stores NOx emissions from ambient temperature to about 150° C.

Embodiment 142

The coated substrate of any one of embodiments 126-141, wherein the PNA material stores NOx emissions from ambient temperature to about 200° C.

Embodiment 143

The coated substrate of any one of embodiments 126-142, wherein the catalytic nano-particles comprise at least one platinum group metal.

Embodiment 144

The coated substrate of any one of embodiments 126-143, wherein the catalytic nano-particles comprise platinum and palladium.

Embodiment 145

The coated substrate of any one of embodiments 126-144, wherein the catalytic nano-particles comprise platinum and palladium in a weight ratio of 2:1 platinum:palladium Embodiment 146

The coated substrate of any one of embodiments 126-145, wherein the support nano-particles have an average diameter of 10 nm to 20 nm.

Embodiment 147

The coated substrate of any one of embodiments 126-146, wherein the catalytic nano-particles have an average diameter of between 1 nm and 5 nm.

Embodiment 148

The coated substrate of any one of embodiments 126-147, wherein the washcoat layer comprising zeolite particles and PNA material further comprises metal-oxide particles and boehmite particles.

Embodiment 149

The coated substrate of any one of embodiments 126-148, wherein the metal-oxide particles are aluminum-oxide particles.

Embodiment 150

The coated substrate of any one of embodiments 126-149, wherein the boehmite particles comprise 2% to 5% by weight of the mixture of zeolite particles, metal-oxide particles, and boehmite particles in the washcoat layer comprising zeolite particles and PNA material.

Embodiment 151

The coated substrate of any one of embodiments 126-150, wherein the metal-oxide particles comprise 15% to 38% by weight of the mixture of zeolite particles, metal-oxide particles, and boehmite particles in the washcoat layer comprising zeolite particles and PNA material.

Embodiment 152

The coated substrate of any one of embodiments 126-151, wherein the washcoat layer comprising zeolite particles and PNA material does not include platinum group metals.

Embodiment 153

The coated substrate of any one of embodiments 126-152, wherein the zeolite particles in the washcoat layer comprising zeolite particles and PNA material each have a diameter of 0.2 microns to 8 microns.

Embodiment 154

The coated substrate of any one of embodiments 126-153, wherein the washcoat layer comprising catalytically active particles further comprises boehmite particles and silica particles.

Embodiment 155

The coated substrate of any one of embodiments 126-154, wherein the washcoat layer comprising catalytically active particles is substantially free of zeolites

Embodiment 156

The coated substrate of any one of embodiments 126-155, wherein the catalytically active particles comprise 35% to 95% by weight of the combination of the catalytically active particles, boehmite particles, and silica particles in the washcoat layer comprising catalytically active particles.

Embodiment 157

The coated substrate of any one of embodiments 126-156, wherein the silica particles are present in an amount up to 20% by weight of the combination of the catalytically active particles, boehmite particles, and silica particles in the washcoat layer comprising catalytically active particles

Embodiment 158

The coated substrate of any one of embodiments 126-157, wherein the boehmite particles comprise 2% to 5% by weight of the combination of the catalytically active particles, the boehmite particles, and the silica particles in the washcoat layer comprising catalytically active particles

Embodiment 159

The coated substrate of any one of embodiments 126-158, wherein the washcoat layer comprising catalytically active particles comprises 92% by weight of the catalytically active particles, 3% by weight of the boehmite particles, and 5% by weight of the silica particles

Embodiment 160

The coated substrate of any one of embodiments 126-159, wherein the substrate comprises cordierite.

Embodiment 161

The coated substrate of any one of embodiments 126-160, wherein the substrate comprises a honeycomb structure.

Embodiment 162

The coated substrate of any one of embodiments 126-161, wherein the washcoat layer comprising catalytically active particles has a thickness of 50 g/l to 250 g/l.

Embodiment 163

The coated substrate of any one of embodiments 126-162, further comprising a corner-fill layer deposited directly on the substrate.

Embodiment 164

The coated substrate of any one of embodiments 126-163, wherein the coated substrate has a platinum group metal loading of 4 g/l or less and a light-off temperature for carbon monoxide at least 5° C. lower than the light-off temperature of a substrate with the same platinum group metal loading deposited by wet-chemistry methods.

Embodiment 165

The coated substrate of any one of embodiments 126-164, wherein the coated substrate has a platinum group metal loading of about 1.0 g/l to about 4.0 g/l.

Embodiment 166

The coated substrate of any one of embodiments 126-165, said coated substrate having a platinum group metal loading of about 1.0 g/l to about 5.5 g/l, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 167

The coated substrate of any one of embodiments 126-166, said coated substrate having a platinum group metal loading of about 1.0 g/l to about 5.5 g/l, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 168

A catalytic converter comprising a coated substrate of any one of embodiments 126-167.

Embodiment 169

An exhaust treatment system comprising a conduit for exhaust gas and a catalytic converter according to embodiment 168.

Embodiment 170

A vehicle comprising a catalytic converter according to embodiment 168.

Embodiment 171

A diesel vehicle comprising a catalytic converter according to embodiment 168.

Embodiment 172

The diesel vehicle of embodiment 171, wherein the diesel vehicle is a light-duty diesel vehicle.

Embodiment 173

A method of treating an exhaust gas, comprising contacting the coated substrate of any one of embodiments 126-167 with the exhaust gas.

Embodiment 174

A method of treating an exhaust gas, comprising contacting the coated substrate of any one of embodiments 126-167 with the exhaust gas, wherein the substrate is housed within a catalytic converter configured to receive the exhaust gas.

Embodiment 175

A coated substrate comprising: a substrate; a washcoat layer comprising zeolite particles, a PNA material, and catalytically active particles, wherein the catalytically active particles comprise composite nano-particles bonded to micron-sized carrier particles, and the composite nano-particles comprise a support nano-particle and a catalytic nano-particle.

Embodiment 176

A method of forming a coated substrate comprising: coating a substrate with a washcoat composition comprising zeolite particles; coating the substrate with a washcoat composition comprising a PNA material; and coating the substrate with a washcoat composition comprising catalytically active particles, wherein the catalytically active particles comprise composite nano-particles bonded to micron-sized carrier particles, and the composite nano-particles comprise a support nano-particle and a catalytic nano-particle.

Embodiment 177

The method of embodiment 176, wherein the PNA material comprises manganese oxide on a plurality of micron-sized support particles.

Embodiment 178

The method of any one of embodiments 176-177, wherein the PNA material comprises magnesium oxide on a plurality of micron-sized support particles.

Embodiment 179

The method of any one of embodiments 176-178, wherein the PNA material comprises calcium oxide on a plurality of micron-sized support particles.

Embodiment 180

The method of any one of embodiments 176-179, wherein the PNA material comprises manganese oxide, magnesium oxide, and calcium oxide on different pluralities of micron-sized support particles.

Embodiment 181

The method of any one of embodiments 176-180, wherein the manganese oxide, magnesium oxide, and calcium oxide are nano-sized.

Embodiment 182

The method of any one of embodiments 176-181, wherein the pluralities of support particles comprise ceria.

Embodiment 183

The method of any one of embodiments 176-182, wherein the PNA material comprises about 150 g/L to about 350 g/L ceria.

Embodiment 184

The method of any one of embodiments 176-183, wherein the PNA material comprises about 1% to about 20% manganese oxide by weight of the amount of ceria.

Embodiment 185

The method of any one of embodiments 176-184, wherein the PNA material comprises about 1% to about 10% magnesium oxide by weight of the amount of ceria.

Embodiment 186

The method of any one of embodiments 176-185, wherein the PNA material comprises about 1% to about 10% calcium oxide by weight of the amount of ceria.

Embodiment 187

The method of any one of embodiments 176-186, wherein the PNA material comprises about 28 g/L manganese oxide.

Embodiment 188

The method of any one of embodiments 176-187, wherein the PNA material comprises about 10.5 g/L magnesium oxide.

Embodiment 189

The method of any one of embodiments 176-188, wherein the PNA material comprises about 10.5 g/L calcium oxide.

Embodiment 190

The method of any one of embodiments 176-189, wherein the PNA material stores NOx emissions from ambient temperature to about 100° C.

Embodiment 191

The method of any one of embodiments 176-190, wherein the PNA material stores NOx emissions from ambient temperature to about 150° C.

Embodiment 192

The method of any one of embodiments 176-191, wherein the PNA material stores NOx emissions from ambient temperature to about 200° C.

Embodiment 193

The method of any one of embodiments 176-192, wherein the washcoat layer comprising the PNA material further comprises boehmite particles.

Embodiment 194

The method of any one of embodiments 176-193, wherein the PNA material comprises 95% to 98% by weight of the mixture of PNA material and boehmite particles in the washcoat layer comprising PNA material.

Embodiment 195

The method of any one of embodiments 176-194, wherein the boehmite particles comprise 2% to 5% by weight of the mixture of PNA material and boehmite particles in the washcoat layer comprising PNA material.

Embodiment 196

The method of any one of embodiments 176-195, wherein the catalytic nano-particles comprise at least one platinum group metal.

Embodiment 197

The method of any one of embodiments 176-196, wherein the catalytic nano-particles comprise platinum and palladium.

Embodiment 198

The method of any one of embodiments 176-197, wherein the catalytic nano-particles comprise platinum and palladium in a weight ratio of 2:1 platinum:palladium

Embodiment 199

The method of any one of embodiments 176-198, wherein the support nano-particles have an average diameter of 10 nm to 20 nm.

Embodiment 200

The method of any one of embodiments 176-199, wherein the catalytic nano-particles have an average diameter of between 1 nm and 5 nm.

Embodiment 201

The method of any one of embodiments 176-200, wherein the washcoat layer comprising zeolite particles comprises metal-oxide particles and boehmite particles.

Embodiment 202

The method of any one of embodiments 201, wherein the metal-oxide particles are aluminum-oxide particles.

Embodiment 203

The method of any one of embodiments 201-202, wherein the zeolite particles comprise 60% to 80% by weight of the mixture of zeolite particles, metal-oxide particles, and boehmite particles in the washcoat layer comprising zeolite particles.

Embodiment 204

The method of any one of embodiments 201-203, wherein the boehmite particles comprise 2% to 5% by weight of the mixture of zeolite particles, metal-oxide particles, and boehmite particles in the washcoat layer comprising zeolite particles.

Embodiment 205

The method of embodiment 201-204, wherein the metal-oxide particles comprise 15% to 38% by weight of the mixture of zeolite particles, metal-oxide particles, and boehmite particles in the washcoat layer comprising zeolite particles.

Embodiment 206

The method of any one of embodiments 176-205, wherein the washcoat layer comprising zeolite particles does not include platinum group metals.

Embodiment 207

The method of any one of embodiments 176-206, wherein the zeolite particles in the washcoat layer comprising zeolite particles each have a diameter of 0.2 microns to 8 microns.

Embodiment 208

The method of any one of embodiments 176-207, wherein the washcoat layer comprising catalytically active particles further comprises boehmite particles and silica particles.

Embodiment 209

The method of any one of embodiments 176-208, wherein the washcoat layer comprising catalytically active particles is substantially free of zeolites

Embodiment 210

The method of any one of embodiments 176-209, wherein the catalytically active particles comprise 35% to 95% by weight of the combination of the catalytically active particles, boehmite particles, and silica particles in the washcoat layer comprising catalytically active particles.

Embodiment 211

The method of any one of embodiments 176-210, wherein the silica particles are present in an amount up to 20% by weight of the combination of the catalytically active particles, boehmite particles, and silica particles in the washcoat layer comprising catalytically active particles

Embodiment 212

The method of any one of embodiments 176-211, wherein the boehmite particles comprise 2% to 5% by weight of the combination of the catalytically active particles, the boehmite particles, and the silica particles in the washcoat layer comprising catalytically active particles

Embodiment 213

The method of any one of embodiments 176-212, wherein the washcoat layer comprising catalytically active particles comprises 92% by weight of the catalytically active particles, 3% by weight of the boehmite particles, and 5% by weight of the silica particles

Embodiment 214

The method of any one of embodiments 176-213, wherein the substrate comprises cordierite.

Embodiment 215

The method of any one of embodiments 176-214, wherein the substrate comprises a honeycomb structure.

Embodiment 216

The method of any one of embodiments 176-215, wherein the washcoat layer comprising zeolite particles has a thickness of 25 g/l to 90 g/l.

Embodiment 217

The method of any one of embodiments 176-216, wherein the washcoat layer comprising catalytically active particles has a thickness of 50 g/l to 250 g/l.

Embodiment 218

The method of any one of embodiments 176-217, further comprising depositing a corner-fill layer directly on the substrate.

Embodiment 219

The method of any one of embodiments 176-218, wherein the coated substrate has a platinum group metal loading of 4 g/l or less and a light-off temperature for carbon monoxide at least 5° C. lower than the light-off temperature of a substrate with the same platinum group metal loading deposited by wet-chemistry methods.

Embodiment 220

The method of any one of embodiments 176-219, wherein the coated substrate has a platinum group metal loading of about 1.0 g/l to about 4.0 g/l.

Embodiment 221

The method of any one of embodiments 176-220, said coated substrate having a platinum group metal loading of about 1.0 g/l to about 5.5 g/l, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 222

The method of any one of embodiments 176-221, said coated substrate having a platinum group metal loading of about 1.0 g/l to about 5.5 g/l, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 223

A method of forming a coated substrate comprising: coating a substrate with a washcoat composition comprising zeolite particles and a PNA material; and coating the substrate with a washcoat composition comprising catalytically active particles, wherein the catalytically active particles comprise composite nano-particles bonded to micron-sized carrier particles, and the composite nano-particles comprise a support nano-particle and a catalytic nano-particle.

Embodiment 224

The method of embodiment 223, wherein the PNA material comprises manganese oxide on a plurality of micron-sized support particles.

Embodiment 225

The method of any one of embodiments 223-224, wherein the PNA material comprises magnesium oxide on a plurality of micron-sized support particles.

Embodiment 226

The method of any one of embodiments 223-225, wherein the PNA material comprises calcium oxide on a plurality of micron-sized support particles.

Embodiment 227

The method of any one of embodiments 223-226, wherein the PNA material comprises manganese oxide, magnesium oxide, and calcium oxide on different pluralities of micron-sized support particles.

Embodiment 228

The method of any one of embodiments 224-227, wherein the manganese oxide, magnesium oxide, and calcium oxide are nano-sized.

Embodiment 229

The method of any one of embodiments 224-228, wherein the pluralities of support particles comprise ceria.

Embodiment 230

The method of any one of embodiments 229, wherein the PNA material comprises about 150 g/L to about 350 g/L ceria.

Embodiment 231

The method of any one of embodiments 229-230, wherein the PNA material comprises about 1% to about 20% manganese oxide by weight of the amount of ceria.

Embodiment 232

The method of any one of embodiments 229-231, wherein the PNA material comprises about 1% to about 10% magnesium oxide by weight of the amount of ceria.

Embodiment 233

The method of any one of embodiments 229-232, wherein the PNA material comprises about 1% to about 10% calcium oxide by weight of the amount of ceria.

Embodiment 234

The method of any one of embodiments 229-233, wherein the PNA material comprises about 28 g/L manganese oxide.

Embodiment 235

The method of any one of embodiments 229-234, wherein the PNA material comprises about 10.5 g/L magnesium oxide.

Embodiment 236

The method of any one of embodiments 229-235, wherein the PNA material comprises about 10.5 g/L calcium oxide.

Embodiment 237

The method of any one of embodiments 223-236, wherein the PNA material stores NOx emissions from ambient temperature to about 100° C.

Embodiment 238

The method of any one of embodiments 223-237, wherein the PNA material stores NOx emissions from ambient temperature to about 150° C.

Embodiment 239

The method of any one of embodiments 223-238, wherein the PNA material stores NOx emissions from ambient temperature to about 200° C.

Embodiment 240

The method of any one of embodiments 223-239, wherein the catalytic nano-particles comprise at least one platinum group metal.

Embodiment 241

The method of any one of embodiments 223-240, wherein the catalytic nano-particles comprise platinum and palladium.

Embodiment 242

The method of any one of embodiments 223-241, wherein the catalytic nano-particles comprise platinum and palladium in a weight ratio of 2:1 platinum:palladium

Embodiment 243

The method of any one of embodiments 223-242, wherein the support nano-particles have an average diameter of 10 nm to 20 nm.

Embodiment 244

The method of any one of embodiments 223-243, wherein the catalytic nano-particles have an average diameter of between 1 nm and 5 nm.

Embodiment 245

The method of any one of embodiments 223-244, wherein the washcoat layer comprising zeolite particles and PNA material further comprises metal-oxide particles and boehmite particles.

Embodiment 246

The method of any one of embodiments 245, wherein the metal-oxide particles are aluminum-oxide particles.

Embodiment 247

The method of any one of embodiments 245-246, wherein the zeolite particles comprise 60% to 80% by weight of the mixture of zeolite particles, metal-oxide particles, and boehmite particles in the washcoat layer comprising zeolite particles and PNA material.

Embodiment 248

The method of any one of embodiments 245-247, wherein the boehmite particles comprise 2% to 5% by weight of the mixture of zeolite particles, metal-oxide particles, and boehmite particles in the washcoat layer comprising zeolite particles and PNA material.

Embodiment 249

The method of embodiment 245-248, wherein the metal-oxide particles comprise 15% to 38% by weight of the mixture of zeolite particles, metal-oxide particles, and boehmite particles in the washcoat layer comprising zeolite particles and PNA material.

Embodiment 250

The method of any one of embodiments 140-164, wherein the washcoat layer comprising zeolite particles and PNA material does not include platinum group metals.

Embodiment 251

The method of any one of embodiments 140-165, wherein the zeolite particles in the washcoat layer comprising zeolite particles and PNA material each have a diameter of 0.2 microns to 8 microns.

Embodiment 252

The method of any one of embodiments 223-251, wherein the washcoat layer comprising catalytically active particles further comprises boehmite particles and silica particles.

Embodiment 253

The method of any one of embodiments 223-252, wherein the washcoat layer comprising catalytically active particles is substantially free of zeolites Embodiment 254

The method of any one of embodiments 223-253, wherein the catalytically active particles comprise 35% to 95% by weight of the combination of the catalytically active particles, boehmite particles, and silica particles in the washcoat layer comprising catalytically active particles.

Embodiment 255

The method of any one of embodiments 223-254, wherein the silica particles are present in an amount up to 20% by weight of the combination of the catalytically active particles, boehmite particles, and silica particles in the washcoat layer comprising catalytically active particles Embodiment 256

The method of any one of embodiments 223-255, wherein the boehmite particles comprise 2% to 5% by weight of the combination of the catalytically active particles, the boehmite particles, and the silica particles in the washcoat layer comprising catalytically active particles Embodiment 257

The method of any one of embodiments 223-256, wherein the washcoat layer comprising catalytically active particles comprises 92% by weight of the catalytically active particles, 3% by weight of the boehmite particles, and 5% by weight of the silica particles Embodiment 258

The method of any one of embodiments 223-257, wherein the substrate comprises cordierite.

Embodiment 259

The method of any one of embodiments 223-258, wherein the substrate comprises a honeycomb structure.

Embodiment 260

The method of any one of embodiments 223-259, wherein the washcoat layer comprising catalytically active particles has a thickness of 50 g/l to 250 g/l.

Embodiment 261

The method of any one of embodiments 223-260, further comprising depositing a corner-fill layer directly on the substrate.

Embodiment 262

The method of any one of embodiments 223-261, wherein the coated substrate has a platinum group metal loading of 4 g/l or less and a light-off temperature for carbon monoxide at least 5° C. lower than the light-off temperature of a substrate with the same platinum group metal loading deposited by wet-chemistry methods.

Embodiment 263

The method of any one of embodiments 223-262, wherein the coated substrate has a platinum group metal loading of about 1.0 g/l to about 4.0 g/l.

Embodiment 264

The method of any one of embodiments 223-263, said coated substrate having a platinum group metal loading of about 1.0 g/l to about 5.5 g/l, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 265

The method of any one of embodiments 223-264, said coated substrate having a platinum group metal loading of about 1.0 g/l to about 5.5 g/l, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 266

A method of forming a coated substrate comprising: coating a substrate with a washcoat composition comprising zeolite particles, a PNA material, and catalytically active particles, wherein the catalytically active particles comprise composite nano-particles bonded to micron-sized carrier particles, and the composite nano-particles comprise a support nano-particle and a catalytic nano-particle.

Embodiment 267

A method of forming a coated substrate, the method comprising: coating a substrate with a washcoat composition comprising zeolite particles; coating the substrate with a washcoat composition comprising PNA material according to any one of embodiments 42-71; and coating the substrate with a washcoat composition containing catalytically active particles.

Embodiment 268

The method of embodiment 267, further comprising coating the substrate with a corner-fill washcoat prior to coating the substrate with the other washcoats.

Embodiment 269

The method of any one of embodiments 267-268, wherein the washcoat composition comprising zeolite particles comprises a thickness of 25 g/l to 90 g/l.

Embodiment 270

The method of any one of embodiments 267-268, wherein the washcoat composition comprising catalytically active particles comprises a thickness of 50 g/l to 250 g/l.

Embodiment 271

A coated substrate comprising a washcoat according to any one of embodiments 42-71.

Embodiment 272

A coated substrate comprising a washcoat according to any one of embodiments 42-71, further comprising a washcoat layer comprising zeolite particles.

Embodiment 273

A catalytic converter comprising a coated substrate according to embodiment 270.

Embodiment 274

An exhaust treatment system comprising a conduit for exhaust gas and a catalytic converter according to embodiment 271.

Embodiment 275

A vehicle comprising a catalytic converter according to embodiment 271.

Embodiment 276

A diesel vehicle comprising a catalytic converter according to embodiment 271.

Embodiment 277

The diesel vehicle of embodiment 274, wherein the diesel vehicle is a light-duty diesel vehicle.

Embodiment 278

The vehicle of any one of embodiments 121, 170, and 275, wherein the vehicle complies with the European emission standard Euro 5.

Embodiment 279

The vehicle of any one of embodiments 121, 170, and 275, wherein the vehicle complies with the European emission standard Euro 6.

Embodiment 280

A vehicle comprising: a catalytic converter comprising between 1.0 g/l and 4.0 g/l of platinum group metal; and a PNA material, wherein the vehicle complies with the European emission standard Euro 5.

Embodiment 281

The vehicle of embodiment 280, wherein the PNA material comprises manganese oxide on a plurality of micron-sized support particles.

Embodiment 282

The vehicle of any one of embodiments 280-281, wherein the PNA material comprises magnesium oxide on a plurality of micron-sized support particles.

Embodiment 283

The vehicle of any one of embodiments 280-282, wherein the PNA material comprises calcium oxide on a plurality of micron-sized support particles.

Embodiment 284

The vehicle of any one of embodiments 280-283, wherein the PNA material comprises manganese oxide, magnesium oxide, and calcium oxide on different pluralities of micron-sized support particles.

Embodiment 285

The vehicle of any one of embodiments 281-284, wherein the manganese oxide, magnesium oxide, and calcium oxide are nano-sized.

Embodiment 286

The vehicle of any one of embodiments 280-285, wherein the pluralities of support particles comprise ceria.

Embodiment 287

The vehicle of any one of embodiments 280 wherein the PNA material comprises about 150 g/L to about 350 g/L ceria.

Embodiment 288

The vehicle of any one of embodiments 286-287, wherein the PNA material comprises about 1% to about 20% manganese oxide by weight of the amount of ceria.

Embodiment 289

The vehicle of any one of embodiments 286-288, wherein the PNA material comprises about 1% to about 10% magnesium oxide by weight of the amount of ceria.

Embodiment 290

The vehicle of any one of embodiments 286-289, wherein the PNA material comprises about 1% to about 10% calcium oxide by weight of the amount of ceria.

Embodiment 291

The vehicle of any one of embodiments 286-290, wherein the PNA material comprises about 28 g/L manganese oxide.

Embodiment 292

The vehicle of any one of embodiments 286-291, wherein the PNA material comprises about 10.5 g/L magnesium oxide.

Embodiment 293

The vehicle of any one of embodiments 286-292, wherein the PNA material comprises about 10.5 g/L calcium oxide.

Embodiment 294

The vehicle of any one of embodiments 280-293, wherein the PNA material stores NOx emissions from ambient temperature to about 100° C.

Embodiment 295

The vehicle of any one of embodiments 280-294, wherein the PNA material stores NOx emissions from ambient temperature to about 150° C.

Embodiment 296

The vehicle of any one of embodiments 280-295, wherein the PNA material stores NOx emissions from ambient temperature to about 200° C.

Embodiment 297

The vehicle of any one of embodiments 280-296, wherein the vehicle is a diesel vehicle.

Embodiment 298

The vehicle of any one of embodiments 280-297, wherein the diesel vehicle is a light-duty diesel vehicle.

Embodiment 299

The vehicle of any one of embodiments 280-298, wherein the vehicle complies with European emission standard Euro 6.

Embodiment 300

The vehicle of any one of embodiments 280-299, further comprising an SCR unit.

Embodiment 301

The vehicle of any one of embodiments 280-300, further comprising an LNT.

Embodiment 302

A catalytic converter comprising: a coated substrate comprising a washcoat layer comprising a PNA material.

Embodiment 303

The catalytic converter of embodiment 302, wherein the PNA material comprises manganese oxide on a plurality of micron-sized support particles.

Embodiment 304

The catalytic converter of any one of embodiments 302-303, wherein the PNA material comprises magnesium oxide on a plurality of micron-sized support particles.

Embodiment 305

The catalytic converter of any one of embodiments 302-304, wherein the PNA material comprises calcium oxide on a plurality of micron-sized support particles.

Embodiment 306

The catalytic converter of any one of embodiments 302-305, wherein the PNA material comprises manganese oxide, magnesium oxide, and calcium oxide on different pluralities of micron-sized support particles.

Embodiment 307

The catalytic converter of any one of embodiments 302-306, wherein the manganese oxide, magnesium oxide, and calcium oxide are nano-sized.

Embodiment 308

The catalytic converter of any one of embodiments 302-307, wherein the pluralities of support particles comprise ceria.

Embodiment 309

The catalytic converter of any one of embodiments 302-308, wherein the PNA material comprises about 150 g/L to about 350 g/L ceria.

Embodiment 310

The catalytic converter of any one of embodiments 302-309, wherein the PNA material comprises about 1% to about 20% manganese oxide by weight of the amount of ceria.

Embodiment 311

The catalytic converter of any one of embodiments 302-310, wherein the PNA material comprises about 1% to about 10% magnesium oxide by weight of the amount of ceria.

Embodiment 312

The catalytic converter of any one of embodiments 302-311, wherein the PNA material comprises about 1% to about 10% calcium oxide by weight of the amount of ceria.

Embodiment 313

The catalytic converter of any one of embodiments 302-312, wherein the PNA material comprises about 28 g/L manganese oxide.

Embodiment 314

The catalytic converter of any one of embodiments 302-313, wherein the PNA material comprises about 10.5 g/L magnesium oxide.

Embodiment 315

The catalytic converter of any one of embodiments 302-314, wherein the PNA material comprises about 10.5 g/L calcium oxide.

Embodiment 316

The catalytic converter of any one of embodiments 302-315, wherein the PNA material stores NOx emissions from ambient temperature to about 100° C.

Embodiment 317

The catalytic converter of any one of embodiments 302-316, wherein the PNA material stores NOx emissions from ambient temperature to about 150° C.

Embodiment 318

The catalytic converter of any one of embodiments 302-317, wherein the PNA material stores NOx emissions from ambient temperature to about 200° C.

Embodiment 319

An exhaust treatment system comprising a conduit for exhaust gas and a catalytic converter comprising a coated substrate comprising a washcoat layer comprising a PNA material.

Embodiment 320

The exhaust treatment system of embodiment 319, wherein the PNA material comprises manganese oxide on a plurality of micron-sized support particles.

Embodiment 321

The exhaust treatment system of any one of embodiments 319-320, wherein the PNA material comprises magnesium oxide on a plurality of micron-sized support particles.

Embodiment 322

The exhaust treatment system of any one of embodiments 319-321, wherein the PNA material comprises calcium oxide on a plurality of micron-sized support particles.

Embodiment 323

The exhaust treatment system of any one of embodiments 319-322, wherein the PNA material comprises manganese oxide, magnesium oxide, and calcium oxide on different pluralities of micron-sized support particles.

Embodiment 324

The exhaust treatment system of any one of embodiments 319-323, wherein the manganese oxide, magnesium oxide, and calcium oxide are nano-sized.

Embodiment 325

The exhaust treatment system of any one of embodiments 319-324, wherein the pluralities of support particles comprise ceria.

Embodiment 326

The exhaust treatment system of any one of embodiments 319-325, wherein the PNA material comprises about 150 g/L to about 350 g/L ceria.

Embodiment 327

The exhaust treatment system of any one of embodiments 319-326, wherein the PNA material comprises about 1% to about 20% manganese oxide by weight of the amount of ceria.

Embodiment 328

The exhaust treatment system of any one of embodiments 319-327, wherein the PNA material comprises about 1% to about 10% magnesium oxide by weight of the amount of ceria.

Embodiment 329

The exhaust treatment system of any one of embodiments 319-328, wherein the PNA material comprises about 1% to about 10% calcium oxide by weight of the amount of ceria.

Embodiment 330

The exhaust treatment system of any one of embodiments 319-329, wherein the PNA material comprises about 28 g/L manganese oxide.

Embodiment 331

The exhaust treatment system of any one of embodiments 319-330, wherein the PNA material comprises about 10.5 g/L magnesium oxide.

Embodiment 332

The exhaust treatment system of any one of embodiments 319-331, wherein the PNA material comprises about 10.5 g/L calcium oxide.

Embodiment 333

The exhaust treatment system of any one of embodiments 319-332, wherein the PNA material stores NOx emissions from ambient temperature to about 100° C.

Embodiment 334

The exhaust treatment system of any one of embodiments 319-333, wherein the PNA material stores NOx emissions from ambient temperature to about 150° C.

Embodiment 335

The exhaust treatment system of any one of embodiments 319-334, wherein the PNA material stores NOx emissions from ambient temperature to about 200° C.

Embodiment 336

The exhaust treatment system of any one of embodiments 319-335, further comprising an SCR unit.

Embodiment 337

The exhaust treatment system of any one of embodiments 319-336, further comprising an LNT.

Embodiment 338

A PNA material comprising: an alkali oxide or alkaline earth oxide on a plurality of micron-sized support particles.

Embodiment 339

The PNA material of embodiment 338, further comprising a second alkali oxide or alkaline earth oxide on a second plurality of micron-sized support particles.

Embodiment 340

The PNA material of any one of embodiments 338-339, further comprising a third alkali oxide or alkaline earth oxide on a third plurality of micron-sized support particles.

Embodiment 341

The PNA material of any one of embodiments 338-340, wherein the first, second, and third alkali oxides or alkaline earth oxides are selected from the group consisting of manganese oxide, magnesium oxide, and calcium oxide.

Embodiment 342

The PNA material of any one of embodiments 338-341, further comprising PGM.

Embodiment 343

The PNA material of embodiment 342, wherein PGM are on a fourth plurality of micron-sized support particles.

Embodiment 344

The PNA material of any one of embodiments 342-343, wherein PGM are on at least one of the first, second, or third pluralities of micron-sized support particles.

Embodiment 345

The PNA material of any one of embodiments 342-344, wherein the PGM comprises platinum, palladium, or a mixture thereof.

Embodiment 346

The PNA material of any one of embodiments 338-345, wherein the alkali oxides or alkaline earth oxides are nano-sized.

Embodiment 347

The PNA material of any one of embodiments 338-346, wherein the pluralities of support particles comprise ceria.

Embodiment 348

The PNA material of embodiment 347, wherein the PNA material comprises about 150 g/L to about 350 g/L ceria.

Embodiment 349

The PNA material of any one of embodiments 338-348, wherein the PNA material stores NOx emissions from ambient temperature to about 100° C.

Embodiment 350

The PNA material of any one of embodiments 338-349, wherein the PNA material stores NOx emissions from ambient temperature to about 150° C.

Embodiment 351

The PNA material of any one of embodiments 338-350, wherein the PNA material stores NOx emissions from ambient temperature to about 200° C.

Embodiment 352

A PNA material comprising: a PGM on a plurality of micron-sized support particles.

Embodiment 353

The PNA material of embodiment 352, further comprising an alkali oxide or alkaline earth oxide on a second plurality of micron-sized support particles.

Embodiment 354

The PNA material of any one of embodiments 352-353, further comprising a second alkali oxide or alkaline earth oxide on a third plurality of micron-sized support particles.

Embodiment 355

The PNA material of any one of embodiments 352-354, further comprising a third alkali oxide or alkaline earth oxide on a fourth plurality of micron-sized support particles.

Embodiment 356

The PNA material of any one of embodiments 352-355, wherein the first, second, and third alkali oxides or alkaline earth oxides are selected from the group consisting of manganese oxide, magnesium oxide, and calcium oxide.

Embodiment 357

The PNA material of any one of embodiments 352-356, wherein the alkali oxides or alkaline earth oxides are nano-sized.

Embodiment 358

The PNA material of any one of embodiments 352-357, further comprising PGM on at least one of the first, second, or third pluralities of micron-sized support particles.

Embodiment 359

The PNA material of any one of embodiments 352-358, wherein PGM on a plurality of micron-sized support particles comprises a NNm particle.

Embodiment 360

The PNA material of any one of embodiments 352-359, wherein the PGM on a plurality of micron-sized support particles comprises a NNiM particle.

Embodiment 361

The PNA material of any one of embodiments 352-360, wherein the PGM comprises platinum, palladium, or a mixture thereof.

Embodiment 362

The PNA material of any one of embodiments 352-361, wherein the pluralities of support particles comprise ceria.

Embodiment 363

The PNA material of embodiment 362, wherein the PNA material comprises about 150 g/L to about 350 g/L ceria.

Embodiment 364

The PNA material of any one of embodiments 352-363, wherein the PNA material stores NOx emissions from ambient temperature to about 100° C.

Embodiment 365

The PNA material of any one of embodiments 352-364, wherein the PNA material stores NOx emissions from ambient temperature to about 150° C.

Embodiment 366

The PNA material of any one of embodiments 352-365, wherein the PNA material stores NOx emissions from ambient temperature to about 200° C.

Embodiment 367

A PNA material comprising: an alkali oxide or alkaline earth oxide and PGM on a plurality of micron-sized support particles.

Embodiment 368

The PNA material of embodiment 367, further comprising a second alkali oxide or alkaline earth oxide on a second plurality of micron-sized support particles.

Embodiment 369

The PNA material of any one of embodiments 367-368, further comprising a third alkali oxide or alkaline earth oxide on a third plurality of micron-sized support particles.

Embodiment 370

The PNA material of any one of embodiments 367-369, wherein the first, second, and third alkali oxides or alkaline earth oxides are selected from the group consisting of manganese oxide, magnesium oxide, and calcium oxide.

Embodiment 371

The PNA material of any one of embodiments 367-370, wherein PGM are on a fourth plurality of micron-sized support particles.

Embodiment 372

The PNA material of any one of embodiments 367-371, wherein the PGM comprises platinum, palladium, or a mixture thereof.

Embodiment 373

The PNA material of any one of embodiments 367-372, wherein the alkali oxides or alkaline earth oxides are nano-sized.

Embodiment 374

The PNA material of any one of embodiments 367-373, wherein the pluralities of support particles comprise ceria.

Embodiment 375

The PNA material of embodiment 374, wherein the PNA material comprises about 150 g/L to about 350 g/L ceria.

Embodiment 376

The PNA material of any one of embodiments 367-375, wherein the PNA material stores NOx emissions from ambient temperature to about 100° C.

Embodiment 377

The PNA material of any one of embodiments 367-376, wherein the PNA material stores NOx emissions from ambient temperature to about 150° C.

Embodiment 378

The PNA material of any one of embodiments 367-377, wherein the PNA material stores NOx emissions from ambient temperature to about 200° C.

Embodiment 379

A method of forming a PNA material comprising: applying a first alkali oxide or alkaline earth oxide to a first plurality of micron-sized support particles; applying a second alkali oxide or alkaline earth oxide to a second plurality of micron-sized support particles; and combining the first and second pluralities of micron-sized support particles.

Embodiment 380

The method of embodiment 379, further comprising applying a third alkali oxide or alkaline earth oxide to a third plurality of micron-sized support particles and combining the third plurality of micron-sized support particles with the first and second pluralities of micron-sized support particles.

Embodiment 381

The method of any one of embodiments 379-380, wherein the first, second, and third alkali oxides or alkaline earth oxides are selected from the group consisting of manganese oxide, magnesium oxide, and calcium oxide.

Embodiment 382

The method of any one of embodiments 379-381, further comprising applying PGM to a fourth plurality of micron-sized support particles and combining the fourth plurality of micron-sized support particles with the first and second pluralities of micron-sized support particles.

Embodiment 383

The method of any one of embodiments 379-382, further comprising applying PGM to at least one of the first, second, or third pluralities of micron-sized support particles.

Embodiment 384

The method of any one of embodiments 382-383, wherein the PGM comprises platinum, palladium, or a mixture thereof.

Embodiment 385

The method of any one of embodiments 379-384, wherein the alkali oxides or alkaline earth oxides are nano-sized.

Embodiment 386

The method of any one of embodiments 379-385, wherein the pluralities of support particles comprise ceria.

Embodiment 387

The method of embodiment 386, wherein the PNA material comprises about 150 g/L to about 350 g/L ceria.

Embodiment 388

The method of any one of embodiments 379-387, wherein the PNA material stores NOx emissions from ambient temperature to about 100° C.

Embodiment 389

The method of any one of embodiments 379-388, wherein the PNA material stores NOx emissions from ambient temperature to about 150° C.

Embodiment 390

The method of any one of embodiments 379-389, wherein the PNA material stores NOx emissions from ambient temperature to about 200° C.

Embodiment 391

A method of forming a PNA material comprising: applying alkali oxide or alkaline earth oxide to a first plurality of micron-sized support particles; applying PGM to a second plurality of micron-sized support particles; and combining the first and second pluralities of micron-sized support particles.

Embodiment 392

The method of embodiment 391 further comprising applying a second alkali oxide or alkaline earth oxide on a third plurality of micron-sized support particles and combining the third plurality of micron-sized support particles with the first and second pluralities of micron-sized support particles.

Embodiment 393

The method of anyone of embodiments 391-392, further comprising applying a third alkali oxide or alkaline earth oxide on a fourth plurality of micron-sized support particles and combining the fourth plurality of micron-sized support particles with the first and second pluralities of micron-sized support particles.

Embodiment 394

The method of any one of embodiments 391-393, wherein the first, second, and third alkali oxides or alkaline earth oxides are selected from the group consisting of manganese oxide, magnesium oxide, and calcium oxide.

Embodiment 395

The method of any one of embodiments 391-394, wherein the alkali oxides or alkaline earth oxides are nano-sized.

Embodiment 396

The method of any one of embodiments 391-395, further comprising applying PGM to at least one of the first, second, or third pluralities of micron-sized support particles.

Embodiment 397

The method of any one of embodiments 391-396, wherein the PGM on a plurality of micron-sized support particles comprises a NNm particle.

Embodiment 398

The method of any one of embodiments 391-397, wherein the PGM on a plurality of micron-sized support particles comprises a NNiM particle.

Embodiment 399

The method of any one of embodiments 391-398, wherein the PGM comprises platinum, palladium, or a mixture thereof.

Embodiment 400

The method of any one of embodiments 391-399, wherein the pluralities of support particles comprise ceria.

Embodiment 401

The method of embodiment 400, wherein the PNA material comprises about 150 g/L to about 350 g/L ceria.

Embodiment 402

The method of any one of embodiments 391-401, wherein the PNA material stores NOx emissions from ambient temperature to about 100° C.

Embodiment 403

The method of any one of embodiments 391-402, wherein the PNA material stores NOx emissions from ambient temperature to about 150° C.

Embodiment 404

The method of any one of embodiments 391-403, wherein the PNA material stores NOx emissions from ambient temperature to about 200° C.

Embodiment 405

A method of forming a PNA material comprising: applying alkali oxide or alkaline earth oxide to a plurality of micron-sized support particles; and applying PGM to the plurality of micron sized support particles.

Embodiment 406

The method of embodiment 405, further comprising applying a second alkali oxide or alkaline earth oxide on a second plurality of micron-sized support particles and combining the first plurality of micron-sized support particles with the second plurality of micron-sized support particles.

Embodiment 407

The method of anyone of embodiments 405-406, further comprising applying a third alkali oxide or alkaline earth oxide on a third plurality of micron-sized support particles and combining the third plurality of micron-sized support particles with the first plurality of micron-sized support particles.

Embodiment 408

The method of any one of embodiments 405-407, wherein the first, second, and third alkali oxides or alkaline earth oxides are selected from the group consisting of manganese oxide, magnesium oxide, and calcium oxide.

Embodiment 409

The method of any one of embodiments 405-408, further comprising applying PGM to a fourth plurality of micron-sized support particles and combining the fourth plurality of micron-sized support particles with the first plurality of micron-sized support particles.

Embodiment 410

The method of any one of embodiments 405-409, wherein the PGM comprises platinum, palladium, or a mixture thereof.

Embodiment 411

The method of any one of embodiments 405-410, wherein the alkali oxides or alkaline earth oxides are nano-sized.

Embodiment 412

The method of any one of embodiments 405-411, wherein the pluralities of support particles comprise ceria.

Embodiment 413

The method of embodiment 412, wherein the PNA material comprises about 150 g/L to about 350 g/L ceria.

Embodiment 414

The method of any one of embodiments 405-413, wherein the PNA material stores NOx emissions from ambient temperature to about 100° C.

Embodiment 415

The method of any one of embodiments 405-414, wherein the PNA material stores NOx emissions from ambient temperature to about 150° C.

Embodiment 416

The method of any one of embodiments 405-415, wherein the PNA material stores NOx emissions from ambient temperature to about 200° C.

Embodiment 417

A washcoat composition comprising a solids content of: 95% to 98% by weight PNA material; and 2% to 5% by weight of boehmite particles.

Embodiment 418

The washcoat composition of embodiment 417, wherein the PNA material comprises an alkali oxide or alkaline earth oxide on a plurality of micron-sized support particles.

Embodiment 419

The washcoat composition of any one of embodiments 417-418, wherein the PNA material comprises a second alkali oxide or alkaline earth oxide on a second plurality of micron-sized support particles.

Embodiment 420

The washcoat composition of any one of embodiments 417-419, wherein the PNA material comprises a third alkali oxide or alkaline earth oxide on a third plurality of micron-sized support particles.

Embodiment 421

The washcoat composition of any one of embodiments 417-420, wherein the first, second, and third alkali oxides or alkaline earth oxides are selected from the group consisting of manganese oxide, magnesium oxide, and calcium oxide.

Embodiment 422

The washcoat composition of any one of embodiments 417-421, wherein the PNA material comprises PGM.

Embodiment 423

The washcoat composition of embodiment 422, wherein PGM are on a fourth plurality of micron-sized support particles.

Embodiment 424

The washcoat composition of any one of embodiments 422-423, wherein PGM are on at least one of the first, second, or third pluralities of micron-sized support particles.

Embodiment 425

The washcoat composition of any one of embodiments 422-424, wherein the PGM comprises platinum, palladium, or a mixture thereof.

Embodiment 426

The washcoat composition of any one of embodiments 422-2425, wherein the PGM on a plurality of micron-sized support particles comprises a NNm or NNiM particle.

Embodiment 427

The washcoat composition of any one of embodiments 417-426, wherein the alkali oxides or alkaline earth oxides are nano-sized.

Embodiment 428

The washcoat composition of any one of embodiments 417-427, wherein the pluralities of support particles comprise ceria.

Embodiment 429

The washcoat composition of embodiment 428, wherein the PNA material comprises about 150 g/L to about 350 g/L ceria.

Embodiment 430

The washcoat composition of any one of embodiments 417-429, wherein the PNA material stores NOx emissions from ambient temperature to about 100° C.

Embodiment 431

The washcoat composition of any one of embodiments 417-430, wherein the PNA material stores NOx emissions from ambient temperature to about 150° C.

Embodiment 432

The washcoat composition of any one of embodiments 417-431, wherein the PNA material stores NOx emissions from ambient temperature to about 200° C.

Embodiment 433

The washcoat composition of any one of embodiments 417-432, wherein the solids are suspended in an aqueous medium at a pH between 3 and 5.

Embodiment 434

A coated substrate comprising: a substrate; a washcoat layer comprising zeolite particles; a washcoat layer comprising PNA material; and a washcoat layer comprising catalytically active particles, wherein the catalytically active particles comprise composite nano-particles bonded to micron-sized carrier particles, and the composite nano-particles comprise a support nano-particle and a catalytic nano-particle.

Embodiment 435

The coated substrate of embodiment 434, wherein the washcoat layer comprising PNA material is formed on top of the washcoat layer comprising catalytically active particles.

Embodiment 436

The coated substrate of any one of embodiments 434-435, wherein the washcoat layer comprising catalytically active particles is formed on top of the washcoat layer comprising PNA material.

Embodiment 437

The coated substrate of any one of embodiments 434-436, wherein the washcoat layer comprising zeolite particles is formed on top of the washcoat layer comprising PNA material.

Embodiment 438

The coated substrate of any one of embodiments 434-437, wherein the washcoat layer comprising PNA material is formed on top of the washcoat layer comprising zeolite particles.

Embodiment 439

The coated substrate of any one of embodiments 434-438, wherein the washcoat layer comprising catalytically active particles is formed on top of the washcoat layer comprising zeolite particles.

Embodiment 440

The coated substrate of any one of embodiments 434-439, wherein the washcoat layer comprising zeolite particles is formed on top of the washcoat layer comprising catalytically active particles.

Embodiment 441

The coated substrate of any one of embodiments 434-440, wherein the PNA material comprises an alkali oxide or alkaline earth oxide on a plurality of micron-sized support particles.

Embodiment 442

The coated substrate of any one of embodiments 434-441, wherein the PNA material comprises a second alkali oxide or alkaline earth oxide on a second plurality of micron-sized support particles.

Embodiment 443

The coated substrate of any one of embodiments 434-442 wherein the PNA material comprises a third alkali oxide or alkaline earth oxide on a third plurality of micron-sized support particles.

Embodiment 444

The coated substrate of any one of embodiments 434-443, wherein the first, second, and third alkali oxides or alkaline earth oxides are selected from the group consisting of manganese oxide, magnesium oxide, and calcium oxide.

Embodiment 445

The coated substrate of any one of embodiments 434-444, wherein the PNA material comprises PGM.

Embodiment 446

The coated substrate of embodiment 445, wherein PGM are on a fourth plurality of micron-sized support particles.

Embodiment 447

The coated substrate of any one of embodiments 445-446, wherein PGM are on at least one of the first, second, or third pluralities of micron-sized support particles.

Embodiment 448

The coated substrate of any one of embodiments 445-447, wherein the PGM comprises platinum, palladium, or a mixture thereof.

Embodiment 449

The coated substrate of any one of embodiments 445-448, wherein the PGM on a plurality of micron-sized support particles comprises a NNm or NNiM particle.

Embodiment 450

The coated substrate of any one of embodiments 434-449, wherein the alkali oxides or alkaline earth oxides are nano-sized.

Embodiment 451

The coated substrate of any one of embodiments 434-450, wherein the pluralities of support particles comprise ceria.

Embodiment 452

The coated substrate of embodiment 451, wherein the PNA material comprises about 150 g/L to about 350 g/L ceria.

Embodiment 453

The coated substrate of any one of embodiments 434-452, wherein the PNA material stores NOx emissions from ambient temperature to about 100° C.

Embodiment 454

The coated substrate of any one of embodiments 434-453, wherein the PNA material stores NOx emissions from ambient temperature to about 150° C.

Embodiment 455

The coated substrate of any one of embodiments 434-454, wherein the PNA material stores NOx emissions from ambient temperature to about 200° C.

Embodiment 456

The coated substrate of any one of embodiments 434-455, wherein the washcoat layer comprising the PNA material further comprises boehmite particles.

Embodiment 457

The coated substrate of any one of embodiments 434-456, wherein the PNA material comprises 95% to 98% by weight of the mixture of PNA material and boehmite particles in the washcoat layer comprising PNA material.

Embodiment 458

The coated substrate of any one of embodiments 434-457, wherein the boehmite particles comprise 2% to 5% by weight of the mixture of PNA material and boehmite particles in the washcoat layer comprising PNA material.

Embodiment 459

The coated substrate of any one of embodiments 434-458, wherein the catalytic nano-particles comprise at least one platinum group metal.

Embodiment 460

The coated substrate of any one of embodiments 434-459, wherein the catalytic nano-particles comprise platinum and palladium.

Embodiment 461

The coated substrate of any one of embodiments 434-460, wherein the catalytic nano-particles comprise platinum and palladium in a weight ratio of 2:1 platinum:palladium

Embodiment 462

The coated substrate of any one of embodiments 434-461, wherein the support nano-particles have an average diameter of 10 nm to 20 nm.

Embodiment 463

The coated substrate of any one of embodiments 434-462, wherein the catalytic nano-particles have an average diameter of between 1 nm and 5 nm.

Embodiment 464

The coated substrate of any one of embodiments 434-463, wherein the washcoat layer comprising zeolite particles comprises metal-oxide particles and boehmite particles.

Embodiment 465

The coated substrate of any one of embodiments 434-464, wherein the metal-oxide particles are aluminum-oxide particles.

Embodiment 466

The coated substrate of any one of embodiments 434-465, wherein the zeolite particles comprise 60% to 80% by weight of the mixture of zeolite particles, metal-oxide particles, and boehmite particles in the washcoat layer comprising zeolite particles.

Embodiment 467

The coated substrate of any one of embodiments 434-466, wherein the boehmite particles comprise 2% to 5% by weight of the mixture of zeolite particles, metal-oxide particles, and boehmite particles in the washcoat layer comprising zeolite particles.

Embodiment 468

The coated substrate of embodiments 434-167, wherein the metal-oxide particles comprise 15% to 38% by weight of the mixture of zeolite particles, metal-oxide particles, and boehmite particles in the washcoat layer comprising zeolite particles.

Embodiment 469

The coated substrate of any one of embodiments 434-468, wherein the washcoat layer comprising zeolite particles does not include platinum group metals.

Embodiment 470

The coated substrate of any one of embodiments 434-469, wherein the zeolite particles in the washcoat layer comprising zeolite particles each have a diameter of 0.2 microns to 8 microns.

Embodiment 471

The coated substrate of any one of embodiments 434-470, wherein the washcoat layer comprising catalytically active particles further comprises boehmite particles and silica particles.

Embodiment 472

The coated substrate of any one of embodiments 434-471, wherein the washcoat layer comprising catalytically active particles is substantially free of zeolites

Embodiment 473

The coated substrate of any one of embodiments 434-472, wherein the catalytically active particles comprise 35% to 95% by weight of the combination of the catalytically active particles, boehmite particles, and silica particles in the washcoat layer comprising catalytically active particles.

Embodiment 474

The coated substrate of any one of embodiments 434-473, wherein the silica particles are present in an amount up to 20% by weight of the combination of the catalytically active particles, boehmite particles, and silica particles in the washcoat layer comprising catalytically active particles

Embodiment 475

The coated substrate of any one of embodiments 434-474, wherein the boehmite particles comprise 2% to 5% by weight of the combination of the catalytically active particles, the boehmite particles, and the silica particles in the washcoat layer comprising catalytically active particles

Embodiment 476

The coated substrate of any one of embodiments 434-475, wherein the washcoat layer comprising catalytically active particles comprises 92% by weight of the catalytically active particles, 3% by weight of the boehmite particles, and 5% by weight of the silica particles

Embodiment 477

The coated substrate of any one of embodiments 434-476, wherein the substrate comprises cordierite.

Embodiment 478

The coated substrate of any one of embodiments 434-477, wherein the substrate comprises a honeycomb structure.

Embodiment 479

The coated substrate of any one of embodiments 434-478, wherein the washcoat layer comprising zeolite particles has a thickness of 25 g/l to 90 g/l.

Embodiment 480

The coated substrate of any one of embodiments 434-479, wherein the washcoat layer comprising catalytically active particles has a thickness of 50 g/l to 250 g/l.

Embodiment 481

The coated substrate of any one of embodiments 434-480, further comprising a corner-fill layer deposited directly on the substrate.

Embodiment 482

The coated substrate of any one of embodiments 434-481, wherein the coated substrate has a platinum group metal loading of 4 g/l or less and a light-off temperature for carbon monoxide at least 5° C. lower than the light-off temperature of a substrate with the same platinum group metal loading deposited by wet-chemistry methods.

Embodiment 483

The coated substrate of any one of embodiments 434-482, wherein the coated substrate has a platinum group metal loading of about 1.0 g/l to about 4.0 g/l.

Embodiment 484

The coated substrate of any one of embodiments 434-483, said coated substrate having a platinum group metal loading of about 1.0 g/l to about 5.5 g/l, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 485

The coated substrate of any one of embodiments 434-484, said coated substrate having a platinum group metal loading of about 1.0 g/l to about 5.5 g/l, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 486

A catalytic converter comprising a coated substrate of any one of embodiments 434-485.

Embodiment 487

An exhaust treatment system comprising a conduit for exhaust gas and a catalytic converter according to embodiment 486.

Embodiment 488

A vehicle comprising a catalytic converter according to embodiment 486.

Embodiment 489

A diesel vehicle comprising a catalytic converter according to embodiment 486.

Embodiment 490

The diesel vehicle of embodiment 489, wherein the diesel vehicle is a light-duty diesel vehicle.

Embodiment 491

A method of treating an exhaust gas, comprising contacting the coated substrate of any one of embodiments 434-485 with the exhaust gas.

Embodiment 492

A method of treating an exhaust gas, comprising contacting the coated substrate of any one of embodiments 434-485 with the exhaust gas, wherein the substrate is housed within a catalytic converter configured to receive the exhaust gas.

Embodiment 493

A method of forming a coated substrate comprising: coating a substrate with a washcoat composition comprising zeolite particles; coating the substrate with a washcoat composition comprising a PNA material; and coating the substrate with a washcoat composition comprising catalytically active particles, wherein the catalytically active particles comprise composite nano-particles bonded to micron-sized carrier particles, and the composite nano-particles comprise a support nano-particle and a catalytic nano-particle.

Embodiment 494

The method of embodiment 493, wherein coating the substrate with the washcoat layer comprising PNA material is performed before coating the substrate with the washcoat comprising catalytically active particles.

Embodiment 495

The method of any one of embodiments 493-494, wherein coating the substrate with the washcoat layer comprising catalytically active particles is performed before coating the substrate with the washcoat layer comprising PNA material.

Embodiment 496

The method of any one of embodiments 493-495, wherein coating the substrate with the washcoat layer comprising zeolite particles is performed before coating the substrate with the washcoat layer comprising PNA material.

Embodiment 497

The method of any one of embodiments 493-496, wherein coating the substrate with the washcoat layer comprising PNA material is performed before coating the substrate with the washcoat layer comprising zeolite particles.

Embodiment 498

The method of any one of embodiments 493-497, wherein coating the substrate with the washcoat layer comprising catalytically active particles is performed before coating the substrate with the washcoat layer comprising zeolite particles.

Embodiment 499

The method of any one of embodiments 493-498, wherein coating the substrate with the washcoat layer comprising zeolite particles is performed before coating the substrate with the washcoat layer comprising catalytically active particles.

Embodiment 500

The method of any one of embodiments 493-499, wherein the PNA material comprises an alkali oxide or alkaline earth oxide on a plurality of micron-sized support particles.

Embodiment 501

The method of any one of embodiments 493-500, wherein the PNA material comprises a second alkali oxide or alkaline earth oxide on a second plurality of micron-sized support particles.

Embodiment 502

The method of any one of embodiments 493-501, wherein the PNA material comprises a third alkali oxide or alkaline earth oxide on a third plurality of micron-sized support particles.

Embodiment 503

The method of any one of embodiments 493-502, wherein the first, second, and third alkali oxides or alkaline earth oxides are selected from the group consisting of manganese oxide, magnesium oxide, and calcium oxide.

Embodiment 504

The method of any one of embodiments 493-503, wherein the PNA material comprises PGM.

Embodiment 505

The method of embodiment 504, wherein PGM are on a fourth plurality of micron-sized support particles.

Embodiment 506

The method of any one of embodiments 504-505, wherein PGM are on at least one of the first, second, or third pluralities of micron-sized support particles.

Embodiment 507

The method of any one of embodiments 504-506, wherein the PGM comprises platinum, palladium, or a mixture thereof.

Embodiment 508

The method of any one of embodiments 504-507, wherein the PGM on a plurality of micron-sized support particles comprises a NNm or NNiM particle.

Embodiment 509

The method of any one of embodiments 493-508, wherein the alkali oxides or alkaline earth oxides are nano-sized.

Embodiment 510

The method of any one of embodiments 493-509, wherein the pluralities of support particles comprise ceria.

Embodiment 511

The method of embodiment 510, wherein the PNA material comprises about 150 g/L to about 350 g/L ceria.

Embodiment 512

The method of any one of embodiments 493-511 wherein the PNA material stores NOx emissions from ambient temperature to about 100° C.

Embodiment 513

The method of any one of embodiments 493-512, wherein the PNA material stores NOx emissions from ambient temperature to about 150° C.

Embodiment 514

The method of any one of embodiments 493-513, wherein the PNA material stores NOx emissions from ambient temperature to about 200° C.

Embodiment 515

The method of any one of embodiments 493-514, wherein the washcoat layer comprising the PNA material further comprises boehmite particles.

Embodiment 516

The method of any one of embodiments 493-515, wherein the PNA material comprises 95% to 98% by weight of the mixture of PNA material and boehmite particles in the washcoat layer comprising PNA material.

Embodiment 517

The method of any one of embodiments 493-516, wherein the boehmite particles comprise 2% to 5% by weight of the mixture of PNA material and boehmite particles in the washcoat layer comprising PNA material.

Embodiment 518

The method of any one of embodiments 493-517, wherein the catalytic nano-particles comprise at least one platinum group metal.

Embodiment 519

The method of any one of embodiments 493-518, wherein the catalytic nano-particles comprise platinum and palladium.

Embodiment 520

The method of any one of embodiments 493-519, wherein the catalytic nano-particles comprise platinum and palladium in a weight ratio of 2:1 platinum:palladium

Embodiment 521

The method of any one of embodiments 493-520, wherein the support nano-particles have an average diameter of 10 nm to 20 nm.

Embodiment 522

The method of any one of embodiments 493-521, wherein the catalytic nano-particles have an average diameter of between 1 nm and 5 nm.

Embodiment 523

The method of any one of embodiments 493-522, wherein the washcoat layer comprising zeolite particles comprises metal-oxide particles and boehmite particles.

Embodiment 524

The method of any one of embodiments 493-523, wherein the metal-oxide particles are aluminum-oxide particles.

Embodiment 525

The method of any one of embodiments 493-524, wherein the zeolite particles comprise 60% to 80% by weight of the mixture of zeolite particles, metal-oxide particles, and boehmite particles in the washcoat layer comprising zeolite particles.

Embodiment 526

The method of any one of embodiments 493-525, wherein the boehmite particles comprise 2% to 5% by weight of the mixture of zeolite particles, metal-oxide particles, and boehmite particles in the washcoat layer comprising zeolite particles.

Embodiment 527

The method of embodiments 493-526, wherein the metal-oxide particles comprise 15% to 38% by weight of the mixture of zeolite particles, metal-oxide particles, and boehmite particles in the washcoat layer comprising zeolite particles.

Embodiment 528

The method of any one of embodiments 493-527, wherein the washcoat layer comprising zeolite particles does not include platinum group metals.

Embodiment 529

The method of any one of embodiments 493-528, wherein the zeolite particles in the washcoat layer comprising zeolite particles each have a diameter of 0.2 microns to 8 microns.

Embodiment 530

The method of any one of embodiments 493-529, wherein the washcoat layer comprising catalytically active particles further comprises boehmite particles and silica particles.

Embodiment 531

The method of any one of embodiments 493-530, wherein the washcoat layer comprising catalytically active particles is substantially free of zeolites

Embodiment 532

The method of any one of embodiments 493-531, wherein the catalytically active particles comprise 35% to 95% by weight of the combination of the catalytically active particles, boehmite particles, and silica particles in the washcoat layer comprising catalytically active particles.

Embodiment 533

The method of any one of embodiments 493-532, wherein the silica particles are present in an amount up to 20% by weight of the combination of the catalytically active particles, boehmite particles, and silica particles in the washcoat layer comprising catalytically active particles

Embodiment 534

The method of any one of embodiments 493-533, wherein the boehmite particles comprise 2% to 5% by weight of the combination of the catalytically active particles, the boehmite particles, and the silica particles in the washcoat layer comprising catalytically active particles

Embodiment 535

The method of any one of embodiments 493-534, wherein the washcoat layer comprising catalytically active particles comprises 92% by weight of the catalytically active particles, 3% by weight of the boehmite particles, and 5% by weight of the silica particles

Embodiment 536

The method of any one of embodiments 493-535, wherein the substrate comprises cordierite.

Embodiment 537

The method of any one of embodiments 493-536, wherein the substrate comprises a honeycomb structure.

Embodiment 538

The method of any one of embodiments 493-537, wherein the washcoat layer comprising zeolite particles has a thickness of 25 g/l to 90 g/l.

Embodiment 539

The method of any one of embodiments 493-538, wherein the washcoat layer comprising catalytically active particles has a thickness of 50 g/l to 250 g/l.

Embodiment 540

The method of any one of embodiments 493-539, further comprising coating the substrate with a corner-fill washcoat prior to coating the substrate with the other washcoats.

Embodiment 541

The method of any one of embodiments 493-540, wherein the coated substrate has a platinum group metal loading of 4 g/l or less and a light-off temperature for carbon monoxide at least 5° C. lower than the light-off temperature of a substrate with the same platinum group metal loading deposited by wet-chemistry methods.

Embodiment 542

The method of any one of embodiments 493-541, wherein the coated substrate has a platinum group metal loading of about 1.0 g/l to about 4.0 g/l.

Embodiment 543

The method of any one of embodiments 493-542, said coated substrate having a platinum group metal loading of about 1.0 g/l to about 5.5 g/l, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 544

The method of any one of embodiments 493-543, said coated substrate having a platinum group metal loading of about 1.0 g/l to about 5.5 g/l, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 545

A method of forming a coated substrate, the method comprising: coating a substrate with a washcoat composition comprising zeolite particles; coating the substrate with a washcoat composition comprising PNA material according to any one of embodiments 417-433; and coating the substrate with a washcoat composition containing catalytically active particles.

Embodiment 546

The method of embodiment 545, wherein coating the substrate with the washcoat layer comprising PNA material is performed before coating the substrate with the washcoat comprising catalytically active particles.

Embodiment 547

The method of any one of embodiments 545-546, wherein coating the substrate with the washcoat layer comprising catalytically active particles is performed before coating the substrate with the washcoat layer comprising PNA material.

Embodiment 548

The method of any one of embodiments 545-547, wherein coating the substrate with the washcoat layer comprising zeolite particles is performed before coating the substrate with the washcoat layer comprising PNA material.

Embodiment 549

The method of any one of embodiments 545-548, wherein coating the substrate with the washcoat layer comprising PNA material is performed before coating the substrate with the washcoat layer comprising zeolite particles.

Embodiment 550

The method of any one of embodiments 545-549, wherein coating the substrate with the washcoat layer comprising catalytically active particles is performed before coating the substrate with the washcoat layer comprising zeolite particles.

Embodiment 551

The method of any one of embodiments 545-550, wherein coating the substrate with the washcoat layer comprising zeolite particles is performed before coating the substrate with the washcoat layer comprising catalytically active particles.

Embodiment 552

The method of any one of embodiments 545-551, further comprising coating the substrate with a corner-fill washcoat prior to coating the substrate with the other washcoats.

Embodiment 553

The method of any one of embodiments 545-552, wherein the washcoat composition comprising zeolite particles comprises a thickness of 25 g/l to 90 g/l.

Embodiment 554

The method of any one of embodiments 545-553 wherein the washcoat composition comprising catalytically active particles comprises a thickness of 50 g/l to 250 g/l.

Embodiment 555

A catalytic converter comprising a coated substrate according to any one of embodiments 545-554.

Embodiment 556

An exhaust treatment system comprising a conduit for exhaust gas and a catalytic converter according to embodiment 555.

Embodiment 557

A vehicle comprising a catalytic converter according to embodiment 555.

Embodiment 558

A diesel vehicle comprising a catalytic converter according to embodiment 555.

Embodiment 559

The diesel vehicle of embodiment 558, wherein the diesel vehicle is a light-duty diesel vehicle.

Embodiment 560

A coated substrate comprising a washcoat composition according to embodiments 417-433.

Embodiment 561

The vehicle of any one of embodiments 488 and 557, wherein the vehicle complies with the European emission standard Euro 5.

Embodiment 562

The vehicle of any one of embodiments 488 and 557, wherein the vehicle complies with the European emission standard Euro 6.

Embodiment 563

A vehicle comprising: a catalytic converter comprising between 1.0 g/l and 4.0 g/l of platinum group metal; and a PNA material, wherein the vehicle complies with the European emission standard Euro 5.

Embodiment 564

The vehicle of embodiment 563, wherein the PNA material comprises an alkali oxide or alkaline earth oxide on a plurality of micron-sized support particles.

Embodiment 565

The vehicle of any one of embodiments 563-564, wherein the PNA material comprises a second alkali oxide or alkaline earth oxide on a second plurality of micron-sized support particles.

Embodiment 566

The vehicle of any one of embodiments 563-565, wherein the PNA material comprises a third alkali oxide or alkaline earth oxide on a third plurality of micron-sized support particles.

Embodiment 567

The vehicle of any one of embodiments 563-566, wherein the first, second, and third alkali oxides or alkaline earth oxides are selected from the group consisting of manganese oxide, magnesium oxide, and calcium oxide.

Embodiment 568

The vehicle of any one of embodiments 563-567, wherein the PNA material comprises PGM.

Embodiment 569

The vehicle of embodiment 568, wherein PGM are on a fourth plurality of micron-sized support particles.

Embodiment 570

The vehicle of any one of embodiments 568-569, wherein PGM are on at least one of the first, second, or third pluralities of micron-sized support particles.

Embodiment 571

The vehicle of any one of embodiments 568-570, wherein the PGM comprises platinum, palladium, or a mixture thereof.

Embodiment 572

The vehicle of any one of embodiments 568-571, wherein the PGM on a plurality of micron-sized support particles comprises a NNm or NNiM particle.

Embodiment 573

The vehicle of any one of embodiments 563-572, wherein the alkali oxides or alkaline earth oxides are nano-sized.

Embodiment 574

The vehicle of any one of embodiments 563-573, wherein the pluralities of support particles comprise ceria.

Embodiment 575

The vehicle of embodiment 574, wherein the PNA material comprises about 150 g/L to about 350 g/L ceria.

Embodiment 576

The vehicle of any one of embodiments 563-575, wherein the PNA material stores NOx emissions from ambient temperature to about 100° C.

Embodiment 577

The vehicle of any one of embodiments 563-576, wherein the PNA material stores NOx emissions from ambient temperature to about 150° C.

Embodiment 578

The vehicle of any one of embodiments 563-577, wherein the PNA material stores NOx emissions from ambient temperature to about 200° C.

Embodiment 579

The vehicle of any one of embodiments 563-578, wherein the vehicle is a diesel vehicle.

Embodiment 580

The vehicle of any one of embodiments 563-579, wherein the diesel vehicle is a light-duty diesel vehicle.

Embodiment 581

The vehicle of any one of embodiments 563-580, wherein the vehicle complies with European emission standard Euro 6.

Embodiment 582

The vehicle of any one of embodiments 563-581, further comprising an SCR unit.

Embodiment 583

The vehicle of any one of embodiments 563-582, further comprising an LNT.

Embodiment 584

A catalytic converter comprising: a coated substrate comprising a washcoat layer comprising a PNA material.

Embodiment 585

The catalytic converter of embodiment 584, wherein the PNA material comprises an alkali oxide or alkaline earth oxide on a plurality of micron-sized support particles.

Embodiment 586

The catalytic converter of any one of embodiments 584-585, wherein the PNA material comprises a second alkali oxide or alkaline earth oxide on a second plurality of micron-sized support particles.

Embodiment 587

The catalytic converter of any one of embodiments 584-586, wherein the PNA material comprises a third alkali oxide or alkaline earth oxide on a third plurality of micron-sized support particles.

Embodiment 588

The catalytic converter of any one of embodiments 584-587, wherein the first, second, and third alkali oxides or alkaline earth oxides are selected from the group consisting of manganese oxide, magnesium oxide, and calcium oxide.

Embodiment 589

The catalytic converter of any one of embodiments 584-588, wherein the PNA material comprises PGM.

Embodiment 590

The catalytic converter of embodiment 589, wherein PGM are on a fourth plurality of micron-sized support particles.

Embodiment 591

The catalytic converter of any one of embodiments 589-590, wherein PGM are on at least one of the first, second, or third pluralities of micron-sized support particles.

Embodiment 592

The catalytic converter of any one of embodiments 589-591, wherein the PGM comprises platinum, palladium, or a mixture thereof.

Embodiment 593

The catalytic converter of any one of embodiments 589-592, wherein the PGM on a plurality of micron-sized support particles comprises a NNm or NNiM particle.

Embodiment 594

The catalytic converter of any one of embodiments 584-593, wherein the alkali oxides or alkaline earth oxides are nano-sized.

Embodiment 595

The catalytic converter of any one of embodiments 584-594, wherein the pluralities of support particles comprise ceria.

Embodiment 596

The catalytic converter of embodiment 595, wherein the PNA material comprises about 150 g/L to about 350 g/L ceria.

Embodiment 597

The catalytic converter of any one of embodiments 584-596, wherein the PNA material stores NOx emissions from ambient temperature to about 100° C.

Embodiment 598

The catalytic converter of any one of embodiments 584-597, wherein the PNA material stores NOx emissions from ambient temperature to about 150° C.

Embodiment 599

The catalytic converter of any one of embodiments 584-598, wherein the PNA material stores NOx emissions from ambient temperature to about 200° C.

Embodiment 600

An exhaust treatment system comprising a conduit for exhaust gas and a catalytic converter comprising a coated substrate comprising a washcoat layer comprising a PNA material.

Embodiment 601

The exhaust treatment system of embodiment 600, wherein the PNA material comprises an alkali oxide or alkaline earth oxide on a plurality of micron-sized support particles.

Embodiment 602

The exhaust treatment system of any one of embodiments 600-601, wherein the PNA material comprises a second alkali oxide or alkaline earth oxide on a second plurality of micron-sized support particles.

Embodiment 603

The exhaust treatment system of any one of embodiments 600-602, wherein the PNA material comprises a third alkali oxide or alkaline earth oxide on a third plurality of micron-sized support particles.

Embodiment 604

The exhaust treatment system of any one of embodiments 600-603, wherein the first, second, and third alkali oxides or alkaline earth oxides are selected from the group consisting of manganese oxide, magnesium oxide, and calcium oxide.

Embodiment 605

The exhaust treatment system of any one of embodiments 600-604, wherein the PNA material comprises PGM.

Embodiment 606

The exhaust treatment system of embodiment 605, wherein PGM are on a fourth plurality of micron-sized support particles.

Embodiment 607

The exhaust treatment system of any one of embodiments 605-606, wherein PGM are on at least one of the first, second, or third pluralities of micron-sized support particles.

Embodiment 608

The exhaust treatment system of any one of embodiments 605-607, wherein the PGM comprises platinum, palladium, or a mixture thereof.

Embodiment 609

The exhaust treatment system of any one of embodiments 605-608, wherein the PGM on a plurality of micron-sized support particles comprises a NNm or NNiM particle.

Embodiment 610

The exhaust treatment system of any one of embodiments 600-609, wherein the alkali oxides or alkaline earth oxides are nano-sized.

Embodiment 611

The exhaust treatment system of any one of embodiments 600-610, wherein the pluralities of support particles comprise ceria.

Embodiment 612

The exhaust treatment system of embodiment 611, wherein the PNA material comprises about 150 g/L to about 350 g/L ceria.

Embodiment 613

The exhaust treatment system of any one of embodiments 600-612, wherein the PNA material stores NOx emissions from ambient temperature to about 100° C.

Embodiment 614

The exhaust treatment system of any one of embodiments 600-613, wherein the PNA material stores NOx emissions from ambient temperature to about 150° C.

Embodiment 615

The exhaust treatment system of any one of embodiments 600-614, wherein the PNA material stores NOx emissions from ambient temperature to about 200° C.

Embodiment 616

The exhaust treatment system of any one of embodiments 600-615, further comprising an SCR unit.

Embodiment 617

The exhaust treatment system of any one of embodiments 600-616, further comprising an LNT.

Embodiment 618

A coated substrate comprising: a substrate; and a Passive NOx Adsorber (PNA) layer comprising nano-sized platinum group metal (PGM) on a plurality of support particles comprising cerium oxide.

Embodiment 619

The coated substrate of embodiment 618, wherein the PNA layer stores NOx gas up to at least a first temperature and releases the stored NOx gas at or above the first temperature.

Embodiment 620

The coated substrate of embodiment 619, wherein the first temperature is 150° C.

Embodiment 621

The coated substrate of any one of embodiments 618-620, wherein the plurality of support particles are micron-sized.

Embodiment 622

The coated substrate of any one of embodiments 618-620, wherein the plurality of support particles are nano-sized.

Embodiment 623

The coated substrate of any one of embodiments 618-622, wherein the plurality of support particles further comprise zirconium oxide, lanthanum oxide, yttrium oxide, or a combination thereof.

Embodiment 624

The coated substrate of embodiment 623, wherein the plurality of support particles comprise HSA5, HSA20, or a mixture thereof.

Embodiment 625

The coated substrate of any of embodiments 618-624, wherein the nano-sized PGM on the plurality of support particles is produced by wet chemistry techniques followed by calcination.

Embodiment 626

The coated substrate of any of embodiments 618-624, wherein the nano-sized PGM on the plurality of support particles is produced by incipient wetness followed by calcination.

Embodiment 627

The coated substrate of any of embodiments 618-620 and 622-624, wherein the nano-sized PGM on the plurality of support particles comprise composite nano-particles, wherein the composite nano-particles comprise a support-nanoparticle and a PGM nano-particle.

Embodiment 628

The coated substrate of embodiment 627, wherein the composite nano-particles are bonded to micron-sized carrier particles to form NNm particles.

Embodiment 629

The coated substrate of embodiment 627, wherein the composite nano-particles are embedded within carrier particles to form NNiM particles.

Embodiment 630

The coated substrate of any one of embodiments 628-629, wherein the carrier particles comprise cerium oxide, zirconium oxide, lanthanum oxide, yttrium oxide, or a combination thereof.

Embodiment 631

The coated substrate of embodiment 630, wherein the carrier particle comprises 86 wt % cerium oxide, 10 wt % zirconium oxide, and 4 wt % lanthanum oxide.

Embodiment 632

The coated substrate of any one of embodiments 627-631, wherein the composite nano-particles are plasma created.

Embodiment 633

The coated substrate of any one of embodiments 618-632, wherein the PGM comprises palladium.

Embodiment 634

The coated substrate of embodiment 633, wherein the PNA layer comprises about 2 g/L to about 4 g/L palladium.

Embodiment 635

The coated substrate of embodiment 634, wherein the PNA layer comprises about 3 g/L palladium.

Embodiment 636

The coated substrate of any one of embodiments 633-635, wherein the coated substrate is used in a greater than or equal to 2.5 L engine system.

Embodiment 637

The coated substrate of any one of embodiments 618-632, wherein the PGM comprises ruthenium.

Embodiment 638

The coated substrate of embodiment 637, wherein the PNA layer comprises about 3 g/L to about 15 g/L ruthenium.

Embodiment 639

The coated substrate of embodiment 638, wherein the PNA layer comprises about 5 g/L to about 6 g/L ruthenium.

Embodiment 640

The coated substrate of any one of embodiments 637-639, wherein the first temperature is 300° C.

Embodiment 641

The coated substrate of any one of embodiments 637-640, wherein the coated substrate is used in a less than or equal to 2.5 L engine system.

Embodiment 642

The coated substrate of any one of embodiments 618-641, wherein the PNA layer comprises greater than or equal to about 150 g/L of the plurality of support particles.

Embodiment 643

The coated substrate of any one of embodiments 618-642, wherein the PNA layer comprises greater than or equal to about 300 g/L of the plurality of support particles.

Embodiment 644

The coated substrate of any one of embodiments 618-643, wherein the PNA layer further comprises boehmite particles.

Embodiment 645

The coated substrate of embodiment 644, wherein the nano-sized PGM on the plurality of support particles comprises 95% to 98% by weight of the mixture of the nano-sized PGM on the plurality of support particles and boehmite particles in the PNA layer.

Embodiment 646

The coated substrate of any one of embodiments 644-645, wherein the boehmite particles comprise 2% to 5% by weight of the mixture of the nano-sized PGM on the plurality of support particles and boehmite particles in the PNA layer.

Embodiment 647

The coated substrate of any one of embodiments 618-646, wherein the substrate comprises cordierite.

Embodiment 648

The coated substrate of any one of embodiments 618-647, wherein the substrate comprises a honeycomb structure.

Embodiment 649

The coated substrate of any one of embodiments 618-648, further comprising a corner-fill layer deposited directly on the substrate.

Embodiment 650

A catalytic converter comprising a coated substrate of any one of embodiments 618-649.

Embodiment 651

An exhaust treatment system comprising a conduit for exhaust gas and a catalytic converter according to embodiment 650.

Embodiment 652

A vehicle comprising a catalytic converter according to embodiment 650.

Embodiment 653

The vehicle of embodiment 652, wherein the vehicle complies with the European emission standard Euro 5.

Embodiment 654

The vehicle of embodiment 652, wherein the vehicle complies with the European emission standard Euro 6.

Embodiment 655

A diesel vehicle comprising a catalytic converter according to embodiment 650.

Embodiment 656

The diesel vehicle of embodiment 655, wherein the diesel vehicle is a light-duty diesel vehicle.

Embodiment 657

A method of treating an exhaust gas, comprising contacting the coated substrate of any one of embodiments 618-649 with the exhaust gas.

Embodiment 658

A method of treating an exhaust gas, comprising contacting the coated substrate of any one of embodiments 618-649 with the exhaust gas, wherein the substrate is housed within a catalytic converter configured to receive the exhaust gas.

Embodiment 659

A washcoat composition comprising a solids content of: 95% to 98% by weight nano-sized PGM on a plurality of support particles comprising cerium oxide; and 2% to 5% by weight of boehmite particles.

Embodiment 660

The washcoat composition of embodiment 659, wherein the washcoat composition stores NOx gas up to at least 150° C. and releases the stored NOx gas at or above 150° C.

Embodiment 661

The washcoat composition of embodiment 659, wherein the plurality of support particles are micron-sized.

Embodiment 662

The washcoat composition of embodiment 659, wherein the plurality of support particles are nano-sized.

Embodiment 663

The washcoat composition of any one of embodiments 659-662, wherein the plurality of support particles further comprise zirconium oxide, lanthanum oxide, yttrium oxide, or a combination thereof.

Embodiment 664

The washcoat composition of embodiment 663, wherein the plurality of support particles comprise HSA5, HSA20, or a mixture thereof.

Embodiment 665

The washcoat composition of any of embodiments 659-664, wherein the nano-sized PGM on the plurality of support particles is produced by wet chemistry techniques followed by calcination.

Embodiment 666

The washcoat composition of any of embodiments 659-664, wherein the nano-sized PGM on the plurality of support particles is produced by incipient wetness followed by calcination.

Embodiment 667

The washcoat composition of any of embodiments 659-660 and 662-664, wherein the nano-sized PGM on the plurality of support particles comprise composite nano-particles, wherein the composite nano-particles comprise a support-nanoparticle and a PGM nano-particle.

Embodiment 668

The washcoat composition of embodiment 667, wherein the composite nano-particles are bonded to micron-sized carrier particles to form NNm particles.

Embodiment 669

The washcoat composition of embodiment 667, wherein the composite nano-particles are embedded within carrier particles to form NNiM particles.

Embodiment 670

The washcoat composition of any one of embodiments 668-669, wherein the carrier particles comprise cerium oxide, zirconium oxide, lanthanum oxide, yttrium oxide, or a combination thereof.

Embodiment 671

The washcoat composition of embodiment 670, wherein the carrier particle comprises 86 wt % cerium oxide, 10 wt % zirconium oxide, and 4 wt % lanthanum oxide.

Embodiment 672

The washcoat composition of any one of embodiments 667-671, wherein the composite nano-particles are plasma created.

Embodiment 673

The washcoat composition of any one of embodiments 659-672, wherein the PGM comprises palladium.

Embodiment 674

The washcoat composition of embodiment 673, wherein the washcoat composition comprises about 2 g/L to about 4 g/L palladium.

Embodiment 675

The washcoat composition of embodiment 674, wherein the washcoat composition comprises about 3 g/L palladium.

Embodiment 676

The washcoat composition of any one of embodiments 673-675, wherein the washcoat composition is used in a greater than or equal to 2.5 L engine system.

Embodiment 677

The washcoat composition of any one of embodiments 659-672, wherein the PGM comprises ruthenium.

Embodiment 678

The washcoat composition of embodiment 677, wherein the washcoat composition comprises about 3 g/L to about 15 g/L ruthenium.

Embodiment 679

The washcoat composition of embodiment 678, wherein the washcoat composition comprises about 5 g/L to about 6 g/L ruthenium.

Embodiment 680

The washcoat composition of any one of embodiments 677-679, wherein the washcoat composition stores NOx gas up to at least 300° C. and releases the stored NOx gas at or above 300° C.

Embodiment 681

The washcoat composition of any one of embodiments 677-680, wherein the washcoat composition is used in a less than or equal to 2.5 L engine system.

Embodiment 682

The washcoat composition of any one of embodiments 659-681, wherein the washcoat composition comprises greater than or equal to about 150 g/L of the plurality of support particles.

Embodiment 683

The washcoat composition of any one of embodiments 659-682, wherein the washcoat composition comprises greater than or equal to about 300 g/L of the plurality of support particles.

Embodiment 684

The washcoat composition of any one of embodiments 659-683, wherein the solids are suspended in an aqueous medium at a pH between 3 and 5.

Embodiment 685

A method of treating an exhaust gas, comprising: contacting a coated substrate with an exhaust gas comprising NOx emissions, wherein the coated substrate comprises: a substrate; and a PNA layer comprising nano-sized PGM on a plurality of support particles comprising cerium oxide.

Embodiment 686

The method of embodiment 685, wherein the PNA layer stores the NOx emissions from the exhaust gas up to at least a first temperature and releases the stored NOx emissions at or above the first temperature.

Embodiment 687

The method of embodiment 686, wherein the first temperature is 150° C.

Embodiment 688

The method of any one of embodiments 685-687, wherein the plurality of support particles are micron-sized.

Embodiment 689

The method of any one of embodiments 685-687, wherein the plurality of support particles are nano-sized.

Embodiment 690

The method of any one of embodiments 685-689, wherein the plurality of support particles further comprise zirconium oxide, lanthanum oxide, yttrium oxide, or a combination thereof.

Embodiment 691

The method of embodiment 690, wherein the plurality of support particles comprise HSA5, HSA20, or a mixture thereof.

Embodiment 692

The method of any of embodiments 685-691, wherein the nano-sized PGM on the plurality of support particles is produced by wet chemistry techniques followed by calcination.

Embodiment 693

The method of any of embodiments 685-691, wherein the nano-sized PGM on the plurality of support particles is produced by incipient wetness followed by calcination.

Embodiment 694

The method of any of embodiments 685-687 and 689-691, wherein the nano-sized PGM on the plurality of support particles comprise composite nano-particles, wherein the composite nano-particles comprise a support-nanoparticle and a PGM nano-particle.

Embodiment 695

The method of embodiment 694, wherein the composite nano-particles are bonded to micron-sized carrier particles to form NNm particles.

Embodiment 696

The method of embodiment 694, wherein the composite nano-particles are embedded within carrier particles to form NNiM particles.

Embodiment 697

The method of any one of embodiments 695-696, wherein the carrier particles comprise cerium oxide, zirconium oxide, lanthanum oxide, yttrium oxide, or a combination thereof.

Embodiment 698

The method of embodiment 697, wherein the carrier particle comprises 86 wt % cerium oxide, 10 wt % zirconium oxide, and 4 wt % lanthanum oxide.

Embodiment 699

The method of any one of embodiments 694-698, wherein the composite nano-particles are plasma created.

Embodiment 700

The method of any one of embodiments 685-699, wherein the PGM comprises palladium.

Embodiment 701

The method of embodiment 700, wherein the PNA layer comprises about 2 g/L to about 4 g/L palladium.

Embodiment 702

The method of embodiment 701, wherein the PNA layer comprises about 3 g/L palladium.

Embodiment 703

The method of any one of embodiments 700-702, wherein the exhaust gas is from a greater than or equal to 2.5 L engine.

Embodiment 704

The method of any one of embodiments 685-699, wherein the PGM comprises ruthenium.

Embodiment 705

The method of embodiment 704, wherein the PNA layer comprises about 3 g/L to about 15 g/L ruthenium.

Embodiment 706

The method of embodiment 705, wherein the PNA layer comprises about 5 g/L to about 6 g/L ruthenium.

Embodiment 707

The method of any one of embodiments 704-706, wherein the first temperature is 300° C.

Embodiment 708

The method of any one of embodiments 704-707, wherein the exhaust gas is from a less than or equal to 2.5 L engine.

Embodiment 709

The method of any one of embodiments 685-708, wherein the PNA layer comprises greater than or equal to about 150 g/L of the plurality of support particles.

Embodiment 710

The method of any one of embodiments 685-709, wherein the PNA layer comprises greater than or equal to about 300 g/L of the plurality of support particles.

Embodiment 711

The method of any one of embodiments 685-710, wherein the PNA layer further comprises boehmite particles.

Embodiment 712

The method of embodiment 711, wherein the nano-sized PGM on the plurality of support particles comprises 95% to 98% by weight of the mixture of the nano-sized PGM on the plurality of support particles and boehmite particles in the PNA layer.

Embodiment 713

The method of any one of embodiments 711-712, wherein the boehmite particles comprise 2% to 5% by weight of the mixture of the nano-sized PGM on the plurality of support particles and boehmite particles in the PNA layer.

Embodiment 714

The method of any one of embodiments 685-713, wherein the substrate comprises cordierite.

Embodiment 715

The method of any one of embodiments 685-714, wherein the substrate comprises a honeycomb structure.

Embodiment 716

The method of any one of embodiments 685-715, further comprising a corner-fill layer deposited directly on the substrate.

Embodiment 717

A method of forming a coated substrate comprising: coating the substrate with a washcoat composition comprising nano-sized palladium or ruthenium on a plurality of support particles comprising cerium oxide.

Embodiment 718

The method of embodiment 717, wherein the washcoat composition stores NOx gas up to at least 150° C. and releases the stored NOx emissions at or above 150° C.

Embodiment 719

The method of embodiment 717, wherein the plurality of support particles are micron-sized.

Embodiment 720

The method of embodiment 717, wherein the plurality of support particles are nano-sized.

Embodiment 721

The method of any one of embodiments 717-720, wherein the plurality of support particles further comprise zirconium oxide, lanthanum oxide, yttrium oxide, or a combination thereof.

Embodiment 722

The method of embodiment 721, wherein the plurality of support particles comprise HSA5, HSA20, or a mixture thereof.

Embodiment 723

The method of any of embodiments 717-722, wherein the nano-sized PGM on the plurality of support particles is produced by wet chemistry techniques followed by calcination.

Embodiment 724

The method of any of embodiments 717-722, wherein the nano-sized PGM on the plurality of support particles is produced by incipient wetness followed by calcination.

Embodiment 725

The method of any of embodiments 717-718 and 720-722, wherein the nano-sized PGM on the plurality of support particles comprise composite nano-particles, wherein the composite nano-particles comprise a support-nanoparticle and a PGM nano-particle.

Embodiment 726

The method of embodiment 725, wherein the composite nano-particles are bonded to micron-sized carrier particles to form NNm particles.

Embodiment 727

The method of embodiment 725, wherein the composite nano-particles are embedded within carrier particles to form NNiM particles.

Embodiment 728

The method of any one of embodiments 726-727, wherein the carrier particles comprise cerium oxide, zirconium oxide, lanthanum oxide, yttrium oxide, or a combination thereof.

Embodiment 729

The method of embodiment 728, wherein the carrier particle comprises 86 wt % cerium oxide, 10 wt % zirconium oxide, and 4 wt % lanthanum oxide.

Embodiment 730

The method of any one of embodiments 725-729, wherein the composite nano-particles are plasma created.

Embodiment 731

The method of any one of embodiments 717-730, wherein the washcoat composition comprises palladium.

Embodiment 732

The method of embodiment 731, wherein the washcoat composition comprises about 2 g/L to about 4 g/L palladium.

Embodiment 733

The method of embodiment 732, wherein the washcoat composition comprises about 3 g/L palladium.

Embodiment 734

The method of any one of embodiments 731-733, wherein the coated substrate is used in a greater than or equal to 2.5 L engine system.

Embodiment 735

The method of any one of embodiments 717-730, wherein the washcoat composition comprises ruthenium.

Embodiment 736

The method of embodiment 735, wherein the washcoat composition comprises about 3 g/L to about 15 g/L ruthenium.

Embodiment 737

The method of embodiment 736, wherein the washcoat composition comprises about 5 g/L to about 6 g/L ruthenium.

Embodiment 738

The method of any one of embodiments 735-737, wherein the washcoat composition stores NOx gas up to at least 300° C. and releases the stored NOx gas at or above 300° C.

Embodiment 739

The method of any one of embodiments 735-738, wherein the coated substrate is used in a less than or equal to 2.5 L engine system.

Embodiment 740

The method of any one of embodiments 717-739, wherein the washcoat composition comprises greater than or equal to about 150 g/L of the plurality of support particles.

Embodiment 741

The method of any one of embodiments 717-740, wherein the washcoat composition comprises greater than or equal to about 300 g/L of the plurality of support particles.

Embodiment 742

The method of any one of embodiments 717-741, wherein the washcoat composition further comprises boehmite particles.

Embodiment 743

The method of embodiment 742, wherein the nano-sized PGM on a plurality of support particles comprises 95% to 98% by weight of the mixture of nano-sized PGM on a plurality of support particles and boehmite particles in the washcoat composition.

Embodiment 744

The method of any one of embodiments 742-743, wherein the boehmite particles comprise 2% to 5% by weight of the mixture of nano-sized PGM on a plurality of support particles and boehmite particles in the washcoat composition.

Embodiment 745

The method of any one of embodiments 717-744, wherein the substrate comprises cordierite.

Embodiment 746

The method of any one of embodiments 717-745, wherein the substrate comprises a honeycomb structure.

Embodiment 747

The method of any one of embodiments 717-746, further comprising coating the substrate with a corner-fill washcoat prior to coating the substrate with the PNA washcoat.

Embodiment 748

A method of forming a coated substrate, the method comprising: coating the substrate with a washcoat composition according to any one of embodiments 659-684.

Embodiment 749

The method of embodiment 748, further comprising coating the substrate with a corner-fill washcoat prior to coating the substrate with the PNA washcoat.

Embodiment 750

A catalytic converter comprising a coated substrate according to any one of embodiments 748-749.

Embodiment 751

An exhaust treatment system comprising a conduit for exhaust gas and a catalytic converter according to embodiment 750.

Embodiment 752

A vehicle comprising a catalytic converter according to embodiment 750.

Embodiment 753

The vehicle of embodiment 752, wherein the vehicle complies with the European emission standard Euro 5.

Embodiment 754

The vehicle of embodiment 752, wherein the vehicle complies with the European emission standard Euro 6.

Embodiment 755

A diesel vehicle comprising a catalytic converter according to embodiment 750.

Embodiment 756

The diesel vehicle of embodiment 755, wherein the diesel vehicle is a light-duty diesel vehicle.

Embodiment 757

A coated substrate comprising a washcoat composition according to any one of embodiments 659-684.

Embodiment 758

A vehicle comprising: a catalytic converter comprising a PNA layer comprising nano-sized PGM on a plurality of support particles comprising cerium oxide, wherein the vehicle complies with the European emission standard Euro 5.

Embodiment 759

The vehicle of embodiment 758, wherein the PNA layer stores NOx emissions from an engine of the vehicle up to at least a first temperature and releases the stored NOx emissions at or above the first temperature.

Embodiment 760

The vehicle of embodiment 759, wherein the first temperature is 150° C.

Embodiment 761

The vehicle of embodiment 758, wherein the plurality of support particles are micron-sized.

Embodiment 762

The vehicle of embodiment 758, wherein the plurality of support particles are nano-sized.

Embodiment 763

The vehicle of any one of embodiments 758-762, wherein the plurality of support particles further comprise zirconium oxide, lanthanum oxide, yttrium oxide, or a combination thereof.

Embodiment 764

The vehicle of embodiment 763, wherein the plurality of support particles comprise HSA5, HSA20, or a mixture thereof.

Embodiment 765

The vehicle of any of embodiments 758-764, wherein the nano-sized PGM on the plurality of support particles is produced by wet chemistry techniques followed by calcination.

Embodiment 766

The vehicle of any of embodiments 758-764, wherein the nano-sized PGM on the plurality of support particles is produced by incipient wetness followed by calcination.

Embodiment 767

The vehicle of any of embodiments 758-760 and 762-764, wherein the nano-sized PGM on the plurality of support particles comprise composite nano-particles, wherein the composite nano-particles comprise a support-nanoparticle and a PGM nano-particle.

Embodiment 768

The vehicle of embodiment 767, wherein the composite nano-particles are bonded to micron-sized carrier particles to form NNm particles.

Embodiment 769

The vehicle of embodiment 767, wherein the composite nano-particles are embedded within carrier particles to form NNiM particles.

Embodiment 770

The vehicle of any one of embodiments 768-769, wherein the carrier particles comprise cerium oxide, zirconium oxide, lanthanum oxide, yttrium oxide, or a combination thereof.

Embodiment 771

The vehicle of embodiment 770, wherein the carrier particle comprises 86 wt % cerium oxide, 10 wt % zirconium oxide, and 4 wt % lanthanum oxide.

Embodiment 772

The vehicle of any one of embodiments 767-771, wherein the composite nano-particles are plasma created.

Embodiment 773

The vehicle of any one of embodiments 758-772, wherein the PGM comprises palladium.

Embodiment 774

The vehicle of embodiment 773, wherein the PNA layer comprises about 2 g/L to about 4 g/L palladium.

Embodiment 775

The vehicle of embodiment 774, wherein the PNA layer comprises about 3 g/L palladium.

Embodiment 776

The vehicle of any one of embodiments 773-775, wherein the engine is greater than or equal to 2.5 L.

Embodiment 777

The vehicle of any one of embodiments 758-772, wherein the PGM comprises ruthenium.

Embodiment 778

The vehicle of embodiment 777, wherein the PNA layer comprises about 3 g/L to about 15 g/L ruthenium.

Embodiment 779

The vehicle of embodiment 778, wherein the PNA layer comprises about 5 g/L to about 6 g/L ruthenium.

Embodiment 780

The vehicle of any one of embodiments 777-779, wherein the first temperature is 300° C.

Embodiment 781

The vehicle of any one of embodiments 777-780, wherein the engine is less than or equal to 2.5 L.

Embodiment 782

The vehicle of any one of embodiments 758-781, wherein the PNA layer comprises greater than or equal to about 150 g/L of the plurality of support particles.

Embodiment 783

The vehicle of any one of embodiments 758-782, wherein the PNA layer comprises greater than or equal to about 300 g/L of the plurality of support particles.

Embodiment 784

The vehicle of any one of embodiments 758-783, wherein the vehicle is a diesel vehicle.

Embodiment 785

The vehicle of embodiment 784, wherein the diesel vehicle is a light-duty diesel vehicle.

Embodiment 786

The vehicle of any one of embodiments 758-785, further comprising an SCR unit downstream the catalytic converter.

Embodiment 787

The vehicle of any one of embodiments 758-786, further comprising an LNT.

Embodiment 788

The vehicle of any one of embodiments 758-787, wherein the vehicle complies with European emission standard Euro 6.

Embodiment 789

A catalytic converter comprising: a coated substrate comprising a PNA layer comprising nano-sized PGM on a plurality of support particles comprising cerium oxide.

Embodiment 790

The catalytic converter of embodiment 789, wherein the PNA layer stores NOx gas up to at least 150° C. and releases the stored NOx gas at or above 150° C.

Embodiment 791

The catalytic converter of embodiment 789, wherein the plurality of support particles are micron-sized.

Embodiment 792

The catalytic converter of embodiment 789, wherein the plurality of support particles are nano-sized.

Embodiment 793

The catalytic converter of any one of embodiments 789-792, wherein the plurality of support particles further comprise zirconium oxide, lanthanum oxide, yttrium oxide, or a combination thereof.

Embodiment 794

The catalytic converter of embodiment 793, wherein the plurality of support particles comprise HSA5, HSA20, or a mixture thereof.

Embodiment 795

The catalytic converter of any of embodiments 789-794, wherein the nano-sized PGM on the plurality of support particles is produced by wet chemistry techniques followed by calcination.

Embodiment 796

The catalytic converter of any of embodiments 789-794, wherein the nano-sized PGM on the plurality of support particles is produced by incipient wetness followed by calcination.

Embodiment 797

The catalytic converter of any of embodiments 789-173 and 792-794, wherein the nano-sized PGM on the plurality of support particles comprise composite nano-particles, wherein the composite nano-particles comprise a support-nanoparticle and a PGM nano-particle.

Embodiment 798

The catalytic converter of embodiment 797, wherein the composite nano-particles are bonded to micron-sized carrier particles to form NNm particles.

Embodiment 799

The catalytic converter of embodiment 797, wherein the composite nano-particles are embedded within carrier particles to form NNiM particles.

Embodiment 800

The catalytic converter of any one of embodiments 798-799, wherein the carrier particles comprise cerium oxide, zirconium oxide, lanthanum oxide, yttrium oxide, or a combination thereof.

Embodiment 801

The catalytic converter of embodiment 800, wherein the carrier particle comprises 86 wt % cerium oxide, 10 wt % zirconium oxide, and 4 wt % lanthanum oxide.

Embodiment 802

The catalytic converter of any one of embodiments 797-801, wherein the composite nano-particles are plasma created.

Embodiment 803

The catalytic converter of any one of embodiments 789-802, wherein the PGM comprises palladium.

Embodiment 804

The catalytic converter of embodiment 803, wherein the PNA layer comprises about 2 g/L to about 4 g/L palladium.

Embodiment 805

The catalytic converter of embodiment 804, wherein the PNA layer comprises about 3 g/L palladium.

Embodiment 806

The catalytic converter of any one of embodiments 803-805, wherein the catalytic converter is used in at least a 2.5 L engine system.

Embodiment 807

The catalytic converter of any one of embodiments 789-802, wherein the PGM comprises ruthenium.

Embodiment 808

The catalytic converter of embodiment 807, wherein the PNA layer comprises about 3 g/L to about 15 g/L ruthenium.

Embodiment 809

The catalytic converter of embodiment 808, wherein the PNA layer comprises about 5 g/L to about 6 g/L ruthenium.

Embodiment 810

The catalytic converter of any one of embodiments 807-809, wherein the PNA layer stores NOx gas up to at least 300° C. and releases the stored NOx gas at or above 300° C.

Embodiment 811

The catalytic converter of any one of embodiments 807-810, wherein the catalytic converter is used in at most a 2.5 L engine system.

Embodiment 812

The catalytic converter of any one of embodiments 789-811, wherein the PNA layer comprises greater than or equal to about 150 g/L of the plurality of support particles.

Embodiment 813

The catalytic converter of any one of embodiments 789-812, wherein the PNA layer comprises greater than or equal to about 300 g/L of the plurality of support particles.

Embodiment 814

An exhaust treatment system comprising a conduit for exhaust gas comprising NOx emissions and a catalytic converter comprising a coated substrate comprising a PNA layer comprising nano-sized PGM on a plurality of support particles comprising cerium oxide.

Embodiment 815

The exhaust treatment system of embodiment 814, wherein the PNA layer stores the NOx emissions from the exhaust gas up to at least 150° C. and releases the stored NOx emissions at or above 150° C.

Embodiment 816

The exhaust treatment system of embodiment 814, wherein the plurality of support particles are micron-sized.

Embodiment 817

The exhaust treatment system of embodiment 814, wherein the plurality of support particles are nano-sized.

Embodiment 818

The exhaust treatment system of any one of embodiments 814-817, wherein the plurality of support particles further comprise zirconium oxide, lanthanum oxide, yttrium oxide, or a combination thereof.

Embodiment 819

The exhaust treatment system of embodiment 818, wherein the plurality of support particles comprise HSA5, HSA20, or a mixture thereof.

Embodiment 820

The exhaust treatment system of any of embodiments 814-819, wherein the nano-sized PGM on the plurality of support particles is produced by wet chemistry techniques followed by calcination.

Embodiment 821

The exhaust treatment system of any of embodiments 814-819, wherein the nano-sized PGM on the plurality of support particles is produced by incipient wetness followed by calcination.

Embodiment 822

The exhaust treatment system of any of embodiments 814-815 and 817-819, wherein the nano-sized PGM on the plurality of support particles comprise composite nano-particles, wherein the composite nano-particles comprise a support-nanoparticle and a PGM nano-particle.

Embodiment 823

The exhaust treatment system of embodiment 822, wherein the composite nano-particles are bonded to micron-sized carrier particles to form NNm particles.

Embodiment 824

The exhaust treatment system of embodiment 823, wherein the composite nano-particles are embedded within carrier particles to form NNiM particles.

Embodiment 825

The exhaust treatment system of any one of embodiments 823-824, wherein the carrier particles comprise cerium oxide, zirconium oxide, lanthanum oxide, yttrium oxide, or a combination thereof.

Embodiment 826

The exhaust treatment system of embodiment 825, wherein the carrier particle comprises 86 wt % cerium oxide, 10 wt % zirconium oxide, and 4 wt % lanthanum oxide.

Embodiment 827

The exhaust treatment system of any one of embodiments 822-826, wherein the composite nano-particles are plasma created.

Embodiment 828

The exhaust treatment system of any one of embodiments 814-827, wherein the PGM comprises palladium.

Embodiment 829

The exhaust treatment system of embodiment 828, wherein the PNA layer comprises about 2 g/L to about 4 g/L palladium.

Embodiment 830

The exhaust treatment system of embodiment 829, wherein the PNA layer comprises about 3 g/L palladium.

Embodiment 831

The exhaust treatment system of any one of embodiments 828-830, wherein the exhaust gas is from at least a 2.5 L engine.

Embodiment 832

The exhaust treatment system of any one of embodiments 814-827, wherein the PGM comprises ruthenium.

Embodiment 833

The exhaust treatment system of embodiment 832, wherein the PNA layer comprises about 3 g/L to about 15 g/L ruthenium.

Embodiment 834

The exhaust treatment system of embodiment 833, wherein the PNA layer comprises about 5 g/L to about 6 g/L ruthenium.

Embodiment 835

The exhaust treatment system of any one of embodiments 832-834, wherein the PNA layer stores NOx emissions from the exhaust gas up to at least 300° C. and releases the stored NOx emissions at or above 300° C.

Embodiment 836

The exhaust treatment system of any one of embodiments 832-835, wherein the exhaust gas is from at most a 2.5 L engine.

Embodiment 837

The exhaust treatment system of any one of embodiments 814-836, wherein the PNA layer comprises greater than or equal to about 150 g/L of the plurality of support particles.

Embodiment 838

The exhaust treatment system of any one of embodiments 814-837, wherein the PNA layer comprises greater than or equal to about 300 g/L of the plurality of support particles.

Embodiment 839

The exhaust treatment system of any one of embodiments 814-838, further comprising an SCR unit downstream the catalytic converter.

Embodiment 840

The exhaust treatment system of any one of embodiments 814-839, further comprising an LNT.

Embodiment 841

The exhaust treatment system of any one of embodiments 814-840, wherein the exhaust treatment system complies with European emission standard Euro 5.

Embodiment 842

The exhaust treatment system of any one of embodiments 814-841, wherein the exhaust treatment system complies with European emission standard Euro 6.

EXAMPLES

As discussed above, the washcoat compositions can be configured and applied in a variety of different ways. The configurations provide examples of preparing substrates coated with the washcoats.

General Procedure for Preparation of Washcoats

The washcoats are made by mixing the solid ingredients with water. Acetic acid is added to adjust the pH to about 4. The washcoat slurry is then milled to arrive at an average particle size of about 4 μm to about 15 μm. The viscosity of the washcoat is adjusted by mixing with a cellulose solution or with corn starch to the desired viscosity, typically between about 300 cP to about 1200 cP. The washcoat is aged for about 24 hours to about 48 hours after cellulose or corn starch addition. The washcoat is coated onto the substrate by either dip-coating or vacuum coating. The part(s) to be coated can be optionally pre-wetted prior to coating. Excess washcoat is blown off and recycled. The washcoat-coated substrate is then dried at about 25° C. to about 95° C. by flowing air over the coated part, until the weight levels off. The washcoat-coated substrate is then calcined at about 450° C. to about 650° C. for about 1 hour to about 2 hours.

Testing the PNA Material for $NO_x$ Storage and Release

Figure 5:
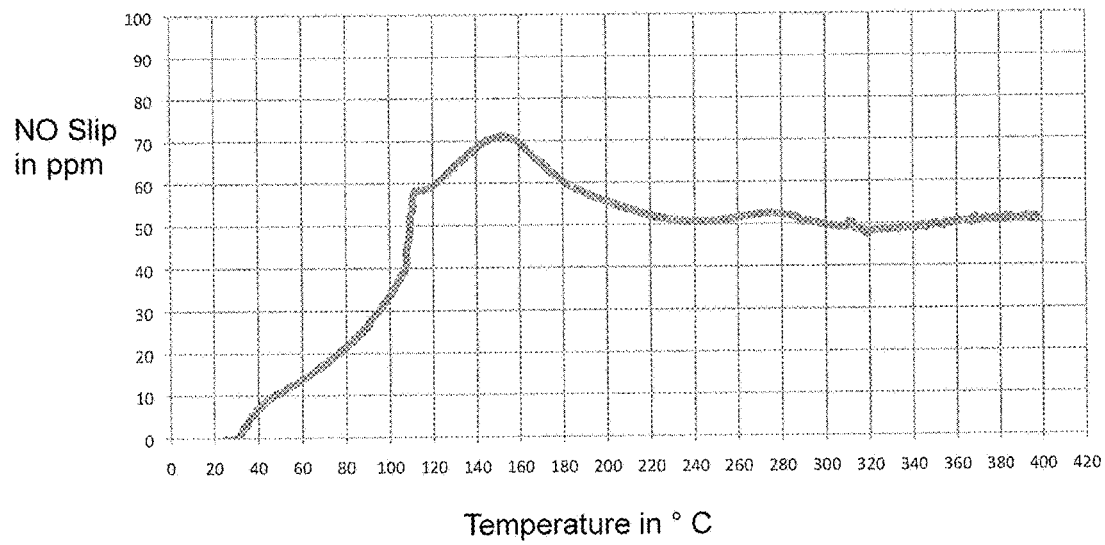
FIG. 5 is a graph demonstrating the $NO_x$ emission adsorption and release for manganese based PNA material across an operating temperature spectrum.
Figure 6:
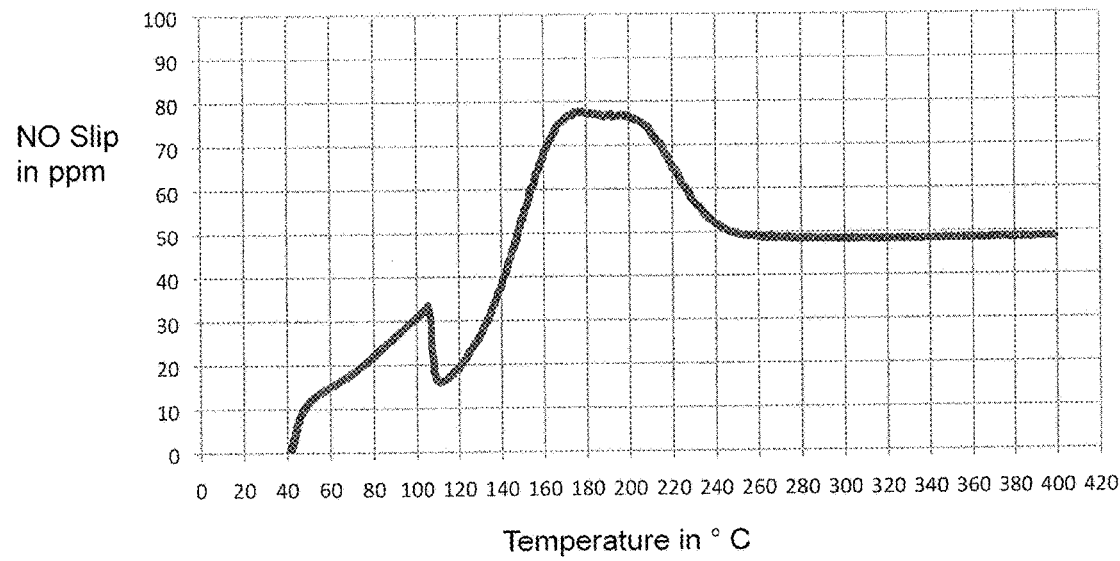
FIG. 6 is a graph demonstrating the $NO_x$ emission adsorption and release for magnesium based PNA material across an operating temperature spectrum.
Figure 7:
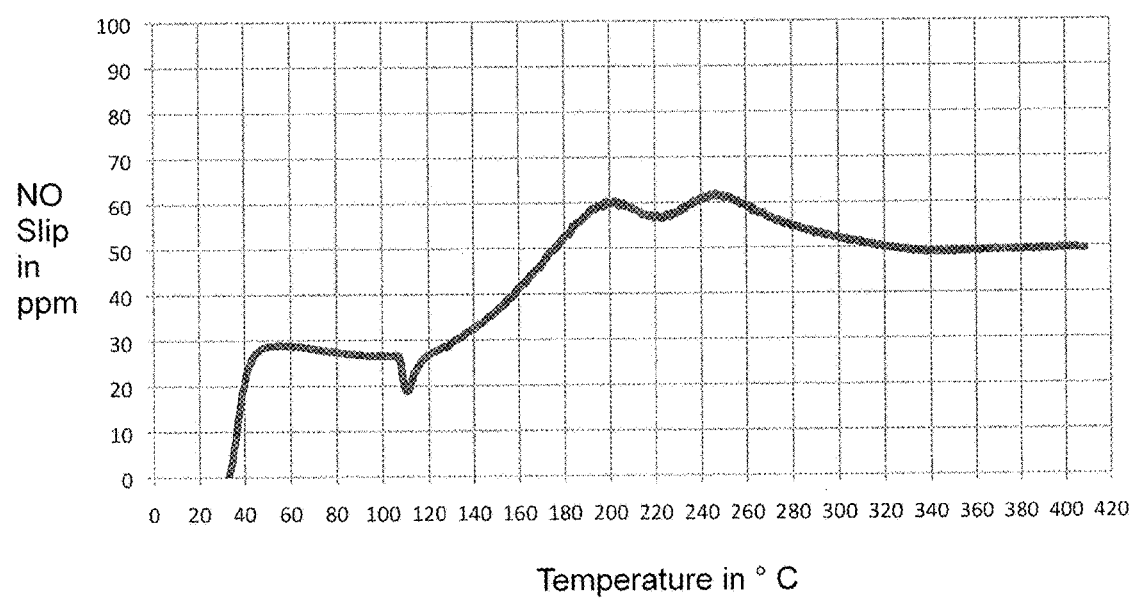
FIG. 7 is a graph demonstrating the $NO_x$ emission adsorption and release for calcium based PNA material across an operating temperature spectrum.

The performance of various PNA materials were tested for $NO_x$ storage and release temperatures. In order to test the performance of the various PNA materials, the following process was adhered to: (1) build the actual PNA samples; (2) age the samples hydrothermally; (3) test the samples for $NO_x$ emission storage and release using a synthetic gas mixture that mimics the exhaust of a light duty diesel vehicle. The results shown in FIGS. 5-7 are "second runs" (i.e., the PNA samples were run back to back to see whether there was any residual storage effects). Based on the results shown in FIGS. 5-7, there were none and the PNA materials release 100% of the stored $NO_x$ emissions.

The following Tables 1 and 2 list the Aging Conditions and Testing Protocol used to test the PNA samples.

TABLE 1

Aging Conditions

| | |
|---|---|
| Heating Rate | 2 hrs (=6.7° C./min) |
| Temperature | 750° C. |
| Holding Period | 20 hrs |
| Cool Down Rate | <3° C./min |
| Atmosphere | $H_2O$ (~5%), $O_2$ (20%), $N_2$ (rest) |
| Volumetric Flow | N/A |

TABLE 2

Testing Protocol

| | |
|---|---|
| Sample Size | 1" × 1" core |
| GHSV | 60,000 $h^{-1}$ |
| Gas Mixture | Propene = 400 ppm |
| | CO = 1,200 ppm |
| | NO = 50 ppm |
| | $O_2$ = 12.5% |
| | $CO_2$ = 6% |
| | $H_2O$ = 6.5% |
| | $N_2$ = Rest |
| Heating Rate | 5° C./min (100° C.-350° C.) |

FIG. 5 is a graph showing the $NO_x$ emission adsorption and release for manganese based PNA material across an operating temperature spectrum. As shown in FIG. 5, manganese based PNA material stores $NO_x$ emissions efficiently up to about 110° C. At that point, the PNA material stops adsorbing $NO_x$ emissions and starts releasing the adsorbed $NO_x$. At about 220° C., all the stored $NO_x$ emissions are released. Thus, manganese based oxides are good $NO_x$ emission adsorbers from ambient temperature to about 100° C. In addition, the manganese based oxides exhibited a "sharp" release temperature. The slight drop in NO slippage at 110° C. is due to water being turned on.

FIG. 6 is a graph showing the $NO_x$ emission adsorption and release for magnesium based PNA material across an operating temperature spectrum. As shown in FIG. 6, magnesium based PNA material stores $NO_x$ emissions efficiently up to about 150° C. At that point, the PNA material stops adsorbing $NO_x$ emissions and starts releasing the adsorbed $NO_x$. At about 240° C., all the stored $NO_x$ emissions are released. Thus, magnesium based oxides are good $NO_x$ emission adsorbers from ambient temperature to about 150° C. In addition, the magnesium based oxides exhibited a "sharp" release temperature. The sharp drop in NO slippage at 110° C. is due to water being turned on.

FIG. 7 is a graph showing the $NO_x$ emission adsorption and release for calcium based PNA material across an operating temperature spectrum. As shown in FIG. 7, calcium based PNA material stores $NO_x$ emissions efficiently up to about 180° C. At that point, the PNA material stops adsorbing $NO_x$ emissions and starts releasing the adsorbed $NO_x$. At about 310° C., all the stored $NO_x$ emissions are released. Thus, calcium based oxides are good $NO_x$ emission adsorbers from ambient temperature to about 150° C. In addition, the calcium based oxides exhibited a "sharp" release temperature. The sharp drop in NO slippage at 110° C. is due to water being turned on.

Figure 8:
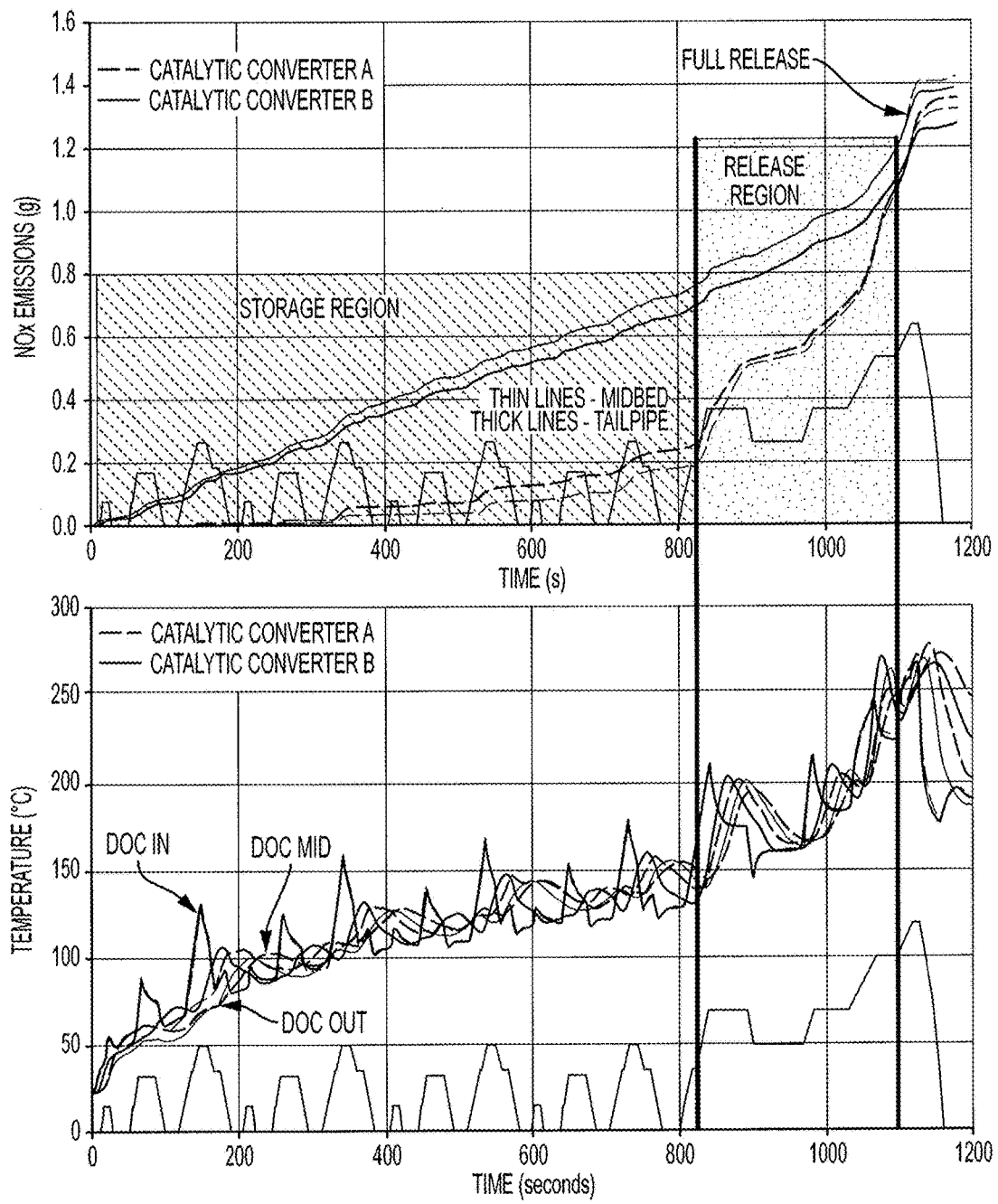
FIG. 8 is a graph demonstrating $NO_x$ emission storage comparison performance of a catalytic converter employing PNA material as described herein to a commercially available catalytic converter.

FIG. 8 illustrates $NO_x$ emission storage comparison performance of one embodiment of a catalytic converter employing a substrate coated with palladium based PNA material and a platinum group metal loading of the entire catalytic converter of about 2.5 g/l (catalytic converter A, dashed line) to the performance of a commercially available catalytic converter (catalytic converter B, solid line) with a platinum group metal loading of the entire catalytic converter of about 6.4 g/l.

Catalytic converter A (employing PNA material as described herein) was formed by generating a PNA washcoat including palladium on cerium oxide produced by wet chemistry methods and boehmite. The PNA washcoat was coated onto a first zone of the substrate and the substrate was dried and calcined. On a second zone of the substrate downstream the PNA zone, the substrate had a corner fill layer, a catalytic layer (on top of the corner fill layer) including NNm particles and a Pt:Pd weight ratio of 2:1, and a zeolite layer (on top of the catalytic layer), all of which as described herein. Catalytic converter B is a commercially available catalytic converter formed by wet chemistry methods. Both catalytic converters were tested under the same conditions.

As shown in FIG. 8, as the temperature of the catalytic converter B increased, the $NO_x$ emissions increased linearly. In contrast, as the temperature of the catalytic converter A increased, the $NO_x$ emissions only slightly increased until after a designated time and temperature, wherein the $NO_x$ emissions were sharply released. Accordingly, catalytic converter A was able to store $NO_x$ emissions from ambient up to about 150° C.

Figure 9:
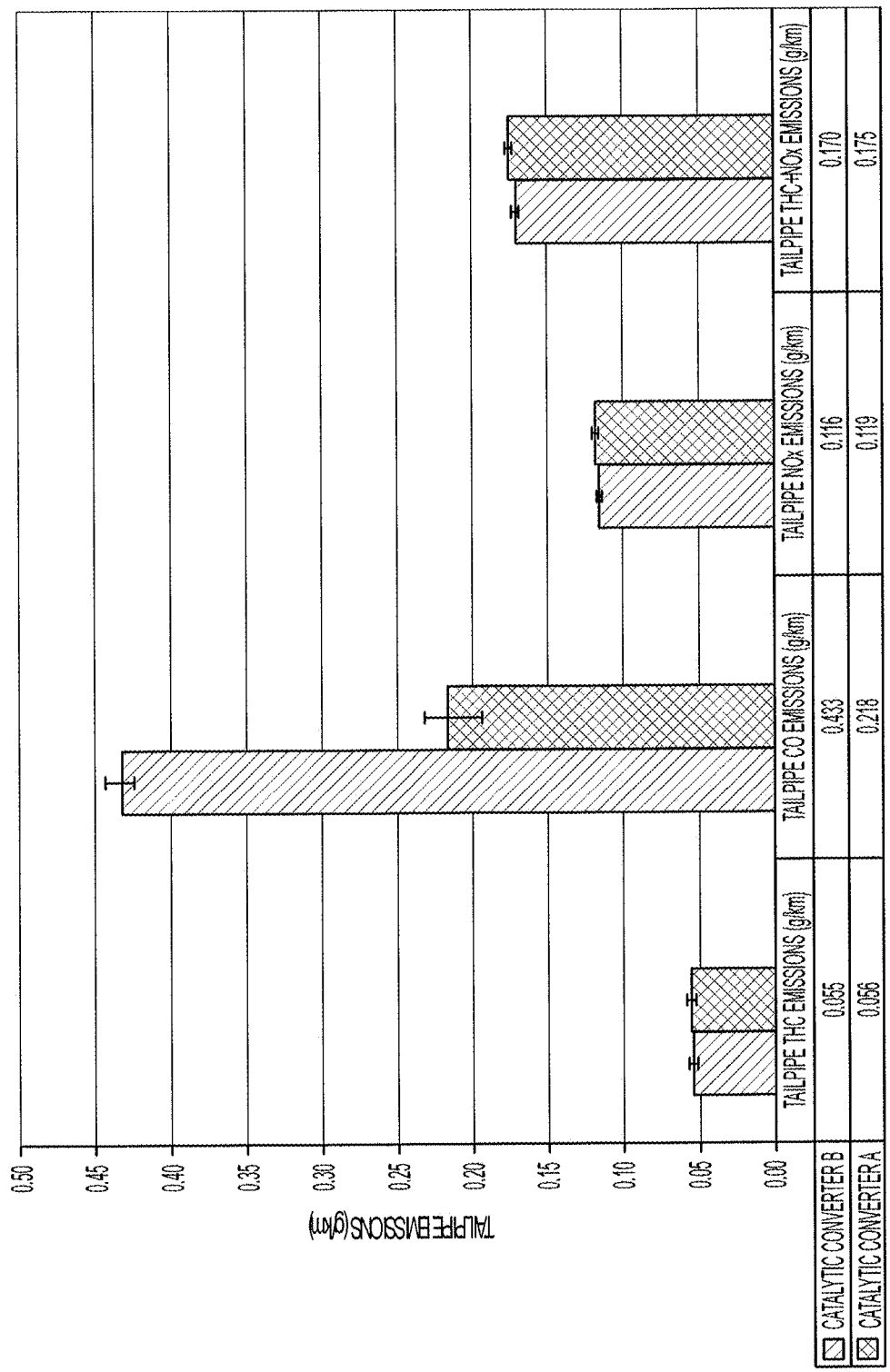
FIG. 9 is a graph demonstrating tailpipe emission comparison performance of a catalytic converter employing PNA material as described herein to a commercially available catalytic converter.

FIG. 9 illustrates a comparison of the tailpipe emissions of the catalytic converter A and the catalytic converter B. As shown in FIG. 9, catalytic converter A can have about 50% less CO emissions than catalytic converter B and use significantly less PGM thereby reducing cost.

The disclosures of all publications, patents, patent applications, and published patent applications referred to herein by an identifying citation are hereby incorporated herein by reference in their entirety.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications can be made in the embodiments chosen for illustration without departing from the spirit and scope of the invention. Therefore, the description and examples should not be construed as limiting the scope of the invention.

We claim:

1. A vehicle comprising:
   a catalytic converter comprising a Passive NOx Adsorber (PNA) layer comprising nano-sized platinum group metal (PGM) on a plurality of support particles comprising cerium oxide, wherein the amount of cerium oxide in the PNA layer is from about 50 g/L to about 400 g/L.

2. The vehicle of claim 1, wherein the plurality of support particles are micron-sized or the plurality of support particles are nano-sized.

3. The vehicle of claim 1, wherein the plurality of support particles further comprise zirconium oxide, lanthanum oxide, yttrium oxide, or a combination thereof.

4. The vehicle of claim 3, wherein the plurality of support particles comprise HSA5, HSA20, or a mixture thereof.

5. The vehicle of claim 1, wherein the nano-sized PGM on the plurality of support particles comprise composite nanoparticles, wherein the composite nano-particles comprise a support-nanoparticle and a PGM nano-particle.

6. The vehicle of claim 5, wherein the composite nano-particles are bonded to micron-sized carrier particles to form nano-on-nano-on-micro (NNm) particles.

7. The vehicle of claim 6, wherein the carrier particles comprise cerium oxide, zirconium oxide, lanthanum oxide, yttrium oxide, or a combination thereof.

8. The vehicle of claim 7, wherein the carrier particle comprises 86 wt % cerium oxide, 10 wt % zirconium oxide, and 4 wt % lanthanum oxide.

9. The vehicle of claim 5, wherein the composite nano-particles are embedded within carrier particles to form nano-on-nano-in-micro (NNiM) particles.

10. The vehicle of claim 1, wherein the PGM comprises palladium.

11. The vehicle of claim 10, wherein the PNA layer comprises about 2 g/L to about 4 g/L palladium.

12. The vehicle of claim 11, wherein the PNA layer comprises about 3 g/L palladium.

13. The vehicle of claim 1, wherein the PGM comprises ruthenium.

14. The vehicle of claim 13, wherein the PNA layer comprises about 3 g/L to about 15 g/L ruthenium.

15. The vehicle of claim 14, wherein the PNA layer comprises about 5 g/L to about 6 g/L ruthenium.

16. The vehicle of claim 1, wherein the PNA layer comprises greater than or equal to about 150 g/L of the plurality of support particles.

17. The vehicle of claim 1, wherein the PNA layer comprises greater than or equal to about 300 g/L of the plurality of support particles.

18. The vehicle of claim 1, wherein the vehicle is a diesel vehicle.

19. The vehicle of claim 1, further comprising a selective catalytic reduction (SCR) unit downstream the catalytic converter.

20. The vehicle of claim 1, further comprising a lean $NO_x$ trap (LNT).

* * * * *